United States Patent [19]
Reitman et al.

[11] Patent Number: 5,177,362
[45] Date of Patent: * Jan. 5, 1993

[54] SENSOR CHAMBER

[75] Inventors: William Reitman; Jeanette Kennedy, both of Santa Ana, Calif.

[73] Assignee: Grumman Aerospace Corporation, Bethpage, N.Y.

[*] Notice: The portion of the term of this patent subsequent to Dec. 29, 2009 has been disclaimed.

[21] Appl. No.: 608,987

[22] Filed: Oct. 31, 1990

[51] Int. Cl.$^5$ .......................................... G01M 11/00
[52] U.S. Cl. .................................. 250/332; 250/330
[58] Field of Search ............................... 250/332, 330

[56] References Cited

U.S. PATENT DOCUMENTS

| | | | |
|---|---|---|---|
| 3,083,473 | 4/1963 | Luton | 434/34 |
| 3,084,454 | 4/1963 | Schueller | 434/34 |
| 3,247,317 | 4/1966 | Saylor | 358/104 |
| 3,442,139 | 5/1969 | Munro | 73/865.6 |
| 4,106,345 | 8/1978 | Saunders et al. | 73/865.6 |
| 4,419,692 | 12/1983 | Modisette et al. | 358/113 |
| 4,482,252 | 11/1984 | Lorenz | 356/448 |
| 4,605,232 | 8/1986 | Hundstad | 273/348 |
| 4,621,265 | 11/1986 | Buse et al. | 342/169 |
| 4,827,130 | 5/1989 | Reno | 250/332 |
| 4,862,002 | 8/1989 | Wang et al. | 250/352 |
| 4,876,453 | 10/1989 | Wirick | 250/332 |

OTHER PUBLICATIONS

Louis-Francois Pau and Mohamed Youssri El Nahas. *An Introduction to Infrared Image Acquisition and Classification Systems*, Letchworth, Hertfordshire, England, Research Studies Press Ltd., 1983. pp. 21, 25, 61-64. TA1570.P38.

Kenneth J. Button, editor, *Infrared and Millimeter Waves*, vol. 3, Submillimeter Techniques, New York, Academic Press, 1980, pp. 62-63. TA1570.I5.

Primary Examiner—Constantine Hannaher
Attorney, Agent, or Firm—Statina and Brunda

[57] ABSTRACT

A sensor chamber is disclosed for testing the operation of detector modules designed to be placed in earth orbit. The sensor chamber includes a chamber housing and a vacuum pump for evacuating the sensor chamber housing to vacuum conditions representative of a space environment. An infrared detector module is disposable within the sensor chamber, the module being operative to receive an infrared frequency signal and generate an output signal in response thereto. A window is formed within the sensor chamber housing, adjacent the detector module, to facilitate communication of infrared frequency signals to the detector module. A detector servo mechanism is provided for regulating the orientation of the detector module within the sensor chamber housing. The detector servo being operative to effect movement of the detector module with respect to the infrared frequency signal.

3 Claims, 8 Drawing Sheets

SENSOR CHAMBER

BACKGROUND OF THE INVENTION

The present invention relates to equipment for testing the operation of sensor modules designed to conduct surveillance of the earth and the surrounding atmosphere from a position in space.

Systems for monitoring activities on the earth and in the surrounding atmosphere have been constructed and deployed in space for many years. Some such systems are designed to map the surface of the earth, others monitor weather conditions and others monitor events relating to national defense. While the accuracy and resolution of such systems has continually improved over the years certain applications require still greater resolution and real time use of the data. Though precise information regarding the resolution of images returned from orbiting satellites is not publicly available, it is generally known that LANDSAT (U.S.) and SPOT-G (Fr.) satellites provide resolution sufficient to identify objects 15 meters long. More recently, the Soviet Union has offered to sell images from photographic satellites capable of identifying objects as short as 5 meters long. Because certain applications require real time processing of the images of the observed scene, photographic techniques may be inadequate to satisfy the requirements of those applications. Certain applications require that the satellite imagery be done by means of infrared detector systems electrically connected to processing circuitry. The need for high resolution, high speed processing and reliability in the extremes of the space environment has required designers to press detector and processing technology to the existing limits and beyond. Consequently, the costs of constructing such satellite surveillance systems have become enormous as has the cost of launching such a system into orbit. In view of those costs and the uncertainty associated with such advanced technology it is highly desirable to vigorously test the surveillance system component in a space-like environment in order to reduce the potential for failure in orbit.

The present invention is directed to a technique and system useful to simulate the space environment in which detector modules are deployed, and to simulate the types of images which they are intended to detect and track. The invention is useful to generate various test scenarios and measures the detector module response to each scenario. The response of the module to the various scenarios may then be evaluated to determine the operability of the various detector module components. The test information may be used to replace inoperative detector module components, to facilitate the design of new modules and related support electronics, or to develop methods of processing and prioritizing detection and communication functions associated with the module.

SUMMARY OF THE INVENTION

A sensor chamber is disclosed for testing the operation of detector modules designed to be placed in earth orbit. The sensor chamber includes a chamber housing and a vacuum pump for evacuating the sensor chamber housing to vacuum conditions representative of a space environment. An infrared detector module is disposable within the sensor chamber, the module being operative to receive an infrared frequency signal and generate an output signal in response thereto. A Window is formed within the sensor chamber housing adjacent, adjacent the detector module, to facilitate communication of infrared frequency signals to the detector module. A detector servo mechanism is provided for regulating the orientation of the detector module within the sensor chamber housing. The detector servo being operative to effect movement of the detector module with respect to the infrared frequency signal.

The presently preferred embodiment further includes a neutral density filter wheel disposed within the sensor chamber housing, between the detector module and the window. The neutral density filter is operative to regulate the intensity of infrared light signals communicated to the detector module. In the presently preferred embodiment the neutral density filter is implemented as a filter wheel, having a plurality of filter elements The neutral density filter wheel is preferably rotatable to present different filter elements to the infrared frequency signal, resulting in graudated filtering of the intensity of the infrared frequency signal presented to the detector module.

The presently preferred embodiment further includes a spectral density filter, disposed within the sensor chamber housing between the detector module and the window. The spectral density filter is preferably implemented as a filter wheel including a plurality of spectral density filter elements. The spectral density filter wheel is rotatable to present different filter elements, each of which being effective to provide graduated filtering of the spectral content of the infrared frequency signal communicated to the detector module.

By rotation of the filter wheels, and by manipulation of the detector servo mechanism, the infrared detector module may be interrogated into a variety of different test conditions to test the operation of the detector module.

DETAILED DESCRIPTION OF THE PRESENTLY PREFERRED EMBODIMENT

The detailed description set forth below is intended merely as a description of the presently preferred embodiment of the invention, and is not intended to represent the only form in which the present invention may be constructed or utilized. The description below sets forth the functions in sequence of signals that are affected by the invention in connection with the illustrated embodiment. It is to be understood, however, that the same, or equivalent functions where signal sequences may be accomplished by different embodiments that are also intended to be encompassed within the spirit and scope of the invention.

Figure 1:
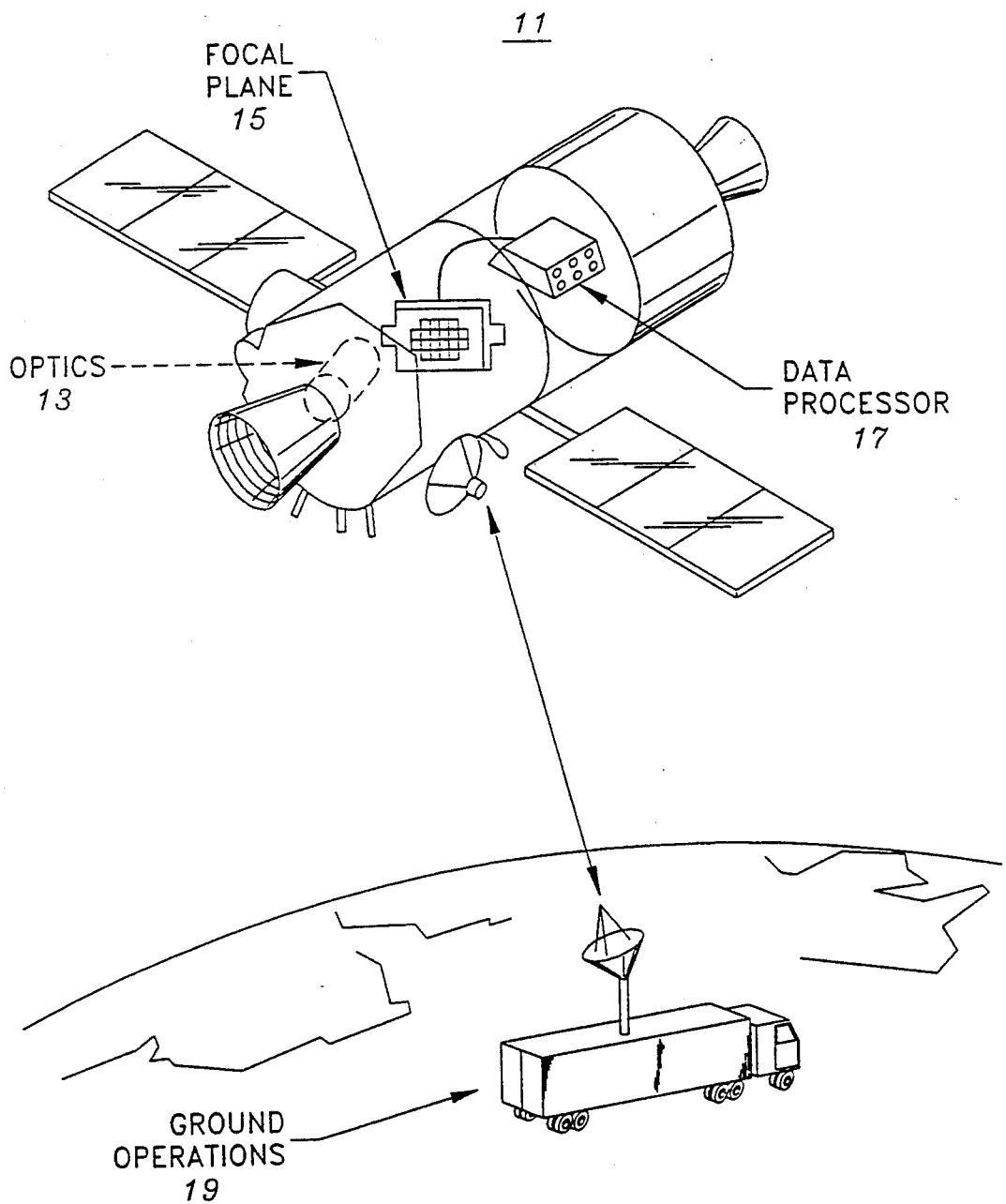
FIG. 1 is a perspective view of an exemplary satellite generally illustrating its various components.

FIG. 1 of the drawings generally illustrates an infrared detector system payload disposed within an orbiting satellite system. The satellite system generally incorporates an optical system which focuses objects within the field of view on the surface of a detector focal plane. The focal plane is formed of electro optical components adapted to detect objects within the field of view and to generate electrical signals responsive to images of those objects. By analyzing the pattern of information produced by the individual detector elements and correlating that information over time in various ways a detailed image of the area within the field of view can be generated. The precise satellite structure, the structure of the detector modules used to form the detector focal plane, and the precise manner in which the information from the detector elements is processed is not intended to be a limitation with respect to the present invention, which, in its broader aspects, has application to all types of satellite and detector systems. Thus, the reference to particular types of detector modules and electronic systems compatible with those detector modules is intended as exemplary of one manner in which the present invention may be utilized. Reference is made to the following patents which are representative of the present state of the art in relation to the construction of infrared detection systems and related support electronics having application to space surveillance systems.

3,852,714 CARSON ET AL.
3,970,990 CARSON ET AL.
4,283,755 TRACY
4,304,624 CARSON ET AL.
4,352,715 CARSON ET AL.
4,354,107 CARSON ET AL.
4,103,238 CLARK
4,525,921 CARSON ET AL.
4,551,629 CARSON ET AL.
4,592,029 ALTMAN ET AL.
4,618,763 SCHMITZ
4,646,128 CARSON ET AL.
4,659,932 SCHMITZ
4,675,532 CARSON
4,672,737 CARSON ET AL.

The teachings of the above cited references are incorporated herein by reference.

FIG. 1 generally illustrates a satellite 11 shown in Earth orbit. The portions of satellite 11 of particular interest include an optical system 13, detector focal plane 15 and data processor 17. The optics 13 function to image objects within the satellite field of view on the surface of focal plane 15. Optics 13 may include scanning mechanisms and/or staring mechanisms, depending on the Particular function of the satellite 11. The optics 13 may include various enhancements, such as means for reducing the effects of radiation from the sun, means for filtering the light frequencies passing through the optical system, and means for toggling the location of the image on the surface of focal plane 15 in order to derive certain information from the image.

As described in more detail below, the focal plane 15 may be any of a variety of constructions, utilizing a variety of different materials suitable to operate in a space environment. The focal plane 15 functions to derive electrical signals from the image focused by optical system 13 and to communicate such electrical signals to the data processor 17. Processor 17 directs interrogation of the focal plane 15 and is controlled by signals from ground operations 19.

Figure 2:
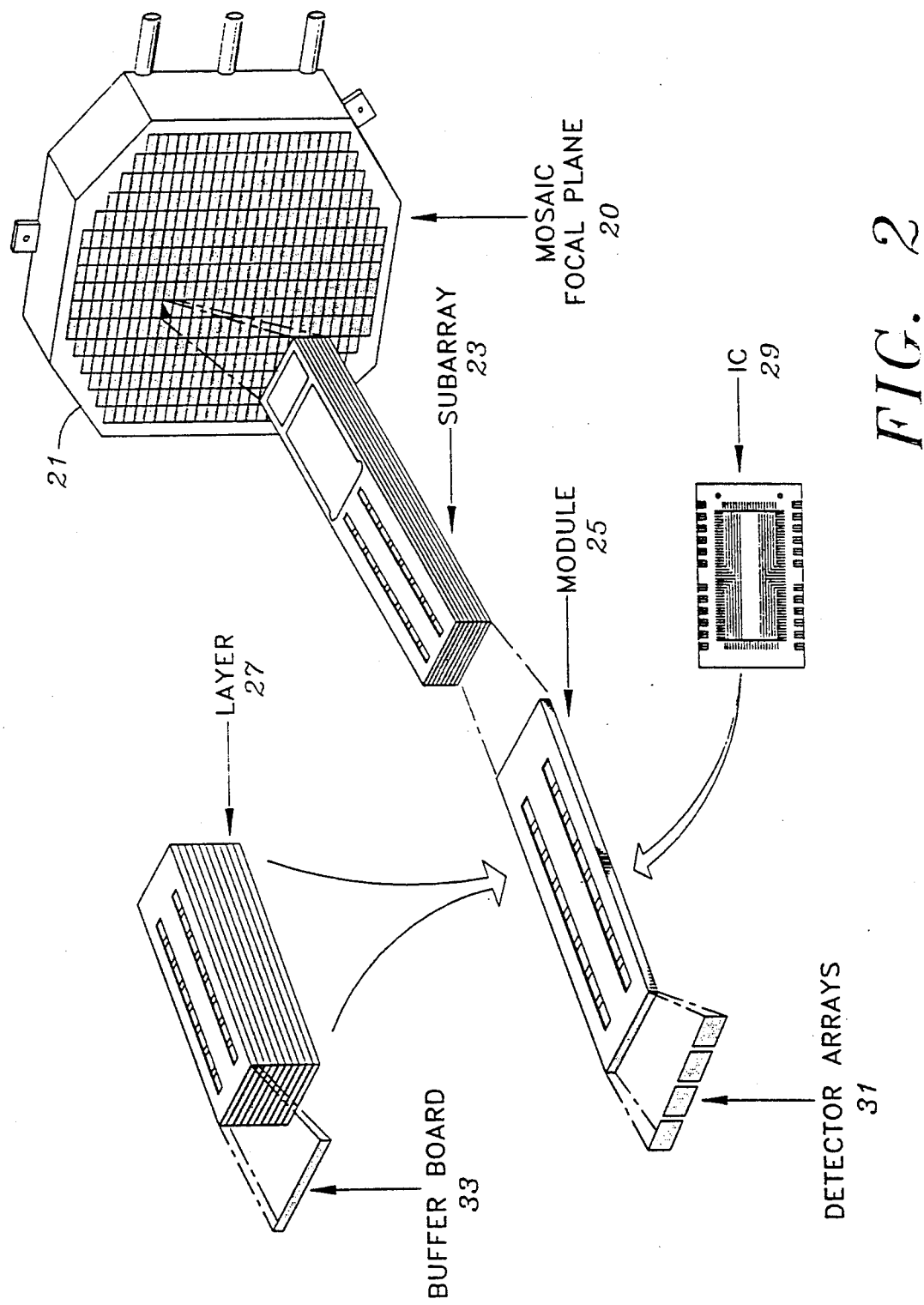
FIG. 2 is a perspective view of an exemplary detector focal plane incorporated in the satellite illustrated at FIG. 1, with portions enlarged.

Referring to FIG. 2 an exemplary focal plane useful in the application illustrated at FIG. 1 is shown in more detail. As shown at FIG. 2 the focal plane 20 is defined by a housing 21 which holds a substantial number of individual subarrays 23 disposed to have edge portions that collectively form the front face of detector focal plane 20. Each subarray 23 is comprised of a plurality of modules 25, with each module is comprised of a plurality of separate layers 27. Integrated circuits 29 may be mounted on the layers 27 to facilitate on-focal-plane processing of data and interrogation of detector elements. Detector arrays 31, each containing a plurality of detector elements are formed along a vertical edge surface of the modules and are in electrical communication with the integrated circuits via conductive paths formed on the surface of the layers 27. A buffer board 33 may be disposed intermediate the front face of module 35 and the detector arrays 31 to facilitate interconnection and to isolate the detector arrays from mechanical stress generated by expansion or contraction of the module 25. Further details describing the construction of such exemplary modules are set forth in the above cited U.S. Patents. Exemplary integrated circuits suitable for incorporation with the modules include circuits disclosed in the following mask work registrations, the substance of which is incorporated herein by reference:

MW 3147 CUSTOM INTEGRATED CIRCUIT LAYOUT FOR DETECTOR CIRCUIT INCLUDING GAIN NORMALIZATION AND ANALOG TO DIGITAL CONVERTER

MW 3145 CUSTOM INTEGRATED CIRCUIT LAYOUT FOR MULTIPLEXER

MW 3148 CUSTOM INTEGRATED CIRCUIT LAYOUT FOR LINEAR AMPLIFIER

MW 3146 CUSTOM INTEGRATED CIRCUIT LAYOUT INCLUDING CHOPPER STABILIZED AMPLIFIER

MW 3150 CUSTOM INTEGRATED CIRCUIT SCANNING CIRCUIT

MW 3144 CUSTOM INTEGRATED CIRCUIT LAYOUT FOR DETECTOR CIRCUIT INCLUDING MODIFIED BANDPATHS AND GAIN CHARACTERISTICS

MW 3151 CUSTOM INTEGRATED CIRCUIT LAYOUT FOR SIGNAL PROCESSOR

MW 3149 CUSTOM INTEGRATED CIRCUIT LAYOUT FOR STARING CIRCUIT

Figure 3:
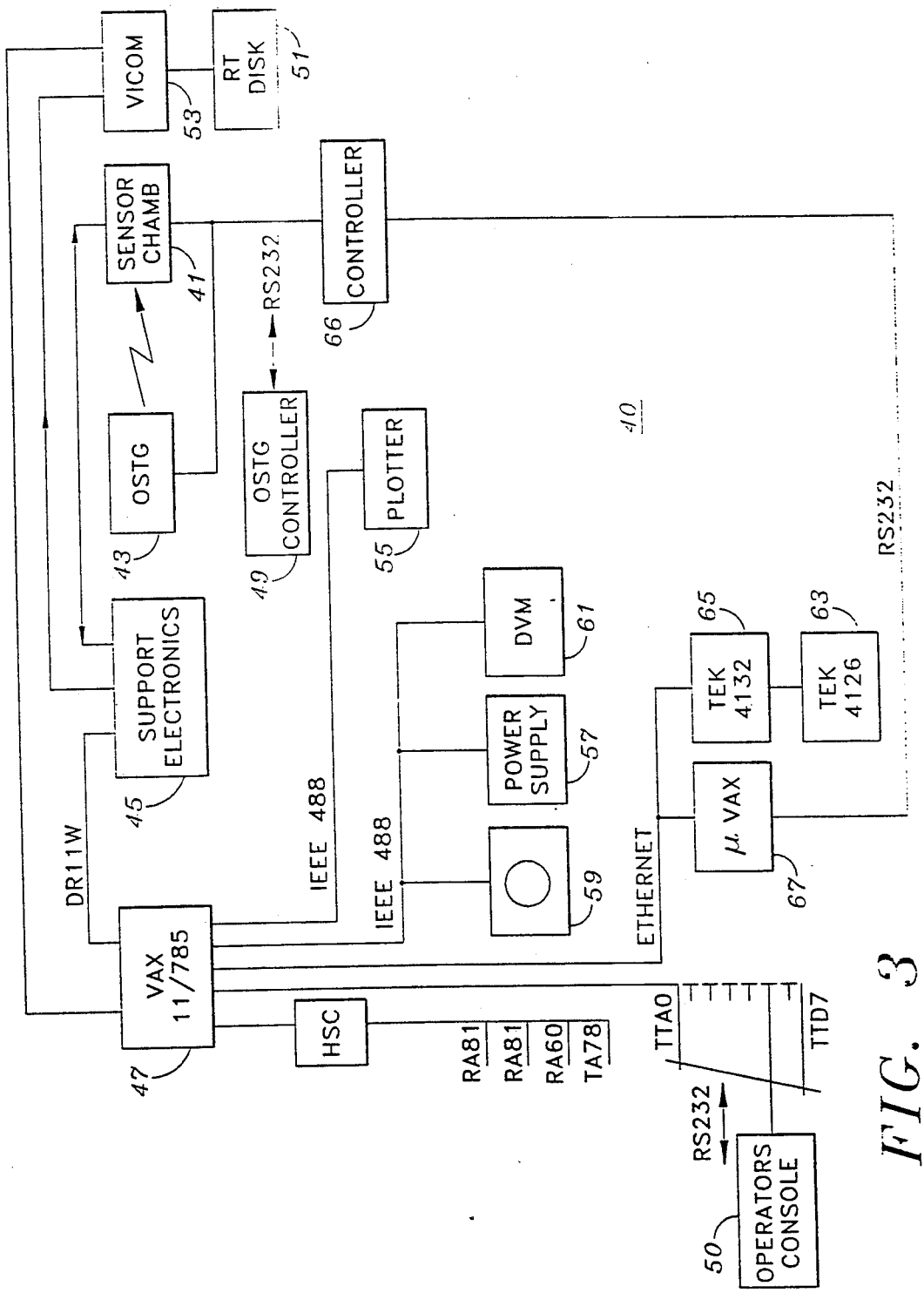
FIG. 3 is a block diagram illustrating the basic configuration of a sensor test system for testing detector modules such as those illustrated at FIG. 2.

FIG. 3 illustrates the basic block diagram of the system for testing the operation of the modules 25. The principal elements of the system 40 include the sensor chamber 41, adapted to hold a module 25 to be tested, the optical scene test generator 43 (OSTG), adapted to generate the optical image for display to the module, and the support electronics 45 adapted to operate and gather data from the subarray 23 or module 25. A VAX 11/785 computer 47 regulates the operation of the support electronics. The computer 47 operates under the direction of control programs and in accordance with instructions entered into controller 49, which may be a personal computer such as an IBM (TM) personal computer. Detailed programming information for an exemplary program to enable the functions of controller 49 are disclosed in an unpublished appendix submitted herewith.

Pursuant to the instructions resident in controller 49 the VAX computer 47 functions to regulate operations in the OSTG 43 and sensor chamber 41, as well as to establish the state of support electronics 45 and establish communications paths to output and store test information from the sensor chamber 41. As described more fully below the sensor chamber 41 and OSTG 43 include servo mechanisms adapted to regulate the position of elements therein. The sensor chamber 41 includes servo mechanisms to orient a detector module to simulate the various angles at which the module may be disposed in relation to the Earth's surface. The OSTG 43 includes several servos to simulate, for example, movement of the Earth scene, movement of a target in motion in relation to the Earth scene, drift and jitter, representative of relative movement between the satellite and Earth scene and toggling of the imagery across the module detector array surface. Depending upon the particular test scenario defined by controller 49, the VAX computer 47 orients the various servo mechanisms and regulates the vacuum pumps and infrared sources to provide scenes and orientations representative of the desired test environment.

Referring again to FIG. 3, it is to be understood that the particular orientation of visual displays and recording and analyzing devices is intended to be exemplary of but one embodiment of the invention and is not intended to be limiting of other embodiments wherein the same or similar regulation or recording functions are implemented in a different manner. In the illustrated embodiment, data management is accomplished by the DR11W connector between the VAX computer 47 and support electronics 45. IEEE 488 connectors communicate formatted data from the VAX computer 47 to plotter 55. Information stored on the real time disk is available for display on VICOM 53 under the control of VAX 47. Plotter 55 provides another means for graphically illustrating the data communicated to VAX 47. Another IEEE 488 connector is used to communicate signals between the VAX computer 47 and power supply 57. Oscilloscope 59 and digital volt meter 61 are used to monitor the signals communicated along this conductor as well.

The graphics engine 63, implemented as a TEK 4126, provides real time display of high resolution images of test conditions. Graphics engine 63 operates in conjunction with controller 65, which may be implemented as a TEK 4132 or 4301. Microvax 67 is also connected to the ethernet and serves to provide processing of the test conditions and illustrating the environmental data such as vacuum, temperature or servo position data.

Pursuant to the program architecture and instruction list described more fully below, VAX computer 47 also communicates with controller 49 via an RS232 conductor, shown to include lines TTAO . . . TTD7. In the present embodiment not all lines of the RS232 connectors are utilized and it should be understood that different display requirements or system components may necessitate the communication of different signals or signal formats along portions of the RS232 connector. However, in the presently preferred embodiment lines TTAO-TTA3 are directed to a display terminal to display information regarding vacuum, vacuum pressure, temperature and other environmental conditions within the sensor chamber 41 or OSTG 43. Line TTA4 is directed to an external printer to print out error messages as may be generated by the VAX computer 47. Lines TTBO-TTB3 communicate signals to a low or medium resolution graphic display device to facilitate real time functions such as illustration of histograms representative of the test data. Line TTB5 communicates signals between the VAX computer 47 and a test operator's console. In the presently preferred embodiment the test operator's console, i.e. controller 50, is implemented as a Macintosh (TM) computer manufactured by Apple Computers, Inc. The console functions to make the system "user friendly" by translating operator instructions to a data format compatible with the VAX computer 47, thereby avoiding the need for direct input of signals to the VAX computer 47 in a format that may be more complicated for the operator. The "C" lines, e.g. TTCO/TTC4 may be used to provide communication between VAX 47 and remote controllers, such as other IBM (TM) personal computers located in a test lab. The "C" lines may also be used to facilitate expansion, calibration inside the chambers, temperature regulation, etc.

It should be understood that various control circuits can be used to regulate the operation of the sensor chamber and OSTG and to display and store the test conditions and responsive data. Accordingly, the above description is intended to be exemplary and not limiting with respect to other control circuits that may be utilized to implement the functions of the present invention. A further description of the construction of sensor chamber 41 and OSTG 43 is provided below.

The OSTG 43 is designed to facilitate the presentation of different test scenarios to the detector module. As described in more detail below the OSTG includes means for generating infrared images representative of the surface of the earth and of one or more objects moving in relation to the surface of the earth. As is well known in the art such infrared images can be presented using a variety of different means. The present invention uses a transmissive scene similar to a halftone image which regulates the amount of infrared radiation passed through from an IR source per unit area by the size and arrangement of opaque spots on the scene plate. The scene plate and target plate may be formed from a circular dish of silicon.

Imagery of one or more objects moving along the earth's surface, or in the atmosphere or space adjacent the earth, is also achieved by radiating the template with an infrared light source. By varying the position of the template the system can simulate movement of an object under investigation with respect to the earth. The intensity and shape of the light may be varied to simulate different types of Vehicles, e.g. solid or liquid fueled missiles. The size of aperture formed in the template may also be varied in size and shape to represent objects of different sizes and shapes under investigation, e.g. planes, missiles, ships, etc.

By independently regulating the infrared source, movement of the target template and the relative position of servos 79, 101, 107, 117, 123 (FIG. 4) the system can simulate relative movement between the earth, the satellite, and the object under investigation. Different types of relative position or movements can be simulated in multiple ways. For example, movement of the earth with respect to the detector module may be simulated by either moving the background template 99 or the detector module 25. Other types of relative movement may similarly be affected in different ways as will be apparent to those having ordinary skill in the art in view of the present disclosure. Different templates and apertures may be used to produce different test scenarios which are then regulated by program control.

Figures 4, 4A:
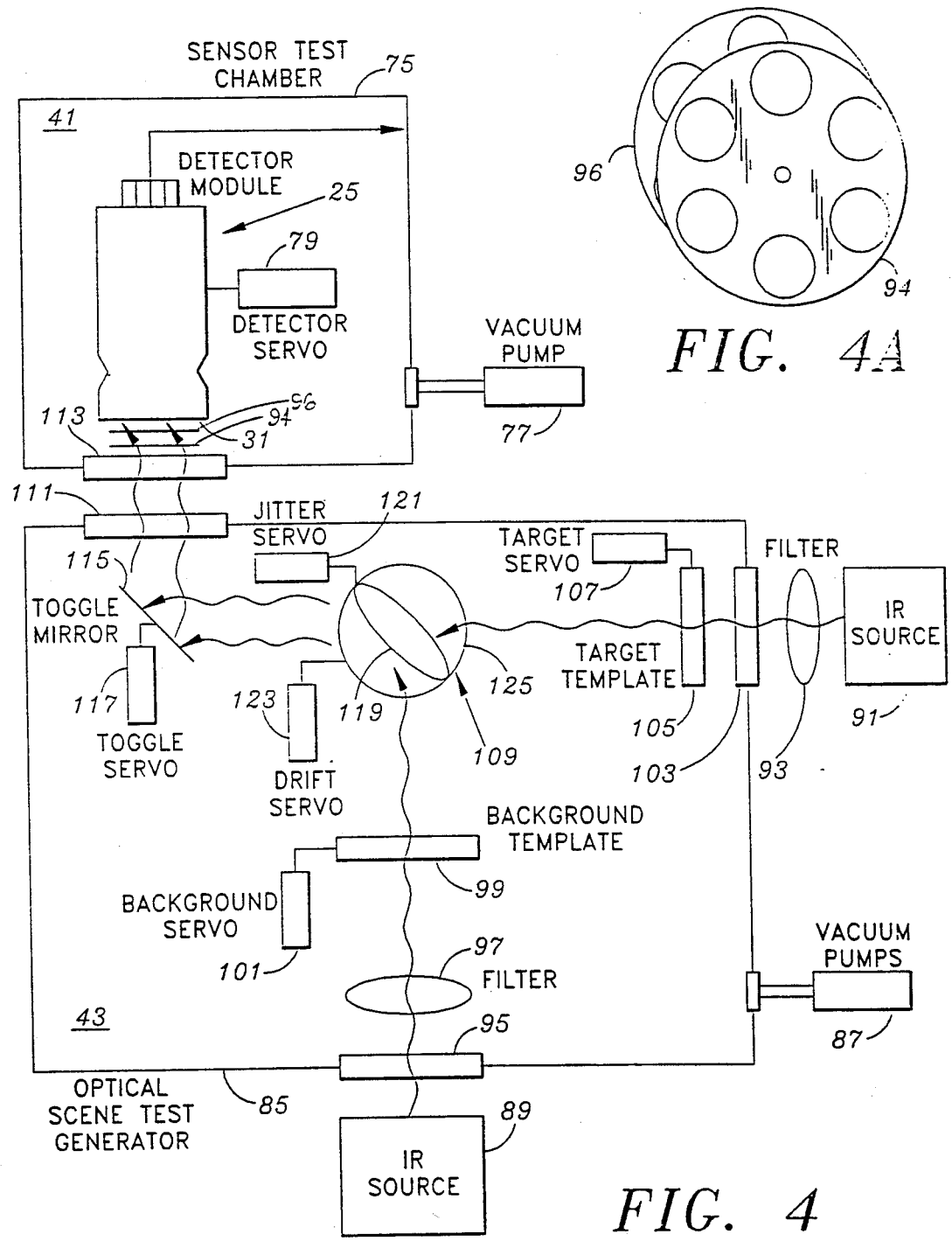
FIG. 4 is a top view of the sensor chamber and the OSTG illustrating the principal mechanical components thereof.
FIG. 4a is a perspective view of optical filters 94, 96, shown generally at FIG. 4.

Referring to FIG. 4, a top view of the construction of the sensor chamber 41 and OSTG 43 is provided. Sensor chamber 41 is a thermal vacuum chamber comprising housing 75 which is evacuated by means of vacuum pump 77. In practice the vacuum pump 77 may be a high speed vacuum control pump such as that sold by CTI-Cryogenics, model CT-10, and is operative to draw vacuum to a level of $1 \times 10^{-6}$ atmospheres (0.1 pascal) at temperatures between 88-145K. Chambers 43, 41 may be cooled to space temperatures using liquid nitrogen from an external source. In the presently preferred embodiment internal heaters are connected to the dewars to stabilize each dewar at the test operating temperature. Detector module 25 is mounted within the sensor chamber 41 so as to be movable in three axes, x, y and z, pursuant to actuation of detector motion servos, collectively represented by servo 79. The servo 79 is operative to position the detector module so as to image the test scene on the surface of the detector arrays 31 and to orient the detector module 25 at a desired angle of inclination with respect to the test scene, simulating an angle of inclination of the satellite with respect to the Earth's surface. Servo 79 is connected to the VAX computer 47 via the controller 66 and $\gamma$VAX 67. (See FIG. 3) Detector module 25 is in electrical communication with support electronics 45 to facilitate selective interrogation of detector elements within detector arrays 31 and to communicate detector element outputs in response to such interrogation. In the presently preferred embodiment both sensor chamber 41 and OSTG 43 are mounted on a granite testbed that is isolated from the ground by hydraulic suspension means. This permits the sensor chamber 41 and OSTG 43 to be isolated from vibrations in the ground or surrounding building which would introduce distortion to the test results. As previously described certain initial processing of the detector signals may be accomplished within integrated circuits 29 (see FIG. 2) disposed directly on the module's surface. More complex processing of the output of detector module 25 is affected by the VAX computer 47 which also correlates the module output signal with test scenario data. A listing of instructions resident in the VAX computer 47 is submitted herewith. Other functions, such as bias regulation, clock signals, sampling and multiplexing of data may be affected by the support electronics 45.

FIG. 4 further shows a top view of the layout of the OSTG 43. OSTG 43 includes housing 85 disposed adjacent sensor chamber housing 75. Housing 85 is evacuated by vacuum pumps 87 which may be constructed similar to vacuum pumps 77 that evacuate the sensor chamber 41. In the preferred embodiment two infrared light frequency sources 89 and 91 are disposed exterior to the OSTG 43 and directed to transmit infrared light towards optical systems disposed within housing 85. IR sources 89 and 91 may alternatively be disposed within housing 85 as may be permitted by the available space within housing 85. One advantage of disposing the IR sources outside of housing 85 is that optical filters, such as optical filter 93, may be replaced without the need to bring the OSTG to normal atmosphere conditions. Filters, such as filter 93, may be useful to vary the intensity or to filter a portion of the IR frequency spectrum to test the detector module responsiveness to selected frequencies within the IR frequency range. As is well known to those of ordinary skill in the art certain frequencies ranges within the IR range are indicative of different objects or backgrounds. For example, certain portions of the IR frequency range are more representative of a solid rocket booster burn whereas other portions of the IR frequency range may be representative of a liquid rocket booster burn. By selectively filtering the light entering the OSTG the detector module may therefore be selectively tested for detection of certain types of vehicles.

In the preferred embodiment IR source 89 is intended to be useful to generate a scene representative of the Earth and other background conditions, e.g. objects on the earth's surface or cloud cover, whereas the IR source 91 is useful to generate an image representative of an object moving in relation to the background. The IR sources 89 and 91 may be implemented using an infrared light source, such as the model WS161-55, sold by Electro-Optical Industries.

The IR frequency light from IR source 89 enters housing 85 through window 95. IR source 89 is set to the desired spectral temperature. IR source 91 is also set to the desired spectral temperature. Filters 93, 97 may be implemented as gradient filters which may be rotated to a desired density filter to regulate light from IR source 91 entering housing 85. It is anticipated that spectral filters may also be used selectively filter the spectral content of the IR light entering the OST 643. A combination of spectral and neutral density filters are utilized in the sensor test chamber 41, as described in connection with FIG. 4A. Referring to FIG. 4, light from IR source 89 passes through filter 97 and impacts on background template 99. Background template 99 may be changed in order to conduct test scenarios wherein different portions of the earth's surface are intended to serve as background for the test. Background template 99 is typically provided with a series of small apertures which, upon the passage of IR light from IR source 89, generates an infrared signature similar to that observed from satellites looking at particular portions of the Earth's surface. Background template 99 may be changed in order to conduct test scenarios wherein different portions of the Earth's surface are intended to serve as background for the test. Background servo 101 facilitates movement of the background template 99 to facilitate simulation of movement of the background in relation to the detector module 25 and/or the target.

As previously noted IR source 91 is useful to generate an infrared signal used to simulate a target. The IR frequency signal passes through optical filter 93. The signal from filter 93 passes into housing 85 through window 103 and impacts target template or membrane 105. Target template 105 is provided with one or more apertures of selected sizes intended to produce the characteristic infrared signature of one or more particular types of vehicles or other objects. By varying the intensity of the signal from IR source 91, and the size of the aperture within target template 105, various types of vehicles or other objects can be simulated. Target servo 107 functions to move the target template 105 to simulate movement of the target in relation to the background and/or the detector module. As with background servo 101, target servo 107 may in practice be formed of a plurality of servos adopted to facilitate three-axis movement of target template 105. By selective actuation of target servo 107 various types of trajectories and speeds can be simulated such that the characteristic flight paths of different types of vehicles can be simulated. For example, cruise missiles or submarine launched ballistic missiles may travel trajectories that are different than the trajectories of ground based intercontinental ballistic missiles. In order to test the responsiveness of the detector module through different types of vehicles the target template may be changed and/or the action of target servo 107 can be varied in accordance with the test program implemented in controller 49 (see FIG. 3).

It should be understood that more than one template may be used to implement the functions of target template 105. In the embodiment illustrated at FIG. 4 a single target template is utilized and, therefore, each target image produced by the template would move in a common manner. However, if more than one target template was used it is possible to simulate a plurality of targets moving relative to each other. It is also anticipated that in alternate embodiments a dynamic IR scene and multiple IR targets may be imaged directly off a cathode ray tube onto the focal plane.

The images generated by the IR light passing through background template 99 and target template 105 are directed to optical image combining device (beam splitter) 109. Device 109 functions to receive both optical images and to direct them in such a manner that they ultimately pass out of housing 85 through window 111, into housing 75 through window 113, filters 94, 96 and impact on the detector arrays 31 disposed on the front surface of detector module 25. In the presently preferred embodiment device 109 communicates the images from templates 99 and 105 to toggle mirror 115 whereupon the images are reflected to detector module 25.

FIG. 4a illustrates in more detail the construction of filter wheels 94, 96, disposed within the sensor test chamber 41. Filter wheel 94 may be implemented as a neutral density wheel, rotatable to present different density gradient filters. Filter 96 may be implemented as a spectral wheel, rotatable to present different spectral density filters. By rotating the spectral filter wheel 96 the infrared frequency of the light signal presented to the detector module 25 may be selectively varied. As will be apparent to one of ordinary skill in the art the selective rotation of filter wheels 94 and 96 will enable the testing of the detector module 25 under a variety of different conditions.

Toggle mirror 115 is an optional element in the sensor test system which is utilized dependent upon the construction of detector module 25. In some constructions detector module 25 may be formed such that adjacent lines of detector elements forming the detector arrays 31 are constructed or connected to be responsive to different portions of the IR frequency spectrum. Thus, by toggling the image such that the same image portion is moved from one line of detectors to the adjacent line of detector elements (or to any other line of detector elements) information particular to a portion of the IR frequency spectrum may be extracted from the test image without the need for increasing population of detector elements within the detector array.

As described in more detail in connection with FIG. 5, image combining device 109 includes lens 119 which is connected to jitter servo 121 which will selectively move the lens 119 in a manner to represent satellite jitter. The jitter servo 121 moves the target in background with respect to the detector module in such a manner to simulate vibration of the satellite. Drift servo 123 is connected to turntable 125 which also supports the lens 119. Drift servo 123 moves the mirror support 125 in such a fashion as to provide slow rate movement of the target and background in a manner to simulate drift of the satellite as it orbits the Earth. As will be clear to those of ordinary skill in the art the relative operation of the various servos 101, 107, 117, 121 and 123 is performed under program control in response to the particular test scenario implemented by controller 49.

Figure 5:
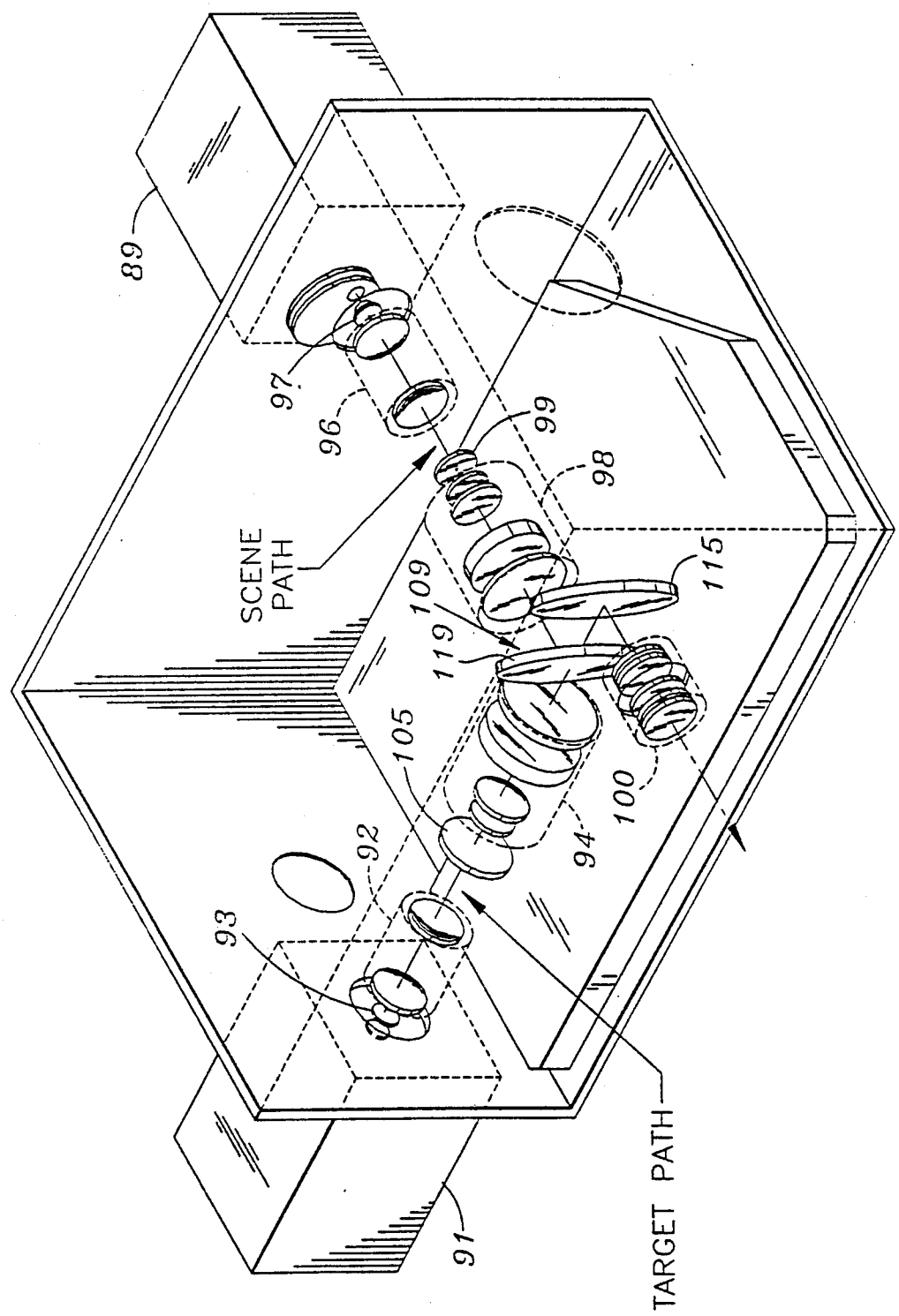
FIG. 5 is a perspective view of the construction of the OSTG illustrated at FIG. 4.

FIG. 5 is a perspective view of the OSTG illustrated at FIG. 4. The construction shown at FIG. 5 generally illustrates the optical arrangement implemented within the OSTG for combining the scene and target images, and for permitting relative movement therebetween. The target path is initiated with IR source 91 and passes through filter 93, condenser lens assembly 92, target mask 105, target collimator 94, and lens 119 of the beam splitter 109.

The scene path commences with IR source 89 and passes through filter 97, scene condenser lens assembly 96, scene template 99, scene collimator 98, and then impacts lens 119 of beam splitter 109.

The beam splitter 109 functions to combine the reflected scene images and transmitted target image on the surface of toggle mirror 115. The combined image is then communicated to the detector module through exit lens assembly 100.

Figure 6:
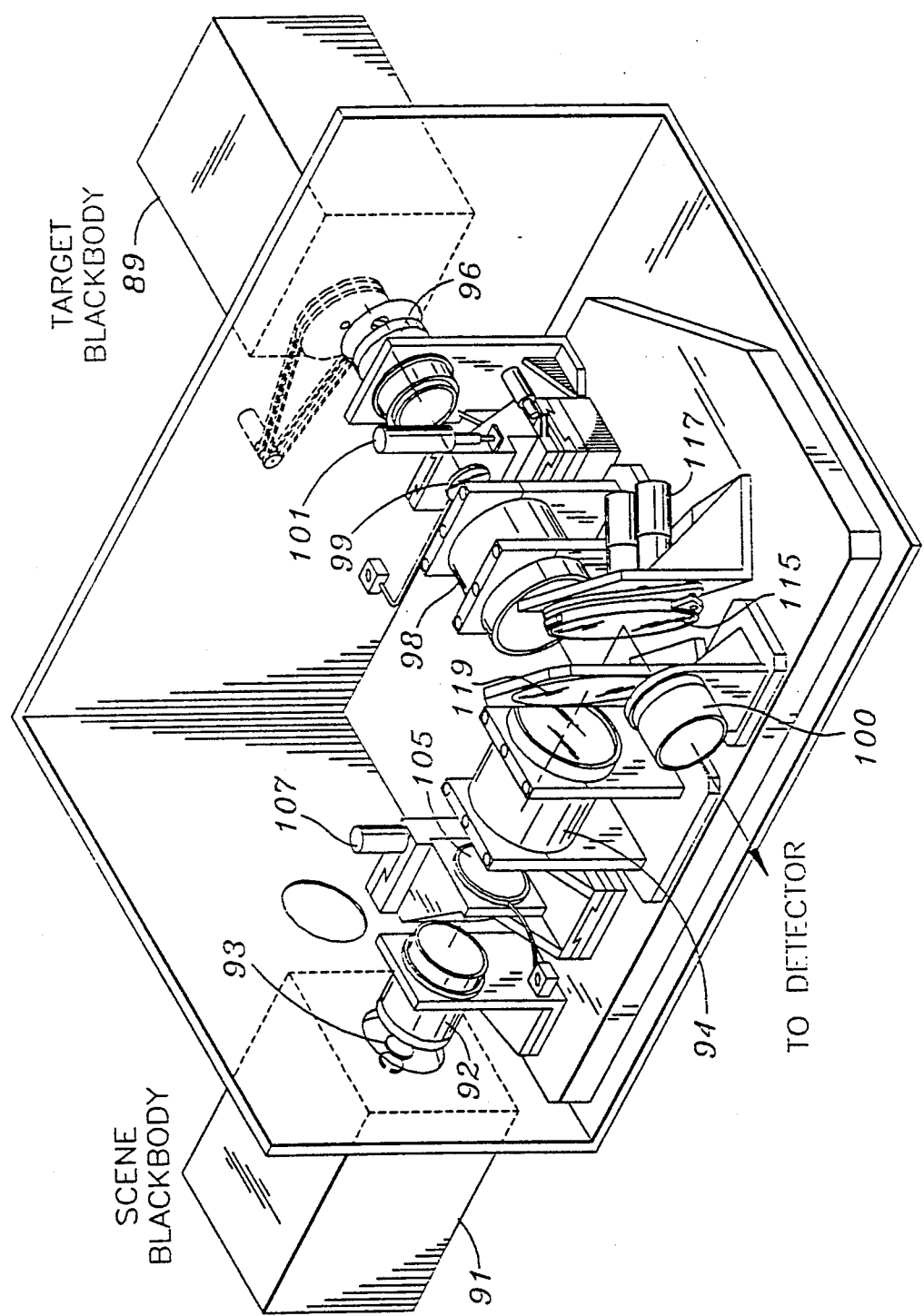
FIG. 6 is a further perspective view of the OSTG illustrated at FIG. 4.

FIG. 6 generally repeats the optical structure shown at FIG. 5 with the further inclusion of the mechanical supports and servos which regulate movement of the target and scene images. FIG. 6 illustrates the target servo 107 used to control movement of the scene mask 105. Background servo 101 operates to regulate the movement of the background mask 99. Both the background and target servos permit regulation of high resolution movement in the X, Y and Z planes. Toggle servo 117 regulates the movement of toggle mirror 115 as more fully set forth in connection with FIG. 7.

As will be recognized by one of ordinary skill in the art the particular optical assembly utilized to generate and vary the position of the target and scene images may be varied in accordance with the particular design requirements and test scenario to be implemented. Accordingly, the particular function set forth in connection with FIGS. 5 and 6 is intended to be only exemplary of the presently preferred embodiment of the invention.

Figure 7:
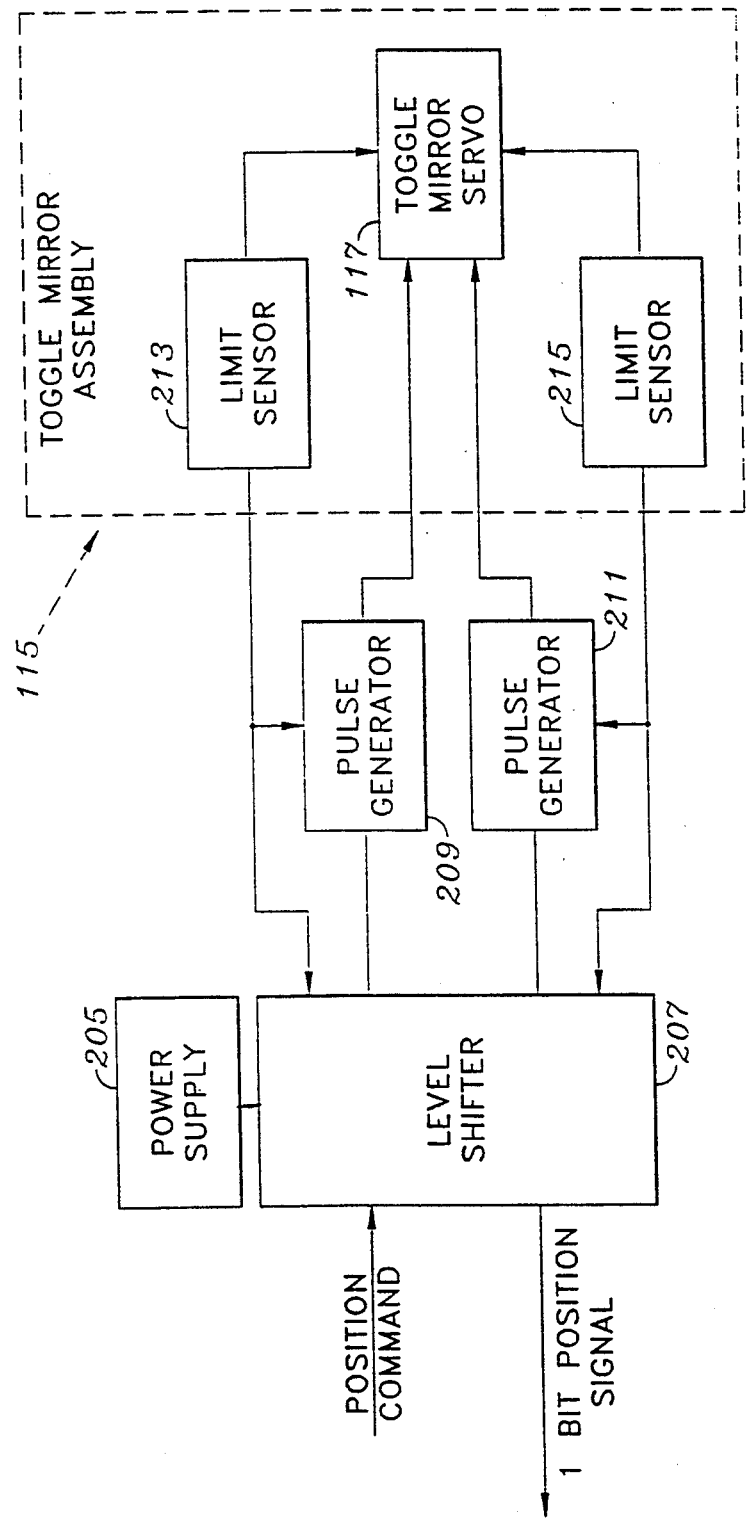
FIG. 7 is a functional block diagram of the control circuitry to operate the toggle servo 117.

FIG. 7 is a functional block diagram illustrating the electrical control circuitry to operate mirror toggle servo 117. The circuit set forth at FIG. 7 generally demonstrates the manner in which servo 117 is operated to regulate the motion of toggle mirror 115.

The toggle mirror assembly 115 is moved between two positions in response to the motion of toggle mirror servo 117. Upon receipt of signals from level shifter 207 the toggle mirror servo 117 moves the toggle mirror in alternate directions. Unit sensors 213, 215 act to terminate any further movement by the toggle mirror servo 117 beyond designated limits. Power to level shifter 207 is provided by power supply 205. The level shifter 207 enables pulse generators 209, 211 which in turn generate a one-bit position signals that activate toggle mirror servo 117 to move in the desired direction.

Figure 8:
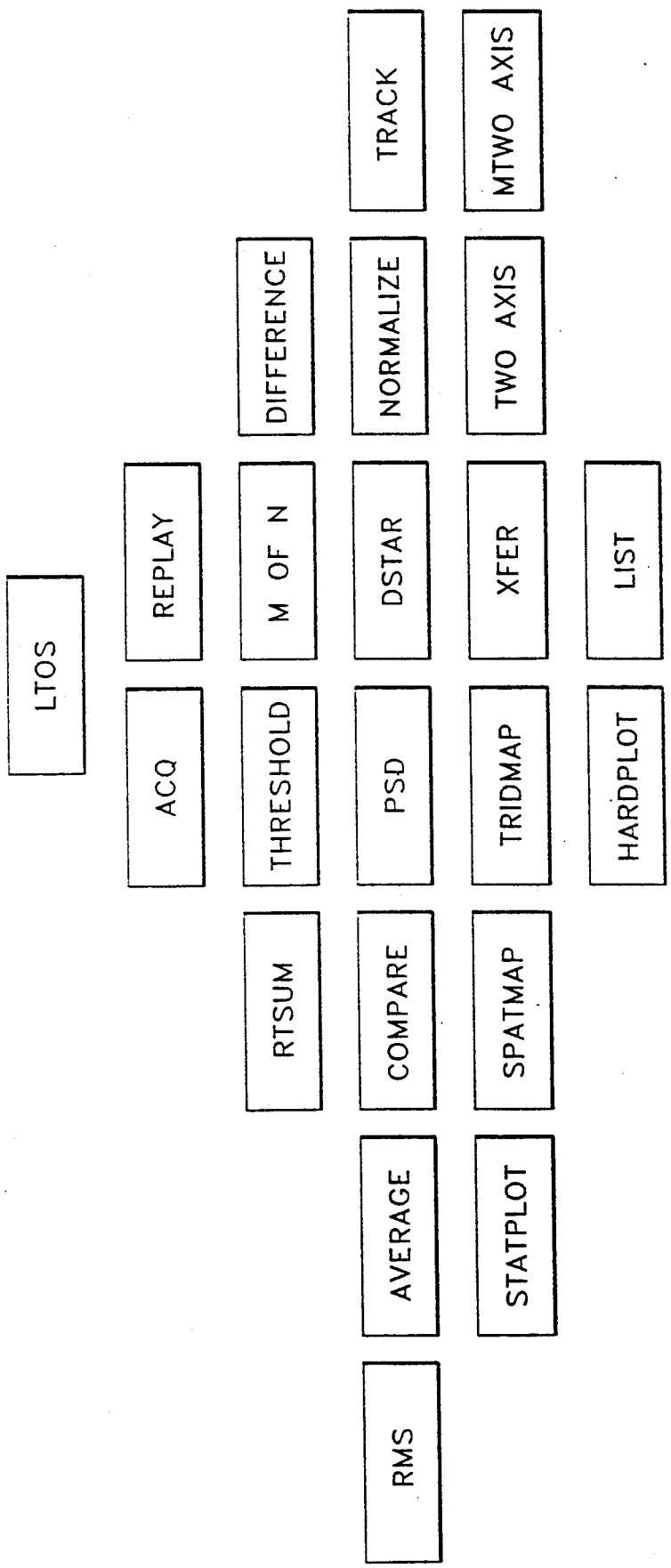
FIG. 8 is a block diagram illustrating the priority levels established by the programming within the controller 49.

FIG. 8 is a block diagram listing the priorities of operation of the software resident in the VAX 11/785 computer to operate the function of the sensor test system. As shown at FIG. 8, the level 1 program module refers to the laboratory test operating system (LTOS), i.e. the root program or test system which operates to specify the type of tests and terminals to be used in the particular test scenario to be run. Functionally, the LTOS program interactively defines a test requirement, loads all required tasks, allocates all shared buffers, links all required lower level functional modules, monitors the status of all tasks and waits for operator input after successful completion of all tasks. Further details of the LTOS and other level systems are set forth below, with a detailed instruction list being attached hereto as an unpublished appendix.

Priority level 2 is assigned for the task of data acquisition and data replay. The level 2 module receive requirements from the LTOS program and shares buffers with other level modules. The module loads raw data from the support electronics into associated buffers and, in response to LTOS signals the module transfers the information contained in the current buffer onto a storage disk during acquisition and sets a done flag for the LTOS after the acquisition is complete. The module checks for operation of level 3 tasks and triggers the operation of level 3 tasks.

The level 2 program module includes an acquisition (Acq) module which acquires data from the support electronics 45 and controls level 3 procedures via event flags. If level 3 procedures fall behind the data module stores the raw data during acquisition. The level 2 module also includes a replay module which replays data from a previously loaded disk data file. The replay module is activated either from the LTOS (playback) or acquisition module where the real time processing does not keep abreast of the data input. The replay module also controls level 3 processors via event flags.

The level 2 replay module is also loaded by the LTOS to receive test requirements and operating speed information. The module is triggered by the LTOS module to start playback of a previous test. The replay module loads frames of data onto buffers and triggers level 3 tasks. Upon completion of the replay module tasks the module also sets a done flag for the LTOS to indicate that the replay function is complete.

The level 3 tasks include all real time processing tasks. The level 3 module processes the data received from the support electronics to effect such processes as the construction of a histogram, XY plotting, mapping, sum square, difference, threshold, M of N filtering, etc. Level 3 modules are loaded by the LTOS from which they also receive the test requirements. The LTOS allocates buffers to the level 3 module, some of which may be shared with level 2, 4 or 5 modules. The processing modules operate on input data and set flags for the level 2 modules when processing is complete. The flags then trigger the next higher level task.

The level 4 modules operate to format the data for output. The modules perform an averaging and other functions on the data stored in the data buffer, and collect statistics for output on assigned output devices. The functions include RMS, Averaging, Comparing, PSD (Power Spectral Density, D* (figure of merrit), Normalize and Trac. As with the other modules the level 4 module shares buffers with other level modules. When the level 4 tasks are complete the module triggers the flag permitting the next higher level tasks to proceed.

Level 5 module functions to regulate output service tasks, such as the output of data generated by the level 4 modules. As with the other modules, level 5 modules are loaded by the LTOS with the test requirements and the configuration of assigned output devices. Buffers are allocated by the LTOS which may be common with other level modules. The level 5 modules may be triggered by the level 3 or level 4 modules to process the assigned data. When processing is complete the level 5 module becomes inactive. The level 5 functions include static plot, spatial mapping, three dimensional mapping, XY output, spatial filtering, and histograms.

The last level module is the level 6 module which performs common hardcopy output tasks, such as hardcopy histogram plot, hardcopy XY plot and hardcopy list. Again this module is loaded by the LTOS with test requirements and buffer allocations. The module typically shares one buffer with each specified task on levels 3, 4 or 5 that request the hardcopy. The module reads hardcopy parameters from the system mailbox and generates the required number of hardcopies.

It is to be understood that the advantage derived by the multi-level program structure implemented in the VAX 47 is that it permits the various tasks to be identified for a particular test, allowing dynamic configuration of the program to meet the requirements associated with a particular test scenario. The particular program portions are modular in implementation and may be incorporated into the processing based upon either a preset test sequence or a recognition of the need for such program portion based on an analysis of output data from the module. For example, jitter and clutter rejection, appropriate temporal and spatial filtering and other rejection criteria to discard false data may be implemented as a consequence of data from the module indicating that noise vibrations, momentary or periodic scene vibrations or focal plane faults are present.

The LTOS module directs configuration of the lower level modules such that only those portions of the level 2 to 6 modules that are needed for a particular test scenario are utilized. The remaining portions become transparent to the programming and do not delay processing by the portions being utilized. This advantage is particularly useful when it is desired to process large amounts of data on a real time basis.

The multi-level program thus operates to link select general function modules in accordance with a desired processing functions. In such a manner only the general function modules that are essential to the desired processing function need be linked. The remaining processing modules form no portion of the instruction set and do not delay the overall operation of the program. The program becomes self-configurable upon defining the sources of data, the processing functions to be formed on that data, the priority sequence of the various processing functions and the desired manner of storing and presenting the process data. The root LTOS program operates to link the general function modules to receive the collected data, process the data, store the data, and display data as designated by relatively simple operation input instructions. An operator may simply indicate the source from which data is to be acquired, the analyzing or processing functions to be performed on the data and the console or other location at which the processed and/or raw data is to be presented or stored, and the LTOS orients the generic function modules to be configured in an efficient manner to implement the operators instructions. Modules run only if there is data for them to run. Modules that, for example, perform unneeded processing functions or communicate process data to non-designated displays or storage devices are excluded from the linking arrangement and the system need not provide sufficient processing time to affect the functions of unlinked modules. All programs on the same level run concurrently. Also the same module may concurrently run multiple programs, each with the same or different parameters. The system is presently configured to operate on 32,000 bits of data at a rate of 327,680 bytes per second. The system provides sufficient parallel processing capacity in order to permit concurrent operation. In the presently preferred embodiment each level can run 31 concurrent programs. Accordingly, the program operates to reduce processing time and thereby facilitate real time processing of large amounts of data.

Where the large amounts of data make the data collecting and data processing functions consume the real time capacity of the program, the different priority levels permit functions such as data display to be deferred in preference to high speed data storage devices which make the data available for display at a later time.

It is to be understood that the particular operations that are performed on the data e.g. the particular operations performed by the general function modules, may be varied without departing from the basic principles of the test configuration program. Thus, for example, the level 3 or level 4 modules may implement a variety of different processing functions other than those described above.

A listing of the program information stored in controller 47 is appended to this application as an unpublished appendix A. A brief review of the operational characteristics of the program stored in controller 49 is set forth below to facilitate an understanding of the operation of the program to implement the functions of the laboratory test system. It is to be understood, however, that the specific program listings in appendix A and the descriptive information set forth below are provided by means of example only, and are not intended to represent the only way in which the laboratory test system may be implemented, or that the novel features on the program may be affected.

A general description of the interconnection of the various priority levels of general purpose modules, and the event flags used to facilitate communication between the various levels is as follows:

| EVENT FLAGS | |
|---|---|
| Level 1 | |
| SEND | LTOS Cluster 2 (16 Triggers from level 1 to level 2) |
| RECEIVE | LTOS Cluster 3 (1 common message from all levels except 6) |
| LEVEL 2 | |
| SEND | LTOS Cluster 3 (1 common message to level 1) |
| | ACQ Cluster 2 (Buffer n[Bits 0 + 2], 1 real time trigger [Bit 3], |
| | 1 replay trigger [Bit 4], Frame Count [Bits |
| RECEIVE | LTOS Cluster 2 (16 Triggers from Level 1) |
| | ACQ Cluster 3 (32 Ready from Level 3) |
| LEVEL 3 | |
| SEND | LTOS Cluster 3 (1 common meassage to Level 1) |
| | Real Time Cluster 2 (32 Triggers to Level 4, if required) |
| | Hard Copy Cluster 2 (16 Common Busy, 16 Common Triggers to Level 6 if required) |
| | ACQ Cluster 3 (32 ready to Level 2) |
| RECEIVE | ACQ Cluster 2 (Buffer # [Bits 0-2], 1 real time trigger [Bit 3], |
| | 1 Relay trigger [Bit 4], Frame Count [Bits 5-17] |

| EVENT FLAGS | |
|---|---|
| from Level 2) | |
| LEVEL 4 | |
| SEND | LTOS Cluster 3 (1 common meassage to Level 1) |
| | Process Cluster 2 (32 triggers to Level 5 if required) |
| | Hard Copy Cluster (16 common busy, 16 common triggers to Level 6 if required) |
| RECEIVE | Real time Cluster 2 (32 triggers from Level 3) |
| LEVEL 5 | |
| SEND | LTOS Cluster 3 (1 common meassage to level 1) |
| | Hard Copy Cluster 2 (16 common busy, 16 common triggers to Level 6 if required) |
| RECEIVE | Process Cluster 2 (32 triggers from Level 4) |
| LEVEL 6 | |
| SEND | Hard Copy 3 (16 common trigger to levels 3, 4, or 5) |
| RECEIVE | Hard Copy 2 (16 common busy, 16 common triggers from Levels 3, 4 or 5) |

In the presently preferred embodiment the LTOS loads the following parameters to the various modules:

| | |
|---|---|
| Parent process MSX name | 10 char |
| Event flag clutter to use | 10 char |
| Global memory name | 10 char |
| Array size | 1 integer |
| Frames in test | 1 integer |
| Name label for output tasks | 40 char |
| Data scaling factor | 1 F.P. |
| Number of output processors required | 1 char |
| Name of first output process | 10 char |
| Name of mailbox for first process | 10 char |
| Label 1 for first process | 20 char |
| Label 2 for first process | 20 char |
| Qualifier word for first process | 1 integer |
| Name of second output process | 10 char |
| Name of mailbox for second process | 10 char |
| Label 1 for second process | 20 char |
| Label 2 for second process | 20 char |
| Qualifier for second process | 1 integer |
| Name of third process ... n qualifier for last process. | |

The following psuedo services are affected by the LTOS in response to a particular scenario selected:
1. create buffer (logical name, size) [size is in bytes]
2. get buffer (logical name) [returns a pointer to buffer or zero if not avail]
3. create cluster (logical name, cluster number) [cluster number is either 2 or 3]
4. get cluster (logical name, cluster number)
5. set flag (cluster number, logical bit) [logical bit is 1-31]
6. release cluster (cluster name)
7. release buffer (logical name)
8. Clear flag (cluster number, logical bit)
9. Read cluster (cluster number)
10. Wait for (cluster number)
11. Wait for and (cluster number)
12. Wait for or (cluster number)

The description below illustrates the particular sequence in which the certain particular modules are implemented in the presently preferred embodiment. The exact implementation is set forth in the appended program listing.

The main driver for the operation of a system may be a simple personal computer which configures the VAX computer to implement the test scenario. As described above, in the presently preferred embodiment the main driver is implemented in a MacIntosh Apple Computer. The principal routines affected by the personal computer are described below.

Main Driver Program

1. Call routine to get order from VAX on GPIB and put it into accumulator.
2. See if order is to relay another order to the OSTG.
3. If it is, go to subroutine to relay VAX order.
4. See if order is to read data from an SOTG unit and store it into memory.
5. If it is, go to subrountine to read OSTG unit.
6. See if order is to write stored data in memory out to the VAX
7. If it is, go to subroutine that dumps memory contents out to the VAX
8. If order was none of the above, it is an unrecognized command and should be ignored in this case, start over from step 1.

Relay Order Routine

1. Call routine to get order type from VAX on GPIB and put it into accumulator.
2. See if order type is for a three-byte (P3 outdip) instruction.
3. If it is, jump to branch that handles the three-byte case. (A)
4. Since we otherwise have a one-byte (p7 outdip) instruction call routine to get byte from VAX on GPIB and put it into a register
5. If order involves stepping a scene stepper ONLY, jump to B below
6. If order involves resetting the all commands done flag, jump to C below.
7. Otherwise, just present instruction byte to p7 outdip
8. Go back to 1. in main driver routine.

A

1. Call routine to get low byte from VAX and put it into the lower half of a register.
2. Call routine to get high byte from VAX and put it into the upper half of a register.
3. Present low byte to P3 outdip.
4. Present order to P2 outdip.
5. Delay enough time for CMD not done yet flag to assert.
6. Now watch flag until it deasserts.
7. When it does, present high byte to P3 outdip.
8. Present a no CMD command to P2 outdip.
9. Delay if necessary for CMD not done yet flag to assert.
10. Now wait for flag to deassert.
11. Then present order again to P2 outdip.
12. Delay again for CMD not done yet flag assertion
13. Wait for flag deassertion.
14. Jump back to 1. in main driver routine.

B

1. Invert the X and Y step trigger bits.
2. Present the byte to P7 outdip.
3. Let it dwell there for about 1/100 second.
4. If the X step trigger bit is low, invert it.
5. If the Y step trigger bit is low, invert it.
6. Present the byte to P7 outdip again.
7. Jump back to 1. in main driver routine.

C

1. Store bits 0-3 in a holding register.
2. Put all 1's in bits 0-3 in scene byte.
3. Invert the reset CMD done* bit.
4. Present byte to P7 outdip.
5. Let it dwell there for a time period.
6. Invert the reset CMD done* bit again.
7. Present the byte to P7 outdip again.
8. Restore bits 0-3 of the byte to their original values.
9. Jump to B above.

Store OSTG data

1. Reset all counters and pointers.
2. Call routine to reset CMD done flag.
3. Send a global no CMD command via P2 outdip.
4. Wait for the not done yet flag in P4 indip to assert.
5. Now wait for it to disassert.
6. Monitor frame sync through its I/O port and wait for it to go low if it is high.
7. Wait for frame sync to go from low to high.
8. Send a command to update position readout to card 1 (if first time through loop) via P2 outdip.
9. Wait for the cart 1 CMD running flag in p4 indip to assert.
10. Now wait for it to disassert.
11. Read lowbyte of data from P0 indip and put into a register.
12. Read highbyte of data from P1 indip and put into a register.
13. Increment memory pointer and place lowbyte into memory.
14. Increment memory pointer and place highbyte into memory.
15. Send a no CMD command to card 1 (if first time through loop).
16. Wait for the card 1 CMD running flag in p4 indip to assert.
17. Now wait for it to disassert.
18. Jump back to 8. and do loop 5 more times, each time with a different card ID (6 total).
19. Read byte of data from P6 indip and put it into a register.
20. Read byte of data from P5 indip and put it into a register.
21. Increment memory pointer and place first (P6 in dip) byte into memory.
22. Increment memory pointer and place second (P5 indip) byte into memory.
23. Increment memory pointer and put a byte of 2ERD5 into memory, do this twice.
24. Increment frame pointer
25. Call routine to check for an interrupt order from the VAX through the IEEE 488 interface.
26. If there is an interrupt order (except resume), go to step 29 below.
27. If frame counter=8192 then jump back to main driver step 1.
28. Else jump back to step 2 above.
29. Is interrupt order to abort?
30. If so, jump to main driver step 1.
31. Is interrupt order to suspend?
32. If so, do nothing but continuously call routine to check for an interrupt order from the VAX until it comes.
33. If order is to resume, go to step 27 above.
34. Else jump to step 29 above.

Dump OSTG Data
1. Reset all counters and pointers.
2. Read byte of data from memory into accumulator.
3. Call routine to send it to VAX via the IEEE-488 Interf.
4. Increment memory pointer.
5. Have 128K bytes been sent?
6. If not, jump back to 2 above and do loop again.
7. Else jump back to main driver step 1.

```
                                      0000   main:
                          OFFC        0000          .entry    main,^m<r2,r3,r4
             5E FC83 CE   9E          0002          movab     -840(sp),sp
             00000000*   EF 16        0007          jsb       CSMAIN
             59 00000000 EF 9E        000D          movab     LOGFILE,r9
             5A 00000000 EF 9E        0014          movab     PIAD,r10
             57 00000000 EF 9E        001B          movab     STATUS,r7
             58 00000000 EF 9E        0022          movab     ERR,r8
             5C 00000000 EF 9E        0029          movab     $CHAR_STRING_CON
         FF70 CD 029E CC 3A 28        0030          movc3     #58,670(ap),-144
         FF20 CD 02D8 CC 90           0038          movb      728(ap),-224(fp)
         FED0 CD 02D9 CC 90           003F          movb      729(ap),-304(fp)
         FEA8 CD 02DA CC 16 28        0046          movc3     #22,730(ap),-344
         FE80 CD 02F0 CC 16 28        004E          movc3     #22,752(ap),-384
         FE6C CD 0306 CC 0C 28        0056          movc3     #12,774(ap),-404
         FE62 CD 0318 CC 06 28        005E          movc3     #6,792(ap),-414(
         FE58 CD 031E CC 06 28        0066          movc3     #6,798(ap),-424(
         FE4E CD 0324 CC 06 28        006E          movc3     #6,804(ap),-434(
         FE44 CD 032A CC 06 28        0076          movc3     #6,810(ap),-444(
         FE3A CD 0330 CC 06 28        007E          movc3     #6,816(ap),-454(
         FE30 CD 0336 CC 06 28        0086          movc3     #6,822(ap),-464(
         FE26 CD 033C CC 06 28        008E          movc3     #6,828(ap),-474(
              FCD2 CD 04 B0           0096          movw      #4,-814(fp)
              FCD4 CD 0E 90           009B          movb      #14,-812(fp)
              FCD5 CD 01 90           00A0          movb      #1,-811(fp)
              FCD6 CD 0342 CC DE      00A5          moval     834(ap),-810(fp)
                   034D CC DF         00AC          pushal    845(ap)
                   0347 CC DF         00B0          pushal    839(ap)
              00000000* EF 02 FB      00B4          calls     #2,FOPEN
                        69 50 D0      00BB          movl      r0,(r9)
                        12 12         00BE          bneq      sym.1
                   034F CC DF         00C0          pushal    847(ap)
              00000000* EF 01 FB      00C4          calls     #1,PRINTF
              00000000* EF 00 FB      00CB          calls     #0,EXIT
                                      00D2   sym.1:
                   00000000 EF 9F     00D2          pushab    LTOS_MAIL
                             7E 7C    00D8          clrq      -(sp)
                             7E 7C    00DA          clrq      -(sp)
                   00000000 EF DF     00DC          pushal    MBXCHAN
                             00 DD    00E2          pushl     #0
              00000000* EF 07 FB      00E4          calls     #7,SYS$CREMBX
                        67 50 D0      00EB          movl      r0,(r7)
         52 50 FFFFFFFE 8F C9         00EE          bicl3     #-2,r0,r2
                        01 52 D1      00F6          cmpl      r2,#1
                           09 13      00F9          beql      sym.2
                           67 DD      00FB          pushl     (r7)
              00000000* EF 01 FB      00FD          calls     #1,EXIT
                                      0104   sym.2:
                             7E 7C    0104          clrq      -(sp)
                   00000000 EF 9F     0106          pushab    LEVEL1
                        7E 40 8F 9A   010C          movzbl    #64,-(sp)
              00000000* EF 04 FB      0110          calls     #4,SYS$ASCEFC
                        67 50 D0      0117          movl      r0,(r7)
         52 50 FFFFFFFE 8F C9         011A          bicl3     #-2,r0,r2
                        01 52 D1      0122          cmpl      r2,#1
                           09 13      0125          beql      sym.3
                           67 DD      0127          pushl     (r7)
              00000000* EF 01 FB      0129          calls     #1,EXIT
                                      0130   sym.3:
```

```
         DC AD 0200 8F 3C   0130           movzwl   #512,-36(fp)
ED AD DC AD 00000800 8F C1  0136           addl3    #2048,-36(fp),-3
                   7E 7C    0140           clrq     -(sp)
                   00 DD    0142           pushl    #0
                   04 DD    0144           pushl    #4
                   7E 7C    0146           clrq     -(sp)
                   00 DD    0148           pushl    #0
          00000000 EF 9F    014A           pushab   INFO
          000A0009 8F DD    0150           pushl    #655369
                   00 DD    0156           pushl    #0
                   D4 AD DF 0158           pushal   -44(fp)
                   DC AD DF 015B           pushal   -36(fp)
       00000000* EF 0C FB   015E           calls    #12,SYS$CRMPSC
                   67 50 D0 0165           movl     r0,(r7)
       52 50 FFFFFFFE 8F C3 0168           bicl3    #-2,r0,r2
                   01 52 D1 0170           cmpl     r2,#1
                      09 13 0173           beql     sym.4
                      67 DD 0175           pushl    (r7)
       00000000* EF 01 FB   0177           calls    #1,EXIT
                            017E  sym.4:
                   56 D4 AD D0 017E        movl     -44(fp),r6
                      D8 AD DD 0182        pushl    -40(fp)
                      D4 AD DD 0185        pushl    -44(fp)
                      0365 CC DF 0188      pushal   869(ap)
       00000000* EF 03 FB   018C           calls    #3,PRINTF
                   66 03C0 8F 3C 0193      movzwl   #960,(r6)
                04 A6 2000 8F 3C 0198      movzwl   #8192,4(r6)
                      03 A6 01 CE 019E     mnegl    #1,8(r6)
                      1C A6 D4 01A2        clrl     28(r6)
                52 04 A6 04 A6 C1 01A5     addl3    4(r6),4(r6),r2
                52 00000200 8F C6 01AB     divl2    #512,r2
                10 A6 52 66 C5 01B2        mull3    (r6),r2,16(r6)
             0C A6 04 A6 04 A6 C1 01B7     addl3    4(r6),4(r6),12(r
                      03 A6 01 CE 01BE     mnegl    #1,8(r6)
FDD6 CD 00000000* EF 0050 8F 28 01C2       movc3    #80,CC$RMS_FAB,-
         FE02 CD 0388 CC DE 01CE           moval    904(ap),-510(fp)
              FE0A CD 1B 90 01D5           movb     #27,-502(fp)
         FDDA CD 12120000 8F D0 01DA       movl     #303169536,-550(
              FDE6 CD 7805 8F 3C 01E3      movzwl   #30725,-538(fp)
              FDEC CD 03 90 01EA           movb     #3,-532(fp)
              FDF2 CD 01 8E 01EF           mnegb    #1,-526(fp)
                   7E 7C    01F4           clrq     -(sp)
              FDD6 CD 9F    01F6           pushab   -554(fp)
       00000000* EF 03 FB   01FA           calls    #3,SYS$OPEN
                   67 50 D0 0201           movl     r0,(r7)
       52 50 FFFFFFFE 8F C3 0204           bicl3    #-2,r0,r2
                   01 52 D1 020C           cmpl     r2,#1
                      09 13 020F           beql     sym.5
                      67 DD 0211           pushl    (r7)
       00000000* EF 01 FB   0213           calls    #1,EXIT
                            021A  sym.5:
                04 AE FDE2 CD D0 021A      movl     -542(fp),4(sp)
                      04 AE DD 0220        pushl    4(sp)
                      03A4 CC DF 0223      pushal   932(ap)
       52 00000000* EF 9E   0227           movab    PRINTF,r2
                   62 02 FB 022E           calls    #2,(r2)
                      03C5 CC DF 0231      pushal   965(ap)
                      62 01 FB 0235        calls    #1,(r2)
                      DC AD 7C 0238        clrq     -36(fp)
                      03E0 CC DF 023B      pushal   992(ap)
                      62 01 FB 023F        calls    #1,(r2)
                      10 A6 DD 0242        pushl    16(r6)
                      7E 7C    0245        clrq     -(sp)
                      10 A6 DD 0247        pushl    16(r6)
                      14 AE DD 024A        pushl    20(sp)
```

```
                         7E 7C      024D          clrq     -(sp)
               00000000 EF 9F       024F          pushab   FRAMES
               00020009 8F DD       0255          pushl    #131081
                           00 DD    0258          pushl    #0
                        D4 AD DF    025D          pushal   -44(fp)
                        DC AD DF    0260          pushal   -36(fp)
              00000000* EF 0C FB    0263          calls    #12,SYS$CRMPSC
                        67 50 D0    026A          movl     r0,(r7)
          52 50 FFFFFFFE 8F C5      026D          bicl3    #-2,r0,r2
                        01 52 D1    0275          cmpl     r2,#1
                           09 13    0278          beql     sym.6
                           67 DD    027A          pushl    (r7)
              00000000* EF 01 FB    027C          calls    #1,EXIT
                                    0283  sym.6:
                  C3 AD D4 AD D0    0283          movl     -44(fp),-56(fp)
                  CC AD D4 AD D0    0288          movl     -44(fp),-52(fp)
                  D0 AD D8 AD D0    028D          movl     -40(fp),-48(fp)
                        D8 AD DD    0292          pushl    -40(fp)
                        D4 AD DD    0295          pushl    -44(fp)
                        0400 CC DF  0298          pushal   1024(ap)
              00000000* EF 03 FB    029C          calls    #3,PRINTF
                     FCDD CD 01 90  02A3          movb     #1,-803(fp)
                     FCDC CD 0E 90  02A8          movb     #14,-804(fp)
                     FCE5 CD 01 90  02AD          movb     #1,-795(fp)
                     FCE4 CD 0E 90  02B2          movb     #14,-796(fp)
       FD86 CD 00000000* EF 0050 8F 28  02B7      movc3    #80,CC$RMS_FAB,-
                     FD96 CD 20 D0  02C3          movl     #32,-618(fp)
                     FD9E CD 2000 8F 3C  02C8      movzwl  #8192,-610(fp)
                     FD9A CD 20 B0  02CF          movw     #32,-614(fp)
             FD86 CD 0428 CC DE     02D4          moval    1064(ap),-586(fp)
                     FDBB CD 1D 90  02DB          movb     #29,-581(fp)
                     FD9C CD 3F 90  02E0          movb     #63,-612(fp)
             FDB2 CD 0446 CC DE     02E5          moval    1094(ap),-590(fp
                     FDBA CD 15 90  02EC          movb     #21,-582(fp)
         FD8A CD 10300042 8F D0     02F1          movl     #271581250,-630(
                     FDBC CD 4000 8F B0  02FA      movw    #16384,-580(fp)
                     FDA3 CD 94     0301          clrb     -605(fp)
                     FDA5 CD 94     0305          clrb     -603(fp)
                     FDA2 CD 01 8E  0309          mnegb    #1,-606(fp)
                FDAA CD FCEA CD 9E  030E          movab    -790(fp),-593(fp
       FD42 CD 00000000* EF 0044 8F 28  0315       movc3   #63,CC$RMS_RAB,-
                FD7E CD FD86 CD 9E  0321          movab    -634(fp),-642(fp
                     FD44 CD B4     0328          clrw     -700(fp)
                     FD5A CD 2000 8F 3C  032C      movzwl  #8192,-678(fp)
                     FD79 CD 20 90  0333          movb     #32,-647(fp)
                     FD78 CD 04 90  0338          movb     #4,-648(fp)
                     FD46 CD 0E12 8F 3C  033D      movzwl  #3602,-698(fp)
                     FD64 CD 4000 8F B0  0344      movw    #16384,-668(fp)
       FCEA CD 00000000* EF 0058 8F 28  0348       movc3   #83,CC$RMS_XABPR
                     FCF2 CD 1180 8F B0  0357      movw    #4480,-732(fp)
                        045C CC DF  035E          pushal   1116(ap)
              00000000* EF 01 FB    0362          calls    #1,PRINTF
                 000003E7 8F E4 AD D1  0369         cmpl   -28(fp),#999
                           03 12    0371          bneq     gen.1
                           11FB 31  0373          brw      sym.81
                                    0376  gen.1:
                  59 00000000* EF 9E  0376         movab   SYS$CREPRC,r11
                  54 00000000* EF 9E  037D         movab   EXIT,r4
               0C AE 00000000* EF 9E  0384         movab   SYS$QIOW,12(sp)
               10 AE 00000000* EF 9E  038C         movab   SCANF,16(sp)
               00 AE 00000000* EF 9E  0394         movab   GETS,0(sp)
               0008 CE 00000000* EF 9E  039C       movab   PRINTF,8(sp)
                  55 00000000* EF 9E  03A5         movab   FPRINTF,r5
                                    03AC  sym.7:
                        E4 AD DF    03AC          pushal   -28(fp)
```

```
        046E CC DF      03AF              pushal    1134(ap)
00000000* EF 02 FB      03B3              calls     #2,SCANF
        1C A6 01 D0     03BA              movl      #1,28(r6)
              0E 13     03BE              beql      sym.8
              E4 AD DD  03C0              pushl     -28(fp)
        0471 CC DF      03C3              pushal    1137(ap)
00000000* EF 02 FB      03C7              calls     #2,PRINTF
                        03CE    sym.8:
000000C9 8F E4 AD D1    03CE              cmpl      -28(fp),#201
              03 18     03D6              bgeq      gen.2
              1179 31   03D8              brw       default
                        03DB    gen.2:
        50 E4 AD D0     03DB              movl      -28(fp),r0
01 000000C9 8F 50 CF    03DF              casel     r0,#201,#1
              08 11     03EB              brb       vcg.2
              50 D5     03ED              tstl      r0
              01        03EF              nop
                        03F0    vcg.1:
        3FFFFC0A EF 17  03F0              jmp       case
              50 D5     03F6              tstl      r0
                        03F8    vcg.2:
0000012D 8F 50 D1       03F8              cmpl      r0,#301
              03 18     03FF              bgeq      gen.3
              1150 31   0401              brw       default
                        0404    gen.3:
06 0000012D 8F 50 CF    0404              casel     r0,#301,#6
              03 11     041A              brb       vcg.4
                        041C    vcg.3:
        3FFFFBDE EF 17  041C              jmp       case
              50 D5     0422              tstl      r0
                        0424    vcg.4:
00000384 8F 50 D1       0424              cmpl      r0,#900
              03 18     042B              bgeq      gen.4
              1124 31   042D              brw       default
                        0430    gen.4:
06 00000384 8F 50 CF    0430              casel     r0,#900,#6
              1108 31   0446              brw       default
              50 D5     0449              tstl      r0
              01        044B              nop
                        044C    vcg.5:
        3FFFFBAE EF 17  044C              jmp       case
              50 D5     0452              tstl      r0
                        0454    case(201):
              04 DD     0454              pushl     #4
              7E 7C     0456              clrq      -(sp)
              13 DD     0458              pushl     #19
        00000000 EF 9F  045A              pushab    L201
              7E 7C     0460              clrq      -(sp)
              7E 7C     0462              clrq      -(sp)
        00000000 EF 9F  0464              pushab    TTC2
        00000000 EF 9F  046A              pushab    ACQ
              6A DF     0470              pushal    (r10)
              63 0C FB  0472              calls     #12,(r11)
              67 50 D0  0475              movl      r0,(r7)
52 50 FFFFFFFE 8F CB    0478              bicl3     #-2,r0,r2
              01 52 D1  0480              cmpl      r2,#1
              05 13     0483              beql      sym.9
              67 DD     0485              pushl     (r7)
              64 01 FB  0487              calls     #1,(r4)
                        048A    sym.9:
              7E 7C     048A              clrq      -(sp)
              7E 7C     048C              clrq      -(sp)
              14 DD     048E              pushl     #20
        00000000 EF DF  0490              pushal    L2MAIL
              7E 7C     0496              clrq      -(sp)
```

```
              00 DD   0498          pushl    #0
              30 DD   049A          pushl    #48
     00000000 EF DD   049C          pushl    MBXCHAN
              01 DD   04A2          pushl    #1
           3C BE 0C FB 04A4          calls    #12,@60(sp)
              67 50 D0 04A8          movl     r0,(r7)
    52 50 FFFFFFFE 8F CB 04AB        bicl3    #-2,r0,r2
              01 52 D1 04B3          cmpl     r2,#1
              03 12   04B6           bneq     gen.5
              10A9 31 04B8           brw      sym.80
                      04BB  gen.5:
              67 DD   04BB           pushl    (r7)
              64 01 FB 04BD          calls    #1,(r4)
              10A1 31 04C0           brw      sym.80
              01      04C3           nop
                      04C4  case(202):
              04 DD   04C4           pushl    #4
              7E 7C   04C6           clrq     -(sp)
              13 DD   04C8           pushl    #19
    00000000 EF 9F    04CA           pushab   L202
              7E 7C   04D0           clrq     -(sp)
              68 9F   04D2           pushab   (r8)
              68 9F   04D4           pushab   (r8)
    00000000 EF 9F    04D6           pushab   TTC2
    00000000 EF 9F    04DC           pushab   REPLAY
              6A DF   04E2           pushal   (r10)
              68 0C FB 04E4           calls    #12,(r11)
              67 50 D0 04E7           movl     r0,(r7)
    52 50 FFFFFFFE 8F CB 04EA        bicl3    #-2,r0,r2
              01 52 D1 04F2           cmpl     r2,#1
              03 12   04F5           bneq     gen.6
              106A 31 04F7           brw      sym.80
                      04FA  gen.6:
              67 DD   04FA           pushl    (r7)
              64 01 FB 04FC           calls    #1,(r4)
              1062 31 04FF           brw      sym.80
              50 D5   0502           tstl     r0
                      0504  case(301):
              F0 AD DF 0504           pushal   -16(fp)
              0493 CC DF 0507         pushal   1171(ap)
              18 BE 02 FB 050B        calls    #2,@24(sp)
              FE6C CD DF 050F         pushal   -404(fp)
              04 BE 01 FB 0513        calls    #1,@4(sp)
              FE6C CD DF 0517         pushal   -404(fp)
              04 BE 01 FB 051B        calls    #1,@4(sp)
              F4 AD DF 051F           pushal   -12(fp)
              0496 CC DF 0522         pushal   1174(ap)
              18 BE 02 FB 0526        calls    #2,@24(sp)
              F8 AD DF 052A           pushal   -8(fp)
              0499 CC DF 052D         pushal   1177(ap)
              18 BE 02 FB 0531        calls    #2,@24(sp)
              049C CC DF 0535         pushal   1180(ap)
              0C BE 01 FB 0539        calls    #1,@12(sp)
              F0 AD DD 053D           pushl    -16(fp)
              04CF CC DF 0540         pushal   1231(ap)
              69 DD   0544           pushl    (r9)
              65 03 FB 0546          calls    #3,(r5)
              14 AE D6 0549          incl     20(sp)
              1C A6 01 D0 054C       movl     #1,28(r6)
              0C 13   0550           beql     sym.10
              14 AE DD 0552          pushl    20(sp)
              04D3 CC DF 0555         pushal   1235(ap)
              69 DD   0559           pushl    (r9)
              65 03 FB 055B          calls    #3,(r5)
                      055E  sym.10:
```

```
            01 14 AE D1    055E            cmpl    20(sp),#1
                  70 12    0562            bneq    sym.12
                  04 DD    0564            pushl   #4
                  7E 7C    0566            clrq    -(sp)
                  12 DD    0568            pushl   #18
         00000000 EF 9F    056A            pushab  L301
                  7E 7C    0570            clrq    -(sp)
                  68 9F    0572            pushab  (r8)
                  68 9F    0574            pushab  (r8)
         00000000 EF 9F    0576            pushab  TTC2
         00000000 EF 9F    057C            pushab  SUMSQ
                  6A DF    0582            pushal  (r10)
                  68 0C FB 0584            calls   #12,(r11)
                  67 50 D0 0587            movl    r0,(r7)
   52 50 FFFFFFFE 8F CB    058A            bicl3   #-2,r0,r2
            01 52 D1       0592            cmpl    r2,#1
                  05 13    0595            beql    sym.11
                  67 DD    0597            pushl   (r7)
                  64 01 FB 0599            calls   #1,(r4)
                           059C    sym.11:
                  04 DD    059C            pushl   #4
                  7E 7C    059E            clrq    -(sp)
                  11 DD    05A0            pushl   #17
         00000000 EF 9F    05A2            pushab  L401
                  7E 7C    05A8            clrq    -(sp)
                  68 9F    05AA            pushab  (r8)
                  68 9F    05AC            pushab  (r8)
         00000000 EF 9F    05AE            pushab  MAC
         00000000 EF 9F    05B4            pushab  STATPLOT
                  6A DF    05BA            pushal  (r10)
                  68 0C FB 05BC            calls   #12,(r11)
                  67 50 D0 05BF            movl    r0,(r7)
   52 50 FFFFFFFE 8F CB    05C2            bicl3   #-2,r0,r2
            01 52 D1       05CA            cmpl    r2,#1
                  05 13    05CD            beql    sym.12
                  67 DD    05CF            pushl   (r7)
                  64 01 FB 05D1            calls   #1,(r4)
                           05D4    sym.12:
            02 14 AE D1    05D4            cmpl    20(sp),#2
                  38 12    05D8            bneq    sym.13
                  04 DD    05DA            pushl   #4
                  7E 7C    05DC            clrq    -(sp)
                  11 DD    05DE            pushl   #17
         00000000 EF 9F    05E0            pushab  L402
                  7E 7C    05E6            clrq    -(sp)
                  68 9F    05E8            pushab  (r8)
                  68 9F    05EA            pushab  (r8)
         00000000 EF 9F    05EC            pushab  MAC
         00000000 EF 9F    05F2            pushab  STATPLOT
                  6A DF    05F8            pushal  (r10)
                  68 0C FB 05FA            calls   #12,(r11)
                  67 50 D0 05FD            movl    r0,(r7)
   52 50 FFFFFFFE 8F CB    0600            bicl3   #-2,r0,r2
            01 52 D1       0608            cmpl    r2,#1
                  05 13    060B            beql    sym.13
                  67 DD    060D            pushl   (r7)
                  64 01 FB 060F            calls   #1,(r4)
                           0612    sym.13:
            03 14 AE D1    0612            cmpl    20(sp),#3
                  38 12    0616            bneq    sym.14
                  04 DD    0618            pushl   #4
                  7E 7C    061A            clrq    -(sp)
                  11 DD    061C            pushl   #17
         00000000 EF 9F    061E            pushab  L403
                  7E 7C    0624            clrq    -(sp)
```

```
               63 9F    0626            pushab   (r8)
               63 9F    0628            pushab   (r8)
      00000000 EF 9F    062A            pushab   MAC
      00000000 EF 9F    0630            pushab   STATPLOT
               6A DF    0636            pushal   (r10)
               68 0C FB 0638            calls    #12,(r11)
               67 50 D0 063B            movl     r0,(r7)
52 50 FFFFFFFE 8F CB    063E            bicl3    #-2,r0,r2
               01 52 D1 0646            cmpl     r2,#1
               05 13    0649            beql     sym.14
               67 DD    064B            pushl    (r7)
               64 01 FB 064D            calls    #1,(r4)
                        0650   sym.14:
               04 14 AE D1 0650         cmpl     20(sp),#4
               38 12    0654            bneq     sym.15
               04 DD    0656            pushl    #4
               7E 7C    0658            clrq     -(sp)
               11 DD    065A            pushl    #17
      00000000 EF 9F    065C            pushab   L404
               7E 7C    0662            clrq     -(sp)
               68 9F    0664            pushab   (r8)
               68 9F    0666            pushab   (r8)
      00000000 EF 9F    0668            pushab   MAC
      00000000 EF 9F    066E            pushab   STATPLOT
               6A DF    0674            pushal   (r10)
               68 0C FB 0676            calls    #12,(r11)
               67 50 D0 0679            movl     r0,(r7)
52 50 FFFFFFFE 8F CB    067C            bicl3    #-2,r0,r2
               01 52 D1 0684            cmpl     r2,#1
               05 13    0687            beql     sym.15
               67 DD    0689            pushl    (r7)
               64 01 FB 068B            calls    #1,(r4)
                        068E   sym.15:
               05 14 AE D1 068E         cmpl     20(sp),#5
               38 12    0692            bneq     sym.16
               04 DD    0694            pushl    #4
               7E 7C    0696            clrq     -(sp)
               11 DD    0698            pushl    #17
      00000000 EF 9F    069A            pushab   L405
               7E 7C    06A0            clrq     -(sp)
               68 9F    06A2            pushab   (r8)
               68 9F    06A4            pushab   (r8)
      00000000 EF 9F    06A6            pushab   MAC
      00000000 EF 9F    06AC            pushab   STATPLOT
               6A DF    06B2            pushal   (r10)
               68 0C FB 06B4            calls    #12,(r11)
               67 50 D0 06B7            movl     r0,(r7)
52 50 FFFFFFFE 8F CB    06BA            bicl3    #-2,r0,r2
               01 52 D1 06C2            cmpl     r2,#1
               05 13    06C5            beql     sym.16
               67 DD    06C7            pushl    (r7)
               64 01 FB 06C9            calls    #1,(r4)
                        06CC   sym.16:
               06 14 AE D1 06CC         cmpl     20(sp),#6
               38 12    06D0            bneq     sym.17
               04 DD    06D2            pushl    #4
               7E 7C    06D4            clrq     -(sp)
               11 DD    06D6            pushl    #17
      00000000 EF 9F    06D8            pushab   L406
               7E 7C    06DE            clrq     -(sp)
               68 9F    06E0            pushab   (r8)
               68 9F    06E2            pushab   (r8)
      00000000 EF 9F    06E4            pushab   MAC
      00000000 EF 9F    06EA            pushab   STATPLOT
               6A DF    06F0            pushal   (r10)
```

```
            68 OC FB    06F2              calls    #12,(r11)
            67 50 D0    06F5              movl     r0,(r7)
52 50 FFFFFFFE 8F C8    06F8              bicl3    #-2,r0,r2
            01 52 D1    0700              cmpl     r2,#1
               05 13    0703              beql     sym.17
               67 DD    0705              pushl    (r7)
            64 01 F8    0707              calls    #1,(r4)
                        070A    sym.17:
         07 14 AE D1    070A              cmpl     20(sp),#7
               33 12    070E              bneq     sym.18
               04 DD    0710              pushl    #4
               7E 7C    0712              clrq     -(sp)
               11 DD    0714              pushl    #17
      00000000 EF 9F    0716              pushab   L407
               7E 7C    071C              clrq     -(sp)
               68 9F    071E              pushab   (r8)
               68 9F    0720              pushab   (r3)
      00000000 EF 9F    0722              pushab   MAC
      00000000 EF 9F    0728              pushab   STATPLOT
               6A DF    072E              pushal   (r10)
            68 OC FB    0730              calls    #12,(r11)
            67 50 D0    0733              movl     r0,(r7)
52 50 FFFFFFFE 8F C8    0736              bicl3    #-2,r0,r2
            01 52 D1    073E              cmpl     r2,#1
               05 13    0741              beql     sym.18
               67 DD    0743              pushl    (r7)
            64 01 F8    0745              calls    #1,(r4)
                        0748    sym.18:
         07 14 AE D1    0748              cmpl     20(sp),#7
               08 15    074C              bleq     sym.19
            04E3 CC DF  074E              pushal   1251(ap)
         0C BE 01 F8    0752              calls    #1,@12(sp)
                        0756    sym.19:
         02 F0 AD D1    0756              cmpl     -16(fp),#2
               31 12    075A              bneq     sym.20
               7E 7C    075C              clrq     -(sp)
               7E 7C    075E              clrq     -(sp)
               0A DD    0760              pushl    #10
            FE58 CD DF  0762              pushal   -424(fp)
               7E 7C    0766              clrq     -(sp)
               00 DD    0768              pushl    #0
               30 DD    076A              pushl    #48
      00000000 EF DD    076C              pushl    MBXCHAN
               01 DD    0772              pushl    #1
         3C BE OC FB    0774              calls    #12,@60(sp)
            67 50 D0    0778              movl     r0,(r7)
52 50 FFFFFFFE 8F C8    0779              bicl3    #-2,r0,r2
            01 52 D1    0783              cmpl     r2,#1
               05 13    0786              beql     sym.20
               67 DD    0788              pushl    (r7)
            64 01 F8    078A              calls    #1,(r4)
                        078D    sym.20:
         03 F0 AD D1    078D              cmpl     -16(fp),#3
               31 12    0791              bneq     sym.21
               7E 7C    0793              clrq     -(sp)
               7E 7C    0795              clrq     -(sp)
               0A DD    0797              pushl    #10
            FE4E CD DF  0799              pushal   -434(fp)
               7E 7C    079D              clrq     -(sp)
               00 DD    079F              pushl    #0
               30 DD    07A1              pushl    #48
      00000000 EF DD    07A3              pushl    MBXCHAN
               01 DD    07A9              pushl    #1
         3C BE OC FB    07AB              calls    #12,@60(sp)
            67 50 D0    07AF              movl     r0,(r7)
```

```
52 50 FFFFFFFE 8F CB   07B2          bicl3    #-2,r0,r2
         01 52 D1      078A          cmpl     r2,#1
            05 13      078D          beql     sym.21
            67 DD      07BF          pushl    (r7)
            64 01 FB   07C1          calls    #1,(r4)
                       07C4  sym.21:
      04 F0 AD D1      07C4          cmpl     -16(fp),#4
            31 12      07C8          bneq     sym.22
            7E 7C      07CA          clrq     -(sp)
            7E 7C      07CC          clrq     -(sp)
            0A DD      07CE          pushl    #10
         FE44 CD DF    07D0          pushal   -444(fp)
            7E 7C      07D4          clrq     -(sp)
            00 DD      07D6          pushl    #0
            30 DD      07D8          pushl    #48
   00000000 EF DD      07DA          pushl    MBXCHAN
            01 DD      07E0          pushl    #1
         3C BE 0C FB   07E2          calls    #12,@60(sp)
            67 50 D0   07E6          movl     r0,(r7)
52 50 FFFFFFFE 8F CB   07E9          bicl3    #-2,r0,r2
         01 52 D1      07F1          cmpl     r2,#1
            05 13      07F4          beql     sym.22
            67 DD      07F6          pushl    (r7)
            64 01 FB   07F8          calls    #1,(r4)
                       07FB  sym.22:
      05 F0 AD D1      07FB          cmpl     -16(fp),#5
            31 12      07FF          bneq     sym.23
            7E 7C      0801          clrq     -(sp)
            7E 7C      0803          clrq     -(sp)
            0A DD      0805          pushl    #10
         FE3A CD DF    0807          pushal   -454(fp)
            7E 7C      080B          clrq     -(sp)
            00 DD      080D          pushl    #0
            30 DD      080F          pushl    #48
   00000000 EF DD      0811          pushl    MBXCHAN
            01 DD      0817          pushl    #1
         3C BE 0C FB   0819          calls    #12,@60(sp)
            67 50 D0   081D          movl     r0,(r7)
52 50 FFFFFFFE 8F CB   0820          bicl3    #-2,r0,r2
         01 52 D1      0828          cmpl     r2,#1
            05 13      082B          beql     sym.23
            67 DD      082D          pushl    (r7)
            64 01 FB   082F          calls    #1,(r4)
                       0832  sym.23:
      06 F0 AD D1      0832          cmpl     -16(fp),#6
            31 12      0836          bneq     sym.24
            7E 7C      0838          clrq     -(sp)
            7E 7C      083A          clrq     -(sp)
            0A DD      083C          pushl    #10
         FE30 CD DF    083E          pushal   -464(fp)
            7E 7C      0842          clrq     -(sp)
            00 DD      0844          pushl    #0
            30 DD      0846          pushl    #48
   00000000 EF DD      0848          pushl    MBXCHAN
            01 DD      084E          pushl    #1
         3C BE 0C FB   0850          calls    #12,@60(sp)
            67 50 D0   0854          movl     r0,(r7)
52 50 FFFFFFFE 8F CB   0857          bicl3    #-2,r0,r2
         01 52 D1      085F          cmpl     r2,#1
            05 13      0862          beql     sym.24
            67 DD      0864          pushl    (r7)
            64 01 FB   0866          calls    #1,(r4)
                       0869  sym.24:
      07 F0 AD D1      0869          cmpl     -16(fp),#7
            31 12      086D          bneq     sym.25
```

```
              7E 7C    086F              clrq      -(sp)
              7E 7C    0871              clrq      -(sp)
              0A DD    0873              pushl     #10
        FE26 CD DF     0875              pushal    -474(fp)
              7E 7C    0879              clrq      -(sp)
              00 DD    087B              pushl     #0
              30 DD    087D              pushl     #48
    00000000 EF DD     087F              pushl     MBXCHAN
              01 DD    0885              pushl     #1
           3C BE 0C FB 0887              calls     #12,@60(sp)
              67 50 D0 088B              movl      r0,(r7)
    52 50 FFFFFFFE 8F CB 088E            bicl3     #-2,r0,r2
              01 52 D1 0896              cmpl      r2,#1
              05 13    0899              beql      sym.25
              67 DD    089B              pushl     (r7)
              64 01 FB 089D              calls     #1,(r4)
                       08A0   sym.25:
              7E 7C    08A0              clrq      -(sp)
              7E 7C    08A2              clrq      -(sp)
              28 DD    08A4              pushl     #40
        FE80 CD DF     08A6              pushal    -384(fp)
              7E 7C    08AA              clrq      -(sp)
              00 DD    08AC              pushl     #0
              30 DD    08AE              pushl     #48
    00000000 EF DD     08B0              pushl     MBXCHAN
              01 DD    08B6              pushl     #1
           3C BE 0C FB 08B8              calls     #12,@60(sp)
              67 50 D0 08BC              movl      r0,(r7)
    52 50 FFFFFFFE 8F CB 08BF            bicl3     #-2,r0,r2
              01 52 D1 08C7              cmpl      r2,#1
              03 12    08CA              bneq      gen.7
              0C95 31  08CC              brw       sym.80
                       08CF   gen.7:
              67 DD    08CF              pushl     (r7)
              64 01 FB 08D1              calls     #1,(r4)
              0C8D 31  08D4              brw       sym.80
              01       08D7              nop
                       08D8   case(302):
              F0 AD DF 08D8              pushal    -16(fp)
              0517 CC DF 08DB            pushal    1303(ap)
              18 BE 02 FB 08DF           calls     #2,@24(sp)
              FE6C CD DF 08E3            pushal    -404(fp)
              04 BE 01 FB 08E7           calls     #1,@4(sp)
              FE6C CD DF 08EB            pushal    -404(fp)
              04 BE 01 FB 08EF           calls     #1,@4(sp)
              F4 AD DF 08F3              pushal    -12(fp)
              051A CC DF 08F6            pushal    1306(ap)
              18 BE 02 FB 08FA           calls     #2,@24(sp)
              F8 AD DF 08FE              pushal    -8(fp)
              051D CC DF 0901            pushal    1309(ap)
              18 BE 02 FB 0905           calls     #2,@24(sp)
              0520 CC DF 0909            pushal    1312(ap)
              0C BE 01 FB 090D           calls     #1,@12(sp)
              F0 AD DD 0911              pushl     -16(fp)
              054C CC DF 0914            pushal    1356(ap)
              69 DD    0918              pushl     (r9)
              65 03 FB 091A              calls     #3,(r5)
              1C A6 01 D0 091D           movl      #1,28(r6)
              09 13    0921              beql      sym.26
              0550 CC DF 0923            pushal    1360(ap)
              69 DD    0927              pushl     (r9)
              65 02 FB 0929              calls     #2,(r5)
                       092C   sym.26:
              1C A6 01 D0 092C           movl      #1,28(r6)
              09 13    0930              beql      sym.27
```

```
         FE6C CD DF    0932            pushal   -404(fp)
               69 DD   0936            pushl    (r9)
            65 02 FB   0938            calls    #2,(r5)
                       093B   sym.27:
         1C A6 01 D0   093B            movl     #1,28(r6)
               09 13   093F            beql     sym.28
         055F CC DF    0941            pushal   1375(ap)
               69 DD   0945            pushl    (r9)
            65 02 FB   0947            calls    #2,(r5)
                       094A   sym.28:
         1C A6 01 D0   094A            movl     #1,28(r6)
               0D 13   094E            beql     sym.29
         7E F4 AD 56   0950            cvtfd    -12(fp),-(sp)
         0574 CC DF    0954            pushal   1396(ap)
               69 DD   0958            pushl    (r9)
            65 04 FB   095A            calls    #4,(r5)
                       095D   sym.29:
         1C A6 01 D0   095D            movl     #1,28(r6)
               09 13   0961            beql     sym.30
         0578 CC DF    0963            pushal   1400(ap)
               69 DD   0967            pushl    (r9)
            65 02 FB   0969            calls    #2,(r5)
                       096C   sym.30:
         1C A6 01 D0   096C            movl     #1,28(r6)
               0D 13   0970            beql     sym.31
         7E F8 AD 56   0972            cvtfd    -8(fp),-(sp)
         0588 CC DF    0976            pushal   1419(ap)
               69 DD   097A            pushl    (r9)
            65 04 FB   097C            calls    #4,(r5)
                       097F   sym.31:
            14 AE D5   097F            tstl     20(sp)
               33 12   0982            bneq     sym.32
               04 DD   0984            pushl    #4
               7E 7C   0986            clrq     -(sp)
               12 DD   0988            pushl    #18
      00000000 EF 9F   098A            pushab   L301
               7E 7C   0990            clrq     -(sp)
               68 9F   0992            pushab   (r8)
               68 9F   0994            pushab   (r8)
      00000000 EF 9F   0996            pushab   TTC2
      00000000 EF 9F   099C            pushab   SUMSQ
               6A DF   09A2            pushal   (r10)
            6B 0C FB   09A4            calls    #12,(r11)
            67 50 D0   09A7            movl     r0,(r7)
52 50 FFFFFFFE 8F CB   09AA            bicl3    #-2,r0,r2
            01 52 D1   09B2            cmpl     r2,#1
               05 13   09B5            beql     sym.32
               67 DD   09B7            pushl    (r7)
            64 01 FB   09B9            calls    #1,(r4)
                       09BC   sym.32:
               04 DD   09BC            pushl    #4
               7E 7C   09BE            clrq     -(sp)
               11 DD   09C0            pushl    #17
      00000000 EF 9F   09C2            pushab   L410
               7E 7C   09C8            clrq     -(sp)
               68 9F   09CA            pushab   (r8)
               68 9F   09CC            pushab   (r8)
      00000000 EF 9F   09CE            pushab   MAC
      00000000 EF 9F   09D4            pushab   ILLUMPLOT
               6A DF   09DA            pushal   (r10)
            6B 0C FB   09DC            calls    #12,(r11)
            67 50 D0   09DF            movl     r0,(r7)
52 50 FFFFFFFE 8F CB   09E2            bicl3    #-2,r0,r2
            01 52 D1   09EA            cmpl     r2,#1
               03 12   09ED            bneq     gen.8
```

```
         0B72 31   09EF            brw     sym.80
                   09F2   gen.8:
            67 DD  09F2            pushl   (r7)
         64 01 FB  09F4            calls   #1,(r4)
         0B6A 31   09F7            brw     sym.80
            50 D5  09FA            tstl    r0
                   09FC   case(303):
         F0 AD DF  09FC            pushal  -16(fp)
         058F CC DF 09FF           pushal  1423(ap)
         18 BE 02 FB 0A03          calls   #2,a24(sp)
         F4 AD DF  0A07            pushal  -12(fp)
         0592 CC DF 0A0A           pushal  1426(ap)
         18 BE 02 FB 0A0E          calls   #2,a24(sp)
         0595 CC DF 0A12           pushal  1429(ap)
         0C BE 01 FB 0A16          calls   #1,a12(sp)
         F0 AD DD  0A1A            pushl   -16(fp)
         05BB CC DF 0A1D           pushal  1467(ap)
            69 DD  0A21            pushl   (r9)
         65 03 FB  0A23            calls   #3,(r5)
      1C A6 01 DO  0A26            movl    #1,28(r6)
            09 13  0A2A            beql    sym.33
         053E CC DF 0A2C           pushal  1470(ap)
            69 DD  0A30            pushl   (r9)
         65 02 FB  0A32            calls   #2,(r5)
                   0A35   sym.33:
      1C A6 01 DO  0A35            movl    #1,28(r6)
            0D 13  0A39            beql    sym.34
         7E F4 AD 56 0A3B          cvtfd   -12(fp),-(sp)
         05D2 CC DF 0A3F           pushal  1490(ap)
            69 DD  0A43            pushl   (r9)
         65 04 FB  0A45            calls   #4,(r5)
                   0A48   sym.34:
      1C A6 01 DO  0A48            movl    #1,28(r6)
            09 13  0A4C            beql    sym.35
         05D5 CC DF 0A4E           pushal  1493(ap)
            69 DD  0A52            pushl   (r9)
         65 02 FB  0A54            calls   #2,(r5)
                   0A57   sym.35:
            04 DD  0A57            pushl   #4
            7E 7C  0A59            clrq    -(sp)
            12 DD  0A5B            pushl   #18
   00000000 EF 9F  0A5D            pushab  L303
            7E 7C  0A63            clrq    -(sp)
            68 9F  0A65            pushab  (r8)
            68 9F  0A67            pushab  (r8)
   00000000 EF 9F  0A69            pushab  TTC2
   00000000 EF 9F  0A6F            pushab  THRESH
            6A DF  0A75            pushal  (r10)
         6B 0C FB  0A77            calls   #12,(r11)
         67 50 D0  0A7A            movl    r0,(r7)
52 50 FFFFFFFE 8F C8 0A7D          bicl3   #-2,r0,r2
         01 52 D1  0A85            cmpl    r2,#1
            03 12  0A88            bneq    gen.9
         0AD7 31   0A8A            brw     sym.80
                   0A8D   gen.9:
            67 DD  0A8D            pushl   (r7)
         64 01 FB  0A8F            calls   #1,(r4)
         0ACF 31   0A92            brw     sym.80
            50 D5  0A95            tstl    r0
               01  0A97            nop
                   0A98   case(304):
         F0 AD DF  0A98            pushal  -16(fp)
         05D7 CC DF 0A9B           pushal  1495(ap)
         18 BE 02 FB 0A9F          calls   #2,a24(sp)
         EC AD DF  0AA3            pushal  -20(fp)
```

```
     05DA CC DF   0AA6            pushal   1498(ap)
     18 BE 02 FB  0AAA            calls    #2,824(sp)
     05DD CC DF   0AAE            pushal   1501(ap)
     0C BE 01 FB  0AB2            calls    #1,812(sp)
        F0 AD DD  0AB6            pushl    -16(fp)
     0608 CC DF   0AB9            pushal   1547(ap)
           69 DD  0ABD            pushl    (r9)
        65 03 FB  0ABF            calls    #3,(r5)
     1C A6 01 D0  0AC2            movl     #1,28(r6)
           09 13  0AC6            beql     sym.36
     060E CC DF   0AC8            pushal   1550(ap)
           69 DD  0ACC            pushl    (r9)
        65 02 FB  0ACE            calls    #2,(r5)
                  0AD1   sym.36:
     1C A6 01 D0  0AD1            movl     #1,28(r6)
           10 13  0AD5            beql     sym.37
        EC AD DD  0AD7            pushl    -20(fp)
     061F CC DF   0ADA            pushal   1567(ap)
           69 DD  0ADE            pushl    (r9)
00000000* EF 03 FB  0AE0          calls    #3,FPRINTF
                  0AE7   sym.37:
     1C A6 01 D0  0AE7            movl     #1,28(r6)
           0D 13  0AEB            beql     sym.38
     0622 CC DF   0AED            pushal   1570(ap)
           69 DD  0AF1            pushl    (r9)
00000000* EF 02 FB  0AF3          calls    #2,FPRINTF
                  0AFA   sym.38:
           04 DD  0AFA            pushl    #4
           7E 7C  0AFC            clrq     -(sp)
           12 DD  0AFE            pushl    #18
00000000 EF 9F   0B00             pushab   L304
           7E 7C  0B06            clrq     -(sp)
           68 9F  0B08            pushab   (r8)
           68 9F  0B0A            pushab   (r8)
00000000 EF 9F   0B0C             pushab   TTC2
00000000 EF 9F   0B12             pushab   MOFN
           6A DF  0B18            pushal   (r10)
        68 0C FB  0B1A            calls    #12,(r11)
        67 50 D0  0B1D            movl     r0,(r7)
52 50 FFFFFFFE 8F C8  0B20        bicl3    #-2,r0,r2
        01 52 D1  0B28            cmpl     r2,#1
           03 12  0B2B            bneq     gen.10
         0A34 31  0B2D            brw      sym.80
                  0B30   gen.10:
           67 DD  0B30            pushl    (r7)
00000000* EF 01 FB  0B32          calls    #1,EXIT
         0A28 31  0B39            brw      sym.80
                  0B3C   case(305):
        F0 AD DF  0B3C            pushal   -16(fp)
     0624 CC DF   0B3F            pushal   1572(ap)
00000000* EF 02 FB  0B43          calls    #2,SCANF
        EC AD DF  0B4A            pushal   -20(fp)
     0627 CC DF   0B4D            pushal   1575(ap)
00000000* EF 02 FB  0B51          calls    #2,SCANF
     062A CC DF   0B58            pushal   1578(ap)
00000000* EF 01 FB  0B5C          calls    #1,PRINTF
        F0 AD DD  0B63            pushl    -16(fp)
     0655 CC DF   0B66            pushal   1621(ap)
           69 DD  0B6A            pushl    (r9)
00000000* EF 03 FB  0B6C          calls    #3,FPRINTF
     1C A6 01 D0  0B73            movl     #1,28(r6)
           0D 13  0B77            beql     sym.39
     0658 CC DF   0B79            pushal   1624(ap)
           69 DD  0B7D            pushl    (r9)
00000000* EF 02 FB  0B7F          calls    #2,FPRINTF
```

```
                           0B86   sym.39:
       1C A6 01 DD         0B86            movl      #1,23(r6)
             10 13         0B8A            beql      sym.40
          EC AD DD         0B8C            pushl     -20(fp)
         0671 CC DF        0B8F            pushal    1649(ap)
             69 DD         0B93            pushl     (r9)
   00000000* EF 03 FB      0B95            calls     #3,FPRINTF
                           0B9C   sym.40:
       1C A6 01 DD         0B9C            movl      #1,28(r6)
             0D 13         0BA0            beql      sym.41
         0674 CC DF        0BA2            pushal    1652(ap)
             69 DD         0BA6            pushl     (r9)
   00000000* EF 02 FB      0BA8            calls     #2,FPRINTF
                           0BAF   sym.41:
             04 DD         0BAF            pushl     #4
             7E 7C         0BB1            clrq      -(sp)
             12 DD         0BB3            pushl     #18
   00000000  EF 9F         0BB5            pushab    L305
             7E 7C         0BBB            clrq      -(sp)
             68 9F         0BBD            pushab    (r8)
             68 9F         0BBF            pushab    (r8)
   00000000  EF 9F         0BC1            pushab    TTC2
   00000000  EF 9F         0BC7            pushab    XY1
             6A DF         0BCD            pushal    (r10)
   00000000* EF 0C FB      0BCF            calls     #12,SYS$CREPRC
          67 50 D0         0BD6            movl      r0,(r7)
   52 50 FFFFFFFE 8F C9    0BD9            bicl3     #-2,r0,r2
          01 52 D1         0BE1            cmpl      r2,#1
             03 12         0BE4            bneq      gen.11
            0973 31        0BE6            brw       sym.80
                           0BE9   gen.11:
             67 DD         0BE9            pushl     (r7)
   00000000* EF 01 FB      0BEB            calls     #1,EXIT
            096F 31        0BF2            brw       sym.80
             50 D5         0BF5            tstl      r0
                01         0BF7            nop
                           0BF8   case(306):
          FO AD DF         0BF8            pushal    -16(fp)
         0676 CC DF        0BFB            pushal    1654(ap)
   00000000* EF 02 FB      0BFF            calls     #2,SCANF
         0679 CC DF        0C06            pushal    1657(ap)
   00000000* EF 01 FB      0C0A            calls     #1,PRINTF
          FO AD DD         0C11            pushl     -16(fp)
         06A0 CC DF        0C14            pushal    1696(ap)
             69 DD         0C18            pushl     (r9)
   00000000* EF 03 FB      0C1A            calls     #3,FPRINTF
          EC AD DF         0C21            pushal    -20(fp)
         06A3 CC DF        0C24            pushal    1699(ap)
   00000000* EF 02 FB      0C28            calls     #2,SCANF
       1C A6 01 DD         0C2F            movl      #1,28(r6)
             0D 13         0C33            beql      sym.42
         06A6 CC DF        0C35            pushal    1702(ap)
             69 DD         0C39            pushl     (r9)
   00000000* EF 02 FB      0C3B            calls     #2,FPRINTF
                           0C42   sym.42:
       1C A6 01 DD         0C42            movl      #1,28(r6)
             10 13         0C46            beql      sym.43
          EC AD DD         0C48            pushl     -20(fp)
         06BC CC DF        0C4B            pushal    1724(ap)
             69 DD         0C4F            pushl     (r9)
   00000000* EF 03 FB      0C51            calls     #3,FPRINTF
                           0C58   sym.43:
       1C A6 01 DD         0C58            movl      #1,23(r6)
             0D 13         0C5C            beql      sym.44
         06BF CC DF        0C5E            pushal    1727(ap)
```

```
              69 DD     0C62              pushl     (r9)
00000000* EF  02 FB     0C64              calls     #2,FPRINTF
                        0C68     sym.44:
              04 DD     0C68              pushl     #4
              7E 7C     0C6D              clrq      -(sp)
              12 DD     0C6F              pushl     #18
00000000  EF  9F        0C71              pushab    L306
              7E 7C     0C77              clrq      -(sp)
              68 9F     0C79              pushab    (r8)
              68 9F     0C7B              pushab    (r8)
00000000  EF  9F        0C7D              pushab    TTC2
00000000  EF  9F        0C83              pushab    NINESPOT
              6A DF     0C89              pushal    (r10)
00000000* EF  0C FB     0C8B              calls     #12,SYS$CREPRC
              67 50 DO  0C92              movl      r0,(r7)
52 50 FFFFFFFE 8F CB    0C95              bicl3     #-2,r0,r2
           01 52 D1     0C9D              cmpl      r2,#1
              03 12     0CA0              bneq      gen.12
              08BF 31   0CA2              brw       sym.80
                        0CA5     gen.12:
              67 DD     0CA5              pushl     (r7)
00000000* EF  01 FB     0CA7              calls     #1,EXIT
              0893 31   0CAE              brw       sym.80
              50 D5     0CB1              tstl      r0
              01        0CB3              nop
                        0CB4     case(307):
           06C1 CC DF   0CB4              pushal    1729(ap)
00000000* EF  01 FB     0CB8              calls     #1,PRINTF
              13 A6 9F  0CBF              pushab    24(r6)
           06E3 CC DF   0CC2              pushal    1763(ap)
00000000* EF  02 FB     0CC6              calls     #2,SCANF
              18 A6 DD  0CCD              pushl     24(r6)
           06E6 CC DF   0CD0              pushal    1766(ap)
              69 DD     0CD4              pushl     (r9)
00000000* EF  03 FB     0CD6              calls     #3,FPRINTF
              14 A6 9F  0CDD              pushab    20(r6)
           06FC CC DF   0CE0              pushal    1788(ap)
00000000* EF  02 FB     0CE4              calls     #2,SCANF
              14 A6 DD  0CEB              pushl     20(r6)
           06FF CC DF   0CEE              pushal    1791(ap)
              69 DD     0CF2              pushl     (r9)
00000000* EF  03 FB     0CF4              calls     #3,FPRINTF
              04 DD     0CFB              pushl     #4
              7E 7C     0CFD              clrq      -(sp)
              12 DD     0CFF              pushl     #18
00000000  EF  9F        0D01              pushab    L302
              7E 7C     0D07              clrq      -(sp)
00000000  EF  9F        0D09              pushab    TTB0
00000000  EF  9F        0D0F              pushab    TTB0
00000000  EF  9F        0D15              pushab    MAC
00000000  EF  9F        0D1B              pushab    MONITOR
              6A DF     0D21              pushal    (r10)
00000000* EF  0C FB     0D23              calls     #12,SYS$CREPRC
              67 50 DO  0D2A              movl      r0,(r7)
52 50 FFFFFFFE 8F CB    0D2D              bicl3     #-2,r0,r2
           01 52 D1     0D35              cmpl      r2,#1
              03 12     0D38              bneq      gen.13
              0827 31   0D3A              brw       sym.80
                        0D3D     gen.13:
              67 DD     0D3D              pushl     (r7)
00000000* EF  01 FB     0D3F              calls     #1,EXIT
              0818 31   0D46              brw       sym.80
              50 D5     0D49              tstl      r0
              01        0D4B              nop
```

```
                          0D4C  case(900):
          0716 CC DF      0D4C        pushal    1814(ap)
  00000000* EF 01 FB      0D50        calls     #1,PRINTF
          7E 40 8F 9A     0D57        movzbl    #64,-(sp)
  00000000* EF 01 FB      0D5B        calls     #1,SYS$DACEFC
          67 50 D0        0D62        movl      r0,(r7)
  52 50 FFFFFFFE 8F CB    0D65        bicl3     #-2,r0,r2
          01 52 D1        0D6D        cmpl      r2,#1
          09 13           0D70        beql      sym.45
          67 DD           0D72        pushl     (r7)
  00000000* EF 01 FB      0D74        calls     #1,EXIT
                          0D7B  sym.45:
          7E 7C           0D7B        clrq      -(sp)
  00000000 EF 9F          0D7D        pushab    LEVEL2
          7E 40 8F 9A     0D83        movzbl    #64,-(sp)
  00000000* EF 04 FB      0D87        calls     #4,SYS$ASCEFC
          67 50 D0        0D8E        movl      r0,(r7)
  52 50 FFFFFFFE 8F CB    0D91        bicl3     #-2,r0,r2
          01 52 D1        0D99        cmpl      r2,#1
          09 13           0D9C        beql      sym.46
          67 DD           0D9E        pushl     (r7)
  00000000* EF 01 FB      0DA0        calls     #1,EXIT
                          0DA7  sym.46:
          7E 5F 8F 9A     0DA7        movzbl    #95,-(sp)
  00000000* EF 01 FB      0DAB        calls     #1,SYS$SETEF
          67 50 D0        0DB2        movl      r0,(r7)
  52 50 FFFFFFFE 8F CB    0DB5        bicl3     #-2,r0,r2
          01 52 D1        0DBD        cmpl      r2,#1
          09 13           0DC0        beql      sym.47
          67 DD           0DC2        pushl     (r7)
  00000000* EF 01 FB      0DC4        calls     #1,EXIT
                          0DCB  sym.47:
          7E 40 8F 9A     0DCB        movzbl    #64,-(sp)
  00000000* EF 01 FB      0DCF        calls     #1,SYS$DACEFC
          67 50 D0        0DD6        movl      r0,(r7)
  52 50 FFFFFFFE 8F CB    0DD9        bicl3     #-2,r0,r2
          01 52 D1        0DE1        cmpl      r2,#1
          09 13           0DE4        beql      sym.48
          67 DD           0DE6        pushl     (r7)
  00000000* EF 01 FB      0DE8        calls     #1,EXIT
                          0DEF  sym.48:
          7E 7C           0DEF        clrq      -(sp)
  00000000 EF 9F          0DF1        pushab    LEVEL3
          7E 40 8F 9A     0DF7        movzbl    #64,-(sp)
  00000000* EF 04 FB      0DFB        calls     #4,SYS$ASCEFC
          67 50 D0        0E02        movl      r0,(r7)
  52 50 FFFFFFFE 8F CB    0E05        bicl3     #-2,r0,r2
          01 52 D1        0E0D        cmpl      r2,#1
          09 13           0E10        beql      sym.49
          67 DD           0E12        pushl     (r7)
  00000000* EF 01 FB      0E14        calls     #1,EXIT
                          0E1B  sym.49:
          7E 5F 8F 9A     0E1B        movzbl    #95,-(sp)
  00000000* EF 01 FB      0E1F        calls     #1,SYS$SETEF
          67 50 D0        0E26        movl      r0,(r7)
  52 50 FFFFFFFE 8F CB    0E29        bicl3     #-2,r0,r2
          01 52 D1        0E31        cmpl      r2,#1
          09 13           0E34        beql      sym.50
          67 DD           0E36        pushl     (r7)
  00000000* EF 01 FB      0E38        calls     #1,EXIT
                          0E3F  sym.50:
          7E 40 8F 9A     0E3F        movzbl    #64,-(sp)
  00000000* EF 01 FB      0E43        calls     #1,SYS$DACEFC
          67 50 D0        0E4A        movl      r0,(r7)
  52 50 FFFFFFFE 8F CB    0E4D        bicl3     #-2,r0,r2
```

```
              01 52 D1    0E55              cmpl      r2,#1
                 09 13    0E58              beql      sym.51
                 67 DD    0E5A              pushl     (r7)
   00000000* EF 01 FB     0E5C              calls     #1,EXIT
                          0E63    sym.51:
                 7E 7C    0E63              clrq      -(sp)
       00000000 EF 9F     0E65              pushab    LEVEL4
              7E 40 8F 9A 0E6B              movzbl    #64,-(sp)
   00000000* EF 04 FB     0E6F              calls     #4,SYS$ASCEFC
                 67 50 D0 0E76              movl      r0,(r7)
   52 50 FFFFFFFE 8F C3   0E79              bicl3     #-2,r0,r2
              01 52 D1    0E81              cmpl      r2,#1
                 09 13    0E84              beql      sym.52
                 67 DD    0E86              pushl     (r7)
   00000000* EF 01 FB     0E88              calls     #1,EXIT
                          0E8F    sym.52:
              7E 5F 8F 9A 0E8F              movzbl    #95,-(sp)
   00000000* EF 01 FB     0E93              calls     #1,SYS$SETEF
                 67 50 D0 0E9A              movl      r0,(r7)
   52 50 FFFFFFFE 8F C3   0E9D              bicl3     #-2,r0,r2
              01 52 D1    0EA5              cmpl      r2,#1
                 09 13    0EA8              beql      sym.53
                 67 DD    0EAA              pushl     (r7)
   00000000* EF 01 FB     0EAC              calls     #1,EXIT
                          0EB3    sym.53:
              7E 40 8F 9A 0EB3              movzbl    #64,-(sp)
   00000000* EF 01 FB     0EB7              calls     #1,SYS$DACEFC
                 67 50 D0 0EBE              movl      r0,(r7)
   52 50 FFFFFFFE 8F C3   0EC1              bicl3     #-2,r0,r2
              01 52 D1    0EC9              cmpl      r2,#1
                 09 13    0ECC              beql      sym.54
                 67 DD    0ECE              pushl     (r7)
   00000000* EF 01 FB     0ED0              calls     #1,EXIT
                          0ED7    sym.54:
                 7E 7C    0ED7              clrq      -(sp)
       00000000 EF 9F     0ED9              pushab    LEVEL5
              7E 40 8F 9A 0EDF              movzbl    #64,-(sp)
   00000000* EF 04 FB     0EE3              calls     #4,SYS$ASCEFC
                 67 50 D0 0EEA              movl      r0,(r7)
   52 50 FFFFFFFE 8F C3   0EED              bicl3     #-2,r0,r2
              01 52 D1    0EF5              cmpl      r2,#1
                 09 13    0EF8              beql      sym.55
                 67 DD    0EFA              pushl     (r7)
   00000000* EF 01 FB     0EFC              calls     #1,EXIT
                          0F03    sym.55:
              7E 5F 8F 9A 0F03              movzbl    #95,-(sp)
   00000000* EF 01 FB     0F07              calls     #1,SYS$SETEF
                 67 50 D0 0F0E              movl      r0,(r7)
   52 50 FFFFFFFE 8F C3   0F11              bicl3     #-2,r0,r2
              01 52 D1    0F19              cmpl      r2,#1
                 09 13    0F1C              beql      sym.56
                 67 DD    0F1E              pushl     (r7)
   00000000* EF 01 FB     0F20              calls     #1,EXIT
                          0F27    sym.56:
              7E 40 8F 9A 0F27              movzbl    #64,-(sp)
   00000000* EF 01 FB     0F2B              calls     #1,SYS$DACEFC
                 67 50 D0 0F32              movl      r0,(r7)
   52 50 FFFFFFFE 8F C3   0F35              bicl3     #-2,r0,r2
              01 52 D1    0F3D              cmpl      r2,#1
                 09 13    0F40              beql      sym.57
                 67 DD    0F42              pushl     (r7)
   00000000* EF 01 FB     0F44              calls     #1,EXIT
                          0F4B    sym.57:
                 7E 7C    0F4B              clrq      -(sp)
       00000000 EF 9F     0F4D              pushab    LEVEL6
```

```
            7E 40 8F 9A    0F53              movzbl   #64,-(sp)
00000000* EF 04 FB         0F57              calls    #4,SYS$ASCEFC
            67 50 D0       0F5E              movl     r0,(r7)
52 50 FFFFFFFE 8F CB       0F61              bicl3    #-2,r0,r2
            01 52 D1       0F69              cmpl     r2,#1
               09 13       0F6C              beql     sym.58
               67 DD       0F6E              pushl    (r7)
00000000* EF 01 FB         0F70              calls    #1,EXIT
                           0F77  sym.58:
            7E 5F 8F 9A    0F77              movzbl   #95,-(sp)
00000000* EF 01 FB         0F7B              calls    #1,SYS$SETEF
            67 50 D0       0F82              movl     r0,(r7)
52 50 FFFFFFFE 8F CB       0F85              bicl3    #-2,r0,r2
            01 52 D1       0F8D              cmpl     r2,#1
               09 13       0F90              beql     sym.59
               67 DD       0F92              pushl    (r7)
00000000* EF 01 FB         0F94              calls    #1,EXIT
                           0F9B  sym.59:
            7E 40 8F 9A    0F9B              movzbl   #64,-(sp)
00000000* EF 01 FB         0F9F              calls    #1,SYS$DACEFC
            67 50 D0       0FA6              movl     r0,(r7)
52 50 FFFFFFFE 8F CB       0FA9              bicl3    #-2,r0,r2
            01 52 D1       0FB1              cmpl     r2,#1
               09 13       0FB4              beql     sym.60
               67 DD       0FB6              pushl    (r7)
00000000* EF 01 FB         0FB8              calls    #1,EXIT
                           0FBF  sym.60:
                  7E 7C    0FBF              clrq     -(sp)
00000000 EF 9F             0FC1              pushab   LEVEL1
            7E 40 8F 9A    0FC7              movzbl   #64,-(sp)
00000000* EF 04 FB         0FCB              calls    #4,SYS$ASCEFC
            67 50 D0       0FD2              movl     r0,(r7)
52 50 FFFFFFFE 8F CB       0FD5              bicl3    #-2,r0,r2
            01 52 D1       0FDD              cmpl     r2,#1
               09 13       0FE0              beql     sym.61
               67 DD       0FE2              pushl    (r7)
00000000* EF 01 FB         0FE4              calls    #1,EXIT
                           0FEB  sym.61:
               0733 CC DF  0FEB              pushal   1343(ap)
00000000* EF 01 FB         0FEF              calls    #1,PRINTF
               14 AE D4    0FF6              clrl     20(sp)
                  0568 31  0FF9              brw      sym.80
                           0FFC  case(901):
            FE80 CD DF     0FFC              pushal   -384(fp)
00000000* EF 01 FB         1000              calls    #1,GETS
            FE80 CD DF     1007              pushal   -384(fp)
00000000* EF 01 FB         100B              calls    #1,GETS
               0748 CC DF  1012              pushal   1864(ap)
52 00000000* EF 9E         1016              movab    PRINTF,r2
            62 01 FB       101D              calls    #1,(r2)
            FE80 CD DF     1020              pushal   -384(fp)
            62 01 FB       1024              calls    #1,(r2)
               075A CC DF  1027              pushal   1882(ap)
            62 01 FB       102B              calls    #1,(r2)
                  0533 31  102E              brw      sym.80
                     50 D5 1031              tstl     r0
                        01 1033              nop
                           1034  case(902):
            7E 40 8F 9A    1034              movzbl   #64,-(sp)
00000000* EF 01 FB         1038              calls    #1,SYS$SETEF
            67 50 D0       103F              movl     r0,(r7)
52 50 FFFFFFFE 8F CB       1042              bicl3    #-2,r0,r2
            01 52 D1       104A              cmpl     r2,#1
               09 13       104D              beql     sym.62
               67 DD       104F              pushl    (r7)
00000000* EF 01 FB         1051              calls    #1,EXIT
```

```
                            1058   sym.62:
                  01 DD     1058          pushl    #1
     00000000* EF 01 FB     105A          calls    #1,EXIT
                            1061   case(903):
                  04 DD     1061          pushl    #4
                  7E 7C     1063          clrq     -(sp)
                  13 DD     1065          pushl    #19
        00000000 EF 9F      1067          pushab   L201
                  7E 7C     106D          clrq     -(sp)
        00000000 EF 9F      106F          pushab   TTSO
        00000000 EF 9F      1075          pushab   TTBO
        00000000 EF 9F      1078          pushab   MAC
        00000000 EF 9F      1081          pushab   ACQ
                  6A DF     1087          pushal   (r10)
     00000000* EF 0C FB     1089          calls    #12,SYS$CREPRC
               67 50 D0     1090          movl     r0,(r7)
     52 50 FFFFFFFE 8F CB   1093          bicl3    #-2,r0,r2
               01 52 D1     109B          cmpl     r2,#1
                  09 13     109E          beql     sym.63
                  67 DD     10A0          pushl    (r7)
     00000000* EF 01 FB     10A2          calls    #1,EXIT
                            10A9   sym.63:
                  7E 7C     10A9          clrq     -(sp)
                  7E 7C     10AB          clrq     -(sp)
                  14 DD     10AD          pushl    #20
        00000000 EF DF      10AF          pushal   L2MAIL
                  7E 7C     10B5          clrq     -(sp)
                  00 DD     10B7          pushl    #0
                  30 DD     10B9          pushl    #48
        00000000 EF DD      10BB          pushl    M8XCHAN
                  01 DD     10C1          pushl    #1
     00000000* EF 0C FB     10C3          calls    #12,SYS$QIOW
               67 50 D0     10CA          movl     r0,(r7)
     52 50 FFFFFFFE 8F CB   10CD          bicl3    #-2,r0,r2
               01 52 D1     10D5          cmpl     r2,#1
                  03 12     10D8          bneq     gen.14
                0487 31     10DA          brw      sym.80
                            10DD   gen.14:
                  67 DD     10DD          pushl    (r7)
     00000000* EF 01 FB     10DF          calls    #1,EXIT
                0478 31     10E6          brw      sym.80
                  50 D5     10E9          tstl     r0
                     01     10EB          nop
                            10EC   case(904):
               7E 46 8F 9A  10EC          movzbl   #70,-(sp)
     00000000* EF 01 FB     10F0          calls    #1,SYS$SETEF
               67 50 D0     10F7          movl     r0,(r7)
     52 50 FFFFFFFE 8F CB   10FA          bicl3    #-2,r0,r2
               01 52 D1     1102          cmpl     r2,#1
                  03 12     1105          bneq     gen.15
                045A 31     1107          brw      sym.80
                            110A   gen.15:
                  67 DD     110A          pushl    (r7)
     00000000* EF 01 FB     110C          calls    #1,EXIT
                044E 31     1113          brw      sym.80
                  50 D5     1116          tstl     r0
                            1118   case(905):
                E8 AD DF    1118          pushal   -24(fp)
     00000000* EF 01 FB     111B          calls    #1,LIB$GET_EF
               67 50 D0     1122          movl     r0,(r7)
     52 50 FFFFFFFE 8F CB   1125          bicl3    #-2,r0,r2
               01 52 D1     112D          cmpl     r2,#1
                  09 13     1130          beql     sym.64
                  67 DD     1132          pushl    (r7)
```

```
00000000* EF 01 FB        1134            calls   #1,EXIT
                          113B   sym.64:
                 7E 7C    113B            clrq    -(sp)
              C0 AD DF    113D            pushal  -64(fp)
              E8 AD DD    1140            pushl   -24(fp)
                 01 DD    1143            pushl   #1
                 00 DD    1145            pushl   #0
              D4 AD DF    1147            pushal  -44(fp)
              C8 AD DF    114A            pushal  -56(fp)
00000000* EF 03 FB        114D            calls   #8,SYS$UPDSEC
              67 50 D0    1154            movl    r0,(r7)
52 50 FFFFFFFE 8F CB      1157            bicl3   #-2,r0,r2
              01 52 D1    115F            cmpl    r2,#1
                 09 13    1162            beql    sym.65
                 67 DD    1164            pushl   (r7)
00000000* EF 01 FB        1166            calls   #1,EXIT
                          116D   sym.65:
              C0 AD DF    116D            pushal  -64(fp)
              E8 AD DD    1170            pushl   -24(fp)
00000000* EF 02 FB        1173            calls   #2,SYS$SYNCH
              67 50 D0    117A            movl    r0,(r7)
52 50 FFFFFFFE 8F CB      117D            bicl3   #-2,r0,r2
              01 52 D1    1185            cmpl    r2,#1
                 09 13    1188            beql    sym.66
                 67 DD    118A            pushl   (r7)
00000000* EF 01 FB        118C            calls   #1,EXIT
                          1193   sym.66:
                 7E 7C    1193            clrq    -(sp)
              CC AD DF    1195            pushal  -52(fp)
00000000* EF 03 FB        1198            calls   #3,SYS$DELTVA
              67 50 D0    119F            movl    r0,(r7)
52 50 FFFFFFFE 8F CB      11A2            bicl3   #-2,r0,r2
              01 52 D1    11AA            cmpl    r2,#1
                 09 13    11AD            beql    sym.67
                 67 DD    11AF            pushl   (r7)
00000000* EF 01 FB        11B1            calls   #1,EXIT
                          11B8   sym.67:
              04 AE DD    11B8            pushl   4(sp)
00000000* EF 01 FB        11BB            calls   #1,SYS$DASSGN
              67 50 D0    11C2            movl    r0,(r7)
52 50 FFFFFFFE 8F CB      11C5            bicl3   #-2,r0,r2
              01 52 D1    11CD            cmpl    r2,#1
                 09 13    11D0            beql    sym.68
                 67 DD    11D2            pushl   (r7)
00000000* EF 01 FB        11D4            calls   #1,EXIT
                          11DB   sym.68:
              FF20 CD DF  11DB            pushal  -224(fp)
00000000* EF 01 FB        11DF            calls   #1,GETS
              FF20 CD DF  11E6            pushal  -224(fp)
00000000* EF 01 FB        11EA            calls   #1,GETS
              FF70 CD DF  11F1            pushal  -144(fp)
              FEA8 CD DF  11F5            pushal  -344(fp)
00000000* EF 02 FB        11F9            calls   #2,STRCPY
              FF20 CD DF  1200            pushal  -224(fp)
              FEA8 CD DF  1204            pushal  -344(fp)
00000000* EF 02 FB        1208            calls   #2,STRCAT
              FEA8 CD DF  120F            pushal  -344(fp)
              075C CC DF  1213            pushal  1884(ap)
00000000* EF 02 FB        1217            calls   #2,PRINTF
              0771 CC DF  121E            pushal  1905(ap)
00000000* EF 01 FB        1222            calls   #1,PRINTF
FCDE CD FEA8 CD DE        1229            moval   -344(fp),-802(fp
              FEA8 CD DF  1230            pushal  -344(fp)
00000000* EF 01 FB        1234            calls   #1,STRLEN
              FCDA CD 50 B0  123B         movw    r0,-806(fp)
```

```
              7E 7C    1240           clrq     -(sp)
              7E 7C    1242           clrq     -(sp)
              7E 7C    1244           clrq     -(sp)
              00 DD    1246           pushl    #0
        FCD2 CD 9F     1248           pushab   -814(fp)
              7E 7C    124C           clrq     -(sp)
              00 DD    124E           pushl    #0
        FCDA CD 9F     1250           pushab   -806(fp)
   00000000* EF 0C FB  1254           calls    #12,LIB$SPAWN
              67 50 D0 1259           movl     r0,(r7)
52 50 FFFFFFFE 8F CB   125E           bicl3    #-2,r0,r2
              01 52 D1 1266           cmpl     r2,#1
                 09 13 1269           beql     sym.69
                 67 DD 126B           pushl    (r7)
   00000000* EF 01 FB  126D           calls    #1,EXIT
                       1274  sym.69:
             073A CC DF 1274          pushal   1930(ap)
   00000000* EF 01 FB  1278           calls    #1,PRINTF
             07A9 CC DF 127F          pushal   1961(ap)
   00000000* EF 01 FB  1283           calls    #1,PRINTF
              7E 7C    128A           clrq     -(sp)
        FDD6 CD 9F     128C           pushab   -554(fp)
   00000000* EF 03 FB  1290           calls    #3,SYS$OPEN
              67 50 D0 1297           movl     r0,(r7)
52 50 FFFFFFFE 8F CB   129A           bicl3    #-2,r0,r2
              01 52 D1 12A2           cmpl     r2,#1
                 09 13 12A5           beql     sym.70
                 67 DD 12A7           pushl    (r7)
   00000000* EF 01 FB  12A9           calls    #1,EXIT
                       12B0  sym.70:
     04 AE FD62 CD D0  12B0           movl     -542(fp),4(sp)
              10 A6 DD 12B6           pushl    16(r6)
              7E 7C    12B9           clrq     -(sp)
              10 A6 DD 12BB           pushl    16(r6)
              14 AE DD 12BE           pushl    20(sp)
              7E 7C    12C1           clrq     -(sp)
         00000000 EF 9F 12C3          pushab   FRAMES
         00020009 8F DD 12C9          pushl    #131081
                 00 DD 12CF           pushl    #0
              D4 AD DF 12D1           pushal   -44(fp)
              CC AD DF 12D4           pushal   -52(fp)
   00000000* EF 0C FB  12D7           calls    #12,SYS$CRMPSC
              67 50 D0 12DE           movl     r0,(r7)
52 50 FFFFFFFE 8F CB   12E1           bicl3    #-2,r0,r2
              01 52 D1 12E9           cmpl     r2,#1
                 09 13 12EC           beql     sym.71
                 67 DD 12EE           pushl    (r7)
   00000000* EF 01 FB  12F0           calls    #1,EXIT
                       12F7  sym.71:
        C8 AD D4 AD D0 12F7           movl     -44(fp),-56(fp)
        CC AD D4 AD D0 12FC           movl     -44(fp),-52(fp)
        D0 AD D8 AD D0 1301           movl     -40(fp),-48(fp)
              E8 AD DF 1306           pushal   -24(fp)
   00000000* EF 01 FB  1309           calls    #1,LIB$FREE_EF
              67 50 D0 1310           movl     r0,(r7)
52 50 FFFFFFFE 8F CB   1313           bicl3    #-2,r0,r2
              01 52 D1 131B           cmpl     r2,#1
                 03 12 131E           bneq     gen.16
                 0241 31 1320         brw      sym.80
                       1323  gen.16:
                 67 DD 1323           pushl    (r7)
   00000000* EF 01 FB  1325           calls    #1,EXIT
                 0235 31 132C         brw      sym.80
                    01 132F           nop
                       1330  case(906):
```

```
                  E8 AD DF   1330             pushal   -24(fp)
00000000* EF 01 FB           1333             calls    #1,LIB$GET_EF
                  67 50 D0   133A             movl     r0,(r7)
52 50 FFFFFFFE 8F C9         133D             bicl3    #-2,r0,r2
               01 52 D1      1345             cmpl     r2,#1
                     09 13   1348             beql     sym.72
                     67 DD   134A             pushl    (r7)
00000000* EF 01 F8           134C             calls    #1,EXIT
                             1353    sym.72:
                     7E 7C   1353             clrq     -(sp)
                  C0 AD DF   1355             pushal   -64(fp)
                  E8 AD DD   1358             pushl    -24(fp)
                     01 DD   135B             pushl    #1
                     00 DD   135D             pushl    #0
                  D4 AD DF   135F             pushal   -44(fp)
                  C8 AD DF   1362             pushal   -56(fp)
00000000* EF 08 FB           1365             calls    #8,SYS$UPDSEC
                  67 50 D0   136C             movl     r0,(r7)
52 50 FFFFFFFE 8F C9         136F             bicl3    #-2,r0,r2
               01 52 D1      1377             cmpl     r2,#1
                     09 13   137A             beql     sym.73
                     67 DD   137C             pushl    (r7)
00000000* EF 01 FB           137E             calls    #1,EXIT
                             1385    sym.73:
                  C0 AD DF   1385             pushal   -64(fp)
                  E8 AD DD   1388             pushl    -24(fp)
00000000* EF 02 FB           138B             calls    #2,SYS$SYNCH
                  67 50 D0   1392             movl     r0,(r7)
52 50 FFFFFFFE 8F C9         1395             bicl3    #-2,r0,r2
               01 52 D1      139D             cmpl     r2,#1
                     09 13   13A0             beql     sym.74
                     67 DD   13A2             pushl    (r7)
00000000* EF 01 FB           13A4             calls    #1,EXIT
                             13AB    sym.74:
                     7E 7C   13AB             clrq     -(sp)
                  CC AD DF   13AD             pushal   -52(fp)
00000000* EF 03 FB           13B0             calls    #3,SYS$DELTVA
                  67 50 D0   13B7             movl     r0,(r7)
52 50 FFFFFFFE 8F C9         13BA             bicl3    #-2,r0,r2
               01 52 D1      13C2             cmpl     r2,#1
                     09 13   13C5             beql     sym.75
                     67 DD   13C7             pushl    (r7)
00000000* EF 01 FB           13C9             calls    #1,EXIT
                             13D0    sym.75:
                  04 AE DD   13D0             pushl    4(sp)
00000000* EF 01 FB           13D3             calls    #1,SYS$DASSGN
                  67 50 D0   13DA             movl     r0,(r7)
52 50 FFFFFFFE 8F C9         13DD             bicl3    #-2,r0,r2
               01 52 D1      13E5             cmpl     r2,#1
                     09 13   13E8             beql     sym.76
                     67 DD   13EA             pushl    (r7)
00000000* EF 01 FB           13EC             calls    #1,EXIT
                             13F3    sym.76:
               FF20 CD DF    13F3             pushal   -224(fp)
00000000* EF 01 FB           13F7             calls    #1,GETS
               FF20 CD DF    13FE             pushal   -224(fp)
00000000* EF 01 FB           1402             calls    #1,GETS
               07CA CC DF    1409             pushal   1994(ap)
               FEA8 CD DF    140D             pushal   -344(fp)
00000000* EF 02 FB           1411             calls    #2,STRCPY
               FF20 CD DF    1418             pushal   -224(fp)
               FEA8 CD DF    141C             pushal   -344(fp)
00000000* EF 02 FB           1420             calls    #2,STRCAT
               07EA CC DF    1427             pushal   2026(ap)
               FEA8 CD DF    142B             pushal   -344(fp)
00000000* EF 02 FB           142F             calls    #2,STRCAT
```

```
       FEA8 CD DF       1436              pushal    -344(fp)
       080D CC DF       143A              pushal    2061(ap)
00000000* EF 02 FB      143E              calls     #2,PRINTF
       0822 CC DF       1445              pushal    2082(ap)
00000000* EF 01 FB      1449              calls     #1,PRINTF
  FCE6 CD FEA8 CD DE    1450              moval     -344(fp),-794(fp
       FEA8 CD DF       1457              pushal    -344(fp)
00000000* EF 01 FB      145B              calls     #1,STRLEN
       FCE2 CD 50 B0    1462              movw      r0,-798(fp)
             7E 7C      1467              clrq      -(sp)
             7E 7C      1469              clrq      -(sp)
             7E 7C      146B              clrq      -(sp)
             00 DD      146D              pushl     #0
        FCD2 CD 9F      146F              pushab    -814(fp)
             7E 7C      1473              clrq      -(sp)
             00 DD      1475              pushl     #0
        FCE2 CD 9F      1477              pushab    -798(fp)
00000000* EF 0C FB      147B              calls     #12,LIB$SPAWN
          67 50 D0      1482              movl      r0,(r7)
52 50 FFFFFFFE 8F C8    1485              bicl3     #-2,r0,r2
          01 52 D1      148D              cmpl      r2,#1
             09 13      1490              beql      sym.77
             67 DD      1492              pushl     (r7)
00000000* EF 01 FB      1494              calls     #1,EXIT
                        149B    sym.77:
       083C CC DF       149B              pushal    2108(ap)
00000000* EF 01 FB      149F              calls     #1,PRINTF
       085C CC DF       14A6              pushal    2140(ap)
00000000* EF 01 FB      14AA              calls     #1,PRINTF
             7E 7C      14B1              clrq      -(sp)
        FDD6 CD 9F      14B3              pushab    -554(fp)
00000000* EF 03 FB      14B7              calls     #3,SYS$OPEN
          67 50 D0      14BE              movl      r0,(r7)
52 50 FFFFFFFE 8F C3    14C1              bicl3     #-2,r0,r2
          01 52 D1      14C9              cmpl      r2,#1
             09 13      14CC              beql      sym.78
             67 DD      14CE              pushl     (r7)
00000000* EF 01 FB      14D0              calls     #1,EXIT
                        14D7    sym.78:
   04 AE FDE2 CD D0     14D7              movl      -542(fp),4(sp)
          10 A6 DD      14DD              pushl     16(r6)
             7E 7C      14E0              clrq      -(sp)
          10 A6 DD      14E2              pushl     16(r6)
          14 AE DD      14E5              pushl     20(sp)
             7E 7C      14E8              clrq      -(sp)
       00000000 EF 9F   14EA              pushab    FRAMES
       00020009 8F DD   14F0              pushl     #131081
             00 DD      14F6              pushl     #0
          D4 AD DF      14F8              pushal    -44(fp)
          CC AD DF      14FB              pushal    -52(fp)
00000000* EF 0C FB      14FE              calls     #12,SYS$CRMPSC
          67 50 D0      1505              movl      r0,(r7)
52 50 FFFFFFFE 8F C8    1508              bicl3     #-2,r0,r2
          01 52 D1      1510              cmpl      r2,#1
             09 13      1513              beql      sym.79
             67 DD      1515              pushl     (r7)
00000000* EF 01 FB      1517              calls     #1,EXIT
                        151E    sym.79:
   C8 AD D4 AD D0      151E              movl      -44(fp),-56(fp)
   CC AD D4 AD D0      1523              movl      -44(fp),-52(fp)
   D0 AD D8 AD D0      1528              movl      -40(fp),-48(fp)
          E8 AD DF      152D              pushal    -24(fp)
00000000* EF 01 FB      1530              calls     #1,LIB$FREE_EF
          67 50 D0      1537              movl      r0,(r7)
52 50 FFFFFFFE 8F CB    153A              bicl3     #-2,r0,r2
```

```
              01 52 D1    1542           cmpl      r2,#1
                 1D 13    1545           beql      sym.80
                 67 DD    1547           pushl     (r7)
  00000000* EF  01 FB    1549           calls     #1,EXIT
                 12 11    1550           brb       sym.80
                 50 D5    1552           tstl      r0
                           1554  default:
              E4 AD DD   1554           pushl     -28(fp)
            087D CC DF   1557           pushal    2173(ap)
                 69 DD    155B           pushl     (r9)
  00000000* EF 03 FB    155D           calls     #3,FPRINTF
                           1564  sym.80:
  000003E7 8F E4 AD D1   1564           cmpl      -28(fp),#999
                 03 13    156C           beql      gen.17
              EE3B 31    156E           brw       sym.7
                           1571  gen.17:
                           1571  sym.81:
                 0A DD    1571           pushl     #10
  00000000* EF 01 FB    1573           calls     #1,SLEEP
            08A2 CC DF   157A           pushal    2210(ap)
  00000000* EF 01 FB    157E           calls     #1,PRINTF
           7E 40 8F 9A   1585           movzbl    #64,-(sp)
  00000000* EF 01 FB    1589           calls     #1,SYS$SETEF
                 67 50 D0 1590           movl      r0,(r7)
  52 50 FFFFFFFE 8F CB   1593           bicl3     #-2,r0,r2
                 01 52 D1 159B           cmpl      r2,#1
                 09 13    159E           beql      sym.82
                 67 DD    15A0           pushl     (r7)
  00000000* EF 01 FB    15A2           calls     #1,EXIT
                           15A9  sym.82:
                 50 01 D0 15A9           movl      #1,r0
                    04    15AC           ret
``` and Line
-------

Q/MACHINE_CODE=AFTER/LIST

```
                           0000  main:
                    OFFC  0000           .entry    main,^m<r2,r3,r4
        5E FFFF7FDC EE 9E 0002           movab     -32804(sp),sp
  00000000* EF 16         0009           jsb       C$MAIN
         56 00000000 EF 9E 000F           movab    STATUS,r6
           000002A4 EF DF 0016           pushal    $CHAR_STRING_CON
           0000029E EF DF 001C           pushal    $CHAR_STRING_CON
  00000000* EF 02 FB      0022           calls     #2,FOPEN
  00000000 EF 50 D0       0029           movl      r0,LOGFILE
                 14 12    0030           bneq      sym.1
           000002A6 EF DF 0032           pushal    $CHAR_STRING_CON
  00000000* EF 01 FB      0038           calls     #1,PRINTF
  00000000* EF 00 FB      003F           calls     #0,EXIT
                           0046  sym.1:
        00000000 EF 9F    0046           pushab    LTOS_MAIL
                 7E 7C    004C           clrq      -(sp)
                 7E 7C    004E           clrq      -(sp)
        00000000 EF DF    0050           pushal    MBXCHAN
                 00 DD    0056           pushl     #0
  00000000* EF 07 FB      0058           calls     #7,SYS$CREMBX
              66 50 D0    005F           movl      r0,(r6)
  52 50 FFFFFFFE 8F CB    0062           bicl3     #-2,r0,r2
                 01 52 D1 006A           cmpl      r2,#1
                 09 13    006D           beql      sym.2
                 66 DD    006F           pushl     (r6)
  00000000* EF 01 FB      0071           calls     #1,EXIT
                           0078  sym.2:
```

```
                  7E 7C   0078            clrq     -(sp)
         00000000 EF 9F   007A            pushab   LEVEL1
                 7E 40 8F 9A   0080       movzbl   #64,-(sp)
        00000000* EF 04 FB    0084        calls    #4,SYS$ASCEFC
                  66 50 D0    0089        movl     r0,(r6)
      52 50 FFFFFFFE 8F CB   008E         bicl3    #-2,r0,r2
                01 52 D1    0096          cmpl     r2,#1
                   09 13    0099          beql     sym.3
                   66 DD    009B          pushl    (r6)
         00000000* EF 01 FB   009D        calls    #1,EXIT
                            00A4  sym.3:
                   7E 7C    00A4          clrq     -(sp)
                   7E 7C    00A6          clrq     -(sp)
                   14 DD    00A8          pushl    #20
         00000000 EF DF    00AA           pushal   L2MAIL
                   7E 7C    00B0          clrq     -(sp)
                   00 DD    00B2          pushl    #0
                   31 DD    00B4          pushl    #49
         00000000 EF DD    00B6           pushl    MBXCHAN
                   01 DD    00BC          pushl    #1
        00000000* EF 0C FB   00BE         calls    #12,SYS$QIOW
                   66 50 D0    00C5       movl     r0,(r6)
     52 50 FFFFFFFE 8F C9    00C8         bicl3    #-2,r0,r2
                01 52 D1    00D0          cmpl     r2,#1
                   09 13    00D3          beql     sym.4
                   66 DD    00D5          pushl    (r6)
        00000000* EF 01 FB   00D7         calls    #1,EXIT
                            00DE  sym.4:
         F4 AD 0200 8F 3C   00DE         movzwl   #512,-12(fp)
         F8 AD 0A00 8F 3C   00E4         movzwl   #2560,-8(fp)
                   7E 7C    00EA          clrq     -(sp)
         00000000 EF 9F    00EC           pushab   INFO
         00020008 8F DD    00F2           pushl    #131080
                   00 DD    00F8          pushl    #0
                   EC AD DF   00FA        pushal   -20(fp)
                   F4 AD DF   00FD        pushal   -12(fp)
        00000000* EF 07 FB   0100         calls    #7,SYS$MGBLSC
                   66 50 D0   0107        movl     r0,(r6)
     52 50 FFFFFFFE 8F CB   010A         bicl3    #-2,r0,r2
                01 52 D1    0112          cmpl     r2,#1
                   09 13    0115          beql     sym.5
                   66 DD    0117          pushl    (r6)
        00000000* EF 01 FB   0119         calls    #1,EXIT
                            0120  sym.5:
                52 EC AD D0   0120         movl    -20(fp),r2
                53 F0 AD D0   0124         movl    -16(fp),r3
                   52 DD    0128          pushl    r2
         000002BC EF DF    012A           pushal   $CHAR_STRING_CON
         00000000 EF DD    0130           pushl    LOGFILE
        00000000* EF 03 FB   0136         calls    #3,FPRINTF
                   53 DD    013D          pushl    r3
         000002D6 EF DF    013F           pushal   $CHAR_STRING_CON
         00000000 EF DD    0145           pushl    LOGFILE
        00000000* EF 03 FB   014B         calls    #3,FPRINTF
         F4 AD 0200 8F 3C   0152         movzwl   #512,-12(fp)
              5C 10 A2 09 73   0158        ashl    #9,16(r2),ap
                   5C 5C C0   015D         addl2   ap,ap
     F8 AD 5C 00000200 8F C1   0160       addl3    #512,ap,-8(fp)
                   7E 7C    0169          clrq     -(sp)
         00000000 EF 9F    016B           pushab   FRAMES
         00020008 8F DD    0171           pushl    #131080
                   00 DD    0177          pushl    #0
                   EC AD DF   0179        pushal   -20(fp)
                   F4 AD DF   017C        pushal   -12(fp)
        00000000* EF 07 FB   017F         calls    #7,SYS$MGBLSC
```

```
            66 50 D0    0186              movl    r0,(r6)
5C 50 FFFFFFFE 8F CB    0189              bicl3   #-2,r0,ap
         01 5C D1       0191              cmpl    ap,#1
            09 13       0194              beql    sym.6
            66 DD       0196              pushl   (r6)
  00000000* EF 01 FB    0198              calls   #1,EXIT
                        019F    sym.6:
         54 EC AD D0    019F              movl    -20(fp),r4
         55 F0 AD D0    01A3              movl    -16(fp),r5
            54 DD       01A7              pushl   r4
    000002DE EF DF      01A9              pushal  $CHAR_STRING_CON
    00000000 EF DD      01AF              pushl   LOGFILE
  00000000* EF 03 FB    01B5              calls   #3,FPRINTF
            55 DD       01BC              pushl   r5
    000002F3 EF DF      01BE              pushal  $CHAR_STRING_CON
    00000000 EF DD      01C4              pushl   LOGFILE
  00000000* EF 03 FB    01CA              calls   #3,FPRINTF
    00000300 EF DF      01D1              pushal  $CHAR_STRING_CON
  00000000* EF 01 FB    01D7              calls   #1,PRINTF
            7E 7C       01DE              clrq    -(sp)
            E8 AD DF    01E0              pushal  -24(fp)
    00000000 EF 9F      01E3              pushab  DR11W
  00000000* EF 04 FB    01E9              calls   #4,SYS$ASSIGN
            66 50 D0    01F0              movl    r0,(r6)
5C 50 FFFFFFFE 8F CB    01F3              bicl3   #-2,r0,ap
         01 5C D1       01FB              cmpl    ap,#1
            09 13       01FE              beql    sym.7
            66 DD       0200              pushl   (r6)
  00000000* EF 01 FB    0202              calls   #1,EXIT
                        0209    sym.7:
            E8 AD DD    0209              pushl   -24(fp)
    00000310 EF DF      020C              pushal  $CHAR_STRING_CON
  00000000* EF 02 FB    0212              calls   #2,PRINTF
            E4 AD DF    0219              pushal  -28(fp)
  00000000* EF 01 FB    021C              calls   #1,LIB$GET_EF
            66 50 D0    0223              movl    r0,(r6)
5C 50 FFFFFFFE 8F CB    0226              bicl3   #-2,r0,ap
         01 5C D1       022E              cmpl    ap,#1
            09 13       0231              beql    sym.8
            66 DD       0233              pushl   (r6)
  00000000* EF 01 FB    0235              calls   #1,EXIT
                        023C    sym.8:
    00000324 EF DF      023C              pushal  $CHAR_STRING_CON
  00000000* EF 01 FB    0242              calls   #1,PRINTF
            7E 46 8F 9A 0249              movzbl  #70,-(sp)
  00000000* EF 01 FB    024D              calls   #1,SYS$WAITFR
            66 50 D0    0254              movl    r0,(r6)
5C 50 FFFFFFFE 8F CB    0257              bicl3   #-2,r0,ap
         01 5C D1       025F              cmpl    ap,#1
            09 13       0262              beql    sym.9
            66 DD       0264              pushl   (r6)
  00000000* EF 01 FB    0266              calls   #1,EXIT
                        026D    sym.9:
            7E 46 8F 9A 026D              movzbl  #70,-(sp)
  00000000* EF 01 FB    0271              calls   #1,SYS$CLREF
            66 50 D0    0278              movl    r0,(r6)
5C 50 FFFFFFFE 8F CB    027B              bicl3   #-2,r0,ap
         01 5C D1       0283              cmpl    ap,#1
            09 13       0286              beql    sym.10
            66 DD       0288              pushl   (r6)
  00000000* EF 01 FB    028A              calls   #1,EXIT
                        0291    sym.10:
         03 A2 01 CE    0291              mnegl   #1,8(r2)
            53 D4       0295              clrl    r3
            7E 47 8F 9A 0297              movzbl  #71,-(sp)
```

```
00000000* EF 01 FB     029E              calls    #1,SYS$SETEF
         66 50 DO      02A2              movl     r0,(r6)
5C 50 FFFFFFFE 8F CB   02A5              bicl3    #-2,r0,ap
         01 5C D1      02AD              cmpl     ap,#1
            09 13      02B0              beql     sym.11
            66 DD      02B2              pushl    (r6)
00000000* EF 01 FB     02B4              calls    #1,EXIT
                       02BB   sym.11:
   00000341 EF DF      02BB              pushal   $CHAR_STRING_CON
00000000* EF 01 FB     02C1              calls    #1,PRINTF
00000000* EF 00 FB     02C8              calls    #0,LIB$INIT_TIME
         66 50 DO      02CF              movl     r0,(r6)
5C 50 FFFFFFFE 8F CB   02D2              bicl3    #-2,r0,ap
         01 5C D1      02DA              cmpl     ap,#1
            09 13      02DD              beql     sym.12
            66 DD      02DF              pushl    (r6)
00000000* EF 01 FB     02E1              calls    #1,EXIT
                       02E8   sym.12:
            7E 7C      02E8              clrq     -(sp)
            00 DD      02EA              pushl    #0
            0A DD      02EC              pushl    #10
7E 04 A2 04 A2 C1      02EE              addl3    4(r2),4(r2),-(sp)
      BFE4 CD DF       02F4              pushal   -16412(fp)
            7E 7C      02F8              clrq     -(sp)
   FFFF7FDC ED DF      02FA              pushal   -32804(fp)
      7E 2031 8F 3C    0300              movzwl   #8369,-(sp)
            E8 AD DD   0305              pushl    -24(fp)
            E4 AD DD   0308              pushl    -28(fp)
00000000* EF CC FB     030B              calls    #12,SYS$QIO
         66 50 DO      0312              movl     r0,(r6)
5C 50 FFFFFFFE 8F CB   0315              bicl3    #-2,r0,ap
         01 5C D1      031D              cmpl     ap,#1
            09 13      0320              beql     sym.13
            66 DD      0322              pushl    (r6)
00000000* EF 01 FB     0324              calls    #1,EXIT
                       032B   sym.13:
   FFFF7FDC ED DF      032B              pushal   -32804(fp)
            E4 AD DD   0331              pushl    -28(fp)
00000000* EF 02 FB     0334              calls    #2,SYS$SYNCH
         66 50 DO      033B              movl     r0,(r6)
5C 50 FFFFFFFE 8F CB   033E              bicl3    #-2,r0,ap
         01 5C D1      0346              cmpl     ap,#1
            09 13      0349              beql     sym.14
            66 DD      034B              pushl    (r6)
00000000* EF 01 FB     034D              calls    #1,EXIT
                       0354   sym.14:
            57 D4      0354              clrl     r7
         5C 62 01 C3   0356              subl3    #1,(r2),ap
            5C 57 D1   035A              cmpl     r7,ap
            03 19      035D              blss     gen.1
            01A2 31    035F              brw      sym.28
                       0362   gen.1:
5B 00000000* EF 9E     0362              movab    SYS$SETEF,r11
55 00000000* EF 9E     0369              movab    EXIT,r5
59 00000000* EF 9E     0370              movab    SYS$SYNCH,r9
5A 00000000* EF 9E     0377              movab    SYS$CLREF,r10
58 00000000* EF 9E     037E              movab    SYS$QIO,r8
            50 D5      0385              tstl     r0
            01         0387              nop
                       0388   sym.15:
            50 D4      0388              clrl     r0
         04 A2 D5      038A              tstl     4(r2)
            14 15      038D              bleq     sym.17
            01         038F              nop
                       0390   sym.16:
```

```
         5C 53 50 C1        0390              addl3     r0,r3,ap
    644C 8FE4 CD40 B0        0394              movw      -16412(fp)[r0],(
                50 D6        0398              incl      r0
         04 A2 50 D1        039D              cmpl      r0,4(r2)
                ED 19        03A1              blss      sym.16
                             03A3    sym.17:
            08 A2 D6        03A3              incl      8(r2)
         53 04 A2 C0        03A6              addl2     4(r2),r3
         7E 4B 8F 9A        03AA              movzbl    #75,-(sp)
            6B 01 FB        03AE              calls     #1,(r11)
            66 50 D0        03B1              movl      r0,(r6)
    5C 50 FFFFFFFE 8F CB    03B4              bicl3     #-2,r0,ap
            01 5C D1        03BC              cmpl      ap,#1
                05 13       03BF              beql      sym.18
                66 DD       03C1              pushl     (r6)
            65 01 FB        03C3              calls     #1,(r5)
                             03C6    sym.18:
       FFFF7FDC ED DF       03C6              pushal    -32804(fp)
               E4 AD DD     03CC              pushl     -28(fp)
            69 02 FB        03CF              calls     #2,(r9)
            66 50 D0        03D2              movl      r0,(r6)
    5C 50 FFFFFFFE 8F CB    03D5              bicl3     #-2,r0,ap
            01 5C D1        03DD              cmpl      ap,#1
                05 13       03E0              beql      sym.19
                66 DD       03E2              pushl     (r6)
            65 01 FB        03E4              calls     #1,(r5)
                             03E7    sym.19:
               E4 AD DD     03E7              pushl     -28(fp)
            6A 01 FB        03EA              calls     #1,(r10)
            66 50 D0        03ED              movl      r0,(r6)
    5C 50 FFFFFFFE 8F CB    03F0              bicl3     #-2,r0,ap
            01 5C D1        03F3              cmpl      ap,#1
                05 13       03F8              beql      sym.20
                66 DD       03FD              pushl     (r6)
            65 01 FB        03FF              calls     #1,(r5)
                             0402    sym.20:
                7E 7C       0402              clrq      -(sp)
                00 DD       0404              pushl     #0
                0A DD       0406              pushl     #10
      7E 04 A2 04 A2 C1     0408              addl3     4(r2),4(r2),-(sp)
       FFFF7FE4 ED DF       040E              pushal    -32796(fp)
                7E 7C       0414              clrq      -(sp)
       FFFF7FDC ED DF       0416              pushal    -32804(fp)
         7E 20D1 8F 3C      041C              movzwl    #3369,-(sp)
               E8 AD DD     0421              pushl     -24(fp)
               E4 AD DD     0424              pushl     -28(fp)
            68 0C FB        0427              calls     #12,(r8)
            66 50 D0        042A              movl      r0,(r6)
    5C 50 FFFFFFFE 8F CB    042D              bicl3     #-2,r0,ap
            01 5C D1        0435              cmpl      ap,#1
                05 13       0438              beql      sym.21
                66 DD       043A              pushl     (r6)
            65 01 FB        043C              calls     #1,(r5)
                             043F    sym.21:
                50 D4       043F              clrl      r0
            04 A2 D5        0441              tstl      4(r2)
                15 15       0444              bleq      sym.23
                50 D5       0446              tstl      r0
                             0448    sym.22:
         5C 53 50 C1        0448              addl3     r0,r3,ap
    644C 8FE4 CD40 B0       044C              movw      -16412(fp)[r0],(
                50 D6       0453              incl      r0
         04 A2 50 D1       0455              cmpl      r0,4(r2)
                ED 19       0459              blss      sym.22
                            045B    sym.23:
```

```
          08 A2 D6   045B           incl      8(r2)
       53 04 A2 C0   045E           addl2     4(r2),r3
       7E 4B 8F 9A   0462           movzbl    #75,-(sp)
          6B 01 FB   0466           calls     #1,(r11)
          66 50 D0   0469           movl      r0,(r6)
5C 50 FFFFFFFE 8F CB 046C           bicl3     #-2,r0,ap
          01 5C D1   0474           cmpl      ap,#1
             05 13   0477           beql      sym.24
             66 DD   0479           pushl     (r6)
          65 01 FB   047B           calls     #1,(r5)
                     047E  sym.24:
    FFFF7FDC ED DF   047E           pushal    -32804(fp)
          E4 AD DD   0484           pushl     -28(fp)
          69 02 FB   0487           calls     #2,(r9)
          66 50 D0   048A           movl      r0,(r6)
5C 50 FFFFFFFE 8F CB 048D           bicl3     #-2,r0,ap
          01 5C D1   0495           cmpl      ap,#1
             05 13   0498           beql      sym.25
             66 DD   049A           pushl     (r6)
          65 01 FB   049C           calls     #1,(r5)
                     049F  sym.25:
          E4 AD DD   049F           pushl     -28(fp)
          6A 01 FB   04A2           calls     #1,(r10)
          66 50 D0   04A5           movl      r0,(r6)
5C 50 FFFFFFFE 8F CB 04A8           bicl3     #-2,r0,ap
          01 5C D1   04B0           cmpl      ap,#1
             05 13   04B3           beql      sym.26
             66 DD   04B5           pushl     (r6)
          65 01 FB   04B7           calls     #1,(r5)
                     04BA  sym.26:
             7E 7C   04BA           clrq      -(sp)
             00 DD   04BC           pushl     #0
             0A DD   04BE           pushl     #10
    7E 04 A2 04 A2 C1 04C0          addl3     4(r2),4(r2),-(sp)
       BFE4 CD DF    04C6           pushal    -16412(fp)
             7E 7C   04CA           clrq      -(sp)
    FFFF7FDC ED DF   04CC           pushal    -32804(fp)
       7E 20B1 8F 3C 04D2           movzwl    #8369,-(sp)
          E8 AD DD   04D7           pushl     -24(fp)
          E4 AD DD   04DA           pushl     -28(fp)
          68 0C FB   04DD           calls     #12,(r8)
          66 50 D0   04E0           movl      r0,(r6)
5C 50 FFFFFFFE 8F CB 04E3           bicl3     #-2,r0,ap
          01 5C D1   04EB           cmpl      ap,#1
             05 13   04EE           beql      sym.27
             66 DD   04F0           pushl     (r6)
          65 01 FB   04F2           calls     #1,(r5)
                     04F5  sym.27:
          57 02 C0   04F5           addl2     #2,r7
       5C 62 01 C3   04F8           subl3     #1,(r2),ap
          5C 57 D1   04FC           cmpl      r7,ap
             03 18   04FF           bgeq      gen.2
            FE34 31  0501           brw       sym.15
                     0504  gen.2:
                     0504  sym.28:
             62 DD   0504           pushl     (r2)
      00000355 EF DF 0506           pushal    $CHAR_STRING_CON
   00000000* EF 02 FB 050C          calls     #2,PRINTF
   00000000* EF 00 FB 0513          calls     #0,LIB$SHOW_TIME
          66 50 D0   051A           movl      r0,(r6)
52 50 FFFFFFFE 8F CB 051D           bicl3     #-2,r0,r2
          01 52 D1   0525           cmpl      r2,#1
             09 13   0528           beql      sym.29
             66 DD   052A           pushl     (r6)
   00000000* EF 01 FB 052C          calls     #1,EXIT
```

```
                        0533  sym.29:
         E3 AD DD       0533            pushl   -24(fp)
00000000* EF 01 FB      0536            calls   #1,SYS$DASSGN
         66 50 D0       053D            movl    r0,(r6)
52 50 FFFFFFFE 8F CB    0540            bicl3   #-2,r0,r2
         01 52 D1       0548            cmpl    r2,#1
            09 13       054B            beql    sym.30
            66 DD       054D            pushl   (r6)
00000000* EF 01 FB      054F            calls   #1,EXIT
                        0556  sym.30:
         E4 AD DF       0556            pushal  -28(fp)
00000000* EF 01 FB      0559            calls   #1,LIB$FREE_EF
         66 50 D0       0560            movl    r0,(r6)
52 50 FFFFFFFE 8F CB    0563            bicl3   #-2,r0,r2
         01 52 D1       056B            cmpl    r2,#1
            09 13       056E            beql    sym.31
            66 DD       0570            pushl   (r6)
00000000* EF 01 FB      0572            calls   #1,EXIT
                        0579  sym.31:
         52 20 D0       0579            movl    #32,r2
            36 13       057C            beql    sym.34
            50 D5       057E            tstl    r0
                        0580  sym.32:
       7E 43 8F 9A      0580            movzbl  #75,-(sp)
00000000* EF 01 FB      0584            calls   #1,SYS$SETEF
         66 50 D0       058B            movl    r0,(r6)
5C 50 FFFFFFFE 8F CB    058E            bicl3   #-2,r0,ap
         01 5C D1       0596            cmpl    ap,#1
            09 13       0599            beql    sym.33
            66 DD       059B            pushl   (r6)
00000000* EF 01 FB      059D            calls   #1,EXIT
                        05A4  sym.33:
            01 DD       05A4            pushl   #1
00000000* EF 01 FB      05A6            calls   #1,SLEEP
            52 D6       05AD            incl    r2
         52 20 D0       05AF            movl    #32,r2
            CC 12       05B2            bneq    sym.32
                        05B4  sym.34:
 00000378 EF DF         05B4            pushal  $CHAR_STRING_CON
00000000* EF 01 FB      05BA            calls   #1,PRINTF
         50 01 D0       05C1            movl    #1,r0
               04       05C4            ret
``` and Line
--------

Q/MACHINE_CODE=AFTER/LIST

```
                       0000  main:
                OFFC   0000        .entry  main,^m<r2,r3,r4
         5E BFD0 CE 9E 0002        movab   -16432(sp),sp
00000000* EF 16         0007        jsb     C$MAIN
56 00000000 EF 9E       000D        movab   STATUS,r6
5B 00000000 EF 9E       0014        movab   $CHAR_STRING_CON
         BFD0 CD 07 B0  001B        movw    #7,-16432(fp)
         BFD2 CD 0E 90  0020        movb    #14,-16430(fp)
         BFD3 CD 01 90  0025        movb    #1,-16429(fp)
BFD4 CD 029E CB DE      002A        moval   670(r11),-16428(
         02AC CB DF     0031        pushal  684(r11)
         02A6 CB DF     0035        pushal  678(r11)
00000000* EF 02 FB      0039        calls   #2,FOPEN
00000000 EF 50 D0       0040        movl    r0,LOGFILE
```

```
            12 12        0047            bneq     sym.1
      02AE  CB DF        0049            pushal   686(r11)
00000000* EF 01 FB       004D            calls    #1,PRINTF
00000000* EF 00 FB       0054            calls    #0,EXIT
                         0058   sym.1:
   00000000 EF 9F        0058            pushab   LTOS_MAIL
            7E 7C        0061            clrq     -(sp)
            7E 7C        0063            clrq     -(sp)
   00000000 EF DF        0065            pushal   MBXCHAN
            00 DD        006B            pushl    #0
00000000* EF 07 FB       006D            calls    #7,SYS$CREMBX
            66 50 D0     0074            movl     r0,(r6)
52 50 FFFFFFFE 8F CB     0077            bicl3    #-2,r0,r2
            01 52 D1     007F            cmpl     r2,#1
            09 13        0082            beql     sym.2
            66 DD        0084            pushl    (r6)
00000000* EF 01 FB       0086            calls    #1,EXIT
                         008D   sym.2:
            7E 7C        008D            clrq     -(sp)
   00000000 EF 9F        008F            pushab   LEVEL1
         7E 40 8F 9A     0095            movzbl   #64,-(sp)
00000000* EF 04 FB       0099            calls    #4,SYS$ASCEFC
            66 50 D0     00A0            movl     r0,(r6)
52 50 FFFFFFFE 8F CB     00A3            bicl3    #-2,r0,r2
            01 52 D1     00AB            cmpl     r2,#1
            09 13        00AE            beql     sym.3
            66 DD        00B0            pushl    (r6)
00000000* EF 01 FB       00B2            calls    #1,EXIT
                         00B9   sym.3:
            7E 7C        00B9            clrq     -(sp)
            7E 7C        00BB            clrq     -(sp)
            14 DD        00BD            pushl    #20
   00000000 EF DF        00BF            pushal   L2MAIL
            7E 7C        00C5            clrq     -(sp)
            00 DD        00C7            pushl    #0
            31 DD        00C9            pushl    #49
   00000000 EF DD        00CB            pushl    MBXCHAN
            01 DD        00D1            pushl    #1
00000000* EF 0C FB       00D3            calls    #12,SYS$QIOW
            66 50 D0     00DA            movl     r0,(r6)
52 50 FFFFFFFE 8F CB     00DD            bicl3    #-2,r0,r2
            01 52 D1     00E5            cmpl     r2,#1
            09 13        00E8            beql     sym.4
            66 DD        00EA            pushl    (r6)
00000000* EF 01 FB       00EC            calls    #1,EXIT
                         00F3   sym.4:
   F4 AD 0200 8F 3C      00F3            movzwl   #512,-12(fp)
   F8 AD 0A00 8F 3C      00F9            movzwl   #2560,-8(fp)
            7E 7C        00FF            clrq     -(sp)
   00000000 EF 9F        0101            pushab   INFO
     00020008 8F DD      0107            pushl    #131080
            00 DD        010D            pushl    #0
         EC AD DF        010F            pushal   -20(fp)
         F4 AD DF        0112            pushal   -12(fp)
00000000* EF 07 FB       0115            calls    #7,SYS$MGBLSC
            66 50 D0     011C            movl     r0,(r6)
52 50 FFFFFFFE 8F CB     011F            bicl3    #-2,r0,r2
            01 52 D1     0127            cmpl     r2,#1
            09 13        012A            beql     sym.5
            66 DD        012C            pushl    (r6)
00000000* EF 01 FB       012E            calls    #1,EXIT
                         0135   sym.5:
         52 EC AD D0     0135            movl     -20(fp),r2
         53 F0 AD D0     0139            movl     -16(fp),r3
            52 DD        013D            pushl    r2
```

```
         02C4 CB DF    013F           pushal   708(r11)
     00000000 EF DD    0143           pushl    LOGFILE
  00000000* EF 03 FB   0149           calls    #3,FPRINTF
               53 DD   0150           pushl    r3
         02DE C3 DF    0152           pushal   734(r11)
     00000000 EF DD    0156           pushl    LOGFILE
  00000000* EF 03 FB   015C           calls    #3,FPRINTF
         F4 AD 0200 8F 3C  0163       movzwl   #512,-12(fp)
            5C 10 A2 09 78  0169      ashl     #9,16(r2),ap
                  5C 5C C0  016E      addl2    ap,ap
  F8 AD 5C 00000200 8F C1  0171       addl3    #512,ap,-8(fp)
                     7E 7C  017A      clrq     -(sp)
           00000000 EF 9F  017C        pushab   FRAMES
           00020008 8F DD  0182        pushl    #131080
                     00 DD  0188        pushl    #0
                  EC AD DF  018A        pushal   -20(fp)
                  F4 AD DF  018D        pushal   -12(fp)
    00000000* EF 07 FB    0190        calls    #7,SYS$MG3LSC
                  66 50 D0  0197        movl     r0,(r6)
     5C 50 FFFFFFFE 8F CB  019A        bicl3    #-2,r0,ap
                  01 5C D1  01A2        cmpl     ap,#1
                     09 13  01A5        beql     sym.6
                     66 DD  01A7        pushl    (r6)
    00000000* EF 01 FB    01A9        calls    #1,EXIT
                          01B0  sym.6:
                  54 EC AD D0  01B0    movl     -20(fp),r4
                  55 F0 AD D0  01B4    movl     -16(fp),r5
                        54 DD  01B8    pushl    r4
                  02E6 C3 DF  01BA     pushal   742(r11)
             00000000 EF DD  01BE      pushl    LOGFILE
    00000000* EF 03 FB    01C4        calls    #3,FPRINTF
                        55 DD  01CB    pushl    r5
                  0300 C3 DF  01CD     pushal   768(r11)
             00000000 EF DD  01D1      pushl    LOGFILE
    00000000* EF 03 FB    01D7        calls    #3,FPRINTF
                  E8 AD DF  01DE        pushal   -24(fp)
    00000000* EF 01 FB    01E1        calls    #1,LIB$GET_EF
                  66 50 D0  01E8        movl     r0,(r6)
     5C 50 FFFFFFFE 8F CB  01EB        bicl3    #-2,r0,ap
                  01 5C D1  01F3        cmpl     ap,#1
                     09 13  01F6        beql     sym.7
                     66 DD  01F8        pushl    (r6)
    00000000* EF 01 FB    01FA        calls    #1,EXIT
                          0201  sym.7:
                        5C D4  0201    clrl     ap
                  50 62 01 C3  0203    subl3    #1,(r2),r0
                     50 5C D1  0207    cmpl     ap,r0
                        0B 13  020A    bgeq     sym.9
                  50 62 01 C3  020C    subl3    #1,(r2),r0
                          0210  sym.8:
                        5C D6  0210    incl     ap
                     50 5C D1  0212    cmpl     ap,r0
                        F9 19  0215    blss     sym.8
                          0217  sym.9:
                  0308 C3 DF  0217     pushal   776(r11)
    00000000* EF 01 FB    021B        calls    #1,PRINTF
                  BFD8 CD DF  0222     pushal   -16424(fp)
                  BFD0 CD 9F  0226     pushab   -16432(fp)
    00000000* EF 02 FB    022A        calls    #2,SYS$BINTIM
                  66 50 D0  0231        movl     r0,(r6)
     5C 50 FFFFFFFE 8F CB  0234        bicl3    #-2,r0,ap
                  01 5C D1  023C        cmpl     ap,#1
                     09 13  023F        beql     sym.10
                     66 DD  0241        pushl    (r6)
    00000000* EF 01 FB    0243        calls    #1,EXIT
                          024A  sym.10:
```

```
       7E 46 8F 9A    024A            movzbl   #70,-(sp)
00000000* EF 01 FB    024E            calls    #1,SYS$WAITFR
          66 50 D0    0255            movl     r0,(r6)
5C 50 FFFFFFFE 8F CB  0258            bicl3    #-2,r0,ap
          01 5C D1    0260            cmpl     ap,#1
             09 13    0263            beql     sym.11
             66 DD    0265            pushl    (r6)
00000000* EF 01 FB    0267            calls    #1,EXIT
                      026E    sym.11:
       7E 46 8F 9A    026E            movzbl   #70,-(sp)
00000000* EF 01 FB    0272            calls    #1,SYS$CLREF
          66 50 D0    0279            movl     r0,(r6)
5C 50 FFFFFFFE 8F C3  027C            bicl3    #-2,r0,ap
          01 5C D1    0284            cmpl     ap,#1
             09 13    0287            beql     sym.12
             66 DD    0289            pushl    (r6)
00000000* EF 01 FB    028B            calls    #1,EXIT
                      0292    sym.12:
       08 A2 01 CE    0292            mnegl    #1,8(r2)
             53 D4    0296            clrl     r3
       7E 47 2F 9A    0298            movzbl   #71,-(sp)
00000000* EF 01 FB    029C            calls    #1,SYS$SETEF
          66 50 D0    02A3            movl     r0,(r6)
5C 50 FFFFFFFE 8F CB  02A6            bicl3    #-2,r0,ap
          01 5C D1    02AE            cmpl     ap,#1
             09 13    02B1            beql     sym.13
             66 DD    02B3            pushl    (r6)
00000000* EF 01 FB    02B5            calls    #1,EXIT
                      02BC    sym.13:
          0323 CB DF  02BC            pushal   803(r11)
00000000* EF 01 FB    02C0            calls    #1,PRINTF
00000000* EF 00 FB    02C7            calls    #0,LIB$INIT_TIME
          66 50 D0    02CE            movl     r0,(r6)
5C 50 FFFFFFFE 8F CB  02D1            bicl3    #-2,r0,ap
          01 5C D1    02D9            cmpl     ap,#1
             09 13    02DC            beql     sym.14
             66 DD    02DE            pushl    (r6)
00000000* EF 01 FB    02E0            calls    #1,EXIT
                      02E7    sym.14:
             7E 7C    02E7            clrq     -(sp)
          BFD8 CD DF  02E9            pushal   -16424(fp)
          E8 AD DD    02ED            pushl    -24(fp)
00000000* EF 04 FB    02F0            calls    #4,SYS$SETIMR
          66 50 D0    02F7            movl     r0,(r6)
5C 50 FFFFFFFE 8F CB  02FA            bicl3    #-2,r0,ap
          01 5C D1    0302            cmpl     ap,#1
             09 13    0305            beql     sym.15
             66 DD    0307            pushl    (r6)
00000000* EF 01 FB    0309            calls    #1,EXIT
                      0310    sym.15:
          E8 AD DD    0310            pushl    -24(fp)
00000000* EF 01 FB    0313            calls    #1,SYS$WAITFR
          66 50 D0    031A            movl     r0,(r6)
5C 50 FFFFFFFE 8F CB  031D            bicl3    #-2,r0,ap
          01 5C D1    0325            cmpl     ap,#1
             09 13    0328            beql     sym.16
             66 DD    032A            pushl    (r6)
00000000* EF 01 FB    032C            calls    #1,EXIT
                      0333    sym.16:
             57 D4    0333            clrl     r7
       5C 62 01 C3    0335            subl3    #1,(r2),ap
          5C 57 D1    0339            cmpl     r7,ap
             03 19    033C            blss     gen.1
          0124 31     033E            brw      sym.23
                      0341    gen.1:
```

```
5A 00000000* EF 9E   0341            movab     SYS$SETEF,r10
55 00000000* EF 9E   0343            movab     EXIT,r5
59 00000000* EF 9E   034F            movab     SYS$SETIMR,r9
58 00000000* EF 9E   0356            movab     SYS$WAITFR,r8
           50 D5     035D            tstl      r0
              01     035F            nop
                     0360  sym.17:
           50 D4     0360            clrl      r0
        04 A2 D5     0362            tstl      4(r2)
           14 15     0365            bleq      sym.19
              01     0367            nop
                     0369  sym.18:
        5C 53 50 C1  0369            addl3     r0,r3,ap
  644C BFE8 CD40 B0  036C            movw      -16408(fp)[r0],(
           50 D6     0373            incl      r0
        04 A2 50 D1  0375            cmpl      r0,4(r2)
           ED 19     0379            blss      sym.18
                     037B  sym.19:
        08 A2 D6     037B            incl      8(r2)
        53 04 A2 C0  037E            addl2     4(r2),r3
        7E 4B 8F 9A  0382            movzbl    #75,-(sp)
        6A 01 FB     0386            calls     #1,(r10)
        66 50 D0     0389            movl      r0,(r6)
 5C 50 FFFFFFFE 8F C8 038C           bicl3     #-2,r0,ap
        01 5C D1     0394            cmpl      ap,#1
           05 13     0397            beql      sym.20
           66 DD     0399            pushl     (r6)
        65 01 FB     039B            calls     #1,(r5)
                     039E  sym.20:
           7E 7C     039E            clrq      -(sp)
        BFD8 CD DF   03A0            pushal    -16424(fp)
        E8 AD DD     03A4            pushl     -24(fp)
        69 04 FB     03A7            calls     #4,(r9)
        66 50 D0     03AA            movl      r0,(r6)
 5C 50 FFFFFFFE 8F CB 03AD           bicl3     #-2,r0,ap
        01 5C D1     03B5            cmpl      ap,#1
           05 13     03B8            beql      sym.21
           66 DD     03BA            pushl     (r6)
        65 01 FB     03BC            calls     #1,(r5)
                     03BF  sym.21:
        E8 AD DD     03BF            pushl     -24(fp)
        68 01 FB     03C2            calls     #1,(r8)
        66 50 D0     03C5            movl      r0,(r6)
 5C 50 FFFFFFFE 8F C8 03C8           bicl3     #-2,r0,ap
        01 5C D1     03D0            cmpl      ap,#1
           05 13     03D3            beql      sym.22
           66 DD     03D5            pushl     (r6)
        65 01 FB     03D7            calls     #1,(r5)
                     03DA  sym.22:
           50 D4     03DA            clrl      r0
        04 A2 D5     03DC            tstl      4(r2)
           16 15     03DF            bleq      sym.24
           50 D5     03E1            tstl      r0
              01     03E3            nop
                     03E4  sym.23:
        5C 53 50 C1  03E4            addl3     r0,r3,ap
  644C BFE8 CD40 B0  03E8            movw      -16408(fp)[r0],(
           50 D6     03EF            incl      r0
        04 A2 50 D1  03F1            cmpl      r0,4(r2)
           ED 19     03F5            blss      sym.23
                     03F7  sym.24:
        08 A2 D6     03F7            incl      8(r2)
        53 04 A2 C0  03FA            addl2     4(r2),r3
        7E 4B 8F 9A  03FE            movzbl    #75,-(sp)
        6A 01 FB     0402            calls     #1,(r10)
```

```
              66 50 DO      0405           movl      r0,(r6)
  5C 50 FFFFFFFE 8F C3      0408           bicl3     #-2,r0,ap
              01 5C D1      0410           cmpl      ap,#1
                 05 13      0413           beql      sym.25
                 66 DD      0415           pushl     (r6)
              65 01 FB      0417           calls     #1,(r5)
                            041A  sym.25:
                 7E 7C      041A           clro      -(sp)
           BFD8 CD DF       041C           pushal    -16424(fp)
              E8 AD DD      0420           pushl     -24(fp)
              69 04 FB      0423           calls     #4,(r9)
              66 50 DO      0426           movl      r0,(r6)
  5C 50 FFFFFFFE 8F CB      0429           bicl3     #-2,r0,ap
              01 5C D1      0431           cmpl      ap,#1
                 05 13      0434           beql      sym.26
                 66 DD      0436           pushl     (r6)
              65 01 FB      0438           calls     #1,(r5)
                            043B  sym.26:
              E8 AD DD      043B           pushl     -24(fp)
              63 01 FB      043E           calls     #1,(r3)
              66 50 D0      0441           movl      r0,(r6)
  5C 50 FFFFFFFE 8F CB      0444           bicl3     #-2,r0,ap
              01 5C D1      044C           cmpl      ap,#1
                 05 13      044F           beql      sym.27
                 66 DD      0451           pushl     (r6)
              65 01 FB      0453           calls     #1,(r5)
                            0456  sym.27:
              57 02 C0      0456           addl2     #2,r7
           5C 62 01 C3      0459           subl3     #1,(r2),ap
              5C 57 D1      045D           cmpl      r7,ap
                 03 18      0460           bgeq      gen.2
              FEFB 31       0462           brw       sym.17
                            0465  gen.2:
                            0465  sym.28:
                 62 DD      0465           pushl     (r2)
           033A C3 DF       0467           pushal    826(r11)
       00000000* EF 02 FB   046B           calls     #2,PRINTF
       00000000* EF 00 FB   0472           calls     #0,LIB$SHOW_TIME
              66 50 D0      0479           movl      r0,(r6)
  52 50 FFFFFFFE 8F CB      047C           bicl3     #-2,r0,r2
              01 52 D1      0484           cmpl      r2,#1
                 09 13      0487           beql      sym.29
                 66 DD      0489           pushl     (r6)
       00000000* EF 01 FB   048B           calls     #1,EXIT
                            0492  sym.29:
              E8 AD DF      0492           pushal    -24(fp)
       00000000* EF 01 FB   0495           calls     #1,LIB$FREE_EF
              66 50 D0      049C           movl      r0,(r6)
  52 50 FFFFFFFE 8F CB      049F           bicl3     #-2,r0,r2
              01 52 D1      04A7           cmpl      r2,#1
                 09 13      04AA           beql      sym.30
                 66 DD      04AC           pushl     (r6)
       00000000* EF 01 FB   04AE           calls     #1,EXIT
                            04B5  sym.30:
           0363 C3 DF       04B5           pushal    867(r11)
       00000000* EF 01 FB   04B9           calls     #1,PRINTF
              50 01 D0      04C0           movl      #1,r0
                    04      04C3           ret
``` and Line
--------

REPLAY/MACHINE_CODE=AFTER/LIST

```
                         0000  main:
               OFFC     0000          .entry   main,^m<r2,r3,r4
         5E 18 C2       0002          subl2    #24,sp
00000000* EF 16         0005          jsb      CSMAIN
57 00000000 EF 9E       000B          movab    HUE,r7
5A 00000000 EF 9E       0012          movab    J,r10
58 00000000 EF 9E       0019          movab    I,r8
56 00000000 EF 9E       0020          movab    STATUS,r6
            7E 7C       0027          clrq     -(sp)
   00000000 EF 9F       0029          pushab   LEVEL1
         7E 40 8F 9A    002F          movzbl   #64,-(sp)
00000000* EF 04 FB      0033          calls    #4,SYS$ASCEFC
         66 50 D0       003A          movl     r0,(r6)
52 50 FFFFFFFE 8F CB    003D          bicl3    #-2,r0,r2
         01 52 D1       0045          cmpl     r2,#1
            09 13       0048          beql     sym.1
            66 DD       004A          pushl    (r6)
00000000* EF 01 FB      004C          calls    #1,EXIT
                        0053  sym.1:
   F4 AD 0200 8F 3C     0053          movzwl   #512,-12(fp)
   F8 AD 0A00 8F 3C     0059          movzwl   #2560,-8(fp)
            7E 7C       005F          clrq     -(sp)
   00000000 EF 9F       0061          pushab   INFO
   00020003 8F DD       0067          pushl    #131080
            00 DD       006D          pushl    #0
         EC AD DF       006F          pushal   -20(fp)
         F4 AD DF       0072          pushal   -12(fp)
00000000* EF 07 FB      0075          calls    #7,SYS$MGBLSC
         66 50 D0       007C          movl     r0,(r6)
52 50 FFFFFFFE 8F CB    007F          bicl3    #-2,r0,r2
         01 52 D1       0087          cmpl     r2,#1
            09 13       008A          beql     sym.2
            66 DD       008C          pushl    (r6)
00000000* EF 01 FB      008E          calls    #1,EXIT
                        0095  sym.2:
         5C EC AD D0    0095          movl     -20(fp),ap
         53 F0 AD D0    0099          movl     -16(fp),r3
            5C DD       009D          pushl    ap
   0000001B EF DF       009F          pushal   $CHAR_STRING_CON
00000000* EF 02 FB      00A5          calls    #2,PRINTF
            53 DD       00AC          pushl    r3
   00000035 EF DF       00AE          pushal   $CHAR_STRING_CON
00000000* EF 02 FB      00B4          calls    #2,PRINTF
   F4 AD 0200 8F 3C     00B8          movzwl   #512,-12(fp)
      52 10 AC 09 78    00C1          ashl     #9,16(ap),r2
            52 52 C0    00C6          addl2    r2,r2
F8 AD 52 00000200 8F C1 00C9          addl3    #512,r2,-8(fp)
            7E 7C       00D2          clrq     -(sp)
   00000000 EF 9F       00D4          pushab   FRAMES
   00020003 8F DD       00DA          pushl    #131080
            00 DD       00E0          pushl    #0
         EC AD DF       00E2          pushal   -20(fp)
         F4 AD DF       00E5          pushal   -12(fp)
00000000* EF 07 FB      00E8          calls    #7,SYS$MGBLSC
         66 50 D0       00EF          movl     r0,(r6)
52 50 FFFFFFFE 8F CB    00F2          bicl3    #-2,r0,r2
         01 52 D1       00FA          cmpl     r2,#1
            09 13       00FD          beql     sym.3
            66 DD       00FF          pushl    (r6)
00000000* EF 01 FB      0101          calls    #1,EXIT
                        0108  sym.3:
         6E EC AD D0    0108          movl     -20(fp),(sp)
         54 F0 AD D0    010C          movl     -16(fp),r4
            6E DD       0110          pushl    (sp)
   0000003D EF DF       0112          pushal   $CHAR_STRING_CON
```

```
            00000000* EF 02 FB    0118            calls   #2,PRINTF
                        54 DD     011F            pushl   r4
            00000057 EF DF        0121            pushal  $CHAR_STRING_CON
            00000000* EF 02 FB    0127            calls   #2,PRINTF
                     7E 4B 8F 9A  012E            movzbl  #75,-(sp)
            00000000* EF 01 FB    0132            calls   #1,SYS$CLREF
                     66 50 D0     0139            movl    r0,(r6)
         52 50 FFFFFFFE 8F C9     013C            bicl3   #-2,r0,r2
                     01 52 D1     0144            cmpl    r2,#1
                        09 13     0147            beql    sym.4
                        66 DD     0149            pushl   (r6)
            00000000* EF 01 FB    014B            calls   #1,EXIT
                                  0152   sym.4:
            00000000 EF 18 AC D0  0152            movl    24(ap),LO
            00000000 EF 14 AC D0  015A            movl    20(ap),HI
            00000000 EF 2000 8F 3C 0162           movzwl  #8192,BUFLEN
52 00000000 EF 00000000 EF C3     016B            subl3   LO,HI,r2
            00000000 EF 52 13 C7  0177            divl3   #19,r2,MAPBIN
            00000000 EF DF        017F            pushal  TFLAG
            00000000* EF 01 FB    0185            calls   #1,LIB$GET_EF
            00000000 EF 50 D0     018C            movl    r0,TSTAT
         52 50 FFFFFFFE 8F C9     0193            bicl3   #-2,r0,r2
                     01 52 D1     019B            cmpl    r2,#1
                        0D 13     019E            beql    sym.5
            00000000 EF DD        01A0            pushl   TSTAT
            00000000* EF 01 FB    01A6            calls   #1,EXIT
                                  01AD   sym.5:
            00000000 EF DF        01AD            pushal  TBUF
            00000000 EF 9F        01B3            pushab  TIME
            00000000* EF 02 FB    01B9            calls   #2,SYS$BINTIM
            00000000 EF 50 D0     01C0            movl    r0,TSTAT
         52 50 FFFFFFFE 8F C9     01C7            bicl3   #-2,r0,r2
                     01 52 D1     01CF            cmpl    r2,#1
                        0D 13     01D2            beql    sym.6
            00000000 EF DD        01D4            pushl   TSTAT
            00000000* EF 01 FB    01DA            calls   #1,EXIT
                                  01E1   sym.6:
            00000000 EF DF        01E1            pushal  HOSTNAME
            00000000 EF DF        01E7            pushal  HOST
            00000000* EF 02 FB    01ED            calls   #2,STRCPY
            00000000 EF DF        01F4            pushal  HOST
            00000000* EF 01 FB    01FA            calls   #1,GETHOSTBYNAME
            00000000 EF 60 14 28  0201            movc3   #20,(r0),DEST_HO
         53 00000010 EF D0        0209            movl    DEST_HOST+16,r3
            00000000 EF 00 A3 90  0210            movb    @0(r3),ADDRESS
                        52 63 D0  0218            movl    (r3),r2
            00000001 EF 01 A2 90  021B            movb    1(r2),ADDRESS+1
                        52 63 D0  0223            movl    (r3),r2
            00000002 EF 02 A2 90  0226            movb    2(r2),ADDRESS+2
                        52 63 D0  022E            movl    (r3),r2
            00000003 EF 03 A2 90  0231            movb    3(r2),ADDRESS+3
         52 00000004 EF 9E        0239            movab   SIN+4,r2
         62 00000000 EF D0        0240            movl    ADDRESS,(r2)
            00000000 EF 02 B0     0247            movw    #2,SIN
                     7E 0420 8F 3C 024E           movzwl  #1056,-(sp)
            00000000* EF 01 FB    0253            calls   #1,HTONS
         52 00000002 EF 9E        025A            movab   SIN+2,r2
                        62 50 B0  0261            movw    r0,(r2)
                        00 DD     0264            pushl   #0
                        01 DD     0266            pushl   #1
                        02 DD     0268            pushl   #2
            00000000* EF 03 FB    026A            calls   #3,SOCKET
            00000000 EF 50 D0     0271            movl    r0,CHANNEL
FFFFFFFF 8F 00000000 EF D1        0278            cmpl    CHANNEL,#-1
                        13 12     0283            bneq    sym.7
```

```
              0000005F EF DF   0285           pushal    $CHAR_STRING_CON
           00000000* EF 01 FB  0288           calls     #1,PRINTF
                       0243 31 0292           brw       sym.23
                          50 D5 0295          tstl      r0
                             01 0297          nop
                                0298  sym.7:
                          10 DD  0298          pushl    #16
              00000000 EF 9F   029A           pushab    SIN
              00000000 EF DD   02A0           pushl     CHANNEL
           00000000* EF 03 FB  02A6           calls     #3,CONNECT
              00000000 EF 50 D0 02AD          movl      r0,SOCKSTAT
 FFFFFFFF 8F 00000000 EF D1   02B4           cmpl       SOCKSTAT,#-1
                          1F 12 02BF          bneq      sym.8
              00000087 EF DF   02C1           pushal    $CHAR_STRING_CON
           00000000* EF 01 FB  02C7           calls     #1,PRINTF
              00000000 EF DD   02CE           pushl     CHANNEL
           00000000* EF 01 FB  02D4           calls     #1,NETCLOSE
                       01FA 31 02DB           brw       sym.23
                          50 D5 02DE          tstl      r0
                                02E0  sym.8:
              000000A9 EF DF   02E0           pushal    $CHAR_STRING_CON
           52 00000000* EF 9E  02E6           movab     PRINTF,r2
                       62 01 FB 02ED          calls     #1,(r2)
                        03 AC DD 02F0         pushl     8(ap)
              000000C7 EF DF   02F3           pushal    $CHAR_STRING_CON
                       62 02 FB 02F9          calls     #2,(r2)
                        04 AC DD 02FC         pushl     4(ap)
              000000DC EF DF   02FF           pushal    $CHAR_STRING_CON
                       62 02 FB 0305          calls     #2,(r2)
                          6C DD 0308          pushl     (ap)
              000000F6 EF DF   030A           pushal    $CHAR_STRING_CON
                       62 02 FB 0310          calls     #2,(r2)
                       7E 43 8F 9A 0313       movzbl    #75,-(sp)
           00000000* EF 01 FB  0317           calls     #1,SYS$WAITFR
                       66 50 D0 031E          movl      r0,(r6)
           52 50 FFFFFFFE 8F C8 0321          bicl3     #-2,r0,r2
                       01 52 D1 0329          cmpl      r2,#1
                          09 13 032C          beql      sym.9
                          66 DD 032E          pushl     (r6)
           00000000* EF 01 FB  0330           calls     #1,EXIT
                                0337  sym.9:
                       7E 43 8F 9A 0337       movzbl    #75,-(sp)
           00000000* EF 01 FB  033B           calls     #1,SYS$CLREF
                       66 50 D0 0342          movl      r0,(r6)
           52 50 FFFFFFFE 8F C8 0345          bicl3     #-2,r0,r2
                       01 52 D1 034D          cmpl      r2,#1
                          09 13 0350          beql      sym.10
                          66 DD 0352          pushl     (r6)
           00000000* EF 01 FB  0354           calls     #1,EXIT
                                035B  sym.10:
              00000114 EF DF   035B           pushal    $CHAR_STRING_CON
           00000000* EF 01 FB  0361           calls     #1,PRINTF
                          55 D4 0368          clrl      r5
                          6C D5 036A          tstl      (ap)
                          03 14 036C          bgtr      gen.1
                       0167 31 036E           brw       sym.23
                                0371  gen.1:
           59 00000000* EF 9E  0371           movab     SYS$WAITFR,r9
           54 00000000* EF 9E  0378           movab     EXIT,r4
           5B 00000000* EF 9E  037F           movab     SYS$CLREF,r11
                          50 D5 0386          tstl      r0
                                0388  sym.11:
                 53 55 04 AC C5 0388          mult3     4(ap),r5,r3
                    08 AC 55 D1 038D          cmpl      r5,8(ap)
                          3F 15 0391          bleq      sym.15
                             01 0393          nop
```

```
                            0394  sym.12:
        7E 48 8F 9A         0394        movzbl   #75,-(sp)
              69 01 FB      0398        calls    #1,(r9)
              66 50 D0      039B        movl     r0,(r6)
  52 50 FFFFFFFE 8F CB      039E        bicl3    #-2,r0,r2
              01 52 D1      03A6        cmpl     r2,#1
                 05 13      03A9        beql     sym.13
                 66 DD      03AB        pushl    (r6)
              64 01 FB      03AD        calls    #1,(r4)
                            03B0  sym.13:
        7E 48 8F 9A         03B0        movzbl   #75,-(sp)
              69 01 FB      03B4        calls    #1,(r11)
              66 50 D0      03B7        movl     r0,(r6)
  52 50 FFFFFFFE 8F CB      03BA        bicl3    #-2,r0,r2
              01 52 D1      03C2        cmpl     r2,#1
                 05 13      03C5        beql     sym.14
                 66 DD      03C7        pushl    (r6)
              64 01 FB      03C9        calls    #1,(r4)
                            03CC  sym.14:
           08 AC 55 D1      03CC        cmpl     r5,8(ap)
                 C2 14      03D0        bgtr     sym.12
                            03D2  sym.15:
                 6A D4      03D2        clrl     (r10)
              63 53 D0      03D4        movl     r3,(r3)
        52 53 04 AC C1      03D7        addl3    4(ap),r3,r2
              52 63 D1      03DC        cmpl     (r3),r2
                 44 13      03DF        bgeq     sym.19
                 50 D5      03E1        tstl     r0
                    01      03E3        nop
                            03E4  sym.16:
              52 63 D0      03E4        movl     (r3),r2
        52 00 BE42 32       03E7        cvtwl    @0(sp)[r2],r2
  52 00000000 EF C2         03EC        subl2    L0,r2
  52 00000000 EF C6         03F3        divl2    MAPBIN,r2
                 52 D6      03FA        incl     r2
              67 52 F6      03FC        cvtlb    r2,(r7)
                 03 14      03FF        bgtr     sym.17
              67 01 90      0401        movb     #1,(r7)
                            0404  sym.17:
              12 67 91      0404        cmpb     (r7),#18
                 03 19      0407        blss     sym.18
              67 12 90      0409        movb     #18,(r7)
                            040C  sym.18:
              52 6A D0      040C        movl     (r10),r2
  00000000 EF42 67 90       040F        movb     (r7),DATABUF[r2]
                 6A D6      0417        incl     (r10)
                 68 D6      0419        incl     (r8)
        52 53 04 AC C1      041B        addl3    4(ap),r3,r2
              52 63 D1      0420        cmpl     (r3),r2
                 BF 19      0423        blss     sym.16
                            0425  sym.19:
                 6A D4      0425        clrl     (r10)
                 7E 7C      0427        clrq     -(sp)
        00000000 EF DF      0429        pushal   TBUF
        00000000 EF DD      042F        pushl    TFLAG
     00000000* EF 04 FB     0435        calls    #4,SYS$SETIMR
        00000000 EF 50 D0   043C        movl     r0,TSTAT
  52 50 FFFFFFFE 8F CB      0443        bicl3    #-2,r0,r2
              01 52 D1      044B        cmpl     r2,#1
                 09 13      044E        beql     sym.20
        00000000 EF DD      0450        pushl    TSTAT
              64 01 FB      0456        calls    #1,(r4)
                            0459  sym.20:
        00000000 EF DD      0459        pushl    TFLAG
              69 01 FB      045F        calls    #1,(r9)
        00000000 EF 50 D0   0462        movl     r0,TSTAT
```

```
  52 50 FFFFFFFE 8F CB    0469           bicl3    #-2,r0,r2
           01 52 D1       0471           cmpl     r2,#1
              09 13       0474           beql     sym.21
     00000000 EF DD       0476           pushl    TSTAT
           64 01 FB       047C           calls    #1,(r4)
                          047F  sym.21:
     00000000 EF DD       047F           pushl    BUFLEN
           52 6A D0       0485           movl     (r10),r2
     00000000 EF42 9F     0488           pushab   DATABUF[r2]
     00000000 EF DD       048F           pushl    CHANNEL
   00000000* EF 03 FB     0495           calls    #3,NETWRITE
     00000000 EF 50 D0    049C           movl     r0,SOCKSTAT
 FFFFFFFF 8F 00000000 EF D1 04A3         cmpl     SOCKSTAT,#-1
              1D 12       04AE           bneq     sym.22
     00000000 EF DD       04B0           pushl    CHANNEL
   00000000* EF 01 FB     04B6           calls    #1,NETCLOSE
     00000124 EF DF       04BD           pushal   $CHAR_STRING_CON
   00000000* EF 01 FB     04C3           calls    #1,PRINTF
           55 6C D0       04CA           movl     (ap),r5
                          04CD  sym.22:
           55 02 C0       04CD           addl2    #2,r5
           6C 55 D1       04D0           cmpl     r5,(ap)
              03 18       04D3           bgeq     gen.2
           FEB0 31        04D5           brw      sym.11
                          04D8  gen.2:
                          04D8  sym.23:
     00000000 EF DD       04D8           pushl    CHANNEL
   00000000* EF 01 FB     04DE           calls    #1,NETCLOSE
     00000143 EF DF       04E5           pushal   $CHAR_STRING_CON
   00000000* EF 01 FB     04EB           calls    #1,PRINTF
        7E 42 8F 9A       04F2           movzbl   #66,-(sp)
   00000000* EF 01 FB     04F6           calls    #1,SYS$SETEF
           66 50 D0       04FD           movl     r0,(r6)
  52 50 FFFFFFFE 8F CB    0500           bicl3    #-2,r0,r2
           01 52 D1       0508           cmpl     r2,#1
              09 13       050B           beql     sym.24
              66 DD       050D           pushl    (r6)
   00000000* EF 01 FB     050F           calls    #1,EXIT
                          0516  sym.24:
     00000160 EF DF       0516           pushal   $CHAR_STRING_CON
   00000000* EF 01 FB     051C           calls    #1,PRINTF
           50 01 D0       0523           movl     #1,r0
              04          0526           ret and Line
        -------

.KENNEDY]MONITOR/MACHINE_CODE=AFTER/LIST 0000  main:
              OFFC        0000           .entry   main,^m<r2,r3,r4
           5E 04 C2       0002           subl2    #4,sp
   00000000* EF 16        0005           jsb      CSMAIN
   59 00000000 EF 9E      000B           movab    $CHAR_STRING_CON
   5B 00000000 EF 9E      0012           movab    BUF4,r11
   55 00000000 EF 9E      0019           movab    L3PARAMS,r5
   5A 00000000 EF 9E      0020           movab    CUR_PIXB,r10
   58 00000000 EF 9E      0027           movab    CUR_PIXA,r8
   56 00000000 EF 9E      002E           movab    CURDATE7,r6
   54 00000000 EF 9E      0035           movab    PREVDATE7,r4
   57 00000000 EF 9E      003C           movab    $DATA,r7
           64 B4          0043           clrw     (r4)
           02 A4 7C       0045           clrq     2(r4)
```

```
           0A A4 D4   0048           clrl     10(r4)
              66 B4   004B           clrw     (r6)
           02 A6 7C   004D           clrq     2(r6)
           0A A6 D4   0050           clrl     10(r6)
           18 A7 9F   0053           pushab   24(r7)
00000000* EF 01 FB    0056           calls    #1,LIB$DATE_TIME
              52 50 D0 005D          movl     r0,r2
5C 52 FFFFFFFE 8F C8  0060           bicl3    #-2,r2,ap
              01 5C D1 0068          cmpl     ap,#1
                 12 13 006B          beql     sym.1
                 69 DF 006D          pushal   (r9)
00000000* EF 01 FB    006F           calls    #1,PRINTF
                 52 DD 0076          pushl    r2
00000000* EF 01 FB    0078           calls    #1,LIB$STOP
                      007F   sym.1:
           65 2000 8F 3C 007F        movzwl   #8192,(r5)
        04 A5 0258 8F 3C 0084        movzwl   #600,4(r5)
           08 A5 68 9E 008A          movab    (r8),8(r5)
           0C A5 6A 9E 008E          movab    (r10),12(r5)
        68 00000000 EF 9E 0092       movab    THRESH_HITS_OUT,
00000000 EF 03E9 8F 3C 0099          movzwl   #1001,THRESH
00000000 EF 02F95115 8F 56 00A2      cvtfd    #49893653,SCALE
              52 D4   00AD           clrl     r2
           50 0A AA DE 00AF          moval    0(r10),r0
           5C 0000 C8 DE 00B3        moval    0(r8),ap
                      00B8   sym.2:
           3C 03E8 8F 3C 00B8        movzwl   #1000,(ap)+
           30 03E8 8F 3C 00BD        movzwl   #1000,(r0)+
        EE 52 00001FFF 8F F3 00C2    aobleq   #8191,r2,sym.2
        4000 C8 03EA 8F 3C 00CA      movzwl   #1002,16384(r8)
              5C 6B D0 00D1          movl     (r11),ap
        00000000 EF 5C D0 00D4       movl     ap,THRESHPREFBLO
     00000000 EF 08 AC 9E 00DB       movab    8(ap),THRESHHITS
  00000000 EF 00000000 EF 9E 00E3    movab    WORKPIX,BADPIX
              40 A7 9F 00EE          pushab   64(r7)
00000000* EF 01 FB    00F1           calls    #1,LIB$DATE_TIME
              52 50 D0 00F8          movl     r0,r2
5C 52 FFFFFFFE 8F C8  00FB           bicl3    #-2,r2,ap
              01 5C D1 0103          cmpl     ap,#1
                 13 13 0106          beql     sym.3
                 2B A9 DF 0108       pushal   43(r9)
00000000* EF 01 FB    010B           calls    #1,PRINTF
                 52 DD 0112          pushl    r2
00000000* EF 01 FB    0114           calls    #1,LIB$STOP
                      011B   sym.3:
              3F A7 94 011B          clrb     63(r7)
              17 A7 94 011E          clrb     23(r7)
                 00 DD 0121          pushl    #0
00000000* EF 01 FB    0123           calls    #1,TO_SCREEN
              4A A9 DF 012A          pushal   74(r9)
00000000* EF 01 FB    012D           calls    #1,PRINTF
              18 A7 9F 0134          pushab   24(r7)
00000000* EF 01 FB    0137           calls    #1,LIB$DATE_TIME
              52 50 D0 013E          movl     r0,r2
5C 52 FFFFFFFE 8F C8  0141           bicl3    #-2,r2,ap
              01 5C D1 0149          cmpl     ap,#1
                 13 13 014C          beql     sym.4
              7A A9 DF 014E          pushal   122(r9)
00000000* EF 01 FB    0151           calls    #1,PRINTF
                 52 DD 0158          pushl    r2
00000000* EF 01 FB    015A           calls    #1,LIB$STOP
                      0161   sym.4:
              52 D4   0161           clrl     r2
           04 A5 D5   0163           tstl     4(r5)
              28 15   0166           bleq     sym.8
```

```
         53 00000000* EF 9E    0168            movab    RUNCALC,r3
                         01    016F            nop
                               0170   sym.5:
                   0D 52 E8    0170            blbs     r2,sym.6
                   03 A5 DD    0173            pushl    8(r5)
                      65 DD    0176            pushl    (r5)
                   63 02 FB    0178            calls    #2,(r3)
                      0B 11    017B            brb      sym.7
                      50 D5    017D            tstl     r0
                         01    017F            nop
                               0180   sym.6:
                   0C A5 DD    0180            pushl    12(r5)
                      65 DD    0183            pushl    (r5)
                   63 02 FB    0185            calls    #2,(r3)
                               0188   sym.7:
                      52 D6    0188            incl     r2
                   04 A5 52 D1 018A            cmpl     r2,4(r5)
                      E0 19    018E            blss     sym.5
                               0190   sym.8:
                   40 A7 9F    0190            pushab   64(r7)
         00000000* EF 01 FB    0193            calls    #1,LIB$DATE_TIME
                   52 50 D0    019A            movl     r0,r2
      5C 52 FFFFFFFE 8F C8     019D            bicl3    #-2,r2,ap
                      01 5C D1 01A5            cmpl     ap,#1
                      14 13    01A8            beql     sym.9
                   009A C9 DF  01AA            pushal   154(r9)
         00000000* EF 01 FB    01AE            calls    #1,PRINTF
                      52 DD    01B5            pushl    r2
         00000000* EF 01 FB    01B7            calls    #1,LIB$STOP
                               01BE   sym.9:
                   3F A7 94    01BE            clrb     63(r7)
                   17 A7 94    01C1            clrb     23(r7)
                      01 DD    01C4            pushl    #1
         00000000* EF 01 FB    01C6            calls    #1,TO_SCREEN
                   18 A7 9F    01CD            pushab   24(r7)
         00000000* EF 01 FB    01D0            calls    #1,LIB$DATE_TIME
                   52 50 D0    01D7            movl     r0,r2
      5C 52 FFFFFFFE 8F C8     01DA            bicl3    #-2,r2,ap
                      01 5C D1 01E2            cmpl     ap,#1
                      14 13    01E5            beql     sym.10
                   00B9 C9 DF  01E7            pushal   185(r9)
         00000000* EF 01 FB    01EB            calls    #1,PRINTF
                      52 DD    01F2            pushl    r2
         00000000* EF 01 FB    01F4            calls    #1,LIB$STOP
                               01FB   sym.10:
                      65 DD    01FB            pushl    (r5)
         00000000* EF 01 FB    01FD            calls    #1,COUNT_HITS
                   04 A5 DD    0204            pushl    4(r5)
                      65 DD    0207            pushl    (r5)
                   00D9 C9 DF  0209            pushal   217(r9)
         53 00000000* EF 9E    020D            movab    PRINTF,r3
                   63 03 FB    0214            calls    #3,(r3)
      5C 00000000 EF D0        0217            movl     THRESHPREFBLOCK,
                   04 AC DD    021E            pushl    4(ap)
                      6C DD    0221            pushl    (ap)
                   00F8 C9 DF  0223            pushal   248(r9)
                   63 03 FB    0227            calls    #3,(r3)
                      5C 6B D0 022A            movl     (r11),ap
                   7E 08 AC 32 022D            cvtwl    8(ap),-(sp)
                   0128 C9 DF  0231            pushal   296(r9)
                   63 02 FB    0235            calls    #2,(r3)
                      5C 6B D0 0238            movl     (r11),ap
                7E 2008 CC 32  023B            cvtwl    8200(ap),-(sp)
                   0141 C9 DF  0240            pushal   321(r9)
                   63 02 FB    0244            calls    #2,(r3)
```

```
              5C 69 D0   0247            movl      (r11),ap
         7E 4006 CC 32   024A            cvtwl     16390(ap),-(sp)
              015E C9 DF 024F            pushal    350(r9)
                 63 02 FB 0253           calls     #2,(r3)
                 40 A7 9F 0256           pushab    64(r7)
         00000000* EF 01 FB 0259         calls     #1,LIB$DATE_TIME
                 52 50 D0 0260           movl      r0,r2
    5C 52 FFFFFFFE 8F C9 0263            bicl3     #-2,r2,ap
                 01 5C D1 026B           cmpl      ap,#1
                    10 13 026E           beql      sym.11
              017D C9 DF 0270            pushal    381(r9)
                 63 01 FB 0274           calls     #1,(r3)
                    52 DD 0277           pushl     r2
         00000000* EF 01 FB 0279         calls     #1,LIB$STOP
                          0280  sym.11:
                 3F A7 94 0280           clrb      63(r7)
                 17 A7 94 0283           clrb      23(r7)
              019C C9 DF 0286            pushal    412(r9)
         00000000* EF 01 FB 028A         calls     #1,PRINTF
                    0C DD 0291           pushl     #0
         00000000* EF 01 FB 0293         calls     #1,TO_SCREEN
                 50 01 D0 029A           movl      #1,r0
                       04 029D           ret
                          029E  runcalc:
                     007C 029E           .entry    runcalc,^m<r2,r3
                 5E 04 C2 02A0           subl2     #4,sp
        56 00000000 EF 9E 02A3           movab     THRESHHITS,r6
        55 00000000 EF 9E 02AA           movab     BADPIX,r5
        52 00000000 EF D0 02B1           movl      THRESH,r2
              51 04 AC D0 02B8           movl      4(ap),r1
                    50 D4 02BC           clrl      r0
                    51 D5 02BE           tstl      r1
                    3D 15 02C0           bleq      sym.16
                    50 D5 02C2           tstl      r0
                          02C4  sym.12:
                 54 65 D0 02C4           movl      (r5),r4
                  6440 B5 02C7           tstw      (r4)[r0]
                    2C 12 02CA           bneq      sym.15
              53 08 AC DE 02CC           moval     a8(ap),r3
              53 6340 D0 02D0            movl      (r3)[r0],r3
      FFF84858 8F 53 D1 02D4             cmpl      r3,#-505000
                    09 19 02D8           blss      sym.13
      000784A8 8F 53 D1 02DD             cmpl      r3,#505000
                    06 15 02E4           bleq      sym.14
                          02E6  sym.13:
              6440 01 B0 02E6            movw      #1,(r4)[r0]
                    0C 11 02EA           brb       sym.15
                          02EC  sym.14:
                 52 53 D1 02EC           cmpl      r3,r2
                    07 19 02EF           blss      sym.15
                 53 66 D0 02F1           movl      (r6),r3
              6340 01 B0 02F4            movw      #1,(r3)[r0]
                          02F8  sym.15:
                    50 D6 02F8           incl      r0
                 51 50 D1 02FA           cmpl      r0,r1
                    C5 19 02FD           blss      sym.12
                          02FF  sym.16:
                       04 02FF           ret
                          0300  count_hits:
                     007C 0300           .entry    count_hits,^m<r2
                 5E 04 C2 0302           subl2     #4,sp
        56 00000000 EF 9E 0305           movab     THRESHPREFBLOCK,
        54 00000000 EF 9E 030C           movab     THRESHHITS,r4
        55 00000000 EF 9E 0313           movab     BADPIX,r5
              51 04 AC D0 031A           movl      4(ap),r1
                    52 D4 031E           clrl      r2
```

```
              50 D4     0320           clrl      r0
              51 D5     0322           tstl      r1
              27 15     0324           bleq      sym.20
              50 D5     0326           tstl      r0
                        0328   sym.17:
           53 65 D0     0328           movl      (r5),r3
        01 6340 B1      032B           cmpw      (r3)[r0],#1
              0B 12     032F           bneq      sym.18
           53 64 D0     0331           movl      (r4),r3
              6340 B4   0334           clrw      (r3)[r0]
              0D 11     0337           brb       sym.19
              50 D5     0339           tstl      r0
                 01     033B           nop
                        033C   sym.18:
           53 64 D0     033C           movl      (r4),r3
              6340 B5   033F           tstw      (r3)[r0]
              02 13     0342           beql      sym.19
                        041C   sym.22:
           28 A3 DF     041C           pushal    40(r3)
           025B C6 DF   041F           pushal    603(r6)
      58 00000000* EF 9E  0423         movab     PRINTF,r8
              68 02 FB  042A           calls     #2,(r8)
           48 A3 9F     042D           pushab    72(r3)
              64 9F     0430           pushab    (r4)
      00000000* EF 02 FB  0432         calls     #2,SYS$NUMTIM
           0288 C6 DF   0439           pushal    648(r6)
              68 01 FB  043D           calls     #1,(r8)
           7E 0C A4 32  0440           cvtwl     12(r4),-(sp)
           7E 0A A4 32  0444           cvtwl     10(r4),-(sp)
           7E 08 A4 32  0448           cvtwl     8(r4),-(sp)
           7E 06 A4 32  044C           cvtwl     6(r4),-(sp)
              7E 64 32  0450           cvtwl     (r4),-(sp)
           7E 02 A4 32  0453           cvtwl     2(r4),-(sp)
           7E 04 A4 32  0457           cvtwl     4(r4),-(sp)
           02CE C6 DF   045B           pushal    718(r6)
              68 08 FB  045F           calls     #8,(r8)
           52 06 A4 32  0462           cvtwl     6(r4),r2
              52 3C C4  0466           mull2     #60,r2
           50 08 A4 32  0469           cvtwl     8(r4),r0
              52 50 C0  046D           addl2     r0,r2
              52 3C C4  0470           mull2     #60,r2
           50 0A A4 32  0473           cvtwl     10(r4),r0
              52 50 C0  0477           addl2     r0,r2
      52 00000064 8F C4  047A          mull2     #100,r2
           50 0C A4 32  0481           cvtwl     12(r4),r0
              52 50 C0  0485           addl2     r0,r2
           51 06 A5 32  0488           cvtwl     6(r5),r1
              51 3C C4  048C           mull2     #60,r1
           50 08 A5 32  048F           cvtwl     8(r5),r0
              51 50 C0  0493           addl2     r0,r1
              51 3C C4  0496           mull2     #60,r1
           50 0A A5 32  0499           cvtwl     10(r5),r0
              51 50 C0  049D           addl2     r0,r1
      51 00000064 8F C4  04A0          mull2     #100,r1
           50 0C A5 32  04A7           cvtwl     12(r5),r0
              51 50 C0  04AB           addl2     r0,r1
           57 52 51 C3  04AE           subl3     r1,r2,r7
              07 18     04B2           bgeq      sym.23
      57 0033D600 8F C0  04B4          addl2     #3640000,r7
                        04BB   sym.23:
                 57 DD  04BB           pushl     r7
           02FD C6 DF   04BD           pushal    765(r6)
              68 02 FB  04C1           calls     #2,(r8)
           52 57 32 C1  04C4           addl3     #50,r7,r2
      52 00000064 8F C6  04C8          divl2     #100,r2
```

```
                    52 DD      04CF              pushl    r2
             031F   C6 DF      04D1              pushal   799(r6)
                    63 02 FB   04D5              calls    #2,(r8)
             01 04  AC D1      04D8              cmpl     4(ap),#1
                    1B 12      04DC              bneq     sym.24
        52 000003E8 8F C4      04DE              mull2    #1000,r2
        50 04 A9    02 C7      04E5              divl3    #2,4(r9),r0
                    52 50 C0   04EA              addl2    r0,r2
        7E 52 04    A9 C7      04ED              divl3    4(r9),r2,-(sp)
             033D   C6 DF      04F2              pushal   829(r6)
                    68 02 FB   04F6              calls    #2,(r8)
                               04F9   sym.24:
                    04         04F9              ret
``` and Line
--------

THRESH/MACHINE_CODE=AFTER/LIST

```
                                   0028  main:
                           0FFC    0028          .entry   main,^m<r2,r3,r4
             5E EFA0 CE 9E        002A           movab    -4192(sp),sp
             00000000* EF 16      002F           jsb      CSMAIN
             5C 00000000 EF 9E    0035           movab    $CHAR_STRING_CON
             5B 00000000 EF 9E    003C           movab    HEYPRINT2,r11
             56 00000000 EF 9E    0043           movab    DATE7,r6
         F20E CD 0F AC 0C 28      004A           movc3    #12,15(ap),-3570
                00000000 EF 9F    0051           pushab   DETACHED
                         1B AC DF 0057           pushal   27(ap)
             00000000* EF 02 FB   005A           calls    #2,SCANF
         64 8F 00000000 EF 91     0061           cmpb     DETACHED,#100
                         09 12    0069           bneq     sym.1
             00000000 EF 01 D0    006B           movl     #1,HEYPRINT4
                         07 11    0072           brb      sym.2
                                  0074  sym.1:
             00000000 EF 02 D0    0074           movl     #2,HEYPRINT4
                                  007B  sym.2:
         02 00000000 EF D1        007B           cmpl     HEYPRINT,#2
                         0A 12    0082           bneq     sym.3
                         1E AC DF 0084           pushal   30(ap)
             00000000* EF 01 FB   0087           calls    #1,PRINTF
                                  008E  sym.3:
             00000000* EF 00 FB   008E           calls    #0,OPENOUTPUT
             00000000* EF 00 FB   0095           calls    #0,OPENINPUT
                    00000000 EF 7C 009C          clrq     PREVDATE7
                    00000008 EF D4 00A2          clrl     PREVDATE7+8
                    0000000C EF B4 00A8          clrw     PREVDATE7+12
                    00000100 EF DD 00AE          pushl    $DATA+256
             00000000* EF 01 FB   00B4           calls    #1,STRLEN
                000000F8 EF 50 B0 00BB           movw     r0,$DATA+248
        000000FC EF 00000100 EF D0 00C2          movl     $DATA+256,$DATA+
                000000FB EF 01 90 00CD           movb     #1,$DATA+251
                000000FA EF 0E 90 00D4           movb     #14,$DATA+250
                00000000 EF 31 D0 00DB           movl     #49,IOFUNC
                00000000 EF 01 D0 00E2           movl     #1,HEYPRINT
                         6B 01 D0 00E9           movl     #1,(r11)
                00000000 EF 01 D0 00EC           movl     #1,HEYPRINT3
        00000000 EF 00000104 EF DE 00F3          moval    $DATA+260,FILE_S
                         53 AC DF 00FE           pushal   83(ap)
                         EFF0 CD DF 0101         pushal   -4112(fp)
             52 00000000* EF 9E   0105           movab    STRCPY,r2
                         62 02 FB 010C           calls    #2,(r2)
                         69 AC DF 010F           pushal   105(ap)
```

```
                EFD2 CD DF    0112            pushal    -4142(fp)
                   62 02 FB   0116            calls     #2,(r2)
                0082 CC DF    0119            pushal    130(ap)
                EFAA CD DF    011D            pushal    -4182(fp)
                   62 02 FB   0121            calls     #2,(r2)
      02 00000000 EF D1       0124            cmpl      HEYPRINT4,#2
                   03 12      0128            bneq      sym.4
                00AA CC DF    012D            pushal    170(ap)
         00000000* EF 01 FB   0131            calls     #1,PRINTF
                              0138  sym.4:
                F21A CD DF    0138            pushal    -3558(fp)
                00E5 CC DF    013C            pushal    229(ap)
         00000000* EF 02 FB   0140            calls     #2,SCANF
           59 8F F21A CD 91   0147            cmpb      -3558(fp),#89
                   03 13      014D            beql      sym.5
           79 8F F21A CD 91   014F            cmpb      -3558(fp),#121
                   0A 12      0155            bneq      sym.6
                              0157  sym.5:
         00000000 EF 02 D0    0157            movl      #2,HEYPRINT
                   68 02 D0   015E            movl      #2,(r11)
                              0161  sym.6:
                              0161  askagain:
      02 00000000 EF D1       0161            cmpl      HEYPRINT4,#2
                   09 12      0168            bneq      sym.7
                00E8 CC DF    016A            pushal    232(ap)
         00000000* EF 01 FB   016E            calls     #1,PRINTF
                              0175  sym.7:
                F21C CD DF    0175            pushal    -3556(fp)
                0118 CC DF    0179            pushal    280(ap)
         00000000* EF 02 FB   017D            calls     #2,SCANF
                52 F21C CD 90 0184            movb      -3556(fp),r2
                   72 8F 52 91 0189           cmpb      r2,#114
                   03 12      018D            bneq      gen.1
                   0098 31    018F            brw       skipmail21
                              0192  gen.1:
                   52 8F 52 91 0192           cmpb      r2,#82
                   03 12      0196            bneq      gen.2
                   008F 31    0198            brw       skipmail21
                              019B  gen.2:
                   77 8F 52 91 019B           cmpb      r2,#119
                   06 13      019F            beql      choices
                   57 8F 52 91 01A1           cmpb      r2,#87
                   BA 12      01A5            bneq      askagain
                              01A7  choices:
         00000000* EF 00 FB   01A7            calls     #0,SCREENCHOICE
                   F8 AD DF   01AE            pushal    -8(fp)
         00000000* EF 01 FB   01B1            calls     #1,GET_SNOOZE_TI
      02 00000000 EF D1       01B8            cmpl      HEYPRINT,#2
                   0E 12      01BF            bneq      sym.8
                   F8 AD DD   01C1            pushl     -8(fp)
                011B CC DF    01C4            pushal    283(ap)
         00000000* EF 02 FB   01C8            calls     #2,PRINTF
                              01CF  sym.8:
      02 00000000 EF D1       01CF            cmpl      HEYPRINT4,#2
                   08 12      01D6            bneq      sym.9
                0146 CC DF    01D8            pushal    326(ap)
         00000000* EF 01 FB   01DC            calls     #1,PRINTF
                              01E3  sym.9:
         00000000 EF DF       01E3            pushal    MAX_READS
                0187 CC DF    01E9            pushal    391(ap)
         00000000* EF 02 FB   01ED            calls     #2,SCANF
      02 00000000 EF D1       01F4            cmpl      HEYPRINT4,#2
                   03 12      01FB            bneq      sym.10
                018A CC DF    01FD            pushal    394(ap)
         00000000* EF 01 FB   0201            calls     #1,PRINTF
                              0208  sym.10:
```

```
         F4 AD DF     0203              pushal  -12(fp)
         0155 CC DF   0208              pushal  437(ap)
  00000000* EF 02 F3  020F              calls   #2,SCANF
  02 00000000 EF D1   0216              cmpl    HEYPRINT,#2
              03 12   021D              bneq    skipmail21
         01B8 CC DF   021F              pushal  440(ap)
  00000000* EF 01 F3  0223              calls   #1,PRINTF
                      022A  choices_done:
                      022A  skipmail21:
00000000 EF 0374 8F 3C 022A              movzwl  #884,HDRSIZER
00000000 EF 0A52 8F 3C 0233              movzwl  #2642,TRAILERSIZ
           02 6B D1   023C              cmpl    (r11),#2
              17 12   023F              bneq    sym.11
       00000000 EF DD 0241              pushl   TRAILERSIZER
       00000000 EF DD 0247              pushl   HDRSIZER
         0263 CC DF   024D              pushal  611(ap)
  00000000* EF 03 F3  0251              calls   #3,PRINTF
                      0258  sym.11:
           EC AD D4   0258              clrl    -20(fp)
       00000104 EF DF 025B              pushal  $DATA+260
  00000000* EF 01 FB  0261              calls   #1,CHOOSEFILE
         0298 CC DF   0268              pushal  664(ap)
       00000000 EF DD 026C              pushl   FILE_SPEC
  00000000* EF 02 FB  0272              calls   #2,FOPEN
       00000000 EF 50 D0 0279           movl    r0,FPTR
              03 13   0280              beql    gen.3
              0089 31 0282              brw     sym.16
                      0285  gen.3:
  02 00000000 EF D1   0285              cmpl    HEYPRINT4,#2
              03 12   028C              bneq    sym.12
         029A CC DF   028E              pushal  666(ap)
  00000000* EF 01 FB  0292              calls   #1,PRINTF
                      0299  sym.12:
    72 8F F21C CD 91  0299              cmpb    -3556(fp),#114
              08 13   029F              beql    sym.13
    52 8F F21C CD 91  02A1              cmpb    -3556(fp),#82
              12 12   02A7              bneq    sym.14
                      02A9  sym.13:
         023F CC DF   02A9              pushal  703(ap)
  00000000* EF 01 FB  02AD              calls   #1,PRINTF
  00000000* EF 00 F3  02B4              calls   #0,EXIT
                      02BB  sym.14:
  02 00000000 EF D1   02BB              cmpl    HEYPRINT4,#2
              0B 12   02C2              bneq    sym.15
         02F3 CC DF   02C4              pushal  755(ap)
  00000000* EF 01 FB  02C8              calls   #1,PRINTF
                      02CF  sym.15:
         F21A CD DF   02CF              pushal  -3558(fp)
         0324 CC DF   02D3              pushal  804(ap)
  00000000* EF 02 F3  02D7              calls   #2,SCANF
    59 8F F21A CD 91  02DE              cmpb    -3558(fp),#89
              56 13   02E4              beql    makenewfile
    79 8F F21A CD 91  02E6              cmpb    -3558(fp),#121
              4E 13   02EC              beql    makenewfile
         0327 CC DF   02EE              pushal  807(ap)
  00000000* EF 01 F3  02F2              calls   #1,PRINTF
         0364 CC DF   02F9              pushal  868(ap)
  00000000* EF 01 F3  02FD              calls   #1,PRINTF
              57 DD   0304              pushl   r7
  00000000* EF 01 F3  0306              calls   #1,LIB$STOP
              2D 11   030D              brb     sym.19
                 01   030F              nop
                      0310  sym.16:
           02 6B D1   0310              cmpl    (r11),#2
              11 12   0313              bneq    sym.17
```

```
         00000000 EF DD    0315            pushl    FPTR
              0399 CC DF   031B            pushal   921(ap)
     00000000* EF 02 FB    031F            calls    #2,PRINTF
                           0326   sym.17:
              02 6B D1     0326            cmpl     (r11),#2
                 08 12     0329            bneq     sym.18
              0396 CC DF   032B            pushal   950(ap)
     00000000* EF 01 FB    032F            calls    #1,PRINTF
                           0336   sym.18:
              EC AD D4     0336            clrl     -20(fp)
                 57 11     0339            brb      konekt
                    01     033B            nop
                           033C   sym.19:
                           033C   makenewfile:
              EC AD 01 D0  033C            movl     #1,-20(fp)
              03DC CC DF   0340            pushal   988(ap)
         00000000 EF DD    0344            pushl    FILE_SPEC
     00000000* EF 02 FB    034A            calls    #2,FOPEN
         00000000 EF 50 D0 0351            movl     r0,FPTR
                 12 12     0358            bneq     sym.20
              03DF CC DF   035A            pushal   991(ap)
     00000000* EF 01 FB    035E            calls    #1,PRINTF
     00000000* EF 00 F2    0365            calls    #0,EXIT
                           036C   sym.20:
              02 6B D1     036C            cmpl     (r11),#2
                 08 12     036F            bneq     sym.21
              03FC CC DF   0371            pushal   1020(ap)
     00000000* EF 01 FB    0375            calls    #1,PRINTF
                           037C   sym.21:
              02 6B D1     037C            cmpl     (r11),#2
                 11 12     037F            bneq     sym.22
         00000000 EF DD    0381            pushl    FPTR
              0428 CC DF   0387            pushal   1064(ap)
     00000000* EF 02 FB    038B            calls    #2,PRINTF
                           0392   sym.22:
                           0392   konekt:
              02 6B D1     0392            cmpl     (r11),#2
                 11 12     0395            bneq     sym.23
         00000000 EF DD    0397            pushl    FPTR
              043F CC DF   039D            pushal   1087(ap)
     00000000* EF 02 FB    03A1            calls    #2,PRINTF
                           03A8   sym.23:
              01 EC AD D1  03A8            cmpl     -20(fp),#1
                 1A 12     03AC            bneq     sym.24
              FC70 CD 9F   03AE            pushab   -912(fp)
              EC AD DD     03B2            pushl    -20(fp)
              F21E CD 9F   03B5            pushab   -3554(fp)
              FC70 CD 9F   03B9            pushab   -912(fp)
     00000000* EF 04 FB    03BD            calls    #4,SETUP
                 0621 31   03C4            brw      onedaywrloop
                    01     03C7            nop
                           03C8   sym.24:
              52 F21C CD 90 03C8           movb     -3556(fp),r2
              72 8F 52 91  03CD            cmpb     r2,#114
                 2D 13     03D1            beql     readloop
              52 8F 52 91  03D3            cmpb     r2,#82
                 27 13     03D7            beql     readloop
              77 8F 52 91  03D9            cmpb     r2,#119
                 06 13     03DD            beql     sym.25
              57 8F 52 91  03DF            cmpb     r2,#87
                 1B 12     03E3            bneq     sym.26
                           03E5   sym.25:
              FC70 CD 9F   03E5            pushab   -912(fp)
              EC AD DD     03E9            pushl    -20(fp)
              F21E CD 9F   03EC            pushab   -3554(fp)
```

```
          FC70 CD 9F   03F0            pushab   -912(fp)
00000000* EF 04 FB     03F4            calls    #4,SETUP
          05EA 31      03FB            brw      onedaywrloop
                50 D5  03FE            tstl     r0
                       0400  sym.26:
                       0400  readloop:
                02 68 D1  0400          cmpl    (r11),#2
                      08 12  0403       bneq    sym.27
                0507 CC DF  0405        pushal  1287(ap)
00000000* EF 01 FB    0409             calls    #1,PRINTF
                       0410  sym.27:
                02 68 D1  0410          cmpl    (r11),#2
                      11 12  0413       bneq    sym.28
         00000000 EF DD  0415           pushl   TRAILERSIZER
                0536 CC DF  0418        pushal  1334(ap)
00000000* EF 02 FB    041F             calls    #2,PRINTF
                       0426  sym.28:
         57 FC70 CD 9E  0426            movab   -912(fp),r7
      55 FFFF21E ED 9E  042B            movab   -3554(fp),r5
                53 D4  0432             clrl    r3
      52 000000A8 EF 9E  0434           movab   $DATA+168,r2
                   01  0438             nop
                       043C  sym.29:
              D6 A2 94  043C             clrb   -42(r2)
                 82 94  043F             clrb   (r2)+
           F7 53 17 F3  0441             aobleq #23,r3,sym.29
                       0445  quest_again:
   02 00000000 EF D1  0445               cmpl   HEYPRINT4,#2
                 08 12  044C             bneq   sym.30
             0568 CC DF  044E            pushal 1337(ap)
00000000* EF 01 FB   0452               calls   #1,PRINTF
                       0459  sym.30:
              F21A CD DF  0459           pushal -3558(fp)
              05A7 CC DF  045D           pushal 1447(ap)
00000000* EF 02 FB  0461                calls   #2,SCANF
         52 F21A CD 90  0463            movb    -3558(fp),r2
            41 8F 52 91  046D            cmpb    r2,#65
                  06 13  0471            beql    sym.31
            61 8F 52 91  0473            cmpb    r2,#97
                  07 12  0477            bneq    sym.32
                       0479  sym.31:
                 53 D4  0479             clrl   r3
                02DD 31  047B            brw    clear_buf
                 50 D5  047E             tstl   r0
                       0480  sym.32:
            53 8F 52 91  0480            cmpb   r2,#83
                  06 13  0484            beql   sym.33
            73 8F 52 91  0486            cmpb   r2,#115
                  B9 12  048A            bneq   quest_again
                       048C  sym.33:
               53 01 D0  048C            movl   #1,r8
                       048F  quest14:
   02 00000000 EF D1  048F               cmpl   HEYPRINT4,#2
                 08 12  0496             bneq   sym.34
             05AA CC DF  0498            pushal 1450(ap)
00000000* EF 01 FB  049C                calls   #1,PRINTF
                       04A3  sym.34:
   02 00000000 EF D1  04A3               cmpl   HEYPRINT4,#2
                 08 12  04AA             bneq   sym.35
             05DC CC DF  04AC            pushal 1500(ap)
00000000* EF 01 FB  04B0                calls   #1,PRINTF
                       04B7  sym.35:
   02 00000000 EF D1  04B7               cmpl   HEYPRINT4,#2
                 08 12  04BE             bneq   sym.36
             0620 CC DF  04C0            pushal 1568(ap)
```

```
00000000* EF 01 F3      04C4            calls    #1,PRINTF
                        04CB   sym.36:
    0000007E EF    DF   04CB            pushal   $DATA+126
         0643 CC    DF  04D1            pushal   1603(ap)
00000000* EF 02 F3      04D5            calls    #2,SCANF
2D 00000080 EF 91       04DC            cmpb     $DATA+128,#45
            OF 12       04E3            bneq     sym.37
   00000089 EF 20 90    04E5            movb     #32,$DATA+137
      00000095 EF 94    04EC            clrb     $DATA+149
               16 11   04F2            brb      showsearchlow
                        04F4   sym.37:
2D 0000007F EF 91       04F4            cmpb     $DATA+127,#45
            92 12       04FB            bneq     quest14
   00000088 EF 20 90    04FD            movb     #32,$DATA+136
      00000094 EF 94    0504            clrb     $DATA+148
                        050A   showsearchlow:
02 00000000 EF D1       050A            cmpl     HEYPRINT4,#2
            11 12       0511            bneq     sym.38
    0000007E EF    DF   0513            pushal   $DATA+126
         0646 CC    DF  0519            pushal   1606(ap)
00000000* EF 02 F3      051D            calls    #2,PRINTF
                        0524   sym.38:
   000000A0 EF    9F    0524            pushab   $DATA+160
   00000096 EF    9F    052A            pushab   $DATA+150
00000000* EF 02 F3      0530            calls    #2,SYS$BINTIM
            53 50 D0    0537            movl     r0,r3
               02 68 D1 053A            cmpl     (r11),#2
                  CD 12 053D            bneq     sym.39
                  53 DD 053F            pushl    r3
         0663 CC    DF  0541            pushal   1640(ap)
00000000* EF 02 F3      0545            calls    #2,PRINTF
                        054C   sym.39:
52 53 FFFFFFFE 8F C8    054C            bicl3    #-2,r3,r2
            01 52 D1    0554            cmpl     r2,#1
               03 13    0557            beql     gen.4
            FF33 31     0559            brw      quest14
                        055C   gen.4:
            01 53 D1    055C            cmpl     r3,#1
               10 12    055F            bneq     sym.40
            02 6B D1    0561            cmpl     (r11),#2
               03 12    0564            bneq     sym.40
         06A0 CC    DF  0566            pushal   1696(ap)
00000000* EF 01 F3      056A            calls    #1,PRINTF
                        0571   sym.40:
   00000184 8F 53 D1    0571            cmpl     r3,#388
               10 12    0578            bneq     sym.41
            02 6B D1    057A            cmpl     (r11),#2
               03 12    057D            bneq     sym.41
         06D2 CC    DF  057F            pushal   1746(ap)
00000000* EF 01 F3      0583            calls    #1,PRINTF
                        058A   sym.41:
   000000A0 EF    9F    058A            pushab   $DATA+160
   00000000 EF    9F    0590            pushab   LOWDATE7
00000000* EF 02 F3      0596            calls    #2,SYS$NUMTIM
            02 6B D1    059D            cmpl     (r11),#2
               03 12    05A0            bneq     sym.42
         0701 CC    DF  05A2            pushal   1793(ap)
00000000* EF 01 F3      05A6            calls    #1,PRINTF
                        05AD   sym.42:
            02 6B D1    05AD            cmpl     (r11),#2
               3C 12    05B0            bneq     sym.43
7E 0000000C EF 32       05B2            cvtwl    LOWDATE7+12,-(sp)
7E 0000000A EF 32       05B9            cvtwl    LOWDATE7+10,-(sp)
7E 00000008 EF 32       05C0            cvtwl    LOWDATE7+8,-(sp)
7E 00000006 EF 32       05C7            cvtwl    LOWDATE7+6,-(sp)
7E 00000000 EF 32       05CE            cvtwl    LOWDATE7,-(sp)
```

```
7E 00000002 EF 32      05D5            cvtwl     LOWDATE7+2,-(sp)
7E 00000004 EF 32      05DC            cvtwl     LOWDATE7+4,-(sp)
         0748 CC DF    05E3            pushal    1864(ap)
   00000000* EF 08 FB  05E7            calls     #8,PRINTF
                       05EE  sym.43:
                       05EE  quest15:
   02 00000000 EF D1   05EE            cmpl      HEYPRINT4,#2
              0B 12    05F5            bneq      sym.44
         0776 CC DF    05F7            pushal    1910(ap)
   00000000* EF 01 FB  05FB            calls     #1,PRINTF
                       0602  sym.44:
   02 00000000 EF D1   0602            cmpl      HEYPRINT4,#2
              0B 12    0609            bneq      sym.45
         07A6 CC DF    060B            pushal    1958(ap)
   00000000* EF 01 FB  060F            calls     #1,PRINTF
                       0616  sym.45:
   02 00000000 EF D1   0616            cmpl      HEYPRINT4,#2
              0B 12    061D            bneq      sym.46
         07EA CC DF    061F            pushal    2026(ap)
   00000000* EF 01 FB  0623            calls     #1,PRINTF
                       062A  sym.46:
      000000A8 EF DF   062A            pushal    $DATA+168
         080D CC DF    0630            pushal    2061(ap)
   00000000* EF 02 FB  0634            calls     #2,SCANF
   2D 000000AA EF 91   063B            cmpb      $DATA+170,#45
              10 12    0642            bneq      sym.47
   000000B3 EF 20 90   0644            movb      #32,$DATA+179
      000000BF EF 94   064B            clrb      $DATA+191
              17 11    0651            brb       showsearchhigh
                 01    0653            nop
                       0654  sym.47:
   2D 000000A9 EF 91   0654            cmpb      $DATA+169,#45
              91 12    0658            bneq      quest15
   000000B2 EF 20 90   065D            movb      #32,$DATA+178
      000000BE EF 94   0664            clrb      $DATA+190
                       066A  showsearchhigh:
   000000B3 EF 20 90   066A            movb      #32,$DATA+179
      000000BF EF 94   0671            clrb      $DATA+191
   02 00000000 EF D1   0677            cmpl      HEYPRINT4,#2
              11 12    067E            bneq      sym.48
      000000A8 EF DF   0680            pushal    $DATA+168
         0810 CC DF    0686            pushal    2064(ap)
   00000000* EF 02 FB  068A            calls     #2,PRINTF
                       0691  sym.48:
      000000C8 EF 9F   0691            pushab    $DATA+200
      000000C0 EF 9F   0697            pushab    $DATA+192
   00000000* EF 02 FB  069D            calls     #2,SYS$BINTIM
            53 50 D0   06A4            movl      r0,r3
            02 6B D1   06A7            cmpl      (r11),#2
              0D 12    06AA            bneq      sym.49
               53 DD   06AC            pushl     r3
         0833 CC DF    06AE            pushal    2099(ap)
   00000000* EF 02 FB  06B2            calls     #2,PRINTF
                       06B9  sym.49:
52 53 FFFFFFFE 8F C3   06B9            bicl3     #-2,r3,r2
            01 52 D1   06C1            cmpl      r2,#1
              03 13    06C4            beql      gen.5
              FF25 31  06C6            brw       quest15
                       06C9  gen.5:
            01 53 D1   06C9            cmpl      r3,#1
              10 12    06CC            bneq      sym.50
            02 6B D1   06CE            cmpl      (r11),#2
              08 12    06D1            bneq      sym.50
         0863 CC DF    06D3            pushal    2155(ap)
   00000000* EF 01 FB  06D7            calls     #1,PRINTF
```

```
                          06DE   sym.50:
00000184 8F 53 D1         06DE            cmpl     r3,#383
         10 12            06E5            bneq     sym.51
         02 6B D1         06E7            cmpl     (r11),#2
            0B 12         06EA            bneq     sym.51
         089D CC DF       06EC            pushal   2205(ap)
00000000* EF 01 FB        06F0            calls    #1,PRINTF
                          06F7   sym.51:
000000C8 EF 9F            06F7            pushab   SDATA+200
00000000 EF 9F            06FD            pushab   HIGHDATE7
00000000* EF 02 FB        0703            calls    #2,SYS$NUMTIM
         02 6B D1         070A            cmpl     (r11),#2
            0B 12         070D            bneq     sym.52
         08CC CC DF       070F            pushal   2252(ap)
00000000* EF 01 FB        0713            calls    #1,PRINTF
                          071A   sym.52:
         02 6B D1         071A            cmpl     (r11),#2
            3C 12         071D            bneq     sym.53
7E 0000000C EF 32         071F            cvtwl    HIGHDATE7+12,-(s
7E 0000000A EF 32         0726            cvtwl    HIGHDATE7+10,-(s
7E 00000008 EF 32         072D            cvtwl    HIGHDATE7+8,-(sp
7E 00000006 EF 32         0734            cvtwl    HIGHDATE7+6,-(sp
7E 00000000 EF 32         073B            cvtwl    HIGHDATE7,-(sp)
7E 00000002 EF 32         0742            cvtwl    HIGHDATE7+2,-(sp
7E 00000004 EF 32         0749            cvtwl    HIGHDATE7+4,-(sp
         0913 CC DF       0750            pushal   2323(ap)
00000000* EF 08 FB        0754            calls    #8,PRINTF
                          075B   sym.53:
                          075B   clear_buf:
         54 01 D0         075B            movl     #1,r4
                          075E   readmore:
            52 D4         075E            clrl     r2
00000000 EF D5            0760            tstl     HDRSIZER
            0E 15         0766            bleq     sym.55
                          0768   sym.54:
         6742 94          0768            clrb     (r7)[r2]
            52 D6         076B            incl     r2
00000000 EF 52 D1         076D            cmpl     r2,HDRSIZER
            F2 19         0774            blss     sym.54
                          0776   sym.55:
            53 D4         0776            clrl     r3
00000000 EF D5            0778            tstl     TRAILERSIZER
            0E 15         077E            bleq     sym.57
                          0780   sym.56:
         6543 94          0780            clrb     (r5)[r3]
            53 D6         0783            incl     r3
00000000 EF 53 D1         0785            cmpl     r3,TRAILERSIZER
            F2 19         078C            blss     sym.56
                          078E   sym.57:
         02 6B D1         078E            cmpl     (r11),#2
            05 12         0791            bneq     sym.58
         0941 CC DF       0793            pushal   2369(ap)
00000000* EF 01 FB        0797            calls    #1,PRINTF
                          079E   sym.58:
            54 DD         079E            pushl    r4
         E8 AD DF         07A0            pushal   -24(fp)
00000000 EF DF            07A3            pushal   FPTR
00000000 EF DF            07A9            pushal   HDRSIZER
         F21E CD 9F       07AF            pushab   -3554(fp)
         FC70 CD 9F       07B3            pushab   -912(fp)
00000000* EF 06 FB        07B7            calls    #6,CALL_READ_REC
         01 E8 AD D1      07BE            cmpl     -24(fp),#1
            44 12         07C2            bneq     sym.61
         02 6B D1         07C4            cmpl     (r11),#2
            0B 12         07C7            bneq     sym.59
         096E CC DF       07C9            pushal   2414(ap)
```

```
00000000* EF 01 FB      07CD            calls       #1,PRINTF
                        07D4  sym.59:
           02 63 D1     07D4            cmpl        (r11),#2
              03 12     07D7            bneq        sym.60
            0997 CC DF  07D9            pushal      2455(ao)
00000000* EF 01 FB      07DD            calls       #1,PRINTF
                        07E4  sym.60:
    00000000 EF DD      07E4            pushl       FPTR
00000000* EF 01 FB      07EA            calls       #1,FCLOSE
              50 D5     07F1            tstl        r0
              03 12     07F3            bneq        gen.6
            0502 31     07F5            brw         alldone_atlast
                        07F8  gen.6:
              50 DD     07F8            pushl       r0
            09A6 CC DF  07FA            pushal      2470(ap)
00000000* EF 02 FB      07FE            calls       #2,PRINTF
            04F2 31     0805            brw         alldone_atlast
                        0808  sym.61:
              58 D5     0808            tstl        r8
              2C 12     080A            bneq        sym.63
           02 68 D1     080C            cmpl        (r11),#2
              09 12     080F            bneq        sym.62
            09F1 CC DF  0811            pushal      2545(ap)
00000000* EF 01 FB      0815            calls       #1,PRINTF
                        081C  sym.62:
              01 DD     081C            pushl       #1
              00 DD     081E            pushl       #0
              53 DD     0820            pushl       r8
            F21E CD 9F  0822            pushab      -3554(fp)
            FC70 CD 9F  0826            pushab      -912(fp)
00000000* EF 05 FB      082A            calls       #5,SHOWLOGREC
              54 D6     0831            incl        r4
            FF28 31     0833            brw         readmore
              50 D5     0836            tstl        r0
                        0838  sym.63:
              52 B4     0838            clrw        r2
02 A6 00000002 EF B1    083A            cmpw        LOWDATE7+2,2(r6)
              02 12     0842            bneq        vcg.1
              52 B6     0844            incw        r2
                        0846  vcg.1:
              53 B4     0846            clrw        r3
04 A6 00000004 EF B1    0848            cmpw        LOWDATE7+4,4(r6)
              02 12     0850            bneq        vcg.2
              53 B6     0852            incw        r3
                        0854  vcg.2:
           52 52 B2     0854            mcomw       r2,r2
        52 53 52 AB     0857            bicw3       r2,r3,r2
    00000000 EF 52 32   085B            cvtwl       r2,SRCH_LOW
              52 B4     0862            clrw        r2
02 A6 00000002 EF B1    0864            cmpw        HIGHDATE7+2,2(r6
              02 12     086C            bneq        vcg.3
              52 B6     086E            incw        r2
                        0870  vcg.3:
              53 B4     0870            clrw        r3
04 A6 00000004 EF B1    0872            cmpw        HIGHDATE7+4,4(r6
              02 12     087A            bneq        vcg.4
              53 B6     087C            incw        r3
                        087E  vcg.4:
           52 52 B2     087E            mcomw       r2,r2
        52 53 52 AB     0881            bicw3       r2,r3,r2
    00000000 EF 52 32   0885            cvtwl       r2,SRCH_HIGH
00000000 EF 00000000 EF B1  088C        cmpw        HIGHDATE7,LOWDAT
              0F 13     0897            beql        sym.64
            0A13 CC DF  0899            pushal      2584(ap)
00000000* EF 01 FB      089D            calls       #1,PRINTF
```

```
               0453 31    08A4            brw      alldone_atlast
                    01    08A7            nop
                          08A8   sym.64:
   00000000 EF 66 B1      08A8            cmpw     (r6),LOWDATE7
            0F 13          08AF            beql     sym.65
         0A4F CC DF       08B1            pushal   2639(ap)
   00000000* EF 01 FB     08B5            calls    #1,PRINTF
               0433 31    08BC            brw      alldone_atlast
                    01    08BF            nop
                          08C0   sym.65:
            53 02 A6 B0   08C0            movw     2(r6),r3
   00000002 EF 53 B1      08C4            cmpw     r3,LOWDATE7+2
                  03 13   08CB            beql     gen.7
               0084 31    08CD            brw      sym.69
                          08D0   gen.7:
            52 04 A6 B0   08D0            movw     4(r6),r2
   00000004 EF 52 B1      08D4            cmpw     r2,LOWDATE7+4
                  1B 12   08DB            bneq     sym.66
                  01 DD   08DD            pushl    #1
                  00 DD   08DF            pushl    #0
                  01 DD   08E1            pushl    #1
            F21E CD 9F    08E3            pushab   -3554(fp)
            FC70 CD 9F    08E7            pushab   -912(fp)
   00000000* EF 05 FB     08EB            calls    #5,SHOWLOGREC
                  54 D6   08F2            incl     r4
               FE67 31    08F4            brw      readmore
                    01    08F7            nop
                          08F8   sym.66:
   00000004 EF 52 B1      08F8            cmpw     r2,LOWDATE7+4
                  07 18   08FF            bgeq     sym.67
                  54 D6   0901            incl     r4
               FE58 31    0903            brw      readmore
                  50 D5   0906            tstl     r0
                          0908   sym.67:
   00000004 EF 52 B1      0908            cmpw     r2,HIGHDATE7+4
                  1B 18   090F            bgeq     sym.68
                  01 DD   0911            pushl    #1
                  7E 7C   0913            clrq     -(sp)
            F21E CD 9F    0915            pushab   -3554(fp)
            FC70 CD 9F    0919            pushab   -912(fp)
   00000000* EF 05 FB     091D            calls    #5,SHOWLOGREC
                  54 D6   0924            incl     r4
               FE35 31    0926            brw      readmore
                  50 D5   0929            tstl     r0
                    01    092B            nop
                          092C   sym.68:
   00000004 EF 52 B1      092C            cmpw     r2,HIGHDATE7+4
                  03 13   0933            beql     gen.8
               03C2 31    0935            brw      alldone_atlast
                          0938   gen.8:
                  01 DD   0938            pushl    #1
                  00 DD   093A            pushl    #0
                  01 DD   093C            pushl    #1
            F21E CD 9F    093E            pushab   -3554(fp)
            FC70 CD 9F    0942            pushab   -912(fp)
   00000000* EF 05 FB     0946            calls    #5,SHOWLOGREC
                  54 D6   094D            incl     r4
               FE0C 31    094F            brw      readmore
                  50 D5   0952            tstl     r0
                          0954   sym.69:
   00000002 EF 53 B1      0954            cmpw     r3,HIGHDATE7+2
                  1B 18   095B            bgeq     sym.70
                  01 DD   095D            pushl    #1
                  7E 7C   095F            clrq     -(sp)
            F21E CD 9F    0961            pushab   -3554(fp)
```

```
              FC70 CD 9F    0965           pushab    -912(fp)
      00000000* EF 05 FB    0969           calls     #5,SHOWLOGREC
                 54 D6      0970           incl      r4
                 FDE9 31    0972           brw       readmore
                 50 D5      0975           tstl      r0
                 01         0977           nop
                            0978  sym.70:
      00000002 EF 53 31     0978           cmpw      r3,HIGHDATE7+2
                 0F 15      097F           bleq      sym.71
              0A83 CC DF    0981           pushal    2691(ap)
      00000000* EF 01 FB    0985           calls     #1,PRINTF
                 0368 31    098C           brw       alldone_atlast
                 01         098F           nop
                            0990  sym.71:
      00000004 EF 04 A6 81  0990           cmpw      4(r6),HIGHDATE7+
                 0E 15      0998           bleq      sym.72
              0AA4 CC DF    099A           pushal    2724(ap)
      00000000* EF 01 FB    099E           calls     #1,PRINTF
                 0352 31    09A5           brw       alldone_atlast
                            09A8  sym.72:
      00000004 EF 04 A6 81  09A8           cmpw      4(r6),HIGHDATE7+
                 1A 18      09B0           bgeq      sym.73
                 01 DD      09B2           pushl     #1
                 7E 7C      09B4           clrq      -(sp)
              F21E CD 9F    09B6           pushab    -3554(fp)
              FC70 CD 9F    09BA           pushab    -912(fp)
      00000000* EF 05 FB    09BE           calls     #5,SHOWLOGREC
                 54 D6      09C5           incl      r4
                 FD94 31    09C7           brw       readmore
                 50 D5      09CA           tstl      r0
                            09CC  sym.73:
                 01 DD      09CC           pushl     #1
                 00 DD      09CE           pushl     #0
                 01 DD      09D0           pushl     #1
              F21E CD 9F    09D2           pushab    -3554(fp)
              FC70 CD 9F    09D6           pushab    -912(fp)
      00000000* EF 05 FB    09DA           calls     #5,SHOWLOGREC
                 54 D6      09E1           incl      r4
                 FD78 31    09E3           brw       readmore
                 50 D5      09E6           tstl      r0
                            09E8  onedaywrloop:
      00000000 EF DD        09E8           pushl     FPTR
      00000000* EF 01 FB    09EE           calls     #1,FCLOSE
                 52 50 D0   09F5           movl      r0,r2
                 02 6B D1   09F8           cmpl      (r11),#2
                 0D 12      09FB           bneq      sym.74
                 52 DD      09FD           pushl     r2
              0AC5 CC DF    09FF           pushal    2757(ap)
      00000000* EF 02 FB    0A03           calls     #2,PRINTF
                            0A0A  sym.74:
                 52 D5      0A0A           tstl      r2
                 07 13      0A0C           beql      sym.75
      00000000* EF 00 FB    0A0E           calls     #0,EXIT
                            0A15  sym.75:
                 02 6B D1   0A15           cmpl      (r11),#2
                 03 12      0A18           bneq      sym.76
              0AF9 CC DF    0A1A           pushal    2809(ap)
      00000000* EF 01 FB    0A1E           calls     #1,PRINTF
                            0A25  sym.76:
                 F0 AD 01 D0 0A25          movl      #1,-16(fp)
              52 F4 AD 01 C1 0A29          addl3     #1,-12(fp),r2
                 52 F0 AD D1 0A2E          cmpl      -16(fp),r2
                 03 15      0A32           bleq      gen.9
                 02C3 31    0A34           brw       sym.98
                            0A37  gen.9:
```

```
       53 00000000* EF 9E    0A37             movab    PRINTF,r3
    00 AE 00000000* EF 9E    0A3E             movab    SNOOZE,0(sp)
       5A 00000000* EF 9E    0A46             movab    FILLUP,r10
       59 00000000* EF 9E    0A4D             movab    UPDATE,r9
  0004 CE 00000000* EF 9E    0A54             movab    EXIT,4(sp)
       58 00000000* EF 9E    0A5D             movab    DAILYWRITE,r8
                             0A64   sym.77:
              02 6B D1       0A64             cmpl     (r11),#2
                 0B 12       0A67             bneq     sym.78
              FF70 CD DD     0A69             pushl    -144(fp)
              0332 CC DF     0A6D             pushal   2866(ap)
                 63 02 FB    0A71             calls    #2,(r3)
                             0A74   sym.78:
        F4 AD FF70 CD D1     0A74             cmpl     -144(fp),-12(fp)
                 10 15       0A7A             bleq     sym.79
              0367 CC DF     0A7C             pushal   2919(ap)
        00000000* EF 01 FB   0A80             calls    #1,PRINTF
                 0270 31     0A87             brw      years_end
                    50 D5    0A8A             tstl     r0
                             0A8C   sym.79:
              02 6B D1       0A8C             cmpl     (r11),#2
                 07 12       0A8F             bneq     sym.80
              0BA3 CC DF     0A91             pushal   2979(ap)
                 63 01 FB    0A95             calls    #1,(r3)
                             0A98   sym.80:
     FC74 CD 02 8F 99        0A98             cvtbw    #2,-908(fp)
     FFFFFF74 ED D4          0A9E             clrl     -140(fp)
                    57 D4    0AA4             clrl     r7
                    55 D4    0AA6             clrl     r5
                             0AA8   sym.81:
                    55 DD    0AA8             pushl    r5
                 F8 AD DD    0AAA             pushl    -8(fp)
                 E4 AD DF    0AAD             pushal   -28(fp)
              OC BE 03 FB    0AB0             calls    #3,212(sp)
              54 E4 AD D0    0AB4             movl     -28(fp),r4
                 01 54 D1    0AB8             cmpl     r4,#1
                    03 13    0ABB             beql     gen.10
                    00A0 31  0ABD             brw      sym.85
                             0AC0   gen.10:
                    57 D4    0AC0             clrl     r7
                    55 DD    0AC2             pushl    r5
           00000000 EF DF    0AC4             pushal   CUR_INT
              F21E CD 9F     0ACA             pushab   -3554(fp)
              FC70 CD 9F     0ACE             pushab   -912(fp)
                 6A 04 FB    0AD2             calls    #4,(r10)
                 02 6B D1    0AD5             cmpl     (r11),#2
                    07 12    0AD8             bneq     sym.82
              0BE7 CC DF     0ADA             pushal   3047(ap)
                 63 01 FB    0ADE             calls    #1,(r3)
                             0AE1   sym.82:
           52 FC74 CD 32     0AE1             cvtwl    -908(fp),r2
           52 00000058 8F C0 0AE6             addl2    #88,r2
              FC74 CD 52 F7  0AED             cvtlw    r2,-908(fp)
                 02 6B D1    0AF2             cmpl     (r11),#2
                    0C 12    0AF5             bneq     sym.83
              7E FC74 CD 32  0AF7             cvtwl    -908(fp),-(sp)
              0C1C CC DF     0AFC             pushal   3100(ap)
                 63 02 FB    0B00             calls    #2,(r3)
                             0B03   sym.83:
              FF74 CD DD     0B03             pushl    -140(fp)
              F21E CD 9F     0B07             pushab   -3554(fp)
                 69 02 FB    0B0B             calls    #2,(r9)
                 1D 55 D1    0B0E             cmpl     r5,#29
                    03 13    0B11             beql     gen.11
                    0189 31  0B13             brw      end_xx_loop
```

```
                     0B16  gen.11:
    F21E CD 9F       0B16        pushab   -3554(fp)
    F0 AD DF         0B1A        pushal   -16(fp)
    EC AD DF         0B1D        pushal   -20(fp)
    FC70 CD 9F       0B20        pushab   -912(fp)
    63 04 FB         0B24        calls    #4,(r8)
02 00000000 EF D1    0B27        cmpl     HEYPRINT4,#2
    07 12            0B2E        bneq     sym.84
    0C56 CC DF       0B30        pushal   3158(ap)
    63 01 FB         0B34        calls    #1,(r3)
                     0B37  sym.84:
02 00000000 EF D1    0B37        cmpl     HEYPRINT4,#2
    03 13            0B3E        beql     gen.12
    0162 31          0B40        brw      check_nndays
                     0B43  gen.12:
    7E 08 A6 32      0B43        cvtwl    8(r6),-(sp)
    7E 06 A6 32      0B47        cvtwl    6(r6),-(sp)
    7E 04 A6 32      0B4B        cvtwl    4(r6),-(sp)
    7E 02 A6 32      0B4F        cvtwl    2(r6),-(sp)
    0C90 CC DF       0B53        pushal   3216(ap)
    63 05 FB         0B57        calls    #5,(r3)
    0148 31          0B5A        brw      check_nndays
    50 D5            0B5D        tstl     r0
    01               0B5F        nop
                     0B60  sym.85:
    03 54 D1         0B60        cmpl     r4,#3
    03 13            0B63        beql     gen.13
    0084 31          0B65        brw      sym.89
                     0B68  gen.13:
    57 01 D0         0B68        movl     #1,r7
    55 DD            0B6B        pushl    r5
    00000000 EF DF   0B6D        pushal   CUR_INT
    F21E CD 9F       0B73        pushab   -3554(fp)
    FC70 CD 9F       0B77        pushab   -912(fp)
    6A 04 FB         0B7B        calls    #4,(r10)
    02 63 D1         0B7E        cmpl     (r11),#2
    07 12            0B81        bneq     sym.86
    0CC5 CC DF       0B83        pushal   3269(ap)
    63 01 FB         0B87        calls    #1,(r3)
                     0B8A  sym.86:
    52 FC74 CD 32    0B8A        cvtwl    -908(fp),r2
52 00000058 8F C0    0B8F        addl2    #88,r2
    FC74 CD 52 F7    0B96        cvtlw    r2,-908(fp)
    02 6B D1         0B9B        cmpl     (r11),#2
    0C 12            0B9E        bneq     sym.87
    7E FC74 CD 32    0BA0        cvtwl    -908(fp),-(sp)
    0CFA CC DF       0BA5        pushal   3322(ap)
    63 02 FB         0BA9        calls    #2,(r3)
                     0BAC  sym.87:
    02 6B D1         0BAC        cmpl     (r11),#2
    07 12            0BAF        bneq     sym.88
    0D34 CC DF       0BB1        pushal   3380(ap)
    63 01 FB         0BB5        calls    #1,(r3)
                     0BB8  sym.88:
    FF74 CD DD       0BB8        pushl    -140(fp)
    F21E CD 9F       0BBC        pushab   -3554(fp)
    69 02 FB         0BC0        calls    #2,(r9)
    F21E CD 9F       0BC3        pushab   -3554(fp)
    F0 AD DF         0BC7        pushal   -16(fp)
    EC AD DF         0BCA        pushal   -20(fp)
    FC70 CD 9F       0BCD        pushab   -912(fp)
    68 04 FB         0BD1        calls    #4,(r8)
02 00000000 EF D1    0BD4        cmpl     HEYPRINT4,#2
    03 13            0BDB        beql     gen.14
    00C5 31          0BDD        brw      check_nndays
```

```
                              0BE0    gen.14:
         0D65 CC DF           0BE0           pushal   3429(ap)
            63 01 FB          0BE4           calls    #1,(r3)
           00BB 31             0BE7           brw      check_nndays
              50 05            0BEA           tstl     r0
                              0BEC    sym.89:
            02 54 D1          0BEC           cmpl     r4,#2
               03 13          0BEF           beql     gen.15
           00A0 31             0BF1           brw      sym.94
                              0BF4    gen.15:
               57 D4           0BF4           clrl     r7
               55 DD           0BF6           pushl    r5
         00000000 EF DF       0BF8           pushal   CUR_INT
           F21E CD 9F          0BFE           pushab   -3554(fp)
           FC70 CD 9F          0C02           pushab   -912(fp)
              6A 04 FB         0C06           calls    #4,(r10)
            02 6B D1           0C09           cmpl     (r11),#2
               07 12           0C0C           bneq     sym.90
         0D9F CC DF            0C0E           pushal   3487(ap)
            63 01 FB           0C12           calls    #1,(r3)
                              0C15    sym.90:
         52 FC74 CD 32         0C15           cvtwl    -908(fp),r2
         52 00000053 8F C0     0C1A           addl2    #88,r2
         FC74 CD 52 F7         0C21           cvtlw    r2,-908(fp)
            02 6B D1           0C26           cmpl     (r11),#2
               0C 12           0C29           bneq     sym.91
         7E FC74 CD 32         0C2B           cvtwl    -908(fp),-(sp)
         0DD4 CC DF            0C30           pushal   3540(ap)
            63 02 FB           0C34           calls    #2,(r3)
                              0C37    sym.91:
            02 6B D1           0C37           cmpl     (r11),#2
               07 12           0C3A           bneq     sym.92
         0E0C CC DF            0C3C           pushal   3596(ap)
            63 01 FB           0C40           calls    #1,(r3)
                              0C43    sym.92:
           FF74 CD DD          0C43           pushl    -140(fp)
           F21E CD 9F          0C47           pushab   -3554(fp)
              69 02 FB         0C4B           calls    #2,(r9)
           F21E CD 9F          0C4E           pushab   -3554(fp)
              F0 AD DF         0C52           pushal   -16(fp)
              EC AD DF         0C55           pushal   -20(fp)
           FC70 CD 9F          0C58           pushab   -912(fp)
              68 04 FB         0C5C           calls    #4,(r8)
         02 00000000 EF D1     0C5F           cmpl     HEYPRINT4,#2
               07 12           0C66           bneq     sym.93
         0E3D CC DF            0C68           pushal   3645(ap)
            63 01 FB           0C6C           calls    #1,(r3)
                              0C6F    sym.93:
         02 00000000 EF D1     0C6F           cmpl     HEYPRINT4,#2
               2D 12           0C76           bneq     check_nndays
            7E 08 A6 32        0C78           cvtwl    8(r6),-(sp)
            7E 06 A6 32        0C7C           cvtwl    6(r6),-(sp)
            7E 04 A6 32        0C80           cvtwl    4(r6),-(sp)
            7E 02 A6 32        0C84           cvtwl    2(r6),-(sp)
         0E64 CC DF            0C88           pushal   3684(ap)
            63 05 FB           0C8C           calls    #5,(r3)
               14 11           0C8F           brb      check_nndays
               50 05           0C91           tstl     r0
                  01           0C93           nop
                              0C94    sym.94:
         0E99 CC DF            0C94           pushal   3737(ap)
            63 01 FB           0C98           calls    #1,(r3)
           04 BE 00 FB         0C9B           calls    #0,@4(sp)
                              0C9F    end_xx_loop:
         FE03 55 01 1D F1      0C9F           acbl     #29,#1,r5,sym.81
                              0CA5    check_nndays:
```

```
            01 57 D1       OCA5            cmpl      r7,#1
               1D 13       OCA8            beql      sym.95
               52 B4       OCAA            clrw      r2
         OC 02 A6 B1       OCAC            cmpw      2(r6),#12
               02 12       OC30            bneq      vcg.5
               52 B6       OCB2            incw      r2
                           OCB4   vcg.5:
               54 B4       OCB4            clrw      r4
         1F 04 A6 B1       OCB6            cmpw      4(r6),#31
               02 12       OCBA            bneq      vcg.6
               54 B6       OCBC            incw      r4
                           OCBE   vcg.6:
            52 52 B2       OCBE            mcomw     r2,r2
         52 54 52 AB       OCC1            bicw3     r2,r4,r2
               OD 13       OCC5            beql      sym.96
                           OCC7   sym.95:
            0EC7 CC DF     OCC7            pushal    3783(ap)
      00000000* EF 01 FB   OCC8            calls     #1,PRINTF
               26 11       OCD2            brb       years_end
                           OCD4   sym.96:
      02 00000000 EF D1    OCD4            cmpl      HEYPRINT4,#2
               07 12       OCDB            bneq      sym.97
            0F0A CC DF     OCDD            pushal    3850(ap)
            63 01 FB       OCE1            calls     #1,(r3)
                           OCE4   sym.97:
               F8 AD DD    OCE4            pushl     -8(fp)
      00000000* EF 01 FB   OCE7            calls     #1,SLEEP
         52 F4 AD 01 C1    OCEE            addl3     #1,-12(fp),r2
      FD6A F0 AD 01 52 F1  OCF3            acbl      r2,#1,-16(fp),sy
                           OCFA   sym.98:
                           OCFA   years_end:
                           OCFA   alldone_atlast:
         00000000 EF DD    OCFA            pushl     OUTFILE6
      00000000* EF 01 FB   OD00            calls     #1,FCLOSE
      02 00000000 EF D1    OD07            cmpl      HEYPRINT,#2
               OB 12       OD0E            bneq      sym.99
            0F29 CC DF     OD10            pushal    3880(ap)
      00000000* EF 01 FB   OD14            calls     #1,PRINTF
                           OD1B   sym.99:
         00000000 EF DD    OD1B            pushl     INFILE6
      00000000* EF 01 FB   OD21            calls     #1,FCLOSE
      02 00000000 EF D1    OD28            cmpl      HEYPRINT,#2
               OB 12       OD2F            bneq      sym.100
            0F56 CC DF     OD31            pushal    3926(ap)
      00000000* EF 01 FB   OD35            calls     #1,PRINTF
                           OD3C   sym.100:
      02 00000000 EF D1    OD3C            cmpl      HEYPRINT4,#2
               OB 12       OD43            bneq      sym.101
            0F8A CC DF     OD45            pushal    3978(ap)
      00000000* EF 01 FB   OD49            calls     #1,PRINTF
                           OD50   sym.101:
      02 00000000 EF D1    OD50            cmpl      HEYPRINT4,#2
               OB 12       OD57            bneq      sym.102
            0FBB CC DF     OD59            pushal    4027(ap)
      00000000* EF 01 FB   OD5D            calls     #1,PRINTF
                           OD64   sym.102:
               50 01 D0    OD64            movl      #1,r0
                  04       OD67            ret
                           OD68   choosefile:
                  000C     OD68            .entry    choosefile,^m<r2
               5E 08 C2    OD6A            subl2     #8,sp
         52 00000000 EF 9E OD6D            movab     3CHAR_STRING_CON
         53 00000000 EF 9E OD74            movab     HEYPRINT4,r3
               02 63 D1    OD7B            cmpl      (r3),#2
                  OB 12    OD7E            bneq      sym.103
```

```
        OFF9 C2 DF    OD80           pushal   4089(r2)
00000000* EF 01 FB    OD84           calls    #1,PRINTF
                      OD88  sym.103:
        02 63 D1      OD88           cmpl     (r3),#2
           OB 12      OD8E           bneq     sym.104
        1014 C2 DF    OD90           pushal   4116(r2)
00000000* EF 01 FB    OD94           calls    #1,PRINTF
                      OD9B  sym.104:
        04 AC DD      OD9B           pushl    4(ap)
        F3 AD DF      OD9E           pushal   -8(fp)
        1040 C2 DF    ODA1           pushal   4160(r2)
00000000* EF 03 FB    ODA5           calls    #3,SCANF
        F8 AD D5      ODAC           tstl     -8(fp)
           OE 12      ODAF           bneq     sym.105
        1046 C2 DF    ODB1           pushal   4166(r2)
        04 AC DD      ODB5           pushl    4(ap)
00000000* EF 02 FB    ODB8           calls    #2,STRCPY
                      ODBF  sym.105:
        02 63 D1      ODBF           cmpl     (r3),#2
           OE 12      ODC2           bneq     sym.106
        04 AC DD      ODC4           pushl    4(ap)
        105F C2 DF    ODC7           pushal   4191(r2)
00000000* EF 02 FB    ODCB           calls    #2,PRINTF
                      ODD2  sym.106:
              04      ODD2           ret
                      ODD3  setup:
              OFFC    ODD3           .entry   setup,^m<r2,r3,r
     5E FC84 CE 9E    ODD5           movab    -892(sp),sp
  56 00000000 EF 9E   ODDA           movab    $CHAR_STRING_CON
  59 00000000 EF 9E   ODE1           movab    TRAILERSIZER,r9
  58 00000000 EF 9E   ODE8           movab    HDRSIZER,r8
  5A 00000000 EF 9E   ODEF           movab    HEYPRINT,r10
  5B 00000000 EF 9E   ODF6           movab    $DATA,r11
  02 00000000 EF D1   ODFD           cmpl     HEYPRINT2,#2
           OE 12      OE04           bneq     sym.107
        OC AC DD      OE06           pushl    12(ap)
        1072 C6 DF    OE09           pushal   4210(r6)
00000000* EF 02 FB    OE0D           calls    #2,PRINTF
                      OE14  sym.107:
  02 00000000 EF D1   OE14           cmpl     HEYPRINT2,#2
           OD 12      OE1B           bneq     sym.108
           69 DD      OE1D           pushl    (r9)
        10A1 C6 DF    OE1F           pushal   4257(r6)
00000000* EF 02 FB    OE23           calls    #2,PRINTF
                      OE2A  sym.108:
        52 10 AC DO   OE2A           movl     16(ap),r2
           50 D4      OE2E           clrl     r0
           68 D5      OE30           tstl     (r8)
           OA 15      OE32           bleq     sym.110
                      OE34  sym.109:
         6240 94      OE34           clrb     (r2)[r0]
           50 D6      OE37           incl     r0
         68 50 D1     OE39           cmpl     r0,(r8)
           F6 19      OE3C           blss     sym.109
                      OE3E  sym.110:
        53 08 AC DO   OE3E           movl     8(ap),r3
           51 D4      OE42           clrl     r1
           69 D5      OE44           tstl     (r9)
           OA 15      OE46           bleq     sym.112
                      OE48  sym.111:
         6341 94      OE48           clrb     (r3)[r1]
           51 D6      OE4B           incl     r1
         69 51 D1     OE4D           cmpl     r1,(r9)
           F6 19      OE50           blss     sym.111
                      OE52  sym.112:
```

```
  02 00000000 EF D1   0E52            cmpl     HEYPRINT2,#2
              03 12   0E59            bneq     sym.113
          10DC C6 DF  0E5B            pushal   4316(r6)
  00000000* EF 01 FB  0E5F            calls    #1,PRINTF
                      0E66   sym.113:
           01 0C AC D1 0E66           cmpl     12(ap),#1
              03 13   0E6A            beql     gen.16
              0329 31 0E6C            brw      sym.119
                      0E6F   gen.16:
           55 04 AC DE 0E6F           moval    4(ap),r5
              52 65 D0 0E73           movl     (r5),r2
           06 A2 1E B0 0E76           movw     #30,6(r2)
          110E C6 DF  0E7A            pushal   4366(r6)
              08 A2 9F 0E7E           pushab   8(r2)
  53 00000000* EF 9E  0E81            movab    STRCPY,r3
              63 02 FB 0E83           calls    #2,(r3)
          112A C6 DF  0E88            pushal   4394(r6)
          0260 C2 9F  0E8F            pushab   608(r2)
              63 02 FB 0E93           calls    #2,(r3)
         0310 C2 05 B0 0E96           movw     #5,784(r2)
         0338 C2 01 B0 0E9B           movw     #1,824(r2)
          112C C6 DF  0EA0            pushal   4396(r6)
              26 A2 9F 0EA4           pushab   38(r2)
              63 02 FB 0EA7           calls    #2,(r3)
          1148 C6 DF  0EAA            pushal   4424(r6)
         0268 C2 9F   0EAE            pushab   616(r2)
              63 02 FB 0EB2           calls    #2,(r3)
         0312 C2 05 B0 0EB5           movw     #5,786(r2)
         033A C2 02 B0 0EBA           movw     #2,826(r2)
          114A C6 DF  0EBF            pushal   4426(r6)
              44 A2 9F 0EC3           pushab   68(r2)
              63 02 FB 0EC6           calls    #2,(r3)
          1166 C6 DF  0EC9            pushal   4454(r6)
         0270 C2 9F   0ECD            pushab   624(r2)
              63 02 FB 0ED1           calls    #2,(r3)
         0314 C2 05 B0 0ED4           movw     #5,788(r2)
         033C C2 03 B0 0ED9           movw     #3,828(r2)
          1168 C6 DF  0EDE            pushal   4456(r6)
              62 A2 9F 0EE2           pushab   98(r2)
              63 02 FB 0EE5           calls    #2,(r3)
          1184 C6 DF  0EE8            pushal   4484(r6)
         0278 C2 9F   0EEC            pushab   632(r2)
              63 02 FB 0EF0           calls    #2,(r3)
         0316 C2 05 B0 0EF3           movw     #5,790(r2)
         033E C2 04 B0 0EF8           movw     #4,830(r2)
          1186 C6 DF  0EFD            pushal   4486(r6)
         0080 C2 9F   0F01            pushab   128(r2)
              63 02 FB 0F05           calls    #2,(r3)
          11A2 C6 DF  0F08            pushal   4514(r6)
         0280 C2 9F   0F0C            pushab   640(r2)
              63 02 FB 0F10           calls    #2,(r3)
         0318 C2 05 B0 0F13           movw     #5,792(r2)
         0340 C2 05 B0 0F18           movw     #5,832(r2)
          11A4 C6 DF  0F1D            pushal   4516(r6)
         009E C2 9F   0F21            pushab   158(r2)
              63 02 FB 0F25           calls    #2,(r3)
          11C0 C6 DF  0F28            pushal   4544(r6)
         0288 C2 9F   0F2C            pushab   648(r2)
              63 02 FB 0F30           calls    #2,(r3)
         031A C2 05 B0 0F33           movw     #5,794(r2)
         0342 C2 06 B0 0F38           movw     #6,834(r2)
          11C2 C6 DF  0F3D            pushal   4546(r6)
         00BC C2 9F   0F41            pushab   188(r2)
              63 02 FB 0F45           calls    #2,(r3)
          11DE C6 DF  0F48            pushal   4574(r6)
         0290 C2 9F   0F4C            pushab   656(r2)
```

|          |       |    |      |        |              |
|----------|-------|----|------|--------|--------------|
|          | 63 02 | FB | 0F50 | calls  | #2,(r3)      |
| 031C C2  | 05    | 80 | 0F53 | movw   | #5,796(r2)   |
| 0344 C2  | 07    | 80 | 0F58 | movw   | #7,836(r2)   |
|          | 11E0 C6 | DF | 0F5D | pushal | 4576(r6)   |
|          | 00DA C2 | 9F | 0F61 | pushab | 218(r2)    |
|          | 63 02 | FB | 0F65 | calls  | #2,(r3)      |
|          | 11FC C6 | DF | 0F68 | pushal | 4604(r6)   |
|          | 0298 C2 | 9F | 0F6C | pushab | 664(r2)    |
|          | 63 02 | FB | 0F70 | calls  | #2,(r3)      |
| 031E C2 63 | 8F | 9B | 0F73 | movzbw | #99,798(r2) |
| 0346 C2 63 | 8F | 9B | 0F79 | movzbw | #99,838(r2) |
|          | 11FE C6 | DF | 0F7F | pushal | 4606(r6)   |
|          | 00F8 C2 | 9F | 0F83 | pushab | 248(r2)    |
|          | 63 02 | FB | 0F87 | calls  | #2,(r3)      |
|          | 121A C6 | DF | 0F8A | pushal | 4634(r6)   |
|          | 02A0 C2 | 9F | 0F8E | pushab | 672(r2)    |
|          | 63 02 | FB | 0F92 | calls  | #2,(r3)      |
| 0320 C2  | 06    | 80 | 0F95 | movw   | #6,800(r2)   |
| 0348 C2  | 01    | 80 | 0F9A | movw   | #1,840(r2)   |
|          | 121C C6 | DF | 0F9F | pushal | 4636(r6)   |
|          | 0116 C2 | 9F | 0FA3 | pushab | 278(r2)    |
|          | 63 02 | FB | 0FA7 | calls  | #2,(r3)      |
|          | 1238 C6 | DF | 0FAA | pushal | 4664(r6)   |
|          | 02A8 C2 | 9F | 0FAE | pushab | 680(r2)    |
|          | 63 02 | FB | 0FB2 | calls  | #2,(r3)      |
| 0322 C2  | 06    | 80 | 0FB5 | movw   | #6,802(r2)   |
| 034A C2  | 02    | 80 | 0FBA | movw   | #2,842(r2)   |
|          | 123A C6 | DF | 0FBF | pushal | 4666(r6)   |
|          | 0134 C2 | 9F | 0FC3 | pushab | 308(r2)    |
|          | 63 02 | FB | 0FC7 | calls  | #2,(r3)      |
|          | 1256 C6 | DF | 0FCA | pushal | 4694(r6)   |
|          | 02B0 C2 | 9F | 0FCE | pushab | 688(r2)    |
|          | 63 02 | FB | 0FD2 | calls  | #2,(r3)      |
| 0324 C2  | 06    | 80 | 0FD5 | movw   | #6,804(r2)   |
| 034C C2  | 03    | 80 | 0FDA | movw   | #3,844(r2)   |
|          | 1258 C6 | DF | 0FDF | pushal | 4696(r6)   |
|          | 0152 C2 | 9F | 0FE3 | pushab | 338(r2)    |
|          | 63 02 | FB | 0FE7 | calls  | #2,(r3)      |
|          | 1274 C6 | DF | 0FEA | pushal | 4724(r6)   |
|          | 02B8 C2 | 9F | 0FEE | pushab | 696(r2)    |
|          | 63 02 | FB | 0FF2 | calls  | #2,(r3)      |
| 0326 C2  | 06    | 80 | 0FF5 | movw   | #6,806(r2)   |
| 034E C2  | 04    | 80 | 0FFA | movw   | #4,846(r2)   |
|          | 1276 C6 | DF | 0FFF | pushal | 4726(r6)   |
|          | 0170 C2 | 9F | 1003 | pushab | 368(r2)    |
|          | 63 02 | FB | 1007 | calls  | #2,(r3)      |
|          | 1292 C6 | DF | 100A | pushal | 4754(r6)   |
|          | 02C0 C2 | 9F | 100E | pushab | 704(r2)    |
|          | 63 02 | FB | 1012 | calls  | #2,(r3)      |
| 0328 C2  | 06    | 80 | 1015 | movw   | #6,808(r2)   |
| 0350 C2  | 05    | 80 | 101A | movw   | #5,848(r2)   |
|          | 1294 C6 | DF | 101F | pushal | 4756(r6)   |
|          | 018E C2 | 9F | 1023 | pushab | 398(r2)    |
|          | 63 02 | FB | 1027 | calls  | #2,(r3)      |
|          | 12B0 C6 | DF | 102A | pushal | 4784(r6)   |
|          | 02C8 C2 | 9F | 102E | pushab | 712(r2)    |
|          | 63 02 | FB | 1032 | calls  | #2,(r3)      |
| 032A C2  | 06    | 80 | 1035 | movw   | #6,810(r2)   |
| 0352 C2  | 06    | 80 | 103A | movw   | #6,850(r2)   |
|          | 12B2 C6 | DF | 103F | pushal | 4786(r6)   |
|          | 01AC C2 | 9F | 1043 | pushab | 428(r2)    |
|          | 63 02 | FB | 1047 | calls  | #2,(r3)      |
|          | 12CE C6 | DF | 104A | pushal | 4814(r6)   |
|          | 02D0 C2 | 9F | 104E | pushab | 720(r2)    |
|          | 63 02 | FB | 1052 | calls  | #2,(r3)      |

```
       032C C2 06 B0     1055           movw      #6,812(r2)
       0354 C2 07 B0     105A           movw      #7,852(r2)
            12D0 C6 DF   105F           pushal    4816(r6)
            01CA C2 9F   1063           pushab    458(r2)
               63 02 FB  1067           calls     #2,(r3)
            12EC C6 DF   106A           pushal    4844(r6)
            02D8 C2 9F   106E           pushab    728(r2)
               63 02 FB  1072           calls     #2,(r3)
       032E C2 04 B0     1075           movw      #4,814(r2)
    0356 C2 FF 8F 9B     107A           movzbw    #255,854(r2)
            12F0 C6 DF   1080           pushal    4848(r6)
            01E8 C2 9F   1084           pushab    488(r2)
               63 02 FB  1088           calls     #2,(r3)
            130C C6 DF   108B           pushal    4876(r6)
            02E0 C2 9F   108F           pushab    736(r2)
               63 02 FB  1093           calls     #2,(r3)
       0330 C2 04 B0     1096           movw      #4,816(r2)
       0358 C2 01 B0     109B           movw      #1,856(r2)
            1312 C6 DF   10A0           pushal    4882(r6)
            0206 C2 9F   10A4           pushab    518(r2)
               63 02 FB  10A8           calls     #2,(r3)
            132E C6 DF   10AB           pushal    4910(r6)
            02E8 C2 9F   10AF           pushab    744(r2)
               63 02 FB  10B3           calls     #2,(r3)
       0332 C2 04 B0     10B6           movw      #4,818(r2)
       035A C2 02 B0     10BB           movw      #2,858(r2)
            1334 C6 DF   10C0           pushal    4916(r6)
            0224 C2 9F   10C4           pushab    548(r2)
               63 02 FB  10C8           calls     #2,(r3)
            1350 C6 DF   10CB           pushal    4944(r6)
            02F0 C2 9F   10CF           pushab    752(r2)
               63 02 FB  10D3           calls     #2,(r3)
       0334 C2 04 B0     10D6           movw      #4,820(r2)
       035C C2 03 B0     10DB           movw      #3,860(r2)
            1356 C6 DF   10E0           pushal    4950(r6)
            0242 C2 9F   10E4           pushab    578(r2)
               63 02 FB  10E8           calls     #2,(r3)
            1372 C6 DF   10EB           pushal    4978(r6)
            02F8 C2 9F   10EF           pushab    760(r2)
               63 02 FB  10F3           calls     #2,(r3)
       0336 C2 04 B0     10F6           movw      #4,822(r2)
       035E C2 04 B0     10FB           movw      #4,862(r2)
                  53 D4  1100           clrl      r3
                  50 65 D0  1102        movl      (r5),r0
    51 00000360 E0 9E    1105           movab     864(r0),r1
                         110C  sym.114:
               81 54 8F 90  110C        movb      #84,(r1)+
               F8 53 0E F3  1110        aobleq    #14,r3,sym.114
               52 04 AC DE  1114        moval     4(ap),r2
                  50 62 D0  1118        movl      (r2),r0
       036F C0 53 8F 90  111B           movb      #83,879(r0)
                  54 10 D0  1121        movl      #16,r4
                  50 62 D0  1124        movl      (r2),r0
            51 0370 C0 9E  1127         movab     880(r0),r1
                         112C  sym.115:
               81 56 8F 90  112C        movb      #86,(r1)+
               F8 54 13 F3  1130        aobleq    #19,r4,sym.115
                  02 6A D1  1134        cmpl      (r10),#2
                     0B 12  1137        bneq      sym.116
            1378 C6 DF   1139           pushal    4984(r6)
    00000000* EF 01 FB   113D           calls     #1,PRINTF
                         1144  sym.116:
                  55 D4  1144           clrl      r5
               57 04 AC DE  1146        moval     4(ap),r7
               52 00 A7 D0  114A        movl      0(r7),r2
```

```
53 0310 C2 3E      114E              movaw    784(r2),r3
54 0360 C2 9E      1153              movab    864(r2),r4
                   1153   sym.117:
         02 6A D1  1153              cmpl     (r10),#2
            22 12  115B              bneq     sym.118
      51 55 1E C5  115D              mull3    #30,r5,r1
         50 67 D0  1161              movl     (r7),r0
      08 A041 9F   1164              pushab   8(r0)[r1]
         7E 64 9B  1168              cvtbl    (r4),-(sp)
      7E 2B A3 32  116B              cvtwl    40(r3),-(sp)
         7E 63 32  116F              cvtwl    (r3),-(sp)
            55 DD  1172              pushl    r5
         13B4 C6 DF 1174             pushal   5044(r6)
00000000* EF 06 FB 1178              calls    #6,PRINTF
                   117F   sym.118:
         53 02 C0  117F              addl2    #2,r3
            54 D6  1182              incl     r4
      D0 55 13 F3  1184              aobleq   #19,r5,sym.117
      52 04 AC D0  1188              movl     4(ap),r2
      0300 C2 01 D0 118C             movl     #1,768(r2)
      0304 C2 D4   1191              clrl     772(r2)
         0130 31   1195              brw      donentry
                   1198   sym.119:
            54 01 D0 1198            movl     #1,r4
                   119B   more:
00000000 EF DD     119B              pushl    FPTR
            01 DD  11A1              pushl    #1
            68 DD  11A3              pushl    (r3)
            04 AC DD 11A5            pushl    4(ap)
00000000* EF 04 FB 11A8              calls    #4,FREAD
         52 50 D0  11AF              movl     r0,r2
02 00000000 EF D1  11B2              cmpl     HEYPRINT2,#2
            CD 12  11B9              bneq     sym.120
            52 DD  11BB              pushl    r2
         13F2 C6 DF 11BD             pushal   5106(r6)
00000000* EF 02 FB 11C1              calls    #2,PRINTF
                   11C8   sym.120:
            52 D5  11C8              tstl     r2
            68 12  11CA              bneq     sym.125
         01 54 D1  11CC              cmpl     r4,#1
            12 12  11CF              bneq     sym.121
         1422 C6 DF 11D1              pushal   5154(r6)
00000000* EF 01 FB 11D5              calls    #1,PRINTF
00000000* EF 00 FB 11DC              calls    #0,EXIT
                   11E3   sym.121:
      53 FC86 CD 9E 11E3             movab    -890(fp),r3
            50 D4  11E8              clrl     r0
            68 D5  11EA              tstl     (r3)
            12 15  11EC              bleq     sym.123
      52 0010 CC D0 11EE             movl     16(ap),r2
               01  11F3              nop
                   11F4   sym.122:
      6240 6340 90 11F4              movb     (r3)[r0],(r2)[r0]
            50 D6  11F9              incl     r0
         68 50 D1  11FB              cmpl     r0,(r8)
            F4 19  11FE              blss     sym.122
                   1200   sym.123:
02 00000000 EF D1  1200              cmpl     HEYPRINT2,#2
            0B 12  1207              bneq     sym.124
         1456 C6 DF 1209             pushal   5206(r6)
00000000* EF 01 FB 120D              calls    #1,PRINTF
                   1214   sym.124:
            7E 7C  1214              clrq     -(sp)
            00 DD  1216              pushl    #0
            08 AC DD 1218            pushl    8(ap)
```

```
         52 04 AC D0     121B           movl     4(ap),r2
               52 DD     121F           pushl    r2
  00000000* EF 05 FB     1221           calls    #5,SHOWLOGREC
         0300 C2 D6      1228           incl     768(r2)
         0304 C2 D4      122C           clrl     772(r2)
            0105 31      1230           brw      sym.133
                  01     1233           nop
                         1234  sym.125:
      00000000 EF DD     1234           pushl    FPTR
               01 DD     123A           pushl    #1
         50 04 AC D0     123C           movl     4(ap),r0
         7E 04 A0 32     1240           cvtwl    4(r0),-(sp)
            03 AC DD     1244           pushl    3(ap)
  00000000* EF 04 FB     1247           calls    #4,FREAD
         52 50 D0        124E           movl     r0,r2
  02 00000000 EF D1      1251           cmpl     HEYPRINT2,#2
               0D 12     1258           bneq     sym.126
               52 DD     125A           pushl    r2
           148D C6 DF    125C           pushal   5261(r6)
  00000000* EF 02 FB     1260           calls    #2,PRINTF
                         1267  sym.126:
               52 D5     1267           tstl     r2
               12 12     1269           bneq     sym.127
           149F C6 DF    126B           pushal   5311(r6)
  00000000* EF 01 FB     126F           calls    #1,PRINTF
  00000000* EF 00 FB     1276           calls    #0,EXIT
                         127D  sym.127:
        53 FC86 CD 9E    127D           movab    -890(fp),r3
               50 D4     1282           clrl     r0
               68 D5     1284           tstl     (r8)
               10 15     1286           bleq     sym.129
         52 10 AC D0     1288           movl     16(ap),r2
                         128C  sym.128:
         6340 6240 90    128C           movb     (r2)[r0],(r3)[r0]
               50 D6     1291           incl     r0
            68 50 D1     1293           cmpl     r0,(r3)
               F4 19     1296           blss     sym.128
                         1298  sym.129:
               7E 7C     1298           clrq     -(sp)
               00 DD     129A           pushl    #0
            03 AC DD     129C           pushl    8(ap)
         52 04 AC D0     129F           movl     4(ap),r2
               52 DD     12A3           pushl    r2
  00000000* EF 05 FB     12A5           calls    #5,SHOWLOGREC
            02 6A D1     12AC           cmpl     (r10),#2
               19 12     12AF           bneq     sym.130
         0304 C2 DD      12B1           pushl    772(r2)
         0300 C2 DD      12B5           pushl    768(r2)
         7E 04 A2 32     12B9           cvtwl    4(r2),-(sp)
               54 DD     12BD           pushl    r4
           14EA C6 DF    12BF           pushal   5354(r6)
  00000000* EF 05 FB     12C3           calls    #5,PRINTF
                         12CA  sym.130:
               00 DD     12CA           pushl    #0
         50 04 AC D0     12CC           movl     4(ap),r0
         0308 C0 9F      12D0           pushab   776(r0)
            76 AB 9F     12D4           pushab   118(r11)
            FA AD 3F     12D7           pushaw   -6(fp)
  00000000* EF 04 FB     12DA           calls    #4,SYS$ASCTIM
  02 00000000 EF D1      12E1           cmpl     HEYPRINT2,#2
               0B 12     12E8           bneq     sym.131
           1526 C6 DF    12EA           pushal   5414(r6)
  00000000* EF 01 FB     12EE           calls    #1,PRINTF
                         12F5  sym.131:
  02 00000000 EF D1      12F5           cmpl     HEYPRINT4,#2
```

```
           0E 12    12FC          bneq    sym.132
        5C AB 9F    12FE          pushab  92(r11)
        1561 C6 DF  1301          pushal  5473(r6)
00000000* EF 02 FB  1305          calls   #2,PRINTF
                    130C  sym.132:
           54 D6    130C          incl    r4
        50 04 AC D0 130E          movl    4(ap),r0
        02 04 A0 B1 1312          cmpw    4(r0),#2
           03 13    1316          beql    gen.17
           FE80 31  1318          brw     more
                    131B  gen.17:
02 00000000 EF D1   131B          cmpl    HEYPRINT4,#2
           03 13    1322          beql    gen.18
           FE74 31  1324          brw     more
                    1327  gen.18:
        1574 C6 DF  1327          pushal  5492(r6)
00000000* EF 01 FB  132B          calls   #1,PRINTF
           FE66 31  1332          brw     more
           50 D5    1335          tstl    r0
           01       1337          nop
                    1338  sym.133:
        02 6A D1    1338          cmpl    (r10),#2
           03 12    133B          bneq    sym.134
        159E C6 DF  133D          pushal  5534(r6)
00000000* EF 01 FB  1341          calls   #1,PRINTF
                    1348  sym.134:
                    1348  donentry:
        52 04 AC D0 1348          movl    4(ap),r2
        0308 C2 7C  134C          clrq    776(r2)
        50 02 D0    1350          movl    #2,r0
        69 02 D1    1353          cmpl    #2,(r9)
           0E 18    1356          bgeq    sym.136
        52 08 AC D0 1358          movl    8(ap),r2
                    135C  sym.135:
           6240 94  135C          clrb    (r2)[r0]
           50 D6    135F          incl    r0
        69 50 D1    1361          cmpl    r0,(r9)
           F6 19    1364          blss    sym.135
                    1366  sym.136:
        52 08 AC D0 1366          movl    8(ap),r2
        62 42 8F 90 136A          movb    #66,(r2)
01 A2 41 8F 90      136E          movb    #65,1(r2)
        52 10 AC D0 1373          movl    16(ap),r2
        62 41 8F 90 1377          movb    #65,(r2)
01 A2 42 8F 90      137B          movb    #66,1(r2)
           54 D4    1380          clrl    r4
        55 04 AC DE 1382          moval   4(ap),r5
           53 65 D0 1386          movl    (r5),r3
52 00000310 E3 3E   1389          movaw   784(r3),r2
                    1390  sym.137:
        02 6A D1    1390          cmpl    (r10),#2
           28 12    1393          bneq    sym.138
        50 54 03 78 1395          ashl    #3,r4,r0
        51 65 D0    1399          movl    (r5),r1
        0260 C140 9F 139C         pushab  608(r1)[r0]
        50 54 1E C5 13A1          mull3   #30,r4,r0
        08 A140 9F  13A5          pushab  8(r1)[r0]
        7E 28 A2 32 13A9          cvtwl   40(r2),-(sp)
           7E 62 32 13AD          cvtwl   (r2),-(sp)
           54 DD    13B0          pushl   r4
        15AD C6 DF  13B2          pushal  5549(r6)
00000000* EF 06 FB  13B6          calls   #6,PRINTF
                    13BD  sym.138:
        52 02 C0    13BD          addl2   #2,r2
        CC 54 13 F3 13C0          aobleq  #19,r4,sym.137
           04       13C4          ret
```

```
                    13C5   fillup:
            01FC    13C5            .entry    fillup,^m<r2,r3,
         5E 04 C2   13C7            subl2     #4,sp
57 00000000 EF 9E   13CA            movab     $CHAR_STRING_CON
58 00000000 EF 9E   13D1            movab     HEYPRINT2,r8
         50 10 AC D0  13D8          movl      16(ap),r0
54 50 00000058 8F C5 13DC           mull3     #88,r0,r4
         53 08 AC D0  13E4          movl      8(ap),r3
         55 0C AC D0  13E8          movl      12(ap),r5
       52 02 A344 9E  13EC          movab     2(r3)[r4],r2
         62 65 D0     13F1          movl      (r5),(r2)
       52 06 A344 9E  13F4          movab     6(r3)[r4],r2
         62 04 A5 D0  13F9          movl      4(r5),(r2)
         56 04 AC DE  13FD          moval     4(ap),r6
            52 66 D0  1401          movl      (r6),r2
      0304 C2 50 D0   1404          movl      r0,772(r2)
               50 D5  1409          tstl      r0
               0B 12  140B          bneq      sym.139
      0308 C2 65 D0   140D          movl      (r5),776(r2)
   030C C2 04 A5 D0   1412          movl      4(r5),780(r2)
                      1418   sym.139:
               55 D4  1418          clrl      r5
               53 66 D0  141A       movl      (r6),r3
54 00000310 E3 3E    141D          movaw     784(r3),r4
                      1424   sym.140:
         0063 8F 84 B1  1424        cmpw      (r4)+,#99
               2D 13  1429          beql      sym.141
               55 DD  142B          pushl     r5
               10 AC DD  142D       pushl     16(ap)
               08 AC DD  1430       pushl     8(ap)
               52 66 D0  1433       movl      (r6),r2
               52 DD  1436          pushl     r2
00000000* EF 04 FB   1438          calls     #4,READGUAGE
               02 68 D1  143F       cmpl      (r8),#2
               14 12  1442          bneq      sym.141
         0300 C2 DD   1444          pushl     768(r2)
               10 AC DD  1448       pushl     16(ap)
               55 DD  144B          pushl     r5
         15EC C7 DF  144D          pushal    5612(r7)
00000000* EF 04 FB   1451          calls     #4,PRINTF
                      1458   sym.141:
         C8 55 13 F3  1458          aobleq    #19,r5,sym.140
               02 68 D1  145C       cmpl      (r8),#2
               0E 12  145F          bneq      sym.142
               10 AC DD  1461       pushl     16(ap)
         1632 C7 DF  1464          pushal    5682(r7)
00000000* EF 02 FB   1468          calls     #2,PRINTF
                      146F   sym.142:
                  04  146F          ret
                      1470   showlogrec:
               0FFC  1470            .entry    showlogrec,^m<r2
               5E 34 C2  1472        subl2     #52,sp
55 00000000 EF 9E    1475          movab     $CHAR_STRING_CON
02 00000000 EF D1    147C          cmpl      HEYPRINT2,#2
               13 12  1483          bneq      sym.143
         52 04 AC D0  1485          movl      4(ap),r2
         0304 C2 DD   1489          pushl     772(r2)
         1663 C5 DF  148D          pushal    5731(r5)
00000000* EF 02 FB   1491          calls     #2,PRINTF
                      1498   sym.143:
                00 DD  1498         pushl     #0
         52 04 AC D0  149A          movl      4(ap),r2
         0308 C2 9F  149E          pushab    776(r2)
00000076 EF 9F      14A2          pushab    $DATA+118
               F6 AD 3F  14A8       pushaw    -10(fp)
00000000* EF 04 FB   14AB          calls     #4,SYS$ASCTIM
```

```
52 50 FFFFFFFE 8F C8   14B2            bicl3   #-2,r0,r2
         01 52 D1      143A            cmpl    r2,#1
            09 13      14BD            beql    sym.144
            50 DD      143F            pushl   r0
00000000* EF 01 FB     14C1            calls   #1,LIB$STOP
                       14C8  sym.144:
   00000073 EF 94      14C8            clrb    $DATA+115
02 00000000 EF D1      14CE            cmpl    HEYPRINT2,#2
            11 12      14D5            bneq    sym.145
   0000005C EF DF      14D7            pushal  $DATA+92
       1697 C5 DF      14DD            pushal  5783(r5)
00000000* EF 02 FB     14E1            calls   #2,PRINTF
                       14E8  sym.145:
         14 AC D5      14E8            tstl    20(ap)
            61 12      14EB            bneq    sym.150
            58 D4      14ED            clrl    r3
      54 04 AC D0      14EF            movl    4(ap),r4
            6E D4      14F3            clrl    (sp)
57 00000000* EF 9E     14F5            movab   PRINTF,r7
   53 0310 C4 3E       14FC            movaw   784(r4),r3
   56 00000360 E4 9E   1501            movab   864(r4),r6
                       1508  sym.146:
      0063 3F 83 B1    1508            cmpw    (r3)+,#99
            38 13      150D            beql    sym.149
            FE A3 B5   150F            tstw    -2(r3)
            06 19      1512            blss    sym.147
         1E FE A3 B1   1514            cmpw    -2(r3),#30
            10 15      1518            bleq    sym.148
                       151A  sym.147:
02 00000000 EF D1      151A            cmpl    HEYPRINT2,#2
            07 12      1521            bneq    sym.148
       16CD C5 DF      1523            pushal  5837(r5)
            67 01 FB   1527            calls   #1,(r7)
                       152A  sym.148:
02 00000000 EF D1      152A            cmpl    HEYPRINT2,#2
            14 12      1531            bneq    sym.149
         7E 66 9B      1533            cvtbl   (r6),-(sp)
         7E 26 A3 32   1536            cvtwl   38(r3),-(sp)
         7E FE A3 32   153A            cvtwl   -2(r3),-(sp)
            58 DD      153E            pushl   r8
       16ED C5 DF      1540            pushal  5869(r5)
            67 05 FB   1544            calls   #5,(r7)
                       1547  sym.149:
            56 D6      1547            incl    r6
      33 58 13 F3      1549            aobleq  #19,r8,sym.146
            04         154D            ret
                       154E  sym.150:
         01 10 AC D1   154E            cmpl    16(ap),#1
            03 13      1552            beql    gen.19
         0095 31       1554            brw     sym.154
                       1557  gen.19:
      52 04 AC D0      1557            movl    4(ap),r2
      02 04 A2 B1      155B            cmpw    4(r2),#2
            13 12      155F            bneq    sym.151
02 00000000 EF D1      1561            cmpl    HEYPRINT4,#2
            03 13      1568            beql    gen.20
         0397 31       156A            brw     sym.174
                       156D  gen.20:
       171E C5 DF      156D            pushal  5918(r5)
00000000* EF 01 FB     1571            calls   #1,PRINTF
         0389 31       1578            brw     sym.174
            01         157B            nop
                       157C  sym.151:
02 00000000 EF D1      157C            cmpl    HEYPRINT2,#2
            08 12      1583            bneq    sym.152
```

```
                1748 C5 DF    1585            pushal  5960(r5)
        00000000* EF 01 FB    1589            calls   #1,PRINTF
                              1590    sym.152:
                      00 DD   1590            pushl   #0
                52 04 AC D0   1592            movl    4(ap),r2
      53 0304 C2 00000058 8F C5  1596         mull3   #88,772(r2),r3
                52 08 AC D0   15A0            movl    8(ap),r2
                   02 A243 9F 15A4            pushab  2(r2)[r3]
              000000E3 EF 9F 15A8            pushab  $DATA+232
                      F6 AD 3F 15AE          pushaw  -10(fp)
        00000000* EF 04 FB    15B1            calls   #4,SYS$ASCTIM
        52 50 FFFFFFFE 8F CB  15B8            bicl3   #-2,r0,r2
                      01 52 D1 15C0           cmpl    r2,#1
                      09 13   15C3            beql    sym.153
                      50 DD   15C5            pushl   r0
        00000000* EF 01 FB    15C7            calls   #1,LIB$STOP
                              15CE    sym.153:
              000000E7 EF 94  15CE            clrb    $DATA+231
                52 04 AC D0   15D4            movl    4(ap),r2
                   0304 C2 DD 15D8            pushl   772(r2)
                      08 AC DD 15DC           pushl   8(ap)
        00000000* EF 02 FB    15DF            calls   #2,UPDATE
                      031B 31 15E6            brw     sym.174
                      50 D5   15E9            tstl    r0
                      01      15EB            nop
                              15EC    sym.154:
        02 00000000 EF D1     15EC            cmpl    HEYPRINT2,#2
                      08 12   15F3            bneq    sym.155
                1775 C5 DF    15F5            pushal  6005(r5)
        00000000* EF 01 FB    15F9            calls   #1,PRINTF
                              1600    sym.155:
                52 04 AC D0   1600            movl    4(ap),r2
                02 04 A2 B1   1604            cmpw    4(r2),#2
                      1A 12   1608            bneq    sym.156
        02 00000000 EF D1     160A            cmpl    HEYPRINT4,#2
                      03 13   1611            beql    gen.21
                      02EE 31 1613            brw     sym.174
                              1616    gen.21:
                1733 C5 DF    1616            pushal  6067(r5)
        00000000* EF 01 FB    161A            calls   #1,PRINTF
                      02E0 31 1621            brw     sym.174
                              1624    sym.156:
        02 00000000 EF D1     1624            cmpl    HEYPRINT2,#2
                      0F 12   162B            bneq    sym.157
                   0304 C2 DD 162D            pushl   772(r2)
                1700 C5 DF    1631            pushal  6109(r5)
        00000000* EF 02 FB    1635            calls   #2,PRINTF
                              163C    sym.157:
                      14 AE D4 163C           clrl    20(sp)
                5B 04 AC DE   163F            moval   4(ap),r11
                      52 6B D0 1643           movl    (r11),r2
        52 0304 C2 01 C1      1646            addl3   #1,772(r2),r2
                52 14 AE D1   164C            cmpl    20(sp),r2
                      03 19   1650            blss    gen.22
                      02AF 31 1652            brw     sym.174
                              1655    gen.22:
                08 AE 08 AC DE 1655           moval   8(ap),8(sp)
                04 AE 08 BE D0 165A           movl    8(sp),4(sp)
        5A 00000000* EF 9E    165F            movab   PRINTF,r10
      000C CE 00000000* EF 9E  1666           movab   TO_SHOW_TORR,12(
      0010 CE 00000000* EF 9E  166F           movab   FLATSTAT,16(sp)
                              1678    sym.158:
                      00 DD   1678            pushl   #0
        50 18 AE 00000058 8F C5 167A          mull3   #88,24(sp),r0
                52 08 AE D0   1683            movl    8(sp),r2
```

```
         02 A240 9F   1687            pushab    2(r2)[r0]
      000000E8 EF 9F  168B            pushab    $DATA+232
            F6 AD 3F  1691            pushaw    -10(fp)
   00000000* EF 04 FB 1694            calls     #4,SYS$ASCTIM
52 50 FFFFFFFE 8F CB  169B            bicl3     #-2,r0,r2
            01 52 D1  16A3            cmpl      r2,#1
               09 13  16A6            beql      sym.159
               50 DD  16A8            pushl     r0
   00000000* EF 01 FB 16AA            calls     #1,LIB$STOP
                      16B1  sym.159:
      000000E7 EF 94  16B1            clrb      $DATA+231
50 14 AE 00000058 8F C5 16B7          mull3     #88,20(sp),r0
         52 04 AE D0  16C0            movl      4(sp),r2
         02 A240 9F   16C4            pushab    2(r2)[r0]
      00000000 EF 9F  16C8            pushab    OBSVDATE7
   00000000* EF 02 FB 16CE            calls     #2,SYS$NUMTIM
            0C AC D5  16D5            tstl      12(ap)
               03 12  16D8            bneq      gen.23
              008B 31 16DA            brw       nowprint
                      16DD  gen.23:
            54 01 90  16DD            movb      #1,r4
00000006 EF 00000006 EF B1 16E0       cmpw      OBSVDATE7+6,LOWD
               2D 19  16E9            blss      sym.160
               52 84  16ED            clrw      r2
00000006 EF 00000006 EF B1 16EF       cmpw      OBSVDATE7+6,LOWD
               02 12  16FA            bneq      vcg.7
               52 B6  16FC            incw      r2
                      16FE  vcg.7:
               53 84  16FE            clrw      r3
00000008 EF 00000008 EF B1 1700       cmpw      OBSVDATE7+8,LOWD
               02 18  1709            bgeq      vcg.8
               53 B6  170D            incw      r3
                      170F  vcg.8:
            52 52 B2  170F            mcomw     r2,r2
         52 53 52 A8  1712            bicw3     r2,r3,r2
               02 12  1716            bneq      sym.160
               54 94  1718            clrb      r4
                      171A  sym.160:
            52 54 98  171A            cvtbl     r4,r2
            52 52 D2  171D            mcoml     r2,r2
52 00000000 EF 52 C3  1720            bicl3     r2,SRCH_LOW,r2
               03 13  1728            beql      gen.24
              01B2 31 172A            brw       pastxxloop
                      172D  gen.24:
            53 01 90  172D            movb      #1,r3
00000006 EF 00000006 EF B1 1730       cmpw      OBSVDATE7+6,HIGH
               11 14  1738            bgtr      sym.162
               0D 12  173D            bneq      sym.161
00000008 EF 00000008 EF B1 173F       cmpw      OBSVDATE7+8,HIGH
               02 14  174A            bgtr      sym.162
                      174C  sym.161:
               53 94  174C            clrb      r3
                      174E  sym.162:
            52 53 98  174E            cvtbl     r3,r2
            52 52 D2  1751            mcoml     r2,r2
52 00000000 EF 52 C3  1754            bicl3     r2,SRCH_HIGH,r2
               0A 13  175C            beql      sym.163
      00000000 EF 01 D0 175E          movl      #1,FILE_PRINT_DO
              019C 31 1765            brw       past_zz_loop
                      1768  sym.163:
                      1768  nowprint:
      000000D0 EF DF  1768            pushal    $DATA+208
            18 AE DD  176E            pushl     24(sp)
            50 6B D0  1771            movl      (r11),r0
         0300 C0 DD   1774            pushl     768(r0)
```

```
   17FE C5 DF        1778           pushal   6142(r5)
      6A 04 FB       177C           calls    #4,(r10)
   1833 C5 DF        177F           pushal   6195(r5)
      6A 01 FB       1783           calls    #1,(r10)
         53 D4       1786           clrl     r3
      54 00 AB D0    1788           movl     0(r11),r4
   58 0360 C4 9E     178C           movab    864(r4),r8
 57 00000338 E4 3E   1791           movaw    824(r4),r7
                     1793   sym.164:
 02 00000000 EF D1   1798           cmpl     HEYPRINT,#2
         1E 12       179F           bneq     sym.165
         50 6B D0    17A1           movl     (r11),r0
   7E 0360 C043 98   17A4           cvtbl    864(r0)[r3],-(sp)
   7E 0338 C043 32   17AA           cvtwl    824(r0)[r3],-(sp)
   7E 0310 C043 32   17B0           cvtwl    784(r0)[r3],-(sp)
         53 DD       17B6           pushl    r3
      186F C5 DF     17B8           pushal   6255(r5)
         6A 05 FB    17BC           calls    #5,(r10)
                     17BF   sym.165:
   52 0310 C443 B0   17BF           movw     784(r4)[r3],r2
         50 B4       17C5           clrw     r0
      0063 8F 52 B1  17C7           cmpw     r2,#99
         02 13       17CC           beql     vcg.9
         50 B6       17CE           incw     r0
                     17D0   vcg.9:
         51 B4       17D0           clrw     r1
         52 B5       17D2           tstw     r2
         02 19       17D4           blss     vcg.10
         51 B6       17D6           incw     r1
                     17D8   vcg.10:
         50 50 B2    17D8           mcomw    r0,r0
         50 51 50 A9 17DB           bicw3    r0,r1,r0
         51 B4       17DF           clrw     r1
         1E 52 B1    17E1           cmpw     r2,#30
         02 14       17E4           bgtr     vcg.11
         51 B6       17E6           incw     r1
                     17E8   vcg.11:
         50 50 B2    17E8           mcomw    r0,r0
         50 51 50 A9 17EB           bicw3    r0,r1,r0
         03 12       17EF           bneq     gen.25
         00E0 31     17F1           brw      sym.172
                     17F4   gen.25:
         52 D8 A7 32 17F4           cvtwl    -40(r7),r2
      52 00000064 8F C4 17F8        mull2    #100,r2
         50 67 32    17FF           cvtwl    (r7),r0
         52 50 C0    1802           addl2    r0,r2
   50 14 AE 00000058 8F C5 1805     mull3    #88,20(sp),r0
         51 53 02 78 180E           ashl     #2,r3,r1
         51 50 C0    1812           addl2    r0,r1
         50 08 BE D0 1815           movl     @8(sp),r0
         51 0A A041 9E 1819         movab    10(r0)[r1],r1
         59 61 4A    181E           cvtfl    (r1),r9
         56 61 50    1821           movf     (r1),r6
         56 8F 68 91 1824           cmpb     (r8),#86
         06 13       1828           beql     sym.166
         76 8F 68 91 182A           cmpb     (r8),#118
         3C 12       182E           bneq     sym.168
                     1830   sym.166:
 02 00000000 EF D1   1830           cmpl     HEYPRINT,#2
         09 12       1837           bneq     sym.167
         53 DD       1839           pushl    r3
      18A0 C5 DF     183B           pushal   6304(r5)
         6A 02 FB    183F           calls    #2,(r10)
                     1842   sym.167:
         F0 AD 9F    1842           pushab   -16(fp)
```

```
            F8 AD DF    1845              pushal    -8(fp)
            7E 56 56    1848              cvtfd     r6,-(sp)
         1C 8E 04 FB    184B              calls     #4,@28(sp)
               52 DD    184F              pushl     r2
            F0 AD DF    1851              pushal    -16(fp)
            F8 AD DD    1854              pushl     -8(fp)
         51 53 1E C5    1857              mull3     #30,r3,r1
               50 6B D0 185B              movl      (r11),r0
            08 A041 9F  185E              pushab    8(r0)[r1]
            18B9 C5 DF  1862              pushal    6329(r5)
               6A 05 FB 1866              calls     #5,(r10)
                  69 11 1869              brb       sym.172
                     01 186B              nop
                           186C sym.168:
            53 8F 68 91 186C              cmpb      (r8),#83
                  06 13 1870              beql      sym.169
            73 8F 68 91 1872              cmpb      (r8),#115
                  38 12 1876              bneq      sym.171
                           1878 sym.169:
02 00000000 EF D1       1878              cmpl      HEYPRINT,#2
                  09 12 187F              bneq      sym.170
                  53 DD 1881              pushl     r3
            18D4 C5 DF  1883              pushal    6356(r5)
               6A 02 FB 1887              calls     #2,(r10)
                           188A sym.170:
            E6 AD 9F    188A              pushab    -26(fp)
                  59 DD 188D              pushl     r9
         18 8E 02 FB    188F              calls     #2,@24(sp)
               52 DD    1893              pushl     r2
            1908 C5 DF  1895              pushal    6408(r5)
            E6 AD 9F    1899              pushab    -26(fp)
         51 53 1E C5    189C              mull3     #30,r3,r1
               50 6B D0 18A0              movl      (r11),r0
            08 A041 9F  18A3              pushab    8(r0)[r1]
            18ED C5 DF  18A7              pushal    6381(r5)
               6A 05 FB 18AB              calls     #5,(r10)
                  24 11 18AE              brb       sym.172
                           18B0 sym.171:
               07 53 D1 18B0              cmpl      r3,#7
                  1F 13 18B3              beql      sym.172
                  52 DD 18B5              pushl     r2
            50 53 03 78 18B7              ashl      #3,r3,r0
               51 6B D0 18BB              movl      (r11),r1
         0260 C140 9F   18BE              pushab    608(r1)[r0]
                  59 DD 18C3              pushl     r9
            50 53 1E C5 18C5              mull3     #30,r3,r0
            08 A140 9F  18C9              pushab    8(r1)[r0]
            1908 C5 DF  18CD              pushal    6411(r5)
               6A 05 FB 18D1              calls     #5,(r10)
                           18D4 sym.172:
                  58 D6 18D4              incl      r8
                .57 02 C0 18D6            addl2     #2,r7
         FEB9 53 01 13 F1 18D9            acbl      #19,#1,r3,sym.16
                           18DF pastxxloop:
02 00000000 EF D1       18DF              cmpl      HEYPRINT2,#2
                  07 12 18E6              bneq      sym.173
            1926 C5 DF  18E8              pushal    6438(r5)
               6A 01 FB 18EC              calls     #1,(r10)
                           18EF sym.173:
               14 AE D6 18EF              incl      20(sp)
                  50 6B D0 18F2            movl      (r11),r0
         52 0304 C0 01 C1 18F5            addl3     #1,772(r0),r2
            52 14 AE D1 18FB              cmpl      20(sp),r2
                  03 13 18FF              bgeq      gen.26
                  FD74 31 1901            brw       sym.158
```

```
                              1904    gen.26:
                              1904    sym.174:
                              1904    past_zz_loop:
   02 00000000 EF D1          1904             cmpl      HEYPRINT2,#2
              0B 12            1908             bneq      sym.175
           194F C5 DF          190D             pushal    6479(r5)
   00000000* EF 01 FB          1911             calls     #1,PRINTF
                              1918    sym.175:
                    04        1918             ret
                              1919    dailywrite:
                   007C       1919             .entry    dailywrite,^m<r2
              5E 04 C2         1919             subl2     #4,sp
   53 00000000 EF 9E           191E             movab     $CHAR_STRING_CON
   56 00000000 EF 9E           1925             movab     HEYPRINT2,r6
   55 00000000 EF 9E           192C             movab     FPTR,r5
           197A C3 DF          1933             pushal    6522(r3)
        00000000 EF DD         1937             pushl     FILE_SPEC
   00000000* EF 02 FB          193D             calls     #2,FOPEN
              65 50 D0         1944             movl      r0,(r5)
                 23 12         1947             bneq      sym.176
           197D C3 DF          1949             pushal    6525(r3)
   52 00000000* EF 9E          194D             movab     PRINTF,r2
                 62 01 FB      1954             calls     #1,(r2)
           19AD C3 DF          1957             pushal    6573(r3)
                 62 01 FB      195B             calls     #1,(r2)
           19D8 C3 DF          195E             pushal    6616(r3)
                 62 01 FB      1962             calls     #1,(r2)
   00000000* EF 00 FB          1965             calls     #0,EXIT
                              196C    sym.176:
              02 66 D1         196C             cmpl      (r6),#2
                 0D 12         196F             bneq      sym.177
                 65 DD         1971             pushl     (r5)
           1A0A C3 DF          1973             pushal    6666(r3)
   00000000* EF 02 FB          1977             calls     #2,PRINTF
                              197E    sym.177:
              54 08 AC D0      197E             movl      8(ap),r4
                 52 D4         1982             clrl      r2
              01 64 D1         1984             cmpl      (r4),#1
                 02 12         1987             bneq      vcg.12
                 52 D6         1989             incl      r2
                              198B    vcg.12:
                 51 D4         198B             clrl      r1
              01 0C BC D1      198D             cmpl      @12(ap),#1
                 02 12         1991             bneq      vcg.13
                 51 D6         1993             incl      r1
                              1995    vcg.13:
              52 52 D2         1995             mcoml     r2,r2
              52 51 52 CB      1998             bicl3     r2,r1,r2
                 02 13         199C             beql      sym.178
                 64 D4         199E             clrl      (r4)
                              19A0    sym.178:
                              19A0    putrecord:
              02 66 D1         19A0             cmpl      (r6),#2
                 03 12         19A3             bneq      sym.179
           1A33 C3 DF          19A5             pushal    6707(r3)
   00000000* EF 01 FB          19A9             calls     #1,PRINTF
                              19B0    sym.179:
              02 66 D1         19B0             cmpl      (r6),#2
                 13 12         19B3             bneq      sym.180
              50 04 AC D0      19B5             movl      4(ap),r0
              7E 04 A0 32      19B9             cvtwl     4(r0),-(sp)
           1A6A C3 DF          19BD             pushal    6762(r3)
   00000000* EF 02 FB          19C1             calls     #2,PRINTF
                              19C8    sym.180:
                 65 DD         19C8             pushl     (r5)
```

```
              01 DD    19CA            pushl    #1
     00000000 EF DD    19CC            pushl    HDRSIZER
           04 AC DD    19D2            pushl    4(ap)
    00000000* EF 04 FB 19D5            calls    #4,FWRITE
              52 50 DO 19DC            movl     r0,r2
              02 66 D1 19DF            cmpl     (r6),#2
                 0D 12 19E2            bneq     sym.181
                 52 DD 19E4            pushl    r2
         1A9E C3 DF    19E6            pushal   6814(r3)
    00000000* EF 02 FB 19EA            calls    #2,PRINTF
                       19F1   sym.181:
                 52 D5 19F1            tstl     r2
                 07 12 19F3            bneq     sym.182
    00000000* EF 00 FB 19F5            calls    #0,EXIT
                       19FC   sym.182:
                 65 DD 19FC            pushl    (r5)
                 01 DD 19FE            pushl    #1
           50 04 AC D0 1A00            movl     4(ap),r0
           7E 04 A0 32 1A04            cvtwl    4(r0),-(sp)
              10 AC DD 1A08            pushl    16(ap)
    00000000* EF 04 FB 1A0B            calls    #4,FWRITE
              52 50 D0 1A12            movl     r0,r2
              02 66 D1 1A15            cmpl     (r6),#2
                 0D 12 1A18            bneq     sym.183
                 52 DD 1A1A            pushl    r2
         1AD0 C3 DF    1A1C            pushal   6864(r3)
    00000000* EF 02 FB 1A20            calls    #2,PRINTF
                       1A27   sym.183:
                 52 D5 1A27            tstl     r2
                 07 12 1A29            bneq     sym.184
    00000000* EF 00 FB 1A2B            calls    #0,EXIT
                       1A32   sym.184:
              02 66 D1 1A32            cmpl     (r6),#2
                 0B 12 1A35            bneq     sym.185
         1B02 C3 DF    1A37            pushal   6914(r3)
    00000000* EF 01 FB 1A3B            calls    #1,PRINTF
                       1A42   sym.185:
           50 04 AC D0 1A42            movl     4(ap),r0
           0300 C0 D6  1A46            incl     768(r0)
                 65 DD 1A4A            pushl    (r5)
    00000000* EF 01 FB 1A4C            calls    #1,FCLOSE
              02 66 D1 1A53            cmpl     (r6),#2
                 0D 12 1A56            bneq     sym.186
                 50 DD 1A58            pushl    r0
         1B2B C3 DF    1A5A            pushal   6955(r3)
    00000000* EF 02 FB 1A5E            calls    #2,PRINTF
                       1A65   sym.186:
                    04 1A65            ret
                       1A66   call_read_recd:
                  003C 1A66            .entry   call_read_recd,^
              5E 04 C2 1A68            subl2    #4,sp
   53 00000000 EF 9E   1A6B            movab    $CHAR_STRING_CON
   55 00000000 EF 9E   1A72            movab    HEYPRINT2,r5
   54 00000000 EF 9E   1A79            movab    DATE7,r4
              10 BC DD 1A80            pushl    @16(ap)
                 01 DD 1A83            pushl    #1
              0C BC DD 1A85            pushl    @12(ap)
              04 AC DD 1A88            pushl    4(ap)
    00000000* EF 04 FB 1A8B            calls    #4,FREAD
              52 50 D0 1A92            movl     r0,r2
              02 65 D1 1A95            cmpl     (r5),#2
                 0D 12 1A98            bneq     sym.187
                 52 DD 1A9A            pushl    r2
         1B5F C3 DF    1A9C            pushal   7007(r3)
    00000000* EF 02 FB 1AA0            calls    #2,PRINTF
                       1AA7   sym.187:
```

```
           52 D5    1AA7            tstl    r2
           15 12    1AA9            bneq    sym.189
        02 65 D1    1AAB            cmpl    (r5),#2
           0B 12    1AAE            bneq    sym.188
     1B84 C3 DF    1AB0            pushal  7044(r3)
00000000* EF 01 FB  1AB4            calls   #1,PRINTF
                    1ABB  sym.188:
        14 BC 01 D0 1ABB            movl    #1,820(ap)
                 04 1ABF            ret
                    1AC0  sym.189:
        02 65 D1    1AC0            cmpl    (r5),#2
           0E 12    1AC3            bneq    sym.190
        18 AC DD    1AC5            pushl   24(ap)
     1B95 C3 DF    1AC8            pushal  7093(r3)
00000000* EF 02 FB  1ACC            calls   #2,PRINTF
                    1AD3  sym.190:
        10 BC DD    1AD3            pushl   816(ap)
           01 DD    1AD6            pushl   #1
        50 04 AC D0 1AD8            movl    4(ap),r0
        7E 04 A0 32 1ADC            cvtwl   4(r0),-(sp)
        03 AC DD    1AE0            pushl   8(ap)
00000000* EF 04 FB  1AE3            calls   #4,FREAD
        52 50 D0    1AEA            movl    r0,r2
        02 65 D1    1AED            cmpl    (r5),#2
           0D 12    1AF0            bneq    sym.191
           52 DD    1AF2            pushl   r2
     1BDC C3 DF    1AF4            pushal  7132(r3)
00000000* EF 02 FB  1AF8            calls   #2,PRINTF
                    1AFF  sym.191:
           52 D5    1AFF            tstl    r2
           15 12    1B01            bneq    sym.192
     1C0E C3 DF    1B03            pushal  7182(r3)
00000000* EF 01 FB  1B07            calls   #1,PRINTF
00000000* EF 00 FB  1B0E            calls   #0,EXIT
                 04 1B15            ret
           50 D5    1B16            tstl    r0
                    1B18  sym.192:
02 00000000 EF D1   1B18            cmpl    HEYPRINT,#2
           0B 12    1B1F            bneq    sym.193
     1C30 C3 DF    1B21            pushal  7216(r3)
00000000* EF 01 FB  1B25            calls   #1,PRINTF
                    1B2C  sym.193:
        50 04 AC D0 1B2C            movl    4(ap),r0
        0308 C0 9F  1B30            pushab  776(r0)
           64 9F    1B34            pushab  (r4)
00000000* EF 02 FB  1B36            calls   #2,SYS$NUMTIM
        02 65 D1    1B3D            cmpl    (r5),#2
           0B 12    1B40            bneq    sym.194
     1C51 C3 DF    1B42            pushal  7249(r3)
00000000* EF 01 FB  1B46            calls   #1,PRINTF
                    1B4D  sym.194:
        02 65 D1    1B4D            cmpl    (r5),#2
           26 12    1B50            bneq    sym.195
        7E 0C A4 32 1B52            cvtwl   12(r4),-(sp)
        7E 0A A4 32 1B56            cvtwl   10(r4),-(sp)
        7E 08 A4 32 1B5A            cvtwl   8(r4),-(sp)
        7E 06 A4 32 1B5E            cvtwl   6(r4),-(sp)
        7E 64 32    1B62            cvtwl   (r4),-(sp)
        7E 02 A4 32 1B65            cvtwl   2(r4),-(sp)
        7E 04 A4 32 1B69            cvtwl   4(r4),-(sp)
     1C98 C3 DF    1B6D            pushal  7320(r3)
00000000* EF 08 FB  1B71            calls   #8,PRINTF
                    1B78  sym.195:
                    1B78  end_subr:
                 04 1B78            ret
```

```
                            1B79  screenchoice:
                 OFFC       1B79         .entry    screenchoice,^m<
           5E 04 C2          1B7B        subl2     #4,sp
52 00000000 EF 9E           1B7E         movab     $CHAR_STRING_CON
54 00000000 EF 9E           1B85         movab     GN_LOWER,r4
53 00000000 EF 9E           1B8C         movab     GN_UPPER,r3
5B 00000000 EF 9E           1B93         movab     OUTFILE4,r11
5A 00000000 EF 9E           1B9A         movab     OUTFILE3,r10
59 00000000 EF 9E           1BA1         movab     OUTFILE2,r9
57 00000000 EF 9E           1BA8         movab     OUTFILE,r7
00000000* EF 00 FB          1BAF         calls     #0,INISH
           55 F5 8F 9A      1BB6         movzbl    #245,r5
                 1B DD      1BBA         pushl     #27
              1CC6 C2 DF    1BBC         pushal    7366(r2)
                 67 DD      1BC0         pushl     (r7)
58 00000000* EF 9E          1BC2         movab     FPRINTF,r8
              68 03 FB      1BC9         calls     #3,(r8)
                 1B DD      1BCC         pushl     #27
              1CCA C2 DF    1BCE         pushal    7370(r2)
                 67 DD      1BD2         pushl     (r7)
              68 03 FB      1BD4         calls     #3,(r8)
                 1B DD      1BD7         pushl     #27
              1CD2 C2 DF    1BD9         pushal    7378(r2)
                 69 DD      1BDD         pushl     (r9)
              68 03 FB      1BDF         calls     #3,(r8)
                 1B DD      1BE2         pushl     #27
              1CD6 C2 DF    1BE4         pushal    7382(r2)
                 69 DD      1BE8         pushl     (r9)
              68 03 FB      1BEA         calls     #3,(r8)
                 1B DD      1BED         pushl     #27
              1CDE C2 DF    1BEF         pushal    7390(r2)
                 6A DD      1BF3         pushl     (r10)
              68 03 FB      1BF5         calls     #3,(r8)
                 1B DD      1BF8         pushl     #27
              1CE2 C2 DF    1BFA         pushal    7394(r2)
                 6A DD      1BFE         pushl     (r10)
              68 03 FB      1C00         calls     #3,(r8)
                 1B DD      1C03         pushl     #27
              1CEA C2 DF    1C05         pushal    7402(r2)
                 6B DD      1C09         pushl     (r11)
              68 03 FB      1C0B         calls     #3,(r8)
                 1B DD      1C0E         pushl     #27
              1CEE C2 DF    1C10         pushal    7406(r2)
                 6B DD      1C14         pushl     (r11)
              68 03 FB      1C16         calls     #3,(r8)
                 1B DD      1C19         pushl     #27
              1CF6 C2 DF    1C1B         pushal    7414(r2)
                 67 DD      1C1F         pushl     (r7)
              68 03 FB      1C21         calls     #3,(r8)
              50 63 9E      1C24         movab     (r3),r0
              5C 64 9E      1C27         movab     (r4),ap
                 67 DD      1C2A         pushl     (r7)
                 55 DD      1C2C         pushl     r5
                 5C DD      1C2E         pushl     ap
                 50 DD      1C30         pushl     r0
56 00000000* EF 9E          1C32         movab     WRITE_SCR1,r6
              66 04 FB      1C39         calls     #4,(r6)
                 55 D6      1C3C         incl      r5
                 1B DD      1C3E         pushl     #27
              1CFE C2 DF    1C40         pushal    7422(r2)
                 67 DD      1C44         pushl     (r7)
              68 03 FB      1C46         calls     #3,(r8)
           50 2C A3 9E      1C49         movab     44(r3),r0
           5C 2C A4 9E      1C4D         movab     44(r4),ap
                 67 DD      1C51         pushl     (r7)
                 55 DD      1C53         pushl     r5
```

|         |    |    |      |        |            |
|---------|----|----|------|--------|------------|
|         | 5C | DD | 1C55 | pushl  | ap         |
|         | 50 | DD | 1C57 | pushl  | r0         |
|      66 | 04 | FB | 1C59 | calls  | #4,(r6)    |
|         | 55 | D6 | 1C5C | incl   | r5         |
|         | 1B | DD | 1C5E | pushl  | #27        |
|    1D05 | C2 | DF | 1C60 | pushal | 7430(r2)   |
|         | 67 | DD | 1C64 | pushl  | (r7)       |
|      68 | 03 | FB | 1C66 | calls  | #3,(r8)    |
|   50 58 | A3 | 9E | 1C69 | movab  | 88(r3),r0  |
|   5C 58 | A4 | 9E | 1C6D | movab  | 88(r4),ap  |
|         | 67 | DD | 1C71 | pushl  | (r7)       |
|         | 55 | DD | 1C73 | pushl  | r5         |
|         | 5C | DD | 1C75 | pushl  | ap         |
|         | 50 | DD | 1C77 | pushl  | r0         |
|      66 | 04 | FB | 1C79 | calls  | #4,(r6)    |
|         | 55 | D6 | 1C7C | incl   | r5         |
|         | 1B | DD | 1C7E | pushl  | #27        |
|    1D0E | C2 | DF | 1C80 | pushal | 7438(r2)   |
|         | 67 | DD | 1C84 | pushl  | (r7)       |
|      68 | 03 | FB | 1C86 | calls  | #3,(r8)    |
| 50 0084 | C3 | 9E | 1C89 | movab  | 132(r3),r0 |
| 5C 0084 | C4 | 9E | 1C8E | movab  | 132(r4),ap |
|         | 67 | DD | 1C93 | pushl  | (r7)       |
|         | 55 | DD | 1C95 | pushl  | r5         |
|         | 5C | DD | 1C97 | pushl  | ap         |
|         | 50 | DD | 1C99 | pushl  | r0         |
|      66 | 04 | FB | 1C9B | calls  | #4,(r6)    |
|         | 55 | D6 | 1C9E | incl   | r5         |
|         | 1B | DD | 1CA0 | pushl  | #27        |
|    1D17 | C2 | DF | 1CA2 | pushal | 7447(r2)   |
|         | 67 | DD | 1CA6 | pushl  | (r7)       |
|      68 | 03 | FB | 1CA8 | calls  | #3,(r8)    |
| 50 00B0 | C3 | 9E | 1CAB | movab  | 176(r3),r0 |
| 5C 00B0 | C4 | 9E | 1CB0 | movab  | 176(r4),ap |
|         | 67 | DD | 1CB5 | pushl  | (r7)       |
|         | 55 | DD | 1CB7 | pushl  | r5         |
|         | 5C | DD | 1CB9 | pushl  | ap         |
|         | 50 | DD | 1CBB | pushl  | r0         |
|      66 | 04 | FB | 1CBD | calls  | #4,(r6)    |
|         | 55 | D6 | 1CC0 | incl   | r5         |
|         | 1B | DD | 1CC2 | pushl  | #27        |
|    1D20 | C2 | DF | 1CC4 | pushal | 7456(r2)   |
|         | 67 | DD | 1CC8 | pushl  | (r7)       |
|      68 | 03 | FB | 1CCA | calls  | #3,(r8)    |
| 50 00DC | C3 | 9E | 1CCD | movab  | 220(r3),r0 |
| 5C 00DC | C4 | 9E | 1CD2 | movab  | 220(r4),ap |
|         | 67 | DD | 1CD7 | pushl  | (r7)       |
|         | 55 | DD | 1CD9 | pushl  | r5         |
|         | 5C | DD | 1CDB | pushl  | ap         |
|         | 50 | DD | 1CDD | pushl  | r0         |
|      66 | 04 | FB | 1CDF | calls  | #4,(r6)    |
|         | 55 | D6 | 1CE2 | incl   | r5         |
|         | 1B | DD | 1CE4 | pushl  | #27        |
|    1D29 | C2 | DF | 1CE6 | pushal | 7465(r2)   |
|         | 67 | DD | 1CEA | pushl  | (r7)       |
|      68 | 03 | FB | 1CEC | calls  | #3,(r8)    |
| 50 0108 | C3 | 9E | 1CEF | movab  | 264(r3),r0 |
| 5C 0108 | C4 | 9E | 1CF4 | movab  | 264(r4),ap |
|         | 67 | DD | 1CF9 | pushl  | (r7)       |
|         | 55 | DD | 1CFB | pushl  | r5         |
|         | 5C | DD | 1CFD | pushl  | ap         |
|         | 50 | DD | 1CFF | pushl  | r0         |
|      66 | 04 | FB | 1D01 | calls  | #4,(r6)    |
|         | 55 | D6 | 1D04 | incl   | r5         |
|         | 1B | DD | 1D06 | pushl  | #27        |
|    1D32 | C2 | DF | 1D08 | pushal | 7474(r2)   |

```
            69 DD      1D0C        pushl   (r9)
         68 03 FB      1D0E        calls   #3,(r8)
  50 0160 C3 9E        1D11        movab   352(r3),r0
  5C 0160 C4 9E        1D16        movab   352(r4),ap
            69 DD      1D1B        pushl   (r9)
            55 DD      1D1D        pushl   r5
            5C DD      1D1F        pushl   ap
            50 DD      1D21        pushl   r0
         66 04 FB      1D23        calls   #4,(r6)
            55 D6      1D26        incl    r5
            1B DD      1D28        pushl   #27
    1D3A C2 DF         1D2A        pushal  7482(r2)
            69 DD      1D2E        pushl   (r9)
         68 03 FB      1D30        calls   #3,(r8)
  50 018C C3 9E        1D33        movab   396(r3),r0
  5C 018C C4 9E        1D38        movab   396(r4),ap
            69 DD      1D3D        pushl   (r9)
            55 DD      1D3F        pushl   r5
            5C DD      1D41        pushl   ap
            50 DD      1D43        pushl   r0
         66 04 FB      1D45        calls   #4,(r6)
            55 D6      1D48        incl    r5
            1B DD      1D4A        pushl   #27
    1D42 C2 DF         1D4C        pushal  7490(r2)
            69 DD      1D50        pushl   (r9)
         68 03 FB      1D52        calls   #3,(r8)
  50 01B8 C3 9E        1D55        movab   440(r3),r0
  5C 01B8 C4 9E        1D5A        movab   440(r4),ap
            69 DD      1D5F        pushl   (r9)
            55 DD      1D61        pushl   r5
            5C DD      1D63        pushl   ap
            50 DD      1D65        pushl   r0
         66 04 FB      1D67        calls   #4,(r6)
            55 D6      1D6A        incl    r5
            1B DD      1D6C        pushl   #27
    1D4A C2 DF         1D6E        pushal  7498(r2)
            69 DD      1D72        pushl   (r9)
         68 03 FB      1D74        calls   #3,(r8)
  50 01E4 C3 9E        1D77        movab   484(r3),r0
  5C 01E4 C4 9E        1D7C        movab   484(r4),ap
            69 DD      1D81        pushl   (r9)
            55 DD      1D83        pushl   r5
            5C DD      1D85        pushl   ap
            50 DD      1D87        pushl   r0
         66 04 FB      1D89        calls   #4,(r6)
            55 D6      1D8C        incl    r5
            1B DD      1D8E        pushl   #27
    1D53 C2 DF         1D90        pushal  7507(r2)
            69 DD      1D94        pushl   (r9)
         68 03 FB      1D96        calls   #3,(r8)
  50 0210 C3 9E        1D99        movab   528(r3),r0
  5C 0210 C4 9E        1D9E        movab   528(r4),ap
            69 DD      1DA3        pushl   (r9)
            55 DD      1DA5        pushl   r5
            5C DD      1DA7        pushl   ap
            50 DD      1DA9        pushl   r0
         66 04 FB      1DAB        calls   #4,(r6)
            55 D6      1DAE        incl    r5
            1B DD      1DB0        pushl   #27
    1D5C C2 DF         1DB2        pushal  7516(r2)
            69 DD      1DB6        pushl   (r9)
         68 03 FB      1DB8        calls   #3,(r8)
  50 023C C3 9E        1DBB        movab   572(r3),r0
  5C 023C C4 9E        1DC0        movab   572(r4),ap
            69 DD      1DC5        pushl   (r9)
```

```
          55 DD     1DC7     pushl    r5
          5C DD     1DC9     pushl    ap
          50 DD     1DCB     pushl    r0
       66 04 FB    1DCD     calls    #4,(r6)
          55 D6    1DD0     incl     r5
          1B DD    1DD2     pushl    #27
   1D65 C2 DF     1DD4     pushal   7525(r2)
          69 DD    1DD8     pushl    (r9)
       68 03 FB    1DDA     calls    #3,(r8)
   50 0268 C3 9E  1DDD     movab    616(r3),r0
   5C 0268 C4 9E  1DE2     movab    616(r4),ap
          69 DD    1DE7     pushl    (r9)
          55 DD    1DE9     pushl    r5
          5C DD    1DEB     pushl    ap
          50 DD    1DED     pushl    r0
       66 04 FB    1DEF     calls    #4,(r6)
          55 D6    1DF2     incl     r5
          1B DD    1DF4     pushl    #27
   1D6E C2 DF     1DF6     pushal   7534(r2)
          6B DD    1DFA     pushl    (r11)
       68 03 FB    1DFC     calls    #3,(r8)
   50 0294 C3 9E  1DFF     movab    660(r3),r0
   5C 0294 C4 9E  1E04     movab    660(r4),ap
          6B DD    1E09     pushl    (r11)
          55 DD    1E0B     pushl    r5
          5C DD    1E0D     pushl    ap
          50 DD    1E0F     pushl    r0
       66 04 FB    1E11     calls    #4,(r6)
          55 D6    1E14     incl     r5
          1B DD    1E16     pushl    #27
   1D76 C2 DF     1E18     pushal   7542(r2)
          6A DD    1E1C     pushl    (r10)
       68 03 FB    1E1E     calls    #3,(r8)
   50 02C0 C3 9E  1E21     movab    704(r3),r0
   5C 02C0 C4 9E  1E26     movab    704(r4),ap
          6A DD    1E2B     pushl    (r10)
          55 DD    1E2D     pushl    r5
          5C DD    1E2F     pushl    ap
          50 DD    1E31     pushl    r0
56 00000000* EF 9E 1E33    movab    WRITE_SCR2,r6
       66 04 FB    1E3A     calls    #4,(r6)
          55 D6    1E3D     incl     r5
          1B DD    1E3F     pushl    #27
   1D7E C2 DF     1E41     pushal   7550(r2)
          6A DD    1E45     pushl    (r10)
       68 03 FB    1E47     calls    #3,(r8)
   50 02EC C3 9E  1E4A     movab    748(r3),r0
   5C 02EC C4 9E  1E4F     movab    748(r4),ap
          6A DD    1E54     pushl    (r10)
          55 DD    1E56     pushl    r5
          5C DD    1E58     pushl    ap
          50 DD    1E5A     pushl    r0
       66 04 FB    1E5C     calls    #4,(r6)
          55 D6    1E5F     incl     r5
          1B DD    1E61     pushl    #27
   1D86 C2 DF     1E63     pushal   7558(r2)
          6A DD    1E67     pushl    (r10)
       68 03 FB    1E69     calls    #3,(r8)
   50 0318 C3 9E  1E6C     movab    792(r3),r0
   5C 0318 C4 9E  1E71     movab    792(r4),ap
          6A DD    1E76     pushl    (r10)
          55 DD    1E78     pushl    r5
          5C DD    1E7A     pushl    ap
          50 DD    1E7C     pushl    r0
       66 04 FB    1E7E     calls    #4,(r6)
          55 D6    1E81     incl     r5
```

```
              1B DD    1E83              pushl    #27
        1D3E  C2 DF    1E85              pushal   7566(r2)
              6A DD    1E89              pushl    (r10)
              68 03 FB 1E8B              calls    #3,(r8)
        50 0344 C3 9E  1E8E              movab    836(r3),r0
        5C 0344 C4 9E  1E93              movab    836(r4),ap
              6A DD    1E98              pushl    (r10)
              55 DD    1E9A              pushl    r5
              5C DD    1E9C              pushl    ap
              50 DD    1E9E              pushl    r0
              66 04 FB 1EA0              calls    #4,(r6)
              04       1EA3              ret
                       1EA4   inish:
              007C     1EA4              .entry   inish,^m<r2,r3,r
              5E 04 C2 1EA6              subl2    #4,sp
  5C 00000000 EF 9E    1EA9              movab    $CHAR_STRING_CON
  56 00000000 EF 9E    1EB0              movab    OUTFILE4,r6
  55 00000000 EF 9E    1EB7              movab    OUTFILE3,r5
  53 00000000 EF 9E    1EBE              movab    OUTFILE2,r3
  54 00000000 EF 9E    1EC5              movab    OUTFILE,r4
        1D9D  CC DF    1ECC              pushal   7581(ap)
        1D97  CC DF    1ED0              pushal   7575(ap)
  52 00000000* EF 9E   1ED4              movab    FOPEN,r2
              62 02 FB 1ED8              calls    #2,(r2)
              64 50 DD 1EDE              movl     r0,(r4)
        1DA5  CC DF    1EE1              pushal   7589(ap)
        1D9F  CC DF    1EE5              pushal   7583(ap)
              62 02 FB 1EE9              calls    #2,(r2)
              63 50 DD 1EEC              movl     r0,(r3)
        1DAD  CC DF    1EEF              pushal   7597(ap)
        1DA7  CC DF    1EF3              pushal   7591(ap)
              62 02 FB 1EF7              calls    #2,(r2)
              65 50 DD 1EFA              movl     r0,(r5)
        1DB5  CC DF    1EFD              pushal   7605(ap)
        1DAF  CC DF    1F01              pushal   7599(ap)
              62 02 FB 1F05              calls    #2,(r2)
              66 50 DD 1F08              movl     r0,(r6)
              64 D5    1F0B              tstl     (r4)
              14 12    1F0D              bneq     sym.196
              64 DD    1F0F              pushl    (r4)
        1DB7  CC DF    1F11              pushal   7607(ap)
  00000000* EF 02 FB   1F15              calls    #2,PRINTF
  00000000* EF 00 FB   1F1C              calls    #0,EXIT
                       1F23   sym.196:
              63 D5    1F23              tstl     (r3)
              14 12    1F25              bneq     sym.197
              63 DD    1F27              pushl    (r3)
        1DF3  CC DF    1F29              pushal   7672(ap)
  00000000* EF 02 FB   1F2D              calls    #2,PRINTF
  00000000* EF 00 FB   1F34              calls    #0,EXIT
                       1F3B   sym.197:
              65 D5    1F3B              tstl     (r5)
              14 12    1F3D              bneq     sym.198
              65 DD    1F3F              pushl    (r5)
        1E3B  CC DF    1F41              pushal   7739(ap)
  00000000* EF 02 FB   1F45              calls    #2,PRINTF
  00000000* EF 00 FB   1F4C              calls    #0,EXIT
                       1F53   sym.198:
              66 D5    1F53              tstl     (r6)
              14 12    1F55              bneq     sym.199
              66 DD    1F57              pushl    (r6)
        1E7E  CC DF    1F59              pushal   7806(ap)
  00000000* EF 02 FB   1F5D              calls    #2,PRINTF
  00000000* EF 00 FB   1F64              calls    #0,EXIT
                       1F6B   sym.199:
              13 DD    1F6B              pushl    #27
```

|  |  |  |  |  |
|---|---|---|---|---|
|  | 1EC2 CC DF | 1F6D | pushal | 7874(ap) |
|  | 64 DD | 1F71 | pushl | (r4) |
| 52 00000000* | EF 9E | 1F73 | movab | FPRINTF,r2 |
|  | 62 03 FB | 1F7A | calls | #3,(r2) |
|  | 1B DD | 1F7D | pushl | #27 |
|  | 1EC9 CC DF | 1F7F | pushal | 7881(ap) |
|  | 63 DD | 1F83 | pushl | (r3) |
|  | 62 03 FB | 1F85 | calls | #3,(r2) |
|  | 1B DD | 1F88 | pushl | #27 |
|  | 1ED0 CC DF | 1F8A | pushal | 7888(ap) |
|  | 65 DD | 1F8E | pushl | (r5) |
|  | 62 03 FB | 1F90 | calls | #3,(r2) |
|  | 1B DD | 1F93 | pushl | #27 |
|  | 1ED7 CC DF | 1F95 | pushal | 7895(ap) |
|  | 66 DD | 1F99 | pushl | (r6) |
|  | 62 03 FB | 1F9B | calls | #3,(r2) |
|  | 1B DD | 1F9E | pushl | #27 |
|  | 1EDE CC DF | 1FA0 | pushal | 7902(ap) |
|  | 64 DD | 1FA4 | pushl | (r4) |
|  | 62 03 FB | 1FA6 | calls | #3,(r2) |
|  | 1B DD | 1FA9 | pushl | #27 |
|  | 1EE4 CC DF | 1FAB | pushal | 7908(ap) |
|  | 63 DD | 1FAF | pushl | (r3) |
|  | 62 03 FB | 1FB1 | calls | #3,(r2) |
|  | 1B DD | 1FB4 | pushl | #27 |
|  | 1EEA CC DF | 1FB6 | pushal | 7914(ap) |
|  | 65 DD | 1FBA | pushl | (r5) |
|  | 62 03 FB | 1FBC | calls | #3,(r2) |
|  | 1B DD | 1FBF | pushl | #27 |
|  | 1EF0 CC DF | 1FC1 | pushal | 7920(ap) |
|  | 66 DD | 1FC5 | pushl | (r6) |
|  | 62 03 FB | 1FC7 | calls | #3,(r2) |
|  | 1B DD | 1FCA | pushl | #27 |
|  | 1EF6 CC DF | 1FCC | pushal | 7926(ap) |
|  | 64 DD | 1FD0 | pushl | (r4) |
|  | 62 03 FB | 1FD2 | calls | #3,(r2) |
|  | 1B DD | 1FD5 | pushl | #27 |
|  | 1EFD CC DF | 1FD7 | pushal | 7933(ap) |
|  | 63 DD | 1FDB | pushl | (r3) |
|  | 62 03 FB | 1FDD | calls | #3,(r2) |
|  | 1B DD | 1FE0 | pushl | #27 |
|  | 1F04 CC DF | 1FE2 | pushal | 7940(ap) |
|  | 65 DD | 1FE6 | pushl | (r5) |
|  | 62 03 FB | 1FE8 | calls | #3,(r2) |
|  | 1B DD | 1FEB | pushl | #27 |
|  | 1F0B CC DF | 1FED | pushal | 7947(ap) |
|  | 66 DD | 1FF1 | pushl | (r6) |
|  | 62 03 FB | 1FF3 | calls | #3,(r2) |
|  | 1B DD | 1FF6 | pushl | #27 |
|  | 1B DD | 1FF8 | pushl | #27 |
|  | 1F12 CC DF | 1FFA | pushal | 7954(ap) |
|  | 64 DD | 1FFE | pushl | (r4) |
|  | 62 04 FB | 2000 | calls | #4,(r2) |
|  | 1B DD | 2003 | pushl | #27 |
|  | 1B DD | 2005 | pushl | #27 |
|  | 1F2B CC DF | 2007 | pushal | 7979(ap) |
|  | 63 DD | 200B | pushl | (r3) |
|  | 62 04 FB | 200D | calls | #4,(r2) |
|  | 1B DD | 2010 | pushl | #27 |
|  | 1B DD | 2012 | pushl | #27 |
|  | 1F44 CC DF | 2014 | pushal | 8004(ap) |
|  | 65 DD | 2018 | pushl | (r5) |
|  | 62 04 FB | 201A | calls | #4,(r2) |
|  | 1B DD | 201D | pushl | #27 |
|  | 1B DD | 201F | pushl | #27 |

|  |  |  |  |  |
|---|---|---|---|---|
| 1F5D | CC DF | 2021 | pushal | 8029(ap) |
|  | 66 DD | 2025 | pushl | (r6) |
|  | 62 04 FB | 2027 | calls | #4,(r2) |
|  | 1B DD | 202A | pushl | #27 |
| 1F76 | CC DF | 202C | pushal | 8054(ap) |
|  | 64 DD | 2030 | pushl | (r4) |
|  | 62 03 FB | 2032 | calls | #3,(r2) |
|  | 1B DD | 2035 | pushl | #27 |
| 1F7E | CC DF | 2037 | pushal | 8062(ap) |
|  | 63 DD | 203B | pushl | (r3) |
|  | 62 03 FB | 203D | calls | #3,(r2) |
|  | 1B DD | 2040 | pushl | #27 |
| 1F86 | CC DF | 2042 | pushal | 8070(ap) |
|  | 65 DD | 2046 | pushl | (r5) |
|  | 62 03 FB | 2048 | calls | #3,(r2) |
|  | 1B DD | 204B | pushl | #27 |
| 1F8E | CC DF | 204D | pushal | 8078(ap) |
|  | 66 DD | 2051 | pushl | (r6) |
|  | 62 03 FB | 2053 | calls | #3,(r2) |
|  | 1B DD | 2056 | pushl | #27 |
| 1F96 | CC DF | 2058 | pushal | 8086(ap) |
|  | 64 DD | 205C | pushl | (r4) |
|  | 62 03 FB | 205E | calls | #3,(r2) |
|  | 1B DD | 2061 | pushl | #27 |
| 1F9D | CC DF | 2063 | pushal | 8093(ap) |
|  | 63 DD | 2067 | pushl | (r3) |
|  | 62 03 FB | 2069 | calls | #3,(r2) |
|  | 1B DD | 206C | pushl | #27 |
| 1FA4 | CC DF | 206E | pushal | 8100(ap) |
|  | 65 DD | 2072 | pushl | (r5) |
|  | 62 03 FB | 2074 | calls | #3,(r2) |
|  | 1B DD | 2077 | pushl | #27 |
| 1FAB | CC DF | 2079 | pushal | 8107(ap) |
|  | 66 DD | 207D | pushl | (r6) |
|  | 62 03 FB | 207F | calls | #3,(r2) |
|  | 1B DD | 2082 | pushl | #27 |
| 1FB2 | CC DF | 2084 | pushal | 8114(ap) |
|  | 64 DD | 2088 | pushl | (r4) |
|  | 62 03 FB | 208A | calls | #3,(r2) |
|  | 1B DD | 208D | pushl | #27 |
| 1FBA | CC DF | 208F | pushal | 8122(ap) |
|  | 63 DD | 2093 | pushl | (r3) |
|  | 62 03 FB | 2095 | calls | #3,(r2) |
|  | 1B DD | 2098 | pushl | #27 |
| 1FC2 | CC DF | 209A | pushal | 8130(ap) |
|  | 65 DD | 209E | pushl | (r5) |
|  | 62 03 FB | 20A0 | calls | #3,(r2) |
|  | 1B DD | 20A3 | pushl | #27 |
| 1FCA | CC DF | 20A5 | pushal | 8138(ap) |
|  | 66 DD | 20A9 | pushl | (r6) |
|  | 62 03 FB | 20AB | calls | #3,(r2) |
|  | 1B DD | 20AE | pushl | #27 |
| 1FD2 | CC DF | 20B0 | pushal | 8146(ap) |
|  | 64 DD | 20B4 | pushl | (r4) |
|  | 62 03 FB | 20B6 | calls | #3,(r2) |
|  | 1B DD | 20B9 | pushl | #27 |
| 1FD7 | CC DF | 20BB | pushal | 8151(ap) |
|  | 63 DD | 20BF | pushl | (r3) |
|  | 62 03 FB | 20C1 | calls | #3,(r2) |
|  | 1B DD | 20C4 | pushl | #27 |
| 1FDC | CC DF | 20C6 | pushal | 8156(ap) |
|  | 65 DD | 20CA | pushl | (r5) |
|  | 62 03 FB | 20CC | calls | #3,(r2) |
|  | 1B DD | 20CF | pushl | #27 |
| 1FE1 | CC DF | 20D1 | pushal | 8161(ap) |

```
              66 DD      20D5              pushl    (r6)
           62 03 FB      20D7              calls    #3,(r2)
                 04      20DA              ret
                         20DB  write_scr1:
               0000      20DB              .entry   write_scr1,^m<>
            5E 04 C2     20DD              subl2    #4,sp
         7E B0 8F 9A     20E0              movzbl   #176,-(sp)
            0C AC DD     20E4              pushl    12(ap)
               1B DD     20E7              pushl    #27
            04 AC DD     20E9              pushl    4(ap)
            10 AC DD     20EC              pushl    16(ap)
   00000000* EF 05 FB    20EF              calls    #5,FPRINTF
         7E B0 8F 9A     20F6              movzbl   #176,-(sp)
            0C AC DD     20FA              pushl    12(ap)
               1B DD     20FD              pushl    #27
            08 AC DD     20FF              pushl    8(ap)
            10 AC DD     2102              pushl    16(ap)
   00000000* EF 05 FB    2105              calls    #5,FPRINTF
                 04      210C              ret
                         210D  write_scr2:
               0000      210D              .entry   write_scr2,^m<>
            5E 04 C2     210F              subl2    #4,sp
            0C AC DD     2112              pushl    12(ap)
               1B DD     2115              pushl    #27
            04 AC DD     2117              pushl    4(ap)
            10 AC DD     211A              pushl    16(ap)
   00000000* EF 04 FB    211D              calls    #4,FPRINTF
            0C AC DD     2124              pushl    12(ap)
               1B DD     2127              pushl    #27
            08 AC DD     2129              pushl    8(ap)
            10 AC DD     212C              pushl    16(ap)
   00000000* EF 04 FB    212F              calls    #4,FPRINTF
                 04      2136              ret
                         2137  update:
               0FFC      2137              .entry   update,^m<r2,r3,
            5E 24 C2     2139              subl2    #36,sp
      54 00000000 EF 9E  213C              movab    $CHAR_STRING_CON
      5B 00000000 EF 9E  2143              movab    OUTFILE3,r11
      5A 00000000 EF 9E  214A              movab    OUTFILE2,r10
      59 00000000 EF 9E  2151              movab    OUTFILE,r9
      55 00000000 EF 9E  2153              movab    $DATA,r5
   53 08 AC 00000058 8F C5  215F           mull3    #88,8(ap),r3
           56 04 AC D0   2163              movl     4(ap),r6
           52 0A A643 9E 216C              movab    10(r6)[r3],r2
           F8 AD 62 4A   2171              cvtfl    (r2),-8(fp)
               1B DD     2175              pushl    #27
           1FE6 C4 DF    2177              pushal   8166(r4)
               69 DD     217B              pushl    (r9)
      57 00000000* EF 9E 217D              movab    FPRINTF,r7
            67 03 FB     2184              calls    #3,(r7)
            F8 AD DD     2187              pushl    -8(fp)
               1B DD     218A              pushl    #27
           1FEF C4 DF    218C              pushal   8175(r4)
               69 DD     2190              pushl    (r9)
            67 04 FB     2192              calls    #4,(r7)
               1B DD     2195              pushl    #27
           1FF7 C4 DF    2197              pushal   8183(r4)
               69 DD     219B              pushl    (r9)
            67 03 FB     219D              calls    #3,(r7)
            F8 AD DD     21A0              pushl    -8(fp)
               1B DD     21A3              pushl    #27
           2000 C4 DF    21A5              pushal   8192(r4)
               69 DD     21A9              pushl    (r9)
            67 04 FB     21AB              calls    #4,(r7)
           52 0E A643 9E 21AE              movab    14(r6)[r3],r2
```

| | | | | |
|---|---|---|---|---|
| F8 AD 62 4A | | 21B3 | cvtfl | (r2),-8(fp) |
| | 1B DD | 21B7 | pushl | #27 |
| 2003 C4 DF | | 21B9 | pushal | 8200(r4) |
| | 69 DD | 21BD | pushl | (r9) |
| | 67 03 FB | 21BF | calls | #3,(r7) |
| F8 AD DD | | 21C2 | pushl | -8(fp) |
| | 1B DD | 21C5 | pushl | #27 |
| 2011 C4 DF | | 21C7 | pushal | 8209(r4) |
| | 69 DD | 21CB | pushl | (r9) |
| | 67 04 FB | 21CD | calls | #4,(r7) |
| | 1B DD | 21D0 | pushl | #27 |
| 2019 C4 DF | | 21D2 | pushal | 8217(r4) |
| | 69 DD | 21D6 | pushl | (r9) |
| | 67 03 FB | 21D8 | calls | #3,(r7) |
| F8 AD DD | | 21DB | pushl | -8(fp) |
| | 1B DD | 21DE | pushl | #27 |
| 2022 C4 DF | | 21E0 | pushal | 8226(r4) |
| | 69 DD | 21E4 | pushl | (r9) |
| | 67 04 FB | 21E6 | calls | #4,(r7) |
| 52 12 A643 9E | | 21E9 | movab | 18(r6)[r3],r2 |
| F8 AD 62 4A | | 21EE | cvtfl | (r2),-8(fp) |
| | 1B DD | 21F2 | pushl | #27 |
| 202A C4 DF | | 21F4 | pushal | 8234(r4) |
| | 69 DD | 21F8 | pushl | (r9) |
| | 67 03 FB | 21FA | calls | #3,(r7) |
| F8 AD DD | | 21FD | pushl | -8(fp) |
| | 1B DD | 2200 | pushl | #27 |
| 2033 C4 DF | | 2202 | pushal | 8243(r4) |
| | 69 DD | 2206 | pushl | (r9) |
| | 67 04 FB | 2208 | calls | #4,(r7) |
| | 1B DD | 220B | pushl | #27 |
| 203B C4 DF | | 220D | pushal | 8251(r4) |
| | 69 DD | 2211 | pushl | (r9) |
| | 67 03 FB | 2213 | calls | #3,(r7) |
| F8 AD DD | | 2216 | pushl | -8(fp) |
| | 1B DD | 2219 | pushl | #27 |
| 2044 C4 DF | | 221B | pushal | 8260(r4) |
| | 69 DD | 221F | pushl | (r9) |
| | 67 04 FB | 2221 | calls | #4,(r7) |
| 52 16 A643 9E | | 2224 | movab | 22(r6)[r3],r2 |
| F8 AD 62 4A | | 2229 | cvtfl | (r2),-8(fp) |
| | 1B DD | 222D | pushl | #27 |
| 204C C4 DF | | 222F | pushal | 8268(r4) |
| | 69 DD | 2233 | pushl | (r9) |
| | 67 03 FB | 2235 | calls | #3,(r7) |
| F8 AD DD | | 2238 | pushl | -8(fp) |
| | 1B DD | 223B | pushl | #27 |
| 2056 C4 DF | | 223D | pushal | 8278(r4) |
| | 69 DD | 2241 | pushl | (r9) |
| | 67 04 FB | 2243 | calls | #4,(r7) |
| | 1B DD | 2246 | pushl | #27 |
| 205E C4 DF | | 2248 | pushal | 8286(r4) |
| | 69 DD | 224C | pushl | (r9) |
| | 67 03 FB | 224E | calls | #3,(r7) |
| F8 AD DD | | 2251 | pushl | -8(fp) |
| | 1B DD | 2254 | pushl | #27 |
| 2068 C4 DF | | 2256 | pushal | 8296(r4) |
| | 69 DD | 225A | pushl | (r9) |
| | 67 04 FB | 225C | calls | #4,(r7) |
| 52 1A A643 9E | | 225F | movab | 26(r6)[r3],r2 |
| F8 AD 62 4A | | 2264 | cvtfl | (r2),-8(fp) |
| | 1B DD | 2268 | pushl | #27 |
| 2070 C4 DF | | 226A | pushal | 8304(r4) |
| | 69 DD | 226E | pushl | (r9) |
| | 67 03 FB | 2270 | calls | #3,(r7) |

```
F8 AD DD        2273    pushl   -8(fp)
    1B DD       2276    pushl   #27
207A C4 DF      2278    pushal  8314(r4)
    69 DD       227C    pushl   (r9)
    67 04 FB    227E    calls   #4,(r7)
    1B DD       2281    pushl   #27
2082 C4 DF      2283    pushal  8322(r4)
    69 DD       2287    pushl   (r9)
    67 03 FB    2289    calls   #3,(r7)
F8 AD DD        228C    pushl   -8(fp)
    1B DD       228F    pushl   #27
208C C4 DF      2291    pushal  8332(r4)
    69 DD       2295    pushl   (r9)
    67 04 FB    2297    calls   #4,(r7)
52 1E A643 9E   229A    movab   30(r6)[r3],r2
F8 AD 62 4A     229F    cvtfl   (r2),-8(fp)
    1B DD       22A3    pushl   #27
2094 C4 DF      22A5    pushal  8340(r4)
    69 DD       22A9    pushl   (r9)
    67 03 FB    22AB    calls   #3,(r7)
F8 AD DD        22AE    pushl   -8(fp)
    1B DD       22B1    pushl   #27
209E C4 DF      22B3    pushal  8350(r4)
    69 DD       22B7    pushl   (r9)
    67 04 FB    22B9    calls   #4,(r7)
    1B DD       22BC    pushl   #27
20A6 C4 DF      22BE    pushal  8358(r4)
    69 DD       22C2    pushl   (r9)
    67 03 FB    22C4    calls   #3,(r7)
F8 AD DD        22C7    pushl   -8(fp)
    1B DD       22CA    pushl   #27
20B0 C4 DF      22CC    pushal  8368(r4)
    69 DD       22D0    pushl   (r9)
    67 04 FB    22D2    calls   #4,(r7)
52 22 A643 9E   22D5    movab   34(r6)[r3],r2
F8 AD 62 4A     22DA    cvtfl   (r2),-8(fp)
    1B DD       22DE    pushl   #27
20B8 C4 DF      22E0    pushal  8376(r4)
    69 DD       22E4    pushl   (r9)
    67 03 FB    22E6    calls   #3,(r7)
F8 AD DD        22E9    pushl   -8(fp)
    1B DD       22EC    pushl   #27
20C2 C4 DF      22EE    pushal  8386(r4)
    69 DD       22F2    pushl   (r9)
    67 04 FB    22F4    calls   #4,(r7)
    1B DD       22F7    pushl   #27
20CA C4 DF      22F9    pushal  8394(r4)
    69 DD       22FD    pushl   (r9)
    67 03 FB    22FF    calls   #3,(r7)
F8 AD DD        2302    pushl   -8(fp)
    1B DD       2305    pushl   #27
20D4 C4 DF      2307    pushal  8404(r4)
    69 DD       230B    pushl   (r9)
    67 04 FB    230D    calls   #4,(r7)
52 2A A643 9E   2310    movab   42(r6)[r3],r2
F8 AD 62 4A     2315    cvtfl   (r2),-8(fp)
    1B DD       2319    pushl   #27
20DC C4 DF      231B    pushal  8412(r4)
    6A DD       231F    pushl   (r10)
    67 03 FB    2321    calls   #3,(r7)
F8 AD DD        2324    pushl   -8(fp)
    1B DD       2327    pushl   #27
20E5 C4 DF      2329    pushal  8421(r4)
    6A DD       232D    pushl   (r10)
    67 04 FB    232F    calls   #4,(r7)
    1B DD       2332    pushl   #27
```

|  |  |  |  |  |
|---|---|---|---|---|
| 20ED | C4 DF | 2334 | pushal | 8429(r4) |
|  | 6A DD | 2338 | pushl | (r10) |
|  | 67 03 FB | 233A | calls | #3,(r7) |
|  | F8 AD DD | 233D | pushl | -8(fp) |
|  | 1B DD | 2340 | pushl | #27 |
| 20F6 | C4 DF | 2342 | pushal | 8438(r4) |
|  | 6A DD | 2346 | pushl | (r10) |
|  | 67 04 FB | 2348 | calls | #4,(r7) |
| 52 2E A643 9E | | 234B | movab | 46(r6)[r3],r2 |
| F8 AD 62 4A | | 2350 | cvtfl | (r2),-8(fp) |
|  | 1B DD | 2354 | pushl | #27 |
| 20FE | C4 DF | 2356 | pushal | 8446(r4) |
|  | 6A DD | 235A | pushl | (r10) |
|  | 67 03 FB | 235C | calls | #3,(r7) |
|  | F8 AD DD | 235F | pushl | -8(fp) |
|  | 1B DD | 2362 | pushl | #27 |
| 2107 | C4 DF | 2364 | pushal | 8455(r4) |
|  | 6A DD | 2368 | pushl | (r10) |
|  | 67 04 FB | 236A | calls | #4,(r7) |
|  | 1B DD | 236D | pushl | #27 |
| 210F | C4 DF | 236F | pushal | 8463(r4) |
|  | 6A DD | 2373 | pushl | (r10) |
|  | 67 03 FB | 2375 | calls | #3,(r7) |
|  | F8 AD DD | 2378 | pushl | -8(fp) |
|  | 1B DD | 237B | pushl | #27 |
| 2118 | C4 DF | 237D | pushal | 8472(r4) |
|  | 6A DD | 2381 | pushl | (r10) |
|  | 67 04 FB | 2383 | calls | #4,(r7) |
| 52 32 A643 9E | | 2386 | movab | 50(r6)[r3],r2 |
| F8 AD 62 4A | | 238B | cvtfl | (r2),-8(fp) |
|  | 1B DD | 238F | pushl | #27 |
| 2120 | C4 DF | 2391 | pushal | 8480(r4) |
|  | 6A DD | 2395 | pushl | (r10) |
|  | 67 03 FB | 2397 | calls | #3,(r7) |
|  | F8 AD DD | 239A | pushl | -8(fp) |
|  | 1B DD | 239D | pushl | #27 |
| 2129 | C4 DF | 239F | pushal | 8489(r4) |
|  | 6A DD | 23A3 | pushl | (r10) |
|  | 67 04 FB | 23A5 | calls | #4,(r7) |
|  | 1B DD | 23A8 | pushl | #27 |
| 2131 | C4 DF | 23AA | pushal | 8497(r4) |
|  | 6A DD | 23AE | pushl | (r10) |
|  | 67 03 FB | 23B0 | calls | #3,(r7) |
|  | F8 AD DD | 23B3 | pushl | -8(fp) |
|  | 1B DD | 23B6 | pushl | #27 |
| 213A | C4 DF | 23B8 | pushal | 8506(r4) |
|  | 6A DD | 23BC | pushl | (r10) |
|  | 67 04 FB | 23BE | calls | #4,(r7) |
| 52 36 A643 9E | | 23C1 | movab | 54(r6)[r3],r2 |
| F8 AD 62 4A | | 23C6 | cvtfl | (r2),-8(fp) |
|  | 1B DD | 23CA | pushl | #27 |
| 2142 | C4 DF | 23CC | pushal | 8514(r4) |
|  | 6A DD | 23D0 | pushl | (r10) |
|  | 67 03 FB | 23D2 | calls | #3,(r7) |
|  | F8 AD DD | 23D5 | pushl | -8(fp) |
|  | 1B DD | 23D8 | pushl | #27 |
| 214C | C4 DF | 23DA | pushal | 8524(r4) |
|  | 6A DD | 23DE | pushl | (r10) |
|  | 67 04 FB | 23E0 | calls | #4,(r7) |
|  | 1B DD | 23E3 | pushl | #27 |
| 2154 | C4 DF | 23E5 | pushal | 8532(r4) |
|  | 6A DD | 23E9 | pushl | (r10) |
|  | 67 03 FB | 23EB | calls | #3,(r7) |
|  | F8 AD DD | 23EE | pushl | -8(fp) |
|  | 1B DD | 23F1 | pushl | #27 |

```
215E C4 DF      23F3        pushal   8542(r4)
     6A DD      23F7        pushl    (r10)
     67 04 FB   23F9        calls    #4,(r7)
52 3A A643 9E   23FC        movab    58(r6)[r3],r2
F8 AD 62 4A     2401        cvtfl    (r2),-8(fp)
     1B DD      2405        pushl    #27
2166 C4 DF      2407        pushal   8550(r4)
     6A DD      240B        pushl    (r10)
     67 03 FB   240D        calls    #3,(r7)
     F8 AD DD   2410        pushl    -8(fp)
     1B DD      2413        pushl    #27
2170 C4 DF      2415        pushal   8560(r4)
     6A DD      2419        pushl    (r10)
     67 04 FB   241B        calls    #4,(r7)
     1B DD      241E        pushl    #27
2178 C4 DF      2420        pushal   8568(r4)
     6A DD      2424        pushl    (r10)
     67 03 FB   2426        calls    #3,(r7)
     F8 AD DD   2429        pushl    -8(fp)
     1B DD      242C        pushl    #27
2182 C4 DF      242E        pushal   8578(r4)
     6A DD      2432        pushl    (r10)
     67 04 FB   2434        calls    #4,(r7)
52 3E A643 9E   2437        movab    62(r6)[r3],r2
F8 AD 62 4A     243C        cvtfl    (r2),-8(fp)
     1B DD      2440        pushl    #27
218A C4 DF      2442        pushal   8586(r4)
     6A DD      2446        pushl    (r10)
     67 03 FB   2448        calls    #3,(r7)
     F8 AD DD   244B        pushl    -8(fp)
     1B DD      244E        pushl    #27
2194 C4 DF      2450        pushal   8596(r4)
     6A DD      2454        pushl    (r10)
     67 04 FB   2456        calls    #4,(r7)
     1B DD      2459        pushl    #27
219C C4 DF      245B        pushal   8604(r4)
     6A DD      245F        pushl    (r10)
     67 03 FB   2461        calls    #3,(r7)
     F8 AD DD   2464        pushl    -8(fp)
     1B DD      2467        pushl    #27
21A6 C4 DF      2469        pushal   8614(r4)
     6A DD      246D        pushl    (r10)
     67 04 FB   246F        calls    #4,(r7)
52 42 A643 9E   2472        movab    66(r6)[r3],r2
F8 AD 62 4A     2477        cvtfl    (r2),-8(fp)
     1B DD      247B        pushl    #27
21AE C4 DF      247D        pushal   8622(r4)
     6A DD      2481        pushl    (r10)
     67 03 FB   2483        calls    #3,(r7)
     F8 AD DD   2486        pushl    -8(fp)
     1B DD      2489        pushl    #27
21B8 C4 DF      248B        pushal   8632(r4)
     6A DD      248F        pushl    (r10)
     67 04 FB   2491        calls    #4,(r7)
     1B DD      2494        pushl    #27
21C0 C4 DF      2496        pushal   8640(r4)
     6A DD      249A        pushl    (r10)
     67 03 FB   249C        calls    #3,(r7)
     F8 AD DD   249F        pushl    -8(fp)
     1B DD      24A2        pushl    #27
21CA C4 DF      24A4        pushal   8650(r4)
     6A DD      24A8        pushl    (r10)
     67 04 FB   24AA        calls    #4,(r7)
52 4A A643 9E   24AD        movab    74(r6)[r3],r2
     52 62 50   24B2        movf     (r2),r2
```

|            |      |       |                      |
|-----------:|-----:|------:|----------------------|
| E6 AD 9F   |      | 2435  | pushab   -26(fp)     |
| F8 AD DF   |      | 2498  | pushal   -8(fp)      |
| 7E 52 56   |      | 243B  | cvtfd    r2,-(sp)    |
| 53 00000000* EF 9E | | 249E | movab   TO_SHOW_TORR,r8 |
| 68 04 FB   |      | 24C5  | calls    #4,(r8)     |
| 1B DD      |      | 24C8  | pushl    #27         |
| 21D2 C4 DF |      | 24CA  | pushal   8658(r4)    |
| 6B DD      |      | 24CE  | pushl    (r11)       |
| 67 03 FB   |      | 24D0  | calls    #3,(r7)     |
| E6 AD DF   |      | 24D3  | pushal   -26(fp)     |
| F8 AD DD   |      | 24D6  | pushl    -8(fp)      |
| 1B DD      |      | 24D9  | pushl    #27         |
| 21DB C4 DF |      | 24DB  | pushal   8667(r4)    |
| 6B DD      |      | 24DF  | pushl    (r11)       |
| 67 05 FB   |      | 24E1  | calls    #5,(r7)     |
| 1B DD      |      | 24E4  | pushl    #27         |
| 21E8 C4 DF |      | 24E6  | pushal   8680(r4)    |
| 6B DD      |      | 24EA  | pushl    (r11)       |
| 67 03 FB   |      | 24EC  | calls    #3,(r7)     |
| E6 AD DF   |      | 24EF  | pushal   -26(fp)     |
| F8 AD DD   |      | 24F2  | pushl    -8(fp)      |
| 1B DD      |      | 24F5  | pushl    #27         |
| 21F1 C4 DF |      | 24F7  | pushal   8689(r4)    |
| 6B DD      |      | 24FB  | pushl    (r11)       |
| 67 05 FB   |      | 24FD  | calls    #5,(r7)     |
| 52 4E A643 9E | | 2500 | movab   78(r6)[r3],r2 |
| 52 62 50   |      | 2505  | movf     (r2),r2     |
| E6 AD 9F   |      | 2508  | pushab   -26(fp)     |
| F8 AD DF   |      | 250B  | pushal   -8(fp)      |
| 7E 52 56   |      | 250E  | cvtfd    r2,-(sp)    |
| 68 04 FB   |      | 2511  | calls    #4,(r8)     |
| 1B DD      |      | 2514  | pushl    #27         |
| 21FE C4 DF |      | 2516  | pushal   8702(r4)    |
| 6B DD      |      | 251A  | pushl    (r11)       |
| 67 03 FB   |      | 251C  | calls    #3,(r7)     |
| E6 AD DF   |      | 251F  | pushal   -26(fp)     |
| F8 AD DD   |      | 2522  | pushl    -8(fp)      |
| 1B DD      |      | 2525  | pushl    #27         |
| 2207 C4 DF |      | 2527  | pushal   8711(r4)    |
| 6B DD      |      | 252B  | pushl    (r11)       |
| 67 05 FB   |      | 252D  | calls    #5,(r7)     |
| 1B DD      |      | 2530  | pushl    #27         |
| 2214 C4 DF |      | 2532  | pushal   8724(r4)    |
| 6B DD      |      | 2536  | pushl    (r11)       |
| 67 03 FB   |      | 2538  | calls    #3,(r7)     |
| E6 AD DF   |      | 253B  | pushal   -26(fp)     |
| F8 AD DD   |      | 253E  | pushl    -8(fp)      |
| 1B DD      |      | 2541  | pushl    #27         |
| 221D C4 DF |      | 2543  | pushal   8733(r4)    |
| 6B DD      |      | 2547  | pushl    (r11)       |
| 67 05 FB   |      | 2549  | calls    #5,(r7)     |
| 52 52 A643 9E | | 254C | movab   82(r6)[r3],r2 |
| 52 62 50   |      | 2551  | movf     (r2),r2     |
| E6 AD 9F   |      | 2554  | pushab   -26(fp)     |
| F8 AD DF   |      | 2557  | pushal   -8(fp)      |
| 7E 52 56   |      | 255A  | cvtfd    r2,-(sp)    |
| 68 04 FB   |      | 255D  | calls    #4,(r8)     |
| 1B DD      |      | 2560  | pushl    #27         |
| 222A C4 DF |      | 2562  | pushal   8746(r4)    |
| 6B DD      |      | 2566  | pushl    (r11)       |
| 67 03 FB   |      | 2568  | calls    #3,(r7)     |
| E6 AD DF   |      | 256B  | pushal   -26(fp)     |
| F8 AD DD   |      | 256E  | pushl    -8(fp)      |
| 1B DD      |      | 2571  | pushl    #27         |
| 2233 C4 DF |      | 2573  | pushal   8755(r4)    |

```
           6B DD        2577         pushl     (r11)
        67 05 FB        2579         calls     #5,(r7)
           1B DD        257C         pushl     #27
     2240 C4 DF         257E         pushal    8768(r4)
           6B DD        2582         pushl     (r11)
        67 03 FB        2584         calls     #3,(r7)
        E6 AD DF        2587         pushal    -26(fp)
        F8 AD DD        258A         pushl     -8(fp)
           1B DD        258D         pushl     #27
     2249 C4 DF         258F         pushal    8777(r4)
           6B DD        2593         pushl     (r11)
        67 05 FB        2595         calls     #5,(r7)
   52 56 A643 9E        2598         movab     86(r6)[r3],r2
        52 62 50        259D         movf      (r2),r2
        E6 AD 9F        25A0         pushab    -26(fp)
        F8 AD DF        25A3         pushal    -8(fp)
        7E 52 56        25A6         cvtfd     r2,-(sp)
        6B 04 FB        25A9         calls     #4,(r8)
           1B DD        25AC         pushl     #27
     2256 C4 DF         25AE         pushal    8790(r4)
           6B DD        25B2         pushl     (r11)
        67 03 FB        25B4         calls     #3,(r7)
        E6 AD DF        25B7         pushal    -26(fp)
        F8 AD DD        25BA         pushl     -8(fp)
           1B DD        25BD         pushl     #27
     2260 C4 DF         25BF         pushal    8800(r4)
           6B DD        25C3         pushl     (r11)
        67 05 FB        25C5         calls     #5,(r7)
           1B DD        25C8         pushl     #27
     226D C4 DF         25CA         pushal    8813(r4)
           6B DD        25CE         pushl     (r11)
        67 03 FB        25D0         calls     #3,(r7)
        E6 AD DF        25D3         pushal    -26(fp)
        F8 AD DD        25D6         pushl     -8(fp)
           1B DD        25D9         pushl     #27
     2277 C4 DF         25DB         pushal    8823(r4)
           6B DD        25DF         pushl     (r11)
        67 05 FB        25E1         calls     #5,(r7)
   52 46 A643 9E        25E4         movab     70(r6)[r3],r2
        F8 AD 62 4A     25E9         cvtfl     (r2),-8(fp)
        DC AD 9F        25ED         pushab    -36(fp)
        F8 AD DD        25F0         pushl     -8(fp)
00000000* EF 02 FB      25F3         calls     #2,FLATSTAT
           1B DD        25FA         pushl     #27
     2284 C4 DF         25FC         pushal    8836(r4)
00000000  EF DD         2600         pushl     OUTFILE4
        67 03 FB        2606         calls     #3,(r7)
        DC AD 9F        2609         pushab    -36(fp)
           1B DD        260C         pushl     #27
     228D C4 DF         260E         pushal    8845(r4)
00000000  EF DD         2612         pushl     OUTFILE4
        67 04 FB        2618         calls     #4,(r7)
           1B DD        261B         pushl     #27
     2295 C4 DF         261D         pushal    8853(r4)
00000000  EF DD         2621         pushl     OUTFILE4
        67 03 FB        2627         calls     #3,(r7)
        DC AD 9F        262A         pushab    -36(fp)
           1B DD        262D         pushl     #27
     229E C4 DF         262F         pushal    8862(r4)
00000000  EF DD         2633         pushl     OUTFILE4
        67 04 FB        2639         calls     #4,(r7)
           51 D4        263C         clrl      r1
   3A 5C A541 91        263E         cmpb      92(r5)[r1],#58
           0C 13        2643         beql      sym.201
           50 D5        2645         tstl      r0
```

```
                    01      2647            nop
                            2648    sym.200:
            51      D6      2648            incl    r1
      3A 5C A541    91      264A            cmpb    92(r5)[r1],#58
            F7      12      264F            bneq    sym.200
                            2651    sym.201:
         51 02      C2      2651            subl2   #2,r1
            53      D4      2654            clrl    r3
      52 FFEE CD    9E      2656            movab   -18(fp),r2
                    01      265B            nop
                            265C    sym.202:
         50 51      D0      265C            movl    r1,r0
            51      D6      265F            incl    r1
      82 5C A540    90      2661            movb    92(r5)[r0],(r2)+
      F2 53 04      F3      2666            aobleq  #4,r3,sym.202
         F3 AD      94      266A            clrb    -13(fp)
            1B      DD      266D            pushl   #27
         22A6 C4    DF      266F            pushal  8870(r4)
            69      DD      2673            pushl   (r9)
52 00000000*  EF    9E      2675            movab   FPRINTF,r2
         62 03      FB      267C            calls   #3,(r2)
            EE AD   9F      267F            pushab  -18(fp)
            1B      DD      2682            pushl   #27
         22AF C4    DF      2684            pushal  8879(r4)
            69      DD      2688            pushl   (r9)
         62 04      FB      268A            calls   #4,(r2)
            1B      DD      268D            pushl   #27
         22B9 C4    DF      268F            pushal  8889(r4)
            69      DD      2693            pushl   (r9)
         62 03      FB      2695            calls   #3,(r2)
            EE AD   9F      2698            pushab  -18(fp)
            1B      DD      269B            pushl   #27
         22C2 C4    DF      269D            pushal  8898(r4)
            69      DD      26A1            pushl   (r9)
         62 04      FB      26A3            calls   #4,(r2)
            1B      DD      26A6            pushl   #27
         22CC C4    DF      26A8            pushal  8908(r4)
            6A      DD      26AC            pushl   (r10)
         62 03      FB      26AE            calls   #3,(r2)
            EE AD   9F      26B1            pushab  -13(fp)
            1B      DD      26B4            pushl   #27
         22D5 C4    DF      26B6            pushal  8917(r4)
            6A      DD      26BA            pushl   (r10)
         62 04      FB      26BC            calls   #4,(r2)
            1B      DD      26BF            pushl   #27
         22E2 C4    DF      26C1            pushal  8930(r4)
            6A      DD      26C5            pushl   (r10)
         62 03      FB      26C7            calls   #3,(r2)
            EE AD   9F      26CA            pushab  -18(fp)
            1B      DD      26CD            pushl   #27
         22EB C4    DF      26CF            pushal  8939(r4)
            6A      DD      26D3            pushl   (r10)
         62 04      FB      26D5            calls   #4,(r2)
            1B      DD      26D8            pushl   #27
         22F8 C4    DF      26DA            pushal  8952(r4)
            6B      DD      26DE            pushl   (r11)
         62 03      FB      26E0            calls   #3,(r2)
            EE AD   9F      26E3            pushab  -18(fp)
            1B      DD      26E6            pushl   #27
         2301 C4    DF      26E8            pushal  8961(r4)
            6B      DD      26EC            pushl   (r11)
         62 04      FB      26EE            calls   #4,(r2)
            1B      DD      26F1            pushl   #27
         2308 C4    DF      26F3            pushal  8971(r4)
            6B      DD      26F7            pushl   (r11)
```

```
           62 03 FB    26F9           calls     #3,(r2)
           EE AD 9F    26FC           pushab    -18(fp)
              1B DD    26FF           pushl     #27
           2314 C4 DF  2701           pushal    8980(r4)
              6B DD    2705           pushl     (r11)
           62 04 FB    2707           calls     #4,(r2)
              1B DD    270A           pushl     #27
           231E C4 DF  270C           pushal    8990(r4)
         00000000 EF DD 2710          pushl     OUTFILE4
           62 03 FB    2716           calls     #3,(r2)
           EE AD 9F    2719           pushab    -18(fp)
              1B DD    271C           pushl     #27
           2327 C4 DF  271E           pushal    8999(r4)
         00000000 EF DD 2722          pushl     OUTFILE4
           62 04 FB    2728           calls     #4,(r2)
              1B DD    272B           pushl     #27
           2331 C4 DF  272D           pushal    9009(r4)
         00000000 EF DD 2731          pushl     OUTFILE4
           62 03 FB    2737           calls     #3,(r2)
           EE AD 9F    273A           pushab    -18(fp)
              1B DD    273D           pushl     #27
           233A C4 DF  273F           pushal    9018(r4)
         00000000 EF DD 2743          pushl     OUTFILE4
           62 04 FB    2749           calls     #4,(r2)
                 04    274C           ret
                       274D   snooze:
                 0FFC  274D           .entry    snooze,^m<r2,r3,
              5E 10 C2 274F           subl2     #16,sp
         58 00000000 EF 9E 2752       movab     $CHAR_STRING_CON
         5A 00000000 EF 9E 2759       movab     HEYPRINT,r10
         57 00000000 EF 9E 2760       movab     DATE7,r7
         58 00000000 EF 9E 2767       movab     NUMB_READINGS,r1
         59 00000000 EF 9E 276E       movab     PREVDATE7,r9
         56 00000000 EF 9E 2775       movab     $DATA,r6
         F0 AD 2344 C8 0C 28 277C     movc3     #12,9028(r8),-16
              02 6A D1 2783           cmpl      (r10),#2
                 0E 12 2786           bneq      sym.203
                 0C AC DD 2788        pushl     12(ap)
              2350 C8 DF 278B         pushal    9040(r8)
         00000000* EF 02 FB 278F      calls     #2,PRINTF
                       2796   sym.203:
                 0C AC D5 2796        tstl      12(ap)
                 1D 13 2799           beql      tod
                 08 AC DD 279B        pushl     8(ap)
         00000000* EF 01 FB 279E      calls     #1,SLEEP
              02 6A D1 27A5           cmpl      (r10),#2
                 0E 12 27A8           bneq      sym.204
                 08 AC DD 27AA        pushl     8(ap)
              236E C8 DF 27AD         pushal    9070(r8)
         00000000* EF 02 FB 27B1      calls     #2,PRINTF
                       27B8   sym.204:
                       27B8   tod:
              76 A6 9F 27B8           pushab    118(r6)
         00000000* EF 01 FB 27BB      calls     #1,LIB$DATE_TIME
              53 50 D0 27C2           movl      r0,r3
         52 53 FFFFFFFE 8F C8 27C5    bicl3     #-2,r3,r2
              01 52 D1 27CD           cmpl      r2,#1
                 14 13 27D0           beql      sym.205
              23A3 C8 DF 27D2         pushal    9123(r8)
         00000000* EF 01 FB 27D6      calls     #1,PRINTF
                 53 DD 27DD           pushl     r3
         00000000* EF 01 FB 27DF      calls     #1,LIB$STOP
                       27E6   sym.205:
              73 A6 94 27E6           clrb      115(r6)
         00000000 EF 9F 27E9          pushab    CUR_INT
```

```
           76 A6 9F    27EF              pushab   118(r6)
00000000* EF 02 FB    27F2              calls    #2,SYS$BINTIM
52 50 FFFFFFFE 8F C3  27F9              bicl3    #-2,r0,r2
           01 52 D1   2801              cmpl     r2,#1
              09 13   2804              beql     sym.206
              50 DD   2806              pushl    r0
00000000* EF 01 FB    2808              calls    #1,LIB$STOP
                      280F   sym.206:
           02 6A D1   280F              cmpl     (r10),#2
              OE 12   2812              bneq     sym.207
           5C A6 DF   2814              pushal   92(r6)
         23CB C8 DF   2817              pushal   9163(r8)
00000000* EF 02 FB    281B              calls    #2,PRINTF
                      2822   sym.207:
     00000000 EF 9F   2822              pushab   CUR_INT
              67 9F   2829              pushab   (r7)
00000000* EF 02 FB    282A              calls    #2,SYS$NUMTIM
           02 6A D1   2831              cmpl     (r10),#2
              09 12   2834              bneq     sym.208
         23F1 C8 DF   2836              pushal   9201(r8)
00000000* EF 01 FB    283A              calls    #1,PRINTF
                      2841   sym.208:
           02 6A D1   2841              cmpl     (r10),#2
              26 12   2844              bneq     sym.209
        7E 0C A7 32   2846              cvtwl    12(r7),-(sp)
        7E 0A A7 32   284A              cvtwl    10(r7),-(sp)
        7E 08 A7 32   284E              cvtwl    8(r7),-(sp)
        7E 06 A7 32   2852              cvtwl    6(r7),-(sp)
           7E 67 32   2856              cvtwl    (r7),-(sp)
        7E 02 A7 32   2859              cvtwl    2(r7),-(sp)
        7E 04 A7 32   285D              cvtwl    4(r7),-(sp)
         2436 C8 DF   2861              pushal   9270(r8)
00000000* EF 08 FB    2865              calls    #8,PRINTF
                      286C   sym.209:
              6B D6   286C              incl     (r11)
     00000000 EF 6B D1 286E              cmpl    (r11),MAX_READS
              31 12   2875              bneq     sym.212
   02 00000000 EF D1 2877              cmpl     HEYPRINT4,#2
              0B 12   287E              bneq     sym.210
         2465 C8 DF   2880              pushal   9317(r8)
00000000* EF 01 FB    2884              calls    #1,PRINTF
                      2888   sym.210:
   02 00000000 EF D1 2888              cmpl     HEYPRINT4,#2
              0B 12   2892              bneq     sym.211
         24A8 C8 DF   2894              pushal   9384(r8)
00000000* EF 01 FB    2898              calls    #1,PRINTF
                      289F   sym.211:
         04 8C 03 D0  289F              movl     #3,a4(ap)
              009E 31 28A3              brw      endsnooze
              50 D5   28A6              tstl     r0
                      28A8   sym.212:
        53 0A A7 32   28A8              cvtwl    10(r7),r3
        52 08 A7 32   28AC              cvtwl    8(r7),r2
           52 3C C4   28B0              mull2    #60,r2
           53 52 C0   28B3              addl2    r2,r3
        52 06 A7 32   28B6              cvtwl    6(r7),r2
     52 00000E10 8F C4 28BA              mull2   #3600,r2
           53 52 C0   28C1              addl2    r2,r3
           53 08 AC C0 28C4              addl2   8(ap),r3
     00015180 8F 53 D1 28C8              cmpl    r3,#86400
              06 18   28CF              bgeq     sym.213
        1D 0C AC D1   28D1              cmpl     12(ap),#29
              49 12   28D5              bneq     sym.216
                      28D7   sym.213:
           02 6A D1   28D7              cmpl     (r10),#2
              08 12   28DA              bneq     sym.214
```

```
         24F0 C8 DF    28DC              pushal   9456(r8)
00000000* EF 01 FB    28E0              calls    #1,PRINTF
                      28E7    sym.214:
         04 8C 02 D0  28E7              movl     #2,a4(ap)
            02 6A D1  28EB              cmpl     (r10),#2
               0B 12  28EE              bneq     sym.215
         251F C8 DF   28F0              pushal   9503(r8)
00000000* EF 01 FB    28F4              calls    #1,PRINTF
                      28FB    sym.215:
            69 67 80  28FB              movw     (r7),(r9)
      02 A9 02 A7 80  28FE              movw     2(r7),2(r9)
      04 A9 04 A7 80  2903              movw     4(r7),4(r9)
      06 A9 06 A7 80  2908              movw     6(r7),6(r9)
      08 A9 08 A7 80  290D              movw     8(r7),8(r9)
      0A A9 0A A7 80  2912              movw     10(r7),10(r9)
      0C A9 0C A7 80  2917              movw     12(r7),12(r9)
               25 11  291C              brb      sym.218
               50 D5  291E              tstl     r0
                      2920    sym.216:
            02 6A D1  2920              cmpl     (r10),#2
               0B 12  2923              bneq     sym.217
         2541 C8 DF   2925              pushal   9537(r8)
00000000* EF 01 FB    2929              calls    #1,PRINTF
                      2930    sym.217:
         04 8C 01 D0  2930              movl     #1,a4(ap)
            02 6A D1  2934              cmpl     (r10),#2
               0B 12  2937              bneq     sym.218
         256A C8 DF   2939              pushal   9578(r8)
00000000* EF 01 FB    293D              calls    #1,PRINTF
                      2944    sym.218:
                      2944    endsnooze:
            02 6A D1  2944              cmpl     (r10),#2
               0B 12  2947              bneq     sym.219
         258B C8 DF   2949              pushal   9611(r8)
00000000* EF 01 FB    294D              calls    #1,PRINTF
                      2954    sym.219:
                  04  2954              ret
                      2955    get_snooze_time:
                001C  2955              .entry   get_snooze_time,
            5E 10 C2  2957              subl2    #16,sp
   53 00000000 EF 9E  295A              movab    $CHAR_STRING_CON
   54 00000000 EF 9E  2961              movab    HEYPRINT4,r4
            02 64 D1  2968              cmpl     (r4),#2
               0B 12  296B              bneq     sym.220
         25A3 C3 DF   296D              pushal   9635(r3)
00000000* EF 01 FB    2971              calls    #1,PRINTF
                      2978    sym.220:
            02 64 D1  2978              cmpl     (r4),#2
               0B 12  297B              bneq     sym.221
         25CA C3 DF   297D              pushal   9674(r3)
00000000* EF 01 FB    2981              calls    #1,PRINTF
                      2988    sym.221:
            F0 AD DF  2988              pushal   -16(fp)
            F4 AD DF  298B              pushal   -12(fp)
            F8 AD DF  298E              pushal   -8(fp)
         25F5 C3 DF   2991              pushal   9717(r3)
00000000* EF 04 FB    2995              calls    #4,SCANF
               52 D4  299C              clrl     r2
            F8 AD D5  299E              tstl     -8(fp)
               02 12  29A1              bneq     vcg.14
               52 D6  29A3              incl     r2
                      29A5    vcg.14:
               50 D4  29A5              clrl     r0
            F4 AD D5  29A7              tstl     -12(fp)
               02 12  29AA              bneq     vcg.15
```

```
                50 D6       29AC            incl      r0
                            29AE   vcg.15:
             52 52 D2       29AE            mcoml     r2,r2
          52 50 52 C3       29B1            bicl3     r2,r0,r2
                50 D4       29B5            clrl      r0
             F0 AD D5       29B7            tstl      -16(fp)
                02 12       29BA            bneq      vcg.16
                50 D6       29BC            incl      r0
                            29BE   vcg.16:
             52 52 D2       29BE            mcoml     r2,r2
          52 50 52 C3       29C1            bicl3     r2,r0,r2
                09 13       29C5            beql      sym.222
          04 BC 08 D0       29C7            movl      #8,a4(ap)
                1A 11       29CB            brb       sym.223
                50 D5       29CD            tstl      r0
                   01       29CF            nop
                            29D0   sym.222:
          52 F4 AD 3C C5    29D0            mull3     #60,-12(fp),r2
          52 F0 AD C0       29D5            addl2     -16(fp),r2
    51 F8 AD 00000E10 8F C5 29D9            mull3     #3600,-8(fp),r1
          04 BC 51 52 C1    29E2            addl3     r2,r1,a4(ap)
                            29E7   sym.223:
             02 64 D1       29E7            cmpl      (r4),#2
                0E 12       29EA            bneq      sym.224
             04 BC DD       29EC            pushl     a4(ap)
          25FE C3 DF       29EF            pushal    9726(r3)
    00000000* EF 02 FB     29F3            calls     #2,PRINTF
                            29FA   sym.224:
                   04       29FA            ret
                            29FB   readguage:
                 03FC       29FB            .entry    readguage,^m<r2,
             5E 18 C2       29FD            subl2     #24,sp
    53 00000000 EF 9E       2A00            movab     $CHAR_STRING_CON
    57 00000000 EF 9E       2A07            movab     HEYPRINT2,r7
             F3 AD DF       2A0E            pushal    -8(fp)
          52 10 AC D0       2A11            movl      16(ap),r2
                52 DD       2A15            pushl     r2
    00000000* EF 02 FB     2A17            calls     #2,RD_OMEGA
                OF 52 D1    2A1E            cmpl      r2,#15
                3C 12       2A21            bneq      sym.225
 50 0C AC 00000058 8F C5    2A23            mull3     #88,12(ap),r0
          51 52 02 78       2A2C            ashl      #2,r2,r1
             51 50 C0       2A30            addl2     r0,r1
          50 08 AC D0       2A33            movl      8(ap),r0
       50 0A A041 9E       2A37            movab     10(r0)[r1],r0
          60 F3 AD 50       2A3C            movf      -8(fp),(r0)
          50 F8 AD 4A       2A40            cvtfl     -8(fp),r0
    02 00000000 EF D1       2A44            cmpl      HEYPRINT,#2
                12 12       2A4B            bneq      sym.225
                50 DD       2A4D            pushl     r0
                52 DD       2A4F            pushl     r2
             0C AC DD       2A51            pushl     12(ap)
             2626 C3 DF    2A54            pushal    9766(r3)
    00000000* EF 04 FB     2A58            calls     #4,PRINTF
                            2A5F   sym.225:
          56 10 AC D0       2A5F            movl      16(ap),r6
                50 D4       2A63            clrl      r0
             10 56 D1       2A65            cmpl      r6,#16
                02 19       2A68            blss      vcg.17
                50 D6       2A6A            incl      r0
                            2A6C   vcg.17:
                51 D4       2A6C            clrl      r1
             13 56 D1       2A6E            cmpl      r6,#19
                02 14       2A71            bgtr      vcg.18
                51 D6       2A73            incl      r1
```

```
                50 50 D2            2A75    vcg.18:
             50 51 50 CB            2A75            mcoml    r0,r0
                   03 12            2A78            bicl3    r0,r1,r0
                   00E7 31          2A7C            bneq     gen.27
                                    2A7E            brw      sym.232
                                    2A81    gen.27:
             52 F8 AD 50            2A81            movf     -8(fp),r2
                54 52 56            2A85            cvtfd    r2,r4
            D53B CF 54 71           2A88            cmpd     r4,$CODE+24
                   1D 18            2A8D            bgeq     sym.226
  53 54 000000006B2B4F6E 8F 65      2A8F            muld3    #1797803886,r4,r
                2644 C3 DF          2A9B            pushal   9796(r3)
                   E9 AD DF         2A9F            pushal   -23(fp)
       00000000* EF 02 FB           2AA2            calls    #2,STRCPY
                   57 11            2AA9            brb      show
                      01            2AAB            nop
                                    2AAC    sym.226:
            D56F CF 54 71           2AAC            cmpd     r4,$CODE+32
                   1D 18            2AB1            bgeq     sym.227
  58 54 0000000024004A74 8F 65      2AB3            muld3    #603998836,r4,r8
                2650 C3 DF          2ABF            pushal   9808(r3)
                   E9 AD DF         2AC3            pushal   -23(fp)
       00000000* EF 02 FB           2AC6            calls    #2,STRCPY
                   33 11            2ACD            brb      show
                      01            2ACF            nop
                                    2AD0    sym.227:
                03 52 51            2AD0            cmpf     r2,#8
                   1F 18            2AD3            bgeq     sym.228
  58 54 000000000000457A 8F 65      2AD5            muld3    #17786,r4,r8
                265C C3 DF          2AE1            pushal   9820(r3)
                   E9 AD DF         2AE5            pushal   -23(fp)
       00000000* EF 02 FB           2AE8            calls    #2,STRCPY
                   11 11            2AEF            brb      show
                      50 D5         2AF1            tstl     r0
                      01            2AF3            nop
                                    2AF4    sym.228:
                2668 C3 DF          2AF4            pushal   9832(r3)
                   E9 AD DF         2AF8            pushal   -23(fp)
       00000000* EF 02 FB           2AFB            calls    #2,STRCPY
                                    2B02    show:
                50 58 6A            2B02            cvtdl    r8,r0
                02 67 D1            2B05            cmpl     (r7),#2
                   16 12            2B08            bneq     sym.229
                   E9 AD DF         2B0A            pushal   -23(fp)
                      50 DD         2B0D            pushl    r0
                   10 AC DD         2B0F            pushl    16(ap)
                   0C AC DD         2B12            pushl    12(ap)
                2674 C3 DF          2B15            pushal   9844(r3)
       00000000* EF 05 FB           2B19            calls    #5,PRINTF
                                    2B20    sym.229:
                02 67 D1            2B20            cmpl     (r7),#2
                   0F 12            2B23            bneq     sym.230
                7E F8 AD 56         2B25            cvtfd    -8(fp),-(sp)
                26A0 C3 DF          2B29            pushal   9888(r3)
       00000000* EF 03 FB           2B2D            calls    #3,PRINTF
                                    2B34    sym.230:
                02 67 D1            2B34            cmpl     (r7),#2
                   0E 12            2B37            bneq     sym.231
                7E 58 70            2B39            movd     r8,-(sp)
                26D8 C3 DF          2B3C            pushal   9944(r3)
       00000000* EF 03 FB           2B40            calls    #3,PRINTF
                                    2B47    sym.231:
  50 0C AC 00000058 8F C5           2B47            mull3    #88,12(ap),r0
          51 10 AC 02 78            2B50            ashl     #2,16(ap),r1
                51 50 C0            2B55            addl2    r0,r1
                50 08 AC D0         2B58            movl     8(ap),r0
```

```
          50 0A A041 9E       2B5C           movab    10(r0)[r1],r0
             60 F8 AD 50      2B61           movf     -8(fp),(r0)
                      04      2B65           ret
                   50 D5      2B66           tstl     r0
                              2B68   sym.232:
    50 0C AC 00000058 8F C5   2B68           mull3    #88,12(ap),r0
                56 56 02 78   2B71           ashl     #2,r6,r6
                   56 50 C0   2B75           addl2    r0,r6
                50 03 AC D0   2B78           movl     8(ap),r0
            50 0A A046 9E     2B7C           movab    10(r0)[r6],r0
             60 F8 AD 50      2B81           movf     -8(fp),(r0)
                      04      2B85           ret
                              2B86   to_show_torr:
                      00FC    2B86           .entry   to_show_torr,^m<
                   5E 04 C2   2B88           subl2    #4,sp
          53 00000000 EF 9E   2B8B           movab    $CHAR_STRING_CON
                54 04 AC 70   2B92           movd     4(ap),r4
                D47D CF 54 71 2B96           cmpd     r4,$CODE+24
                      1F 18   2B9B           bgeq     sym.233
    56 54 00000000B284F6E 8F 65 2B9D         muld3    #1797803886,r4,r
                   2710 C3 DF 2BA9           pushal   10000(r3)
                      10 AC DD 2BAD          pushl    16(ap)
              00000000* EF 02 FB 2BB0        calls    #2,STRCPY
                         5C 11 2BB7          brb      show
                         50 D5 2BB9          tstl     r0
                            01 2BBB          nop
                              2BBC   sym.233:
                D45F CF 54 71 2BBC           cmpd     r4,$CODE+32
                      1D 18   2BC1           bgeq     sym.234
    56 54 00000000024004A74 8F 65 2BC3       muld3    #603998836,r4,r6
                   2717 C3 DF 2BCF           pushal   10007(r3)
                      10 AC DD 2BD3          pushl    16(ap)
              00000000* EF 02 FB 2BD6        calls    #2,STRCPY
                         36 11 2BDD          brb      show
                            01 2BDF          nop
                              2BE0   sym.234:
                   03 54 71   2BE0           cmpd     r4,#8
                      1F 18   2BE3           bgeq     sym.235
    56 54 000000000000457A 8F 65 2BE5        muld3    #17786,r4,r6
                   271E C3 DF 2BF1           pushal   10014(r3)
                      10 AC DD 2BF5          pushl    16(ap)
              00000000* EF 02 FB 2BF8        calls    #2,STRCPY
                         14 11 2BFF          brb      show
                         50 D5 2C01          tstl     r0
                            01 2C03          nop
                              2C04   sym.235:
                      56 54 70 2C04          movd     r4,r6
                   2725 C3 DF 2C07           pushal   10021(r3)
                      10 AC DD 2C0B          pushl    16(ap)
              00000000* EF 02 FB 2C0E        calls    #2,STRCPY
                              2C15   show:
                      52 56 6A 2C15          cvtdl    r6,r2
              02 00000000 EF D1 2C18         cmpl     HEYPRINT2,#2
                         10 12 2C1F          bneq     sym.236
                      10 AC DD 2C21          pushl    16(ap)
                         52 DD 2C24          pushl    r2
                   272C C3 DF 2C26           pushal   10028(r3)
              00000000* EF 03 FB 2C2A        calls    #3,PRINTF
                              2C31   sym.236:
                   0C 8C 52 D0 2C31          movl     r2,B12(ap)
              02 00000000 EF D1 2C35         cmpl     HEYPRINT2,#2
                         0B 12 2C3C          bneq     sym.237
                   2743 C3 DF 2C3E           pushal   10056(r3)
              00000000* EF 01 FB 2C42        calls    #1,PRINTF
                              2C49   sym.237:
```

```
                           04     2C49              ret
                                  2C4A    w_omega:
                    000C          2C4A              .entry    w_omega,^m<r2,r3
             5E AC AE 9E          2C4C              movab     -84(sp),sp
       52 00000000 EF 9E          2C50              movab     $CHAR_STRING_CON
       53 00000000 EF 9E          2C57              movab     HEYPRINT,r3
                 2761 C2 DF       2C5E              pushal    10081(r2)
                    AC AD DF      2C62              pushal    -84(fp)
          00000000* EF 02 FB      2C65              calls     #2,STRCPY
                 B8 AD 0D 90      2C6C              movb      #13,-72(fp)
                 BA AD 0A 90      2C70              movb      #10,-70(fp)
                    BB AD 94      2C74              clrb      -69(fp)
                 BC AD 0D 90      2C77              movb      #13,-68(fp)
                 BD AD 0D 90      2C7B              movb      #13,-67(fp)
                    BE AD 94      2C7F              clrb      -66(fp)
                    02 63 D1      2C82              cmpl      (r3),#2
                       0E 12      2C85              bneq      sym.238
                    AC AD 9F      2C87              pushab    -84(fp)
                 276E C2 DF       2C8A              pushal    10094(r2)
          00000000* EF 02 FB      2C8E              calls     #2,PRINTF
                                  2C95    sym.238:
                    AC AD DF      2C95              pushal    -84(fp)
           00000000 EF DD         2C98              pushl     OUTFILE6
          00000000* EF 02 FB      2C9E              calls     #2,FPRINTF
                    02 63 D1      2CA5              cmpl      (r3),#2
                       0B 12      2CA8              bneq      sym.239
                 2783 C2 DF       2CAA              pushal    10123(r2)
          00000000* EF 01 FB      2CAE              calls     #1,PRINTF
                                  2CB5    sym.239:
                    02 63 D1      2CB5              cmpl      (r3),#2
                       0B 12      2CB8              bneq      sym.240
                 2790 C2 DF       2CBA              pushal    10160(r2)
          00000000* EF 01 FB      2CBE              calls     #1,PRINTF
                                  2CC5    sym.240:
                 27E4 C2 DF       2CC5              pushal    10212(r2)
                    AC AD DF      2CC9              pushal    -84(fp)
          00000000* EF 02 FB      2CCC              calls     #2,STRCPY
                 DA AD 0D 90      2CD3              movb      #13,-38(fp)
                 D9 AD 0A 90      2CD7              movb      #10,-37(fp)
                    DC AD 94      2CDB              clrb      -36(fp)
                    02 63 D1      2CDE              cmpl      (r3),#2
                       0E 12      2CE1              bneq      sym.241
                    AC AD 9F      2CE3              pushab    -84(fp)
                 2313 C2 DF       2CE6              pushal    10259(r2)
          00000000* EF 02 FB      2CEA              calls     #2,PRINTF
                                  2CF1    sym.241:
                    AC AD DF      2CF1              pushal    -84(fp)
           00000000 EF DD         2CF4              pushl     OUTFILE6
          00000000* EF 02 FB      2CFA              calls     #2,FPRINTF
                    02 63 D1      2D01              cmpl      (r3),#2
                       0B 12      2D04              bneq      sym.242
                 2830 C2 DF       2D06              pushal    10288(r2)
          00000000* EF 01 FB      2D0A              calls     #1,PRINTF
                                  2D11    sym.242:
                           04     2D11              ret
                                  2D12    rd_omega:
                       07FC       2D12              .entry    rd_omega,^m<r2,r
                       5E 24 C2   2D14              subl2     #36,sp
       55 00000000 EF 9E          2D17              movab     PEEKING,r5
       53 00000000 EF 9E          2D1E              movab     T,r3
       58 00000000 EF 9E          2D25              movab     COMMAND,r8
       54 00000000 EF 9E          2D2C              movab     $CHAR_STRING_CON
       57 00000000 EF 9E          2D33              movab     HEYPRINT,r7
                    02 67 D1      2D3A              cmpl      (r7),#2
                       0B 12      2D3D              bneq      sym.243
                 2868 C4 DF       2D3F              pushal    10344(r4)
```

```
00000000* EF 01 FB    2D43            calls    #1,PRINTF
                      2D4A   sym.243:
         52 D4        2D4A            clrl     r2
      02 67 D1        2D4C            cmpl     (r7),#2
         08 12        2D4F            bneq     sym.244
      238C C4 DF      2D51            pushal   10380(r4)
00000000* EF 01 FB    2D55            calls    #1,PRINTF
                      2D5C   sym.244:
         59 7C        2D5C            clrq     r9
      02 67 D1        2D5E            cmpl     (r7),#2
         0D 12        2D61            bneq     sym.245
         52 DD        2D63            pushl    r2
      288E C4 DF      2D65            pushal   10382(r4)
00000000* EF 02 FB    2D69            calls    #2,PRINTF
                      2D70   sym.245:
         52 D6        2D70            incl     r2
      51 04 AC D0     2D72            movl     4(ap),r1
         08 13        2D76            beql     new_command
   08 8C 6341 50      2D78            movf     (r3)[r1],88(ap)
         0390 31      2D7D            brw      alldone
                      2D80   new_command:
         50 5A D0     2D80            movl     r10,r0
         5A D6        2D83            incl     r10
   56 00000000 EF40 32  2D85          cvtwl    PRIME[r0],r6
         07 56 D1     2D8D            cmpl     r6,#7
         0E 12        2D90            bneq     sym.246
         05 DD        2D92            pushl    #5
00000000* EF 01 FB    2D94            calls    #1,SLEEP
         E3 11        2D9B            brb      new_command
         50 D5        2D9D            tstl     r0
         01           2D9F            nop
                      2DA0   sym.246:
         06 56 D1     2DA0            cmpl     r6,#6
         03 12        2DA3            bneq     gen.28
         0363 31      2DA5            brw      alldone
                      2DA8   gen.28:
         05 56 D1     2DA8            cmpl     r6,#5
         03 12        2DAB            bneq     gen.29
         0298 31      2DAD            brw      showit
                      2DB0   gen.29:
         04 56 D1     2DB0            cmpl     r6,#4
         03 12        2DB3            bneq     gen.30
         0358 31      2DB5            brw      snooze
                      2DB8   gen.30:
         01 56 D1     2DB8            cmpl     r6,#1
         03 13        2DBB            beql     gen.31
         0084 31      2DBD            brw      sym.251
                      2DC0   gen.31:
      02 67 D1        2DC0            cmpl     (r7),#2
         08 12        2DC3            bneq     sym.247
      28AE C4 DF      2DC5            pushal   10414(r4)
00000000* EF 01 FB    2DC9            calls    #1,PRINTF
                      2DD0   sym.247:
         15 59 D1     2DD0            cmpl     r9,#21
         17 19        2DD3            blss     sym.249
      02 67 D1        2DD5            cmpl     (r7),#2
         08 12        2DD8            bneq     sym.248
      23DF C4 DF      2DDA            pushal   10463(r4)
00000000* EF 01 FB    2DDE            calls    #1,PRINTF
                      2DE5   sym.248:
00000000* EF 00 FB    2DE5            calls    #0,EXIT
                      2DEC   sym.249:
      50 59 24 C5     2DEC            mull3    #36,r9,r0
00000000 EF40 9F      2DF0            pushab   LITTLE_LIST[r0]
         68 9F        2DF7            pushab   (r8)
00000000* EF 02 FB    2DF9            calls    #2,STRCPY
```

```
                   59 D6    2E00            incl    r9
                   52 D4    2E02            clrl    r2
                            2E04    loopkb:
                50 52 D0    2E04            movl    r2,r0
                   52 D6    2E07            incl    r2
                50 6840 90  2E09            movb    (r8)[r0],r0
                7A 8F 50 91 2E0D            cmpb    r0,#122
                      F1 12 2E11            bneq    loopkb
                      52 D7 2E13            decl    r2
                6342 0D 90  2E15            movb    #13,(r8)[r2]
                      52 D6 2E19            incl    r2
                50 52 D0    2E1B            movl    r2,r0
                      52 D6 2E1E            incl    r2
                6840 0A 90  2E20            movb    #10,(r8)[r0]
                   6842 94  2E24            clrb    (r8)[r2]
                   02 67 D1 2E27            cmpl    (r7),#2
                      0D 12 2E2A            bneq    sym.250
                      69 9F 2E2C            pushab  (r8)
                2905 C4 DF  2E2E            pushal  10501(r4)
         00000000* EF 02 FB 2E32            calls   #2,PRINTF
                            2E39    sym.250:
                      01 DD 2E39            pushl   #1
         00000000* EF 01 FB 2E3B            calls   #1,SLEEP
         00000000  EF DD    2E42            pushl   OUTFILE6
                      69 DF 2E48            pushal  (r3)
         00000000* EF 02 FB 2E4A            calls   #2,FPUTS
         00000000  EF 50 D0 2E51            movl    r0,FPUTS_STAT
                   02 67 D1 2E58            cmpl    (r7),#2
                      03 13 2E5B            beql    gen.32
                   FF20 31  2E5D            brw     new_command
                            2E60    gen.32:
         00000000  EF DD    2E60            pushl   FPUTS_STAT
                 291E C4 DF 2E66            pushal  10526(r4)
         00000000* EF 02 FB 2E6A            calls   #2,PRINTF
                   FF0C 31  2E71            brw     new_command
                            2E74    sym.251:
                   02 56 D1 2E74            cmpl    r6,#2
                      12 13 2E77            beql    sym.252
                   03 56 D1 2E79            cmpl    r6,#3
                      0D 13 2E7C            beql    sym.252
                   03 56 D1 2E7E            cmpl    r6,#8
                      08 13 2E81            beql    sym.252
                   09 56 D1 2E83            cmpl    r6,#9
                      03 13 2E86            beql    gen.33
                      018D 31 2E88          brw     sym.265
                            2E8B    gen.33:
                            2E8B    sym.252:
                   02 67 D1 2E8B            cmpl    (r7),#2
                      0B 12 2E8E            bneq    sym.253
                 2938 C4 DF 2E90            pushal  10552(r4)
         00000000* EF 01 FB 2E94            calls   #1,PRINTF
                            2E9B    sym.253:
                            2E9B    getagain:
                      51 D4 2E9B            clrl    r1
                   50 65 9E 2E9D            movab   (r5),r0
                            2EA0    sym.254:
                      80 94 2EA0            clrb    (r0)+
         F6 51 0000004F 8F F3 2EA2          aobleq  #79,r1,sym.254
                   02 67 D1 2EAA            cmpl    (r7),#2
                      0B 12 2EAD            bneq    sym.255
                 295E C4 DF 2EAF            pushal  10590(r4)
         00000000* EF 01 FB 2EB3            calls   #1,PRINTF
                            2EBA    sym.255:
                      01 DD 2EBA            pushl   #1
         00000000* EF 01 FB 2EBC            calls   #1,SLEEP
```

```
           02 67 D1     2EC3           cmpl      (r7),#2
              0B 12     2EC6           bneq      sym.256
        299E C4 DF      2EC8           pushal    10654(r4)
00000000* EF 01 FB      2ECC           calls     #1,PRINTF
                        2ED3   sym.256:
      00000000 EF DD    2ED3           pushl     INFILE6
           7E 50 8F 9A  2ED9           movzbl    #80,-(sp)
              65 9F     2EDD           pushab    (r5)
00000000* EF 03 FB      2EDF           calls     #3,FGETS
  00000000 EF 50 D0     2EE6           movl      r0,FGETS_STAT
           02 67 D1     2EED           cmpl      (r7),#2
              13 12     2EF0           bneq      sym.257
      00000000 EF DD    2EF2           pushl     FGETS_STAT
              65 9F     2EF8           pushab    (r5)
        29C7 C4 DF      2EFA           pushal    10695(r4)
00000000* EF 03 FB      2EFE           calls     #3,PRINTF
                        2F05   sym.257:
              65 95     2F05           tstb      (r5)
              05 13     2F07           beql      sym.258
           23 65 91     2F09           cmpb      (r5),#35
              16 12     2F0C           bneq      sym.259
                        2F0E   sym.258:
           02 67 D1     2F0E           cmpl      (r7),#2
              88 12     2F11           bneq      getagain
        29ED C4 DF      2F13           pushal    10733(r4)
00000000* EF 01 FB      2F17           calls     #1,PRINTF
             FF7A 31    2F1E           brw       getagain
              50 D5     2F21           tstl      r0
                 01     2F23           nop
                        2F24   sym.259:
           02 67 D1     2F24           cmpl      (r7),#2
              0D 12     2F27           bneq      sym.260
              65 9F     2F29           pushab    (r5)
        29EF C4 DF      2F2B           pushal    10735(r4)
00000000* EF 02 FB      2F2F           calls     #2,PRINTF
                        2F36   sym.260:
           02 56 D1     2F36           cmpl      r6,#2
              25 12     2F39           bneq      sym.261
           18 A3 9F     2F3B           pushab    24(r3)
           14 A3 9F     2F3E           pushab    20(r3)
           10 A3 9F     2F41           pushab    16(r3)
           0C A3 9F     2F44           pushab    12(r3)
           08 A3 9F     2F47           pushab    8(r3)
           04 A3 9F     2F4A           pushab    4(r3)
              63 9F     2F4D           pushab    (r3)
        29F3 C4 DF      2F4F           pushal    10739(r4)
              65 9F     2F53           pushab    (r5)
00000000* EF 09 FB      2F55           calls     #9,SSCANF
             FE21 31    2F5C           brw       new_command
                 01     2F5F           nop
                        2F60   sym.261:
           03 56 D1     2F60           cmpl      r6,#3
              27 12     2F63           bneq      sym.262
           38 A3 9F     2F65           pushab    56(r3)
           34 A3 9F     2F68           pushab    52(r3)
           30 A3 9F     2F6B           pushab    48(r3)
           2C A3 9F     2F6E           pushab    44(r3)
           28 A3 9F     2F71           pushab    40(r3)
           24 A3 9F     2F74           pushab    36(r3)
           20 A3 9F     2F77           pushab    32(r3)
        2A08 C4 DF      2F7A           pushal    10760(r4)
              65 9F     2F7E           pushab    (r5)
00000000* EF 09 FB      2F80           calls     #9,SSCANF
             FDF6 31    2F87           brw       new_command
              50 D5     2F8A           tstl      r0
```

```
                    2F8C  sym.262:
      09 56 D1      2F8C           cmpl      r6,#9
         03 13      2F8F           beql      gen.34
         0090 31    2F91           brw       sym.264
                    2F94  gen.34:
      DC AD 9F      2F94           pushab    -36(fp)
      E0 AD 9F      2F97           pushab    -32(fp)
      E4 AD 9F      2F9A           pushab    -28(fp)
      E8 AD 9F      2F9D           pushab    -24(fp)
      EC AD 9F      2FA0           pushab    -20(fp)
      F0 AD 9F      2FA3           pushab    -16(fp)
      F4 AD 9F      2FA6           pushab    -12(fp)
      F8 AD 9F      2FA9           pushab    -8(fp)
      2A1D C4 DF    2FAC           pushal    10781(r4)
         65 9F      2FB0           pushab    (r5)
00000000* EF 0A FB  2FB2           calls     #10,SSCANF
   52 F8 AD 07 78   2FB9           ashl      #7,-8(fp),r2
   50 F4 AD 06 78   2FBE           ashl      #6,-12(fp),r0
      52 50 C0      2FC3           addl2     r0,r2
   50 F0 AD 05 78   2FC6           ashl      #5,-16(fp),r0
      52 50 C0      2FCB           addl2     r0,r2
   50 EC AD 04 78   2FCE           ashl      #4,-20(fp),r0
      52 50 C0      2FD3           addl2     r0,r2
   50 E8 AD 03 78   2FD6           ashl      #3,-24(fp),r0
      52 50 C0      2FDB           addl2     r0,r2
   50 E4 AD 02 78   2FDE           ashl      #2,-28(fp),r0
      52 50 C0      2FE3           addl2     r0,r2
50 E0 AD E0 AD C1   2FE6           addl3     -32(fp),-32(fp)
      52 50 C0      2FEC           addl2     r0,r2
      52 DC AD C0   2FEF           addl2     -36(fp),r2
      3C A3 52 4E   2FF3           cvtlf     r2,60(r3)
         02 67 D1   2FF7           cmpl      (r7),#2
            0D 12   2FFA           bneq      sym.263
            65 9F   2FFC           pushab    (r5)
       2A35 C4 DF   2FFE           pushal    10805(r4)
00000000* EF 02 FB  3002           calls     #2,PRINTF
                    3009  sym.263:
         02 67 D1   3009           cmpl      (r7),#2
            03 13   300C           beql      gen.35
            FD6F 31 300E           brw       new_command
                    3011  gen.35:
            52 DD   3011           pushl     r2
            52 DD   3013           pushl     r2
       2A57 C4 DF   3015           pushal    10839(r4)
00000000* EF 03 FB  3019           calls     #3,PRINTF
            FD5D 31 3020           brw       new_command
               01   3023           nop
                    3024  sym.264:
         08 56 D1   3024           cmpl      r6,#8
            1F 12   3027           bneq      sym.265
         4C A3 9F   3029           pushab    76(r3)
         48 A3 9F   302C           pushab    72(r3)
         44 A3 9F   302F           pushab    68(r3)
         40 A3 9F   3032           pushab    64(r3)
       2A7E C4 DF   3035           pushal    10878(r4)
            65 9F   3039           pushab    (r5)
00000000* EF 06 FB  303B           calls     #6,SSCANF
            FD33 31 3042           brw       new_command
            50 D5   3045           tstl      r0
               01   3047           nop
                    3048  sym.265:
                    3048  showit:
            51 D4   3048           clrl      r1
      50 0000 C5 9E 304A           movab     0(r5),r0
               01   304F           nop
                    3050  sym.266:
```

```
                    80 94      3050              clrb      (r0)+
F6 51 0000004F 8F F3 3052              aobleq    #79,r1,sym.266
              02 67 D1    305A              cmpl      (r7),#2
                    1A 12      305D              bneq      sym.267
              7E 0C A3 56    305F              cvtfd     12(r3),-(sp)
              7E 08 A3 56    3063              cvtfd     8(r3),-(sp)
              7E 04 A3 56    3067              cvtfd     4(r3),-(sp)
                 7E 63 56    306B              cvtfd     (r3),-(sp)
              2A8A C4 DF    306E              pushal    10890(r4)
    00000000* EF 09 FB    3072              calls     #9,PRINTF
                              3079   sym.267:
              02 67 D1    3079              cmpl      (r7),#2
                    17 12      307C              bneq      sym.268
              7E 18 A3 56    307E              cvtfd     24(r3),-(sp)
              7E 14 A3 56    3082              cvtfd     20(r3),-(sp)
              7E 10 A3 56    3086              cvtfd     16(r3),-(sp)
              2AAB C4 DF    308A              pushal    10923(r4)
    00000000* EF 07 FB    308E              calls     #7,PRINTF
                              3095   sym.268:
              02 67 D1    3095              cmpl      (r7),#2
                    18 12      3098              bneq      sym.269
              7E 2C A3 56    309A              cvtfd     44(r3),-(sp)
              7E 28 A3 56    309E              cvtfd     40(r3),-(sp)
              7E 24 A3 56    30A2              cvtfd     36(r3),-(sp)
              7E 20 A3 56    30A6              cvtfd     32(r3),-(sp)
              2AC8 C4 DF    30AA              pushal    10952(r4)
    00000000* EF 09 FB    30AE              calls     #9,PRINTF
                              30B5   sym.269:
              02 67 D1    30B5              cmpl      (r7),#2
                    17 12      30B8              bneq      sym.270
              7E 38 A3 56    30BA              cvtfd     56(r3),-(sp)
              7E 34 A3 56    30BE              cvtfd     52(r3),-(sp)
              7E 30 A3 56    30C2              cvtfd     48(r3),-(sp)
              2AE9 C4 DF    30C6              pushal    10985(r4)
    00000000* EF 07 FB    30CA              calls     #7,PRINTF
                              30D1   sym.270:
              02 67 D1    30D1              cmpl      (r7),#2
                    18 12      30D4              bneq      sym.271
              7E 4C A3 56    30D6              cvtfd     76(r3),-(sp)
              7E 48 A3 56    30DA              cvtfd     72(r3),-(sp)
              7E 44 A3 56    30DE              cvtfd     68(r3),-(sp)
              7E 40 A3 56    30E2              cvtfd     64(r3),-(sp)
              2B06 C4 DF    30E6              pushal    11014(r4)
    00000000* EF 09 FB    30EA              calls     #9,PRINTF
                              30F1   sym.271:
              50 3C A3 4A    30F1              cvtfl     60(r3),r0
              02 67 D1    .30F5              cmpl      (r7),#2
                    03 13      30F8              beql      gen.36
                 FC83 31    30FA              brw       new_command
                              30FD   gen.36:
                    50 DD      30FD              pushl     r0
              2B38 C4 DF    30FF              pushal    11064(r4)
    00000000* EF 02 FB    3103              calls     #2,PRINTF
                 FC73 31    310A              brw       new_command
                    50 D5      310D              tstl      r0
                       01      310F              nop
                              3110   snooze:
                              3110   alldone:
              50 04 AC D0    3110              movl      4(ap),r0
              08 BC 6340 50  3114              movf      (r3)[r0],a8(ap)
                       04      3119              ret
                              311A   openinput:
                    0004      311A              .entry    openinput,^m<r2>
                 5E 04 C2    311C              subl2     #4,sp
    5C 00000000 EF 9E    311F              movab     SCHAR_STRING_CON
```

```
    52 00000000 EF 9E    3126          movab    INFILE6,r2
    02 00000000 EF D1    312D          cmpl     HEYPRINT,#2
             09 12       3134          bneq     sym.272
          2B69 CC DF     3136          pushal   11113(ap)
    00000000* EF 01 FB   313A          calls    #1,PRINTF
                         3141 sym.272:
    00000000 EF 2B92 CC DE 3141        moval    11154(ap),DEV_6I
            2B98 CC DF   314A          pushal   11160(ap)
       00000000 EF DD    314E          pushl    DEV_6IN
    00000000* EF 02 FB   3154          calls    #2,FOPEN
             62 50 D0    3159          movl     r0,(r2)
                12 12    315E          bneq     sym.273
          2B9A CC DF     3160          pushal   11162(ap)
    00000000* EF 01 FB   3164          calls    #1,PRINTF
    00000000* EF 00 FB   3168          calls    #0,EXIT
                         3172 sym.273:
    02 00000000 EF D1    3172          cmpl     HEYPRINT,#2
             0D 12       3179          bneq     sym.274
             62 DD       317B          pushl    (r2)
          2BC2 CC DF     317D          pushal   11202(ap)
    00000000* EF 02 FB   3181          calls    #2,PRINTF
                         3188 sym.274:
                04       3188          ret
                         3189 openoutput:
                0004     3189          .entry   openoutput,^m<r2
             5E 04 C2    318B          subl2    #4,sp
    5C 00000000 EF 9E    318E          movab    $CHAR_STRING_CON
    52 00000000 EF 9E    3195          movab    OUTFILE6,r2
    02 00000000 EF D1    319C          cmpl     HEYPRINT,#2
             09 12       31A3          bneq     sym.275
          2BEE CC DF     31A5          pushal   11246(ap)
    00000000* EF 01 FB   31A9          calls    #1,PRINTF
                         31B0 sym.275:
    00000000 EF 2C13 CC DE 31B0        moval    11288(ap),DEV_60
            2C1E CC DF   31B9          pushal   11294(ap)
       00000000 EF DD    31BD          pushl    DEV_6OUT
    00000000* EF 02 FB   31C3          calls    #2,FOPEN
             62 50 D0    31CA          movl     r0,(r2)
                12 12    31CD          bneq     sym.276
          2C21 CC DF     31CF          pushal   11297(ap)
    00000000* EF 01 FB   31D3          calls    #1,PRINTF
    00000000* EF 00 FB   31DA          calls    #0,EXIT
                         31E1 sym.276:
    02 00000000 EF D1    31E1          cmpl     HEYPRINT,#2
             0D 12       31E8          bneq     sym.277
             62 DD       31EA          pushl    (r2)
          2C49 CC DF     31EC          pushal   11337(ap)
    00000000* EF 02 FB   31F0          calls    #2,PRINTF
                         31F7 sym.277:
                04       31F7          ret
                         31F8 flatstat:
                001C     31F8          .entry   flatstat,^m<r2,r
             5E 04 C2    31FA          subl2    #4,sp
             51 0B AC D0 31FD          movl     8(ap),r1
             54 04 AC D0 3201          movl     4(ap),r4
             07 54 07 E1 3205          bbc      #7,r4,sym.278
             52 31 90    3209          movb     #49,r2
                05 11    320C          brb      sym.279
                50 D5    320E          tstl     r0
                         3210 sym.278:
             52 30 90    3210          movb     #48,r2
                         3213 sym.279:
             61 52 90    3213          movb     r2,(r1)
             06 54 06 E1 3216          bbc      #6,r4,sym.280
             53 31 90    321A          movb     #49,r3
```

```
            04 11    321D            brb     sym.281
               01    321F            nop
                     3220  sym.230:
         53 30 90    3220            movb    #43,r3
                     3223  sym.281:
      01 A1 53 90    3223            movb    r3,1(r1)
      05 54 05 E1    3227            bbc     #5,r4,sym.282
         52 31 90    322B            movb    #49,r2
            03 11    322E            brb     sym.283
                     3230  sym.232:
         52 30 90    3230            movb    #48,r2
                     3233  sym.283:
      02 A1 52 90    3233            movb    r2,2(r1)
      05 54 04 E1    3237            bbc     #4,r4,sym.284
         53 31 90    323B            movb    #49,r3
            03 11    323E            brb     sym.285
                     3240  sym.284:
         53 30 90    3240            movb    #48,r3
                     3243  sym.285:
      03 A1 53 90    3243            movb    r3,3(r1)
      05 54 03 E1    3247            bbc     #3,r4,sym.286
         52 31 90    324B            movb    #49,r2
            03 11    324E            brb     sym.287
                     3250  sym.286:
         52 30 90    3250            movb    #48,r2
                     3253  sym.287:
      04 A1 52 90    3253            movb    r2,4(r1)
      05 54 02 E1    3257            bbc     #2,r4,sym.288
         53 31 90    325B            movb    #49,r3
            03 11    325E            brb     sym.289
                     3260  sym.288:
         53 30 90    3260            movb    #48,r3
                     3263  sym.289:
      05 A1 53 90    3263            movb    r3,5(r1)
      05 54 01 E1    3267            bbc     #1,r4,sym.290
         50 31 90    326B            movb    #49,r0
            03 11    326E            brb     sym.291
                     3270  sym.290:
         50 30 90    3270            movb    #48,r0
                     3273  sym.291:
      06 A1 50 90    3273            movb    r0,6(r1)
         06 54 E9    3277            blbc    r4,sym.292
         52 31 90    327A            movb    #49,r2
            04 11    327D            brb     sym.293
               01    327F            nop
                     3280  sym.292:
         52 30 90    3280            movb    #48,r2
                     3283  sym.293:
      07 A1 52 90    3283            movb    r2,7(r1)
      08 A1 B4       3287            clrw    8(r1)
               04    328A            ret
```

Command Line
------------

CC G_W_VOLTS/MACHINE_CODE=AFTER/LIST

What is claimed is:

1. A sensor test chamber system for testing the operation of infrared detector modules to be operably disposed upon a satellite by simulating a target, background, and the satellite, as well as drift and jitter of the satellite, the system comprising:

a sensor test chamber housing, said housing being evacuatable to provide vacuum conditions representative of a space environment;

a detector servo mechanism for varying the orientation of the infrared detector module within the sensor test chamber housing to simulate drift and jitter of the satellite;

a source of infrared signals disposed outside of said sensor test chamber housing, said source generating infrared signals simulating the independent motions of a target and a background;

a window formed within the sensor test chamber housing to facilitate communication of said infrared signals to the detector module; and wherein the simulation of satellite drift and jitter in combination with the simulations of the independent motions of the target and the background provide a realistic representation of the infrared detector modules' working environment.

2. The system as recited in claim 1 wherein said servo mechanism is operative to effect movement of the detector module in three axes and to orient the detector module at a desired angle with respect to the infrared frequency signal.

3. The system as recited in claim 1 wherein said source of infrared signals simulating the independent motions of a target and a background comprise:

a first source of infrared light;

a first template having at least one aperture formed therein through which infrared light from the first source of infrared light is transmitted to generate a first infrared frequency light signal representative of the earth's surface;

a second source of infrared light;

a second template having at least one aperture formed therein through which infrared light from the second source of infrared light is transmitted to generate a second infrared frequency light signal representative of a target;

an optical image combiner for receiving and combining the first and second infrared frequency light signals, and for directing the combined first and second infrared frequency light signals to the detector module to be tested; and template positioning apparatus connected to each of said first and second templates for positioning each of said first and second templates relative to one another and relative to said detector modules such that the independent motions of a target and background may be simulated.

* * * * *